(12) United States Patent
Pennington et al.

(10) Patent No.: US 11,999,067 B2
(45) Date of Patent: Jun. 4, 2024

(54) ROBOTIC LAUNDRY SEPARATING AND REPOSITIONING DEVICES, SYSTEMS, AND METHODS OF USE

(71) Applicant: Monotony.ai, Inc., Newton, MA (US)

(72) Inventors: Elliot Sinclair Pennington, Lexington, MA (US); Benjamin D. Bixby, Newton Highlands, MA (US); Samuel Duffley, Cambridge, MA (US); Samuel M. Felton, Belmont, MA (US); Wilson J. Mefford, Somerville, MA (US); Stuart E. Schechter, Newton, MA (US); Ross O. Schlaikjer, Somerville, MA (US); Jesse Sielaff, Norfolk, MA (US); Madeline R. Hickman, Arlington, MA (US); Noa M. Rensing, West Newton, MA (US); Marissa A. Bennett, Waltham, MA (US)

(73) Assignee: MONOTONY.AI, INC., Watertown, MA (US)

(*) Notice: Subject to any disclaimer, the term of this patent is extended or adjusted under 35 U.S.C. 154(b) by 376 days.

(21) Appl. No.: 17/513,008

(22) Filed: Oct. 28, 2021

(65) Prior Publication Data
US 2022/0126452 A1    Apr. 28, 2022

Related U.S. Application Data

(60) Provisional application No. 63/106,829, filed on Oct. 28, 2020.

(51) Int. Cl.
*B25J 9/00* (2006.01)
*B25J 9/16* (2006.01)
(Continued)

(52) U.S. Cl.
CPC .......... *B25J 9/1682* (2013.01); *B25J 9/1612* (2013.01); *B25J 9/1697* (2013.01); *B25J 11/008* (2013.01);
(Continued)

(58) Field of Classification Search
CPC ...... B25J 9/1682; B25J 9/1612; B25J 9/1697; B25J 11/008; B25J 13/08; B25J 15/0028;
(Continued)

(56) References Cited

U.S. PATENT DOCUMENTS

| 4,885,853 A | 12/1989 | McCabe |
| 5,595,467 A | 1/1997 | Jensen |

(Continued)

FOREIGN PATENT DOCUMENTS

| CN | 103582728 A | 2/2014 |
| EP | 0679755 A1 | 11/1995 |

(Continued)

OTHER PUBLICATIONS

Robotic Conveyor Tracking with Dynamic Object Fetching for Industrial Automation (Year: 2017).*

(Continued)

*Primary Examiner* — Adam R Mott
*Assistant Examiner* — Shaheda Shabnam Hoque
(74) *Attorney, Agent, or Firm* — Myers Bigel, P.A.

(57) ABSTRACT

Devices, systems, and methods for autonomously separating a mass of clean laundry into single articles for folding and/or packing include autonomous separating device. The device includes a platform including a plurality of sequential work volumes and a stationary floor extending between an inlet end and an outlet end of the platform, a plurality of arms disposed in series along the platform for rotating, tilting, extending, and retracting a terminal gripper of each arm into an associated work volume for grabbing at least one of a (Continued)

plurality of laundry articles and passing the at least one laundry article to an adjacent work volume for grasping and hoisting by an adjacent arm. The device includes a bin, platform, conveyor and/or repositioning robot adjacent the outlet end for receiving each single article one at a time as each separate article passes beyond the outlet end.

20 Claims, 63 Drawing Sheets

(51) Int. Cl.
    *B25J 11/00*     (2006.01)
    *B25J 13/08*     (2006.01)
    *D06F 89/00*     (2006.01)
    *D06F 93/00*     (2006.01)
    *D06F 95/00*     (2006.01)
    *B25J 15/00*     (2006.01)

(52) U.S. Cl.
    CPC .............. *B25J 13/08* (2013.01); *D06F 89/00* (2013.01); *D06F 93/00* (2013.01); *D06F 95/00* (2013.01); *B25J 15/0028* (2013.01)

(58) Field of Classification Search
    CPC ...... B25J 9/0084; B25J 9/045; B25J 15/0206; B25J 19/023; B25J 9/1669; D06F 89/00; D06F 93/00; D06F 95/00; G05B 2219/39123
    See application file for complete search history.

(56) References Cited

U.S. PATENT DOCUMENTS

| | | | |
|---|---|---|---|
| 6,089,810 | A | 7/2000 | Heinz et al. |
| 6,287,066 | B1 | 9/2001 | Heinz et al. |
| 6,618,968 | B1 | 9/2003 | Nielsen |
| 6,655,890 | B1 | 12/2003 | Weir |
| 6,826,856 | B1 | 12/2004 | McCabe |
| 7,448,152 | B2 | 11/2008 | Jensen et al. |
| 2002/0157190 | A1 | 10/2002 | Imai et al. |
| 2004/0105736 | A1 | 6/2004 | Nielsen |
| 2005/0012349 | A1 | 1/2005 | Rauch et al. |
| 2006/0191170 | A1 | 8/2006 | Jensen et al. |
| 2006/0191171 | A1 | 8/2006 | Jensen et al. |
| 2008/0149460 | A1 | 6/2008 | Harris |
| 2012/0046783 | A1 | 2/2012 | Kechel |
| 2012/0099947 | A1 | 4/2012 | Heinz et al. |
| 2012/0103029 | A1 | 5/2012 | Darwin et al. |
| 2012/0165986 | A1 | 6/2012 | Fuhlbrigge et al. |
| 2012/0228340 | A1* | 9/2012 | Sakane ............... D06F 89/02 223/37 |
| 2012/0308339 | A1 | 12/2012 | McCabe |
| 2014/0219732 | A1 | 8/2014 | Thorpe |
| 2015/0361610 | A1 | 12/2015 | Yano |
| 2016/0145055 | A1* | 5/2016 | Sielermann ............. D06F 67/04 414/800 |
| 2022/0048708 | A1* | 2/2022 | Lindley .................. B65B 5/06 |

FOREIGN PATENT DOCUMENTS

| | | |
|---|---|---|
| EP | 1498539 A1 | 1/2005 |
| EP | 3280839 A1 | 2/2018 |
| EP | 3280839 B1 | 2/2019 |
| GB | 1525491 A | 9/1978 |
| JP | 2000263481 A | 9/2000 |
| WO | 9713914 A1 | 4/1997 |
| WO | 02077355 A1 | 10/2002 |
| WO | 2017153511 A1 | 9/2017 |
| WO | 2017182309 A1 | 10/2017 |
| WO | 2019072751 A1 | 4/2019 |

OTHER PUBLICATIONS

R. C. Luo and C.-H. Liao, "Robotice conveyor tracking with dynamic object fetching for industrial automation," 2017 IEEE 15th International Conference on Industrial Informatics (INDIN), Emden, Germany, 2017, pp. 369-374 (Year: 2017).* https://www.youtube.com/watch?v=mfOcVpMNdHg, Inwatec—Fully Automatic Sorting of Soiled Workwear 2,124 views, Feb. 16, 2018.

https://www.youtube.com/watch?v=-oDMVnP__p8, Soiled Side Sorting of the Future: Robot, RFID, X-ray, Automatic Sorting, 8,653 views Mar. 26, 2018.

International Search Report and Written Opinion for PCT/US2021/056987 dated Feb. 28, 2022, 21 pages.

Inwatec, "Line 3: Automatic Sorting", Robotics for Industrial Laundries, https:/inwatec.dk/products/line-3-automatic-sorting/, 2021, 4 pages.

The Heavy Duty Automatic Flatwork Separating System Cascade®, Chicago Dryer Company, Bulletin #7560, 4 pages, available at the time of filing.

Warener Waschfee, "SmartLaundry With Laundry Carts: the Success Story of the 'Warener Waschfee'", Herbert Kannegiesser GmbH, Nov. 3, 2021, 1 page.

Bersch, Christian , et al., "Bimanual robotic cloth manipulation for laundry folding", Intelligent Robots and Systems, 2011 IEEE/RSJ International Conference on, IEEE, Sep. 25, 2011, pp. 1413-1419.

Hata, S. , et al., "Robot system for cloth handling", Industrial Electronics, 2008, IECON 2008, 34th Annual Conference of IEEE, Nov. 10, 2008, pp. 3449-3454.

Paton, Scott , "Stepping Into the Future—AI in the Laundry", https://laundryledger.com/the-future-of-ai-based-automation-in-the-laundry-industry/.

Poe, Matt, "Artificial Intelligence: Future of Laundry Operations? (Part 1) Difference between artificial intelligence, automation", https://americanlaundrynews.com/articles/artificial-intelligence-future-laundry-operations-part-1, 5 pages., Dec. 17, 2020

Poe, Matt, "Artificial Intelligence: Future of Laundry Operations? (Part 1) Difference between artificial intelligence, automation", Retrieved from: https://americanlaundrynews.com/articles/artificial-intelligence-future-laundry-operations-part-1, Dec. 17, 2020, (2 pages).

* cited by examiner

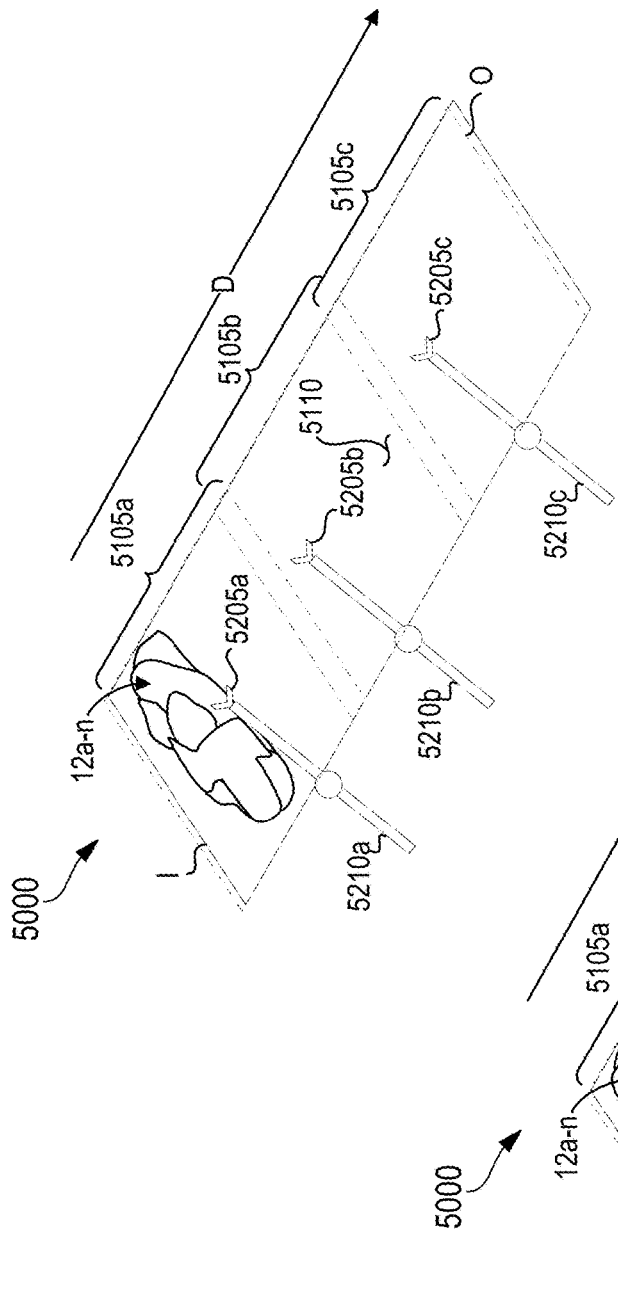
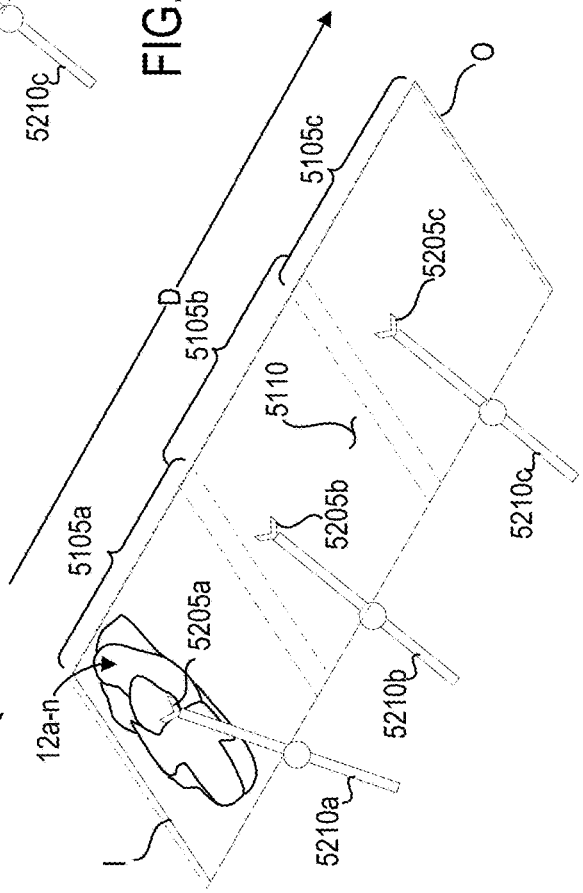
FIG. 12A
FIG. 12B

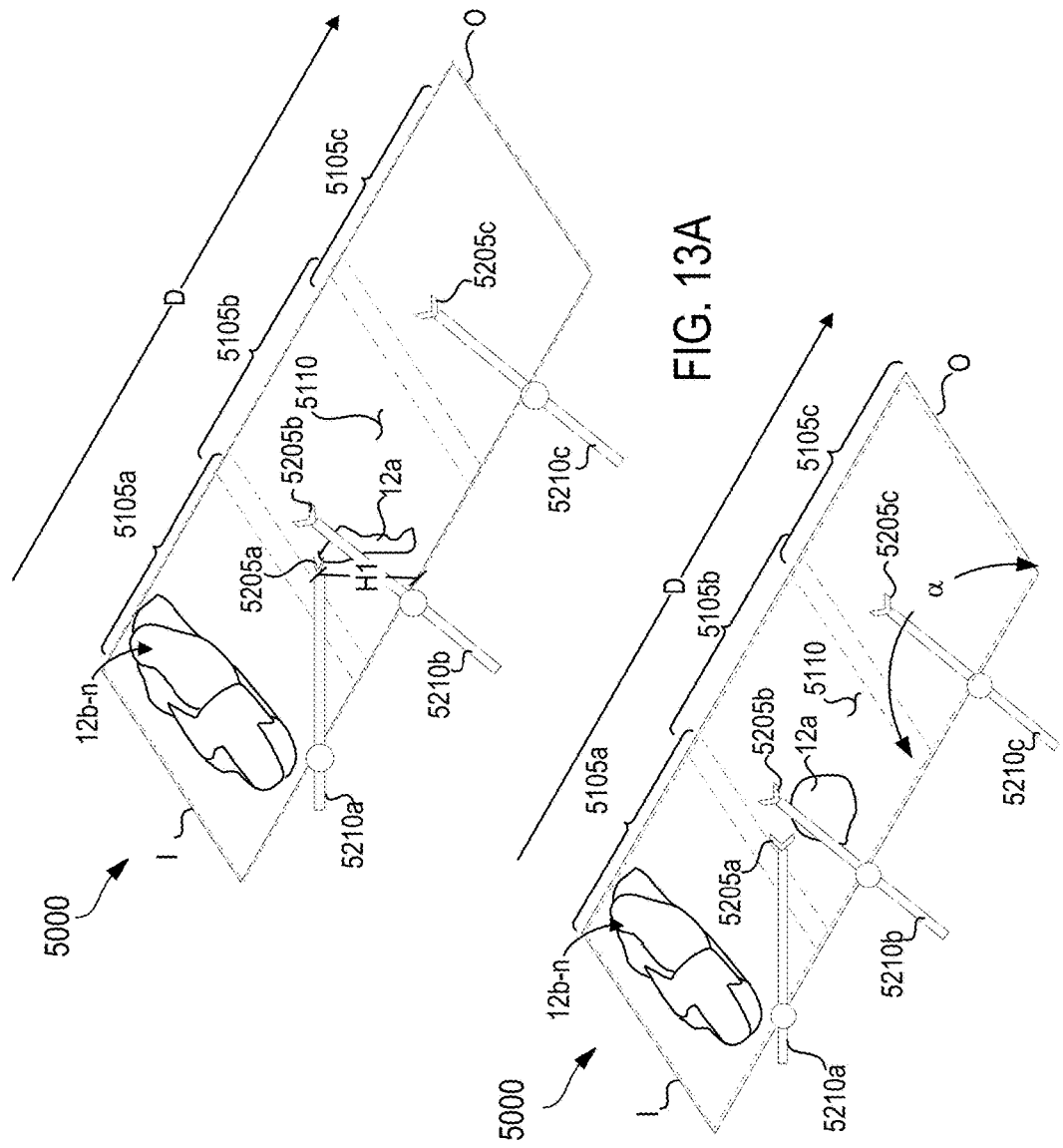

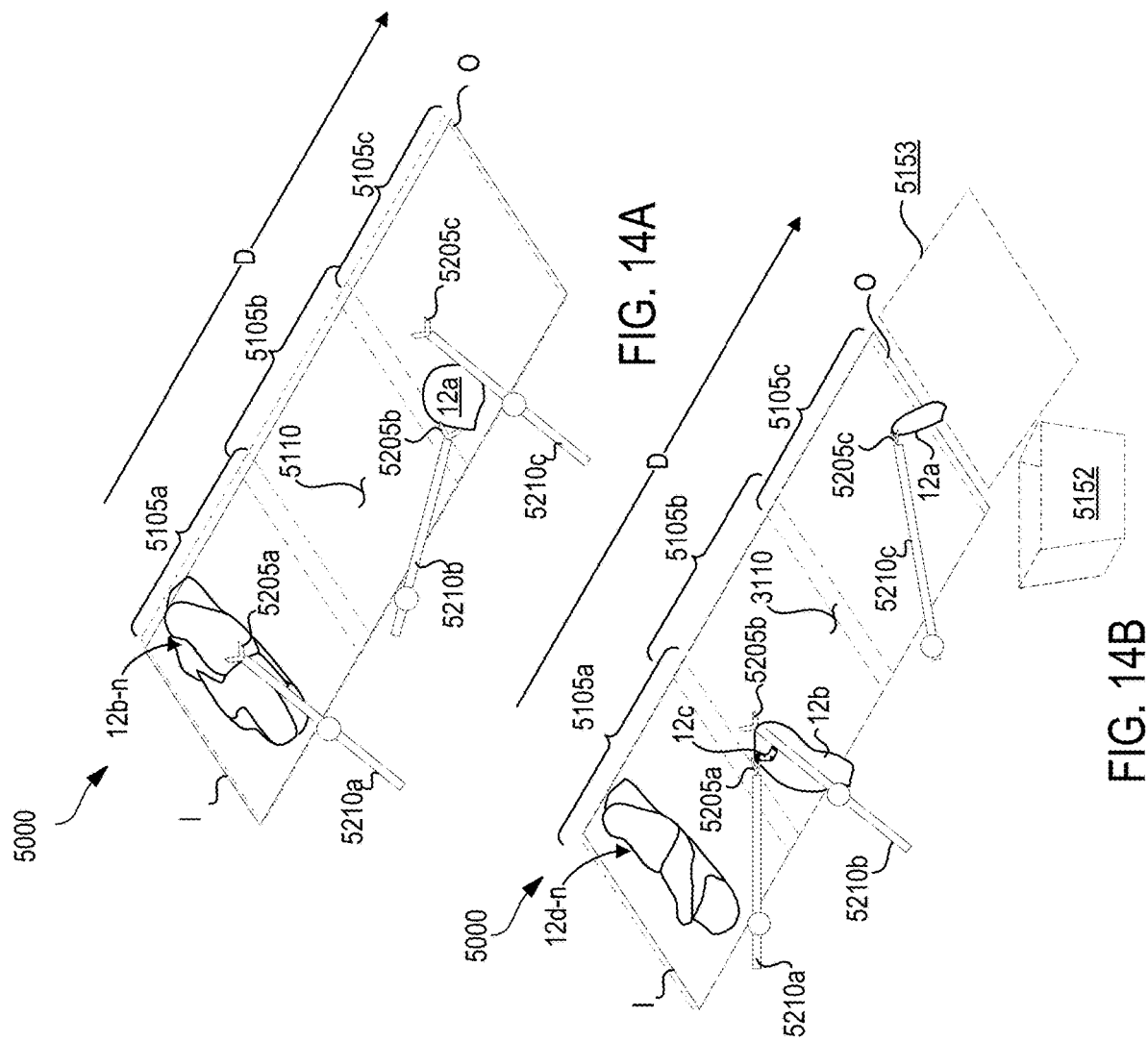

ROBOTIC LAUNDRY SEPARATING AND REPOSITIONING DEVICES, SYSTEMS, AND METHODS OF USE

CROSS-REFERENCE TO RELATED APPLICATIONS

This application claims priority under 35 U.S.C. § 119(e) to U.S. Provisional Patent Application Ser. No. 63/106,829 filed Oct. 28, 2020, titled "Robotic Laundry Separating and Repositioning Devices, Systems, And Methods of Use," the entirety of which application is hereby incorporated by reference.

BACKGROUND

The present disclosure is directed to robotic laundry devices, systems, and methods.

Automating and outsourcing mundane, time-consuming household chores to robotic devices is increasingly common. Time saving home robots include, for example, floor vacuuming and floor washing robots. Outsourcing responsibilities include, for example, engaging grocery shopping and delivery services, and manually operated and human-operator dependent laundry washing and dry-cleaning pick up and return services.

Many homes are appointed with a dedicated washer and dryer for family use. Domestic washers and dryers are increasingly sophisticated and include IoT connectivity features and push notifications for alerting users about cycle progress and energy and resource usage. These technologically advanced machines, however, require human interaction and cannot eliminate the time required for processing loads of laundry in the home. Although more modern, "high efficiency" machines are equipped with sensors for metering water usage and dryer temperatures, the efficiency gains are capped by the constraints of sequentially processing single loads of laundry. Grey water is output to the city water and sewer system for mitigation with each load of laundry processed. Energy is consumed with each load of laundry washed and dried.

Households can outsource laundry chores to laundromat facilities for a fee in exchange for time. Laundromats offering residential mixed load laundering services, however, require human interaction for intake and sorting of dirty laundry, transferring loads from washer to dryer, and then manually folding clean laundry. These are costly processes as measured in time, energy consumption, water consumption, and wastewater output, and they rely on human intervention to keep the process running at every transition and throughout several process steps. This invites delays at every stage. Because these processes are human-dependent and inefficient, the costs are passed along to customers outsourcing their laundry for cleaning. Human-reliant laundering services also require that employees touch the belongings of the customer, potentially exposing the employee to contaminants in the dirty laundry and potentially exposing the clean laundry to transferable pathogens, dust, hair, and other debris emanating from a laundromat employee. In addition to potentially introducing undesirable contact contamination from the employees processing the loads of laundry, a privacy barrier is breached. Outsourcing household laundry to a laundromat involves employees interacting with customers' personal belongings including bodily worn garments.

Industrial laundry services exist for handling uniform business-related items, such as hospital bed sheets, medical scrubs, and hotel towels. Such industrial machines are tailor-made to accept one type of laundry item of one size or style. For example, unique folding machines exist to accept a dedicated one of washed flat sheets, fitted sheets, hotel towels, and hotel bathrobes. These machines require human operators to load the washed article into its dedicated machine, which is sized and designed to fold that one type and size of article. This type of process line relies on a human operator for properly aligning and loading the clean article into the machine, which could introduce bodily contaminants, bacteria, and viral matter into the clean articles. Like laundromat services, these industrial services rely on human intervention and potentially introduce bio-contaminants into clean loads of laundry. Because these services are only profitable by processing large volumes of like items, these industrial processors are generally subscription-based services for large clients like hotels and hospitals producing standard-size, repeat laundry articles and are not available to consumers at an individual household level. Additionally, these services are configured to combine laundry from more than one source and are not configured to isolate and process separate loads for individual households.

Autonomous robotic devices are provided to process loads of household laundry. Such devices eliminate human contact with deformable laundry articles. As such, the devices need to be designed to be efficient and reliable for replacing the common, human-dependent chore of laundry.

SUMMARY

In one example, an autonomous device for separating a plurality of amassed deformable articles includes a platform, a plurality of arms disposed in series along the platform, at least one sensor, and a controller. The platform includes a plurality of sequential work volumes and a stationary floor extending between an inlet end and an outlet end of the platform, a portion of the stationary floor within a first work volume of the plurality of sequential work volumes being configured to receive thereon the plurality of deformable articles adjacent an inlet end. The plurality of arms are disposed in series along the platform and is associated with one of the plurality of sequential work volumes. Each one of the plurality of arms include an actuatable terminal gripper configured to selectively grasp at least one of the plurality of deformable articles, and at least one drive configured to at least one of linearly translate, slide, rotate, tilt, extend, and retract the terminal gripper. The at least one sensor is disposed at least one of on, adjacent to, and within each of the plurality of sequential work volumes. The at least one sensor is configured to detect at least one of the plurality of deformable articles disposed within an associated one of the plurality of sequential work volumes, and output a signal indicative of at least one of the presence and location of the at least one of the plurality of deformable articles relative to the terminal gripper of the one of the plurality of arms associated with the one of the plurality of sequential work volumes. The controller is in operable communication with the at least one drive and the at least one sensor. The controller is configured to receive a signal from the at least one sensor in an associated one of the plurality of sequential work volumes indicative of at least one of the plurality of deformable articles being disposed within the associated one of the plurality of sequential work volumes, determine a location of the at least one of the plurality of deformable articles on the stationary floor relative to an arm associated with the one of the plurality of sequential work volumes, instruct the at least one drive to position the terminal gripper of the associated arm at the determined location to grasp the at least one of the plurality of deformable articles, instruct an actuator of the terminal gripper of the associated arm to close on the at least one of the plurality of deformable articles, instruct the at least one drive to raise the closed terminal gripper of the associated arm and the grasped at least one of the plurality of deformable articles to a hoist height above the stationary floor and rotate toward the outlet end into an adjacent work volume, instruct the actuator of the terminal gripper to open the gripper to release the at least one of the plurality of deformable articles in the adjacent work volume, receive a signal from at least one sensor in the adjacent work volume of the plurality of sequential work volumes, and determine, based on the received signal, a state including at least one of one or more of the plurality of deformable articles are present on the stationary floor, and none of the plurality of deformable articles are present on the stationary floor.

Implementations of the device may include one or more of the following features.

In examples, the deformable articles are non-uniform.

In examples, the platform is a trough with at least two longitudinal side walls. In examples, the trough can include at least one wall disposed across the inlet end between the two longitudinal side walls. The at least one wall is configured to retain the plurality of deformable articles on the platform.

In examples, a last arm in the series of the plurality of arms delivers each separated deformable article onto a surface adjacent the platform. In examples, the surface is a conveyor. In examples, the surface is a bin.

In examples, the device is aligned with a repositioning robot, and the last arm in the plurality of arms delivers the single deformable article to the repositioning robot.

In examples, the plurality of sequential work volumes includes three or more work volumes. The plurality of arms can include three or more arms, each of the three or more arms being associated with one of the three or more work volumes. In examples, an outlet-facing end of each of the three or more work volumes overlaps with an inlet-facing end of an adjacent sequential one of the three or more work volumes such that each arm of the plurality of arms is configured to extend into one or more adjacent work volumes of the plurality of sequential work volumes.

In examples, the controller is further configured to, based on determining one or more of the plurality of deformable articles are present on the stationary floor in the adjacent work volume, iteratively determine a location of the at least one of the plurality of deformable articles on the stationary floor relative to an arm associated with the adjacent work volume, instruct the at least one drive of the arm associated with the adjacent work volume to position the terminal gripper of the arm associated with the adjacent work volume at the determined location to grasp the at least one of the plurality of deformable articles, instruct an actuator of the terminal gripper of the arm associated with the adjacent work volume to close on the at least one of the plurality of deformable articles, instruct the at least one drive to raise the closed terminal gripper of the arm associated with the adjacent work volume and the grasped at least one of the plurality of deformable articles to a hoist height above the stationary floor, and move (e.g., rotate, slide, translate) toward the outlet end into the next sequential adjacent work volume of the three or more work volumes, instruct the actuator of the terminal gripper to open the gripper to release the at least one of the plurality of deformable articles in the next sequential adjacent work volume, receive a signal from at least one sensor in the next sequential adjacent work volume of the plurality of sequential work volumes, and determine, based on the received signal, a state including at least one of one or more of the plurality of deformable articles are present on the stationary floor, and none of the plurality of deformable articles are present on the stationary floor.

In examples, the controller is configured to stop iterating when each one of the plurality of deformable articles exits the platform past the outlet end as a solitary deformable article.

In examples, the controller is further configured to instruct two or more of the plurality of arms to operate simultaneously within each associated one of the plurality of sequential work volumes. The terminal grippers of the two or more of the plurality of arms operating simultaneously can be configured to simultaneously grasp at least one of the plurality of deformable articles.

In examples, the controller is further configured to, based on determining none of the plurality of deformable articles are present on the stationary floor in the adjacent work volume, receive a signal from the at least one sensor indicative of at least one of the plurality of deformable articles remaining disposed within the one of the plurality of sequential work volumes preceding the adjacent work volume, determine a location of the at least one of the plurality of deformable articles on the stationary floor relative to the associated arm, instruct the at least one drive to position the terminal gripper of the associated arm at the determined location to grasp the at least one of the plurality of deformable articles, instruct an actuator of the terminal gripper of the associated arm to close on the at least one of the plurality of deformable articles, instruct the at least one drive to raise the closed terminal gripper of the associated arm and the grasped at least one of the plurality of deformable articles to a hoist height above the stationary floor and move (e.g., rotate, slide, translate) toward the outlet end into the adjacent work volume, instruct the actuator of the terminal gripper to open the gripper to release the at least one of the plurality of deformable articles in the adjacent work volume, and determine, based on the received signal, a state including at least one of one or more of the plurality of deformable articles are present on the stationary floor, and none of the plurality of deformable articles are present on the stationary floor.

In examples, the stationary floor includes a substantially level surface from the inlet end to the outlet end.

In examples, the stationary floor includes a substantially continuous surface throughout all of the plurality of sequential work volumes.

In examples, the plurality of arms each further include a rod configured to extend from an anchor at corresponding individually anchored positions. The rod includes a fully extended length of between about 0.25 m and 4 m.

In examples, the anchor includes the at least one drive. In examples, the at least one drive includes a pan drive, a tilt drive, and an extend drive. In examples, the controller is further configured to drive the at least one drive in at least one of alternating side-to-side and alternating up and down motions to shake a grasped deformable article of the plurality of deformable articles at the hoist height.

In examples, each one of the plurality of arms includes between one and three degrees of freedom.

In examples, the each one of the plurality of arms includes at least one compliant joint. In examples, the at least one compliant joint includes a compliant wrist disposed between the extendable rod and the terminal gripper.

In examples, the terminal gripper of each of the plurality of arms includes at least two actuatable fingers. In examples, the at least two actuatable fingers include an overmold including a durometer of between about 40 A to 80 A.

In examples, the terminal gripper of each of the plurality of arms is at least one of cable driven and pneumatically driven, and an actuator of each terminal gripper is in operable communication with the controller.

In examples, a wrist is disposed between each of the plurality of arms and an associated terminal gripper. The wrist includes one or more sensors configured to detect forces applied to the terminal gripper.

In examples, each anchor is disposed on a base outside the platform and the associated one of the plurality of arms disposed on the base extends over the platform.

In examples, a plurality anchors each associated with the plurality of arms are disposed on at least one of a wall, a frame, the stationary floor, and a ceiling above the platform.

In examples, the hoist height includes a predetermined hoist height. The predetermined hoist height can be in a range of between about 0.5 to 4 m above the stationary floor.

In examples, one or more weight sensors are disposed on each of the plurality of arms, the one or more weight sensor being in operative communication with the controller and being configured to continuously detect a rate of change as each one of the plurality of deformable laundry articles is raised. The controller can be configured to determine each one of the plurality of deformable laundry articles is raised to a hoist height when the one or more weight sensors detect an unchanging rate of change of measured weight.

In examples, the at least one sensor includes at least one of a 3-D camera, an IR sensor, a 2-D camera, LIDAR, LADAR, a sonar proximity sensor, an ultrasonic ranging sensor, a radar sensor, and a pair of stereo depth cameras. In examples, the at least one sensors outputs at least one of depth map, RGB images, and IR images. The at least one sensor can be configured to output 3-D image data to the controller. The at least one sensor are configured to output one or more 2-D images to the controller. In examples, the at least one sensor is a camera, and the camera is calibrated to the floor of the platform and one or more of the plurality of arms.

In examples, the controller is further configured to determine, based on a comparison of a received output signal of the at least one sensor to data stored in a memory in communication with the controller, at least one of an article type, an article color, an article size, and an article fabric. At least one of the at least one sensor is a 2-D camera and the data associated with repositioned deformable laundry article is size invariant image data. The memory can further include a neural network and determining the one or more characteristics of each one of the plurality of deformable articles includes processing the received output signal of the at least one sensor of each of the plurality of work volumes with a neural network classifier.

In examples, determining a location of the at least one of the plurality of deformable articles on the stationary floor further includes determining one or more grip points on the at least one of the plurality of deformable articles. The one or more grip points can be disposed on a high point of the at least one of the plurality of deformable articles. The one or more grip points can be disposed on an edge of the at least one of the plurality of deformable articles.

In examples, the at least one sensor is disposed above each of the plurality of sequential work volumes.

In examples, the at least one sensor is disposed within the platform adjacent an associated one of the plurality of arms and includes a field of view encompassing the associated work volume.

In examples, the at least one sensor is disposed on a pedestal adjacent the platform.

In examples, wherein the at least one sensor is disposed on a base supporting one of the plurality of arms.

In examples, the controller is further configured to receive an output signal including an image, determine, based on the output signal, a number of pixels in each of an upper half and a lower half of the image, the number of pixels being representative of at least one deformable article being grasped by a terminal gripper and held at a hoist height, and determine based on the number of pixels in the lower half of the image exceeding a preset threshold that the at least one deformable article is a large sized article.

In examples, the controller is further configured to receive an output signal including an image of a deformable article in the enclosed channel, determine, based on the output signal and a calibrated coordinate space, where in the calibrated coordinate space each pixels of the image lies, and determine at least one of a location, shape, and size of the deformable article. In examples, the at least one sensor is a camera and the camera is calibrated to the floor of the platform and one or more of the plurality of arms.

In examples, the controller is further configured to determine, based on receiving a signal from the at least one sensor disposed within each of the plurality of sequential work volumes, that none of the plurality of deformable articles remain on the stationary floor in any of the plurality of sequential work volumes.

In one example, a system for separating and repositioning a plurality of deformable articles amassed in a collection includes a platform, a plurality of arms disposed in series long the platform, at least one separation sensor, a conveyor adjacent the outlet end of the platform, two or more repositioning arms disposed about the conveyor, two or more repositioning sensors disposed about the conveyor, and a controller. The platform includes a plurality of sequential work volumes and a stationary floor extending between an inlet end and an outlet end of the platform. At least a portion of the stationary floor within a first work volume of the plurality of sequential work volumes is configured to receive thereon the plurality of deformable articles (e.g., the amassed collection of deformable articles, e.g., a load of laundry) adjacent an inlet end. The plurality of arms are disposed in series along the platform, and each one of the plurality of arms includes an actuatable terminal gripper configured to selectively grasp at least one of the plurality of deformable articles, and at least one arm drive motor configured to move the terminal gripper within one or more sequential work volumes to pass the one or more of the plurality of deformable articles sequentially through the plurality of sequential work volumes. At least one separation sensor is disposed at least one of on, adjacent to, and within the plurality of sequential work volumes. The at least one sensor is configured to detect at least one of the plurality of deformable articles disposed within an associated one of the plurality of sequential work volumes and output a signal indicative of at least one of the presence and location of the at least one of the plurality of deformable articles relative to the terminal gripper of the one of the plurality of arms closest to the deformable article. The conveyor adjacent the outlet end of the platform is disposed at a bottom of a repositioning work volume. The repositioning work volume is configured to receive therein the terminal gripper of an arm of the plurality of arms closest to the outlet end and one of the plurality of deformable articles engaged by the terminal gripper. The two or more repositioning arms are disposed about the perimeter of the repositioning work volume at individually anchored positions spaced apart by between about 150 cm to 400 cm. In implementations, the two or more repositioning arms are spaced apart by a distance of between about 1.5 m to 3 m (e.g., 1.5 m, 2 m, 2.5 m, 3 m) or 5 to 9 feet (e.g., 5 ft, 5.25 ft, 5.5 ft, 5.75 ft, Eft, 6.25 ft, 6.5 ft, 6.75 ft, 7 ft, 7.25 ft, 7.5 ft, 7.75 ft, 8 ft, 8.25 ft, 8.5 ft, 8.75, 9 ft). Each of the two or more repositioning arms includes a gripper and at least one repositioning drive motor and is configured to move within the repositioning work volume for releasably engaging the deformable laundry article, and operate at least one of independently of and in tandem with another of the two or more repositioning arms and the arm of the plurality of arms closest to the outlet end of the platform to at least one of raise and suspend the deformable laundry article above the conveyor. The two or more repositioning sensors are disposed at two or more fixed locations about the work volume and are spaced apart by between about 30 cm to 400 cm. Each one of the two or more repositioning sensors is configured to at least one of detect one or more features and capture one or more images of the deformable laundry article disposed within the work volume, and output a signal including the at least one of the detected one of one or more features and captured one or more images.

The controller is in operable communication with the at least one arm drive motor, the at least one repositioning drive motor, the at least one separation sensor, and the two or more repositioning sensors. The controller is configured to receive a signal from the at least one separation sensor of the plurality of sequential work volumes indicative of at least one of the plurality of deformable articles being disposed within the associated one of the plurality of sequential work volumes, determine a location of the at least one of the plurality of deformable articles on the stationary floor relative to a closest arm off the plurality of arms, instruct the at least one drive motor to position the terminal gripper of the closest arm at the determined location to grasp the at least one of the plurality of deformable articles, instruct an actuator of the terminal gripper of the associated arm to close on the at least one of the plurality of deformable articles, instruct the at least one drive motor to raise the arm and associated closed terminal gripper and the grasped at least one of the plurality of deformable articles to a hoist height above the stationary floor and move toward the outlet end into at least one of an adjacent work volume and the repositioning work volume for handing off to at least one of an adjacent one of the plurality of arms in series and one of the two or more repositioning arms, receive a signal from at least one of the at least one separation sensor and at least one of the two or more repositioning sensors, and determine, based on the received signal, a state including at least one of one or more of the plurality, of deformable articles are present in the plurality of work volumes, none of the plurality of deformable articles are present in the plurality of work volumes, and one of the plurality of deformable articles is disposed within the repositioning work volume.

Implementations of the system may include one or more of the following features.

In examples, moving the terminal gripper includes the at least one arm drive motor at least one of rotating, tilting, extending, translating, and retracting the terminal gripper.

In examples, each one of the plurality of arms is associated with and disposed adjacent one of the plurality of sequential work volumes.

In examples, the controller is further configured to instruct the actuator of the terminal gripper to open the gripper to release the at least one of the plurality of deformable articles in at least one of the adjacent work volume and the repositioning work volume.

In examples, the controller is further configured to, before instructing the terminal gripper within the repositioning work volume to release the one of the plurality of deformable articles, determine that at least one of the two or more repositioning arms is engaged with the one of the plurality of deformable articles in the repositioning work volume.

In examples, the one of the plurality of deformable articles disposed within the repositioning work volume is disposed on the conveyor.

In examples, the two or more repositioning sensors are positioned apart from the two or more repositioning arms.

In examples, the two or more repositioning sensors are each positioned on at least one base supporting one of the two or more repositioning arms.

In examples, the at least one sensor includes at least one of a 3-D camera, an IR sensor, a 2-D camera, LIDAR, LADAR, a sonar proximity sensor, an ultrasonic ranging sensor, a radar sensor, and a pair of stereo depth cameras. In examples, the at least one sensors outputs at least one of depth map, RGB images, and IR images. The at least one sensor can be configured to output 3-D image data to the controller. The at least one sensor are configured to output one or more 2-D images to the controller. In examples, the at least one sensor is a camera, and the camera is calibrated to the floor of the platform and one or more of the plurality of arms.

In one example, a system for separating and repositioning a plurality of deformable articles amassed in a collection includes a pair of parallel platforms, a plurality of shared arms disposed between the pair of parallel platforms, at least one sensor, and a controller. The pair of parallel platforms are separated by a gap. Each platform of the pair of parallel platforms includes a plurality of sequential work volumes disposed sequentially along a stationary floor extending between an inlet end and an outlet end of the platform. A portion of the stationary floor within a first work volume of the plurality of sequential work volumes of each platform of the pair of parallel platforms is configured to receive thereon the plurality of deformable articles adjacent the inlet end of each platform. The plurality of arms is disposed in series in the gap between the pair of parallel platforms. Each one of the plurality of arms is configured to rotate in a range of between 180 and 360 degrees, and each one of the plurality of arms is associated with parallel ones of the plurality of sequential work volumes of the pair of parallel platforms. Each one of the plurality of arms includes an actuatable terminal gripper configured to selectively grasp at least one of the plurality of deformable articles within either one of the pair of parallel platforms, and at least one drive motor is configured to at least one of rotate, tilt, extend, and retract the terminal gripper into the associated ones of the plurality of sequential work volumes. The at least one sensor is disposed at least one of on, adjacent to, and within the plurality of sequential work volumes of the pair of parallel platforms. The at least one sensor is configured to detect at least one of the plurality of deformable articles disposed within one of the plurality of sequential work volumes of the pair of parallel platforms and output a signal indicative of at least one of the presence and location of the at least one of the plurality of deformable articles relative to the terminal gripper of the one of the plurality of arms associated with the one of the plurality of sequential work volumes of the pair of parallel platforms.

The controller is in operable communication with the at least one drive motor and the at least one sensor of each of the parallel platforms. The controller is configured to receive a signal from the at least one sensor in an associated one of the plurality of sequential work volumes indicative of at least one of the plurality of deformable articles being disposed within the associated one of the plurality of sequential work volumes of the pair of parallel platforms, determine a location of the at least one of the plurality of deformable articles on the stationary floor of one of the pair of parallel platforms relative to the arm associated with the work volume, instruct the at least one drive motor to at least one of rotate the associated arm into the other of the pair of parallel platforms and position the terminal gripper of the associated arm at the determined location to grasp at least one of the plurality of deformable articles, instruct an actuator of the terminal gripper of the associated arm to close on the at least one of the plurality of deformable, instruct the at least one drive to raise the closed terminal gripper of the associated arm and the grasped at least one of the plurality of deformable articles to a hoist height above the stationary floor of one the pair of parallel platforms and rotate toward the outlet end into an adjacent work volume of the one of the pair of parallel platforms, instruct the actuator of the terminal gripper to open the gripper to release the at least one of the plurality of deformable articles in the adjacent work volume, receive a signal from the at least one sensor of the plurality of sequential work volumes, and determine, based on the received signal, a state including at least one of one or more of the plurality of deformable articles are present on the stationary floor of at least one of one of the pair of parallel platforms, and none of the plurality of deformable articles are present on the stationary floor of at least one of the pair of parallel platforms.

Implementations of the system may include one or more of the following features.

In examples, the system further includes a pair of parallel conveyors. Each one of the pair of parallel conveyors can be disposed adjacent the outlet end of each one of the pair of parallel platforms and disposed at a bottom of a repositioning work volume. The repositioning work volume is configured to receive therein the terminal gripper of an arm of the plurality of arms closest to the outlet end and one of the plurality of deformable articles gripped by the terminal gripper.

In examples, the system further includes two or more repositioning arms disposed about the perimeter of the repositioning work volume at individually anchored positions spaced apart by between about 150 cm to 400 cm. In examples, the two or more repositioning arms are disposed about the perimeter of the repositioning work volume at individually anchored positions spaced apart by between about 1.5 m to 3 m (e.g., 1.5 m, 2 m, 2.5 m, 3 m) or 5 to 9 feet (e.g., 5 ft, 5.25 ft, 5.5 ft, 5.75 ft 6 ft, 6.25 ft, 6.5 ft, 6.75 ft, 7 ft, 7.25 ft, 7.5 ft, 7.75 ft 8 ft, 8.25 ft, 8.5 ft, 8.75, 9 ft). Each of the two or more repositioning arms includes a gripper and at least one repositioning drive motor and is configured to move within the repositioning work volume for releasably engaging the deformable laundry article, and operate at least one of independently of and in tandem with another of the two or more repositioning arms and the arm of the plurality of arms closest to the outlet end of the platform to at least one of raise and suspend the deformable laundry article above the conveyor.

In examples, the system further includes two or more repositioning sensors disposed at two or more fixed locations about the work volume and spaced apart by between about 30 cm to 400 cm. Each of the two or more repositioning sensors are configured to at least one of detect one or more features and capture one or more images of the deformable laundry article disposed within the work volume and output a signal including the at least one of the detected one of one or more features and captured one or more images, the signal being indicative of the deformable laundry article being spread apart for folding.

In examples, the two or more repositioning sensors are positioned apart from the two or more repositioning arms.

In examples, the two or more repositioning sensors are each positioned on at least one base supporting one of the two or more repositioning arms.

In examples, the at least one sensor includes two cameras disposed on a base supporting the arm closest to the outlet end, each one of the two cameras having a field of view one of the pair of work volumes.

In examples, the system further includes a controller in operable communication with the at least one arm drive motor, the at least one repositioning drive motor, the at least one separation sensor, and the two or more repositioning sensors. The controller is configured to receive a signal from the at least one separation sensor of the plurality of sequential work volumes indicative of at least one of the plurality of deformable articles being disposed within the associated one of the plurality of sequential work volumes, determine a location of the at least one of the plurality of deformable articles on the stationary floor relative to the associated arm, instruct the at least one drive motor to position the terminal gripper of the associated arm at the determined location to grasp the at least one of the plurality of deformable articles, instruct an actuator of the terminal gripper of the associated arm to close on the at least one of the plurality of deformable articles, instruct the at least one drive motor to raise the arm and associated closed terminal gripper of the arm and the grasped at least one of the plurality of deformable articles to a hoist height above the stationary floor and rotate toward the outlet end into at least one of an adjacent work volume and an adjacent one of the pair of repositioning work volumes, instruct the actuator of the terminal gripper to open the gripper to release the at least one of the plurality of deformable articles in at least one of the adjacent work volume and the adjacent one of the repositioning work volumes, receive a signal from at least one of at least one separation sensor in the adjacent work volume of the plurality of sequential work volumes and at least one of the two or more repositioning sensors, and determine, based on the received signal, a state including at least one of one or more of the plurality of deformable articles are present on the stationary floor, none of the plurality of deformable articles are present on the stationary floor, and one of the plurality of deformable articles is disposed within the adjacent one of the repositioning work volumes.

In examples, the controller is further configured to, before instructing the terminal gripper within the adjacent one of the repositioning work volumes to release the one of the plurality of deformable articles, determine that at least one of the two or more repositioning arms is engaged with the one of the plurality of deformable articles in the adjacent one of the repositioning work volumes.

In examples, the one of the plurality of deformable articles disposed within the adjacent one of the repositioning work volumes is disposed on the conveyor.

In examples, the controller is further configured to actuate the repositioning drive motor of one or more of the two or more repositioning arms of each one of the pair of parallel conveyors.

In examples, the controller can further be configured to simultaneously activate two or more of the arm drive motor of the separating arm closest to the outlet end of the pair of platforms and the two or more repositioning arms of each of the pair of parallel conveyors to at least one of hoist and fold the deformable article disposed within one of the work volumes of the pair of parallel conveyors.

In examples, the controller is further configured to simultaneously activate two or more of the arm drive motor of the separating arm closest to the outlet end of the pair of platforms and the two or more repositioning arms of each of the pair of parallel conveyors to at least one of hoist and fold the deformable article disposed within both of the work volumes of the pair of parallel conveyors.

In examples, the at least one sensor includes at least one of a 3-D camera, an IR sensor, a 2-D camera, LIDAR, LADAR, a sonar proximity sensor, an ultrasonic ranging sensor, a radar sensor, and a pair of stereo depth cameras. In examples, the at least one sensors outputs at least one of depth map, RGB images, and IR images. The at least one sensor can be configured to output 3-D image data to the controller. The at least one sensor are configured to output one or more 2-D images to the controller. In examples, the at least one sensor is a camera, and the camera is calibrated to the floor of the platform and one or more of the plurality of arms.

In one example, a method of robotically separating a laundry article from a pile of laundry includes receiving, at a controller, a signal from at least one sensor disposed at least one of on, adjacent to, and within a plurality of sequential work volumes, the signal being indicative of at least one of the plurality of deformable laundry articles being disposed within the associated one of the plurality of sequential work volumes. The method includes determining, based on the received signal, a location of the at least one of the plurality of deformable articles on a stationary floor of the associated one of the plurality of sequential work volumes. The plurality of sequential work volumes are constituent to a platform and the stationary floor extending between an inlet end and an outlet end of the platform, and a portion of the stationary floor adjacent the inlet end is configured to receive thereon the plurality of deformable laundry articles. The method includes instructing at least one drive of at least one of a plurality of arms disposed in series along the platform to at least one of rotate, tilt, extend, and retract a terminal gripper configured to selectively grasp at least one of the plurality of deformable laundry articles at the determined location. Each one of the plurality of arms is associated with one of the plurality of sequential work volumes, and the last one of the plurality of arms is configured to extend into a repositioning work volume configured to be disposed adjacent the outlet end. The method includes instructing, by the controller, an actuator of the terminal gripper to close on the at least one of the plurality of deformable laundry articles. The method includes instructing the at least one drive to raise the closed terminal gripper and the grasped at least one of the plurality of deformable laundry articles to a hoist height above the stationary floor, and rotate toward the outlet end into at least one of an adjacent work volume and the repositioning work volume. The method includes instructing the actuator of the terminal gripper to open the gripper to release the at least one of the plurality of deformable laundry articles in the adjacent work volume, and receiving a signal from the least one sensor of the plurality of sequential work volumes. The method includes determining, based on the received signal, a state including at least one of one or more of the plurality of deformable laundry articles are present on the stationary floor, one or more of the plurality of deformable laundry articles are not present on the stationary floor, and one the plurality of deformable laundry articles is disposed in a repositioning work volume adjacent the outlet end.

In examples, the method further comprises handing off a deformable laundry article between a separating robot and a repositioning robot. The method includes detecting an article in the final work volume closest to the outlet end with the at least one of the one or more sensors, finding a high point on the detected article, and instructing the terminal gripper of the final work volume to grab the high point. The method includes taking a population count at least one of at and just below the terminal gripper raised to a first height above the platform, the first height placing the terminal gripper within a field of view of at least one sensor disposed beneath a repositioning robot conveyor. In implementations, the at least one sensor disposed beneath the repositioning robot conveyor is a camera comprising a field of view aimed down the length of the platform. The method includes instructing the at least one motor to raise the terminal gripper to a final hoist height and move the terminal gripper into the work volume of the repositioning robot.

The method includes determining, based on the population count, whether the grab was missed (or alternatively successful) and/or if the article grabbed by the terminal gripper is small and requires special disposition. If the threshold population count is above a threshold value, the method determines that the article was grabbed and is not small. Because the article grab was not missed and is not small, the terminal gripper delivered the article to the repositioning robot work volume and a repositioning routine begins.

If the threshold population count is below the threshold value, a miss is detected. The missed grab could be either a true miss, or the grab was successful, but the article is small (e.g., comprises a detected point cloud below a threshold value) and requires special disposition (e.g., rerouting) to a packing robot without being folded by a folding robot. If a miss is determined, the method includes checking whether the platform is empty. If the platform is empty, the miss detection is false and the method includes the repositioning robot executing a small article routine on the small article delivered to the work volume. The small article routine can include at least one of a lifter of the repositioning robot hoisting the article and delivering it to a collection bin or conveyor adjacent the repositioning robot work volume for delivery to a packing robot 800 without folding and the conveyor receiving the article thereon and transiting the article out of the work volume and to the folding robot for retrieval by a packing robot without folding.

If a miss is detected and the platform is not empty, the method includes instructing the last arm to move the gripper back over the platform to a location other than above the detected high point and release the gripper (e.g., ungrip) over the platform so that when the controller iterates finding the highpoint, the gripper is ready to grab the highpoint, once again attempting a grab of the article.

If the gripper had been holding a small item while another item remained on the platform in the final work volume, the method includes depositing the small item back onto the platform when the gripper returns and ungrips over the platform. Because the gripper ungrips at a location other than the high point, the gripper is unlikely to grasp the small article again when it iteratively grabs the highpoint.

BRIEF DESCRIPTION OF THE DRAWINGS

FIG. 12A depicts a schematic perspective view of a portion of an implementation of an autonomous laundry separating device at the start of a sorting process.

FIG. 12B depicts the implementation of the autonomous laundry separating device of 12A at a next step in the sorting process.

FIG. 13A depicts the implementation of the autonomous laundry separating device of 12B at a next step in the sorting process.

FIG. 13B depicts the implementation of the autonomous laundry separating device of 13A at a next step in the sorting process.

FIG. 14A depicts the implementation of the autonomous laundry separating device of 13B at a next step in the sorting process.

FIG. 14B depicts the implementation of the autonomous laundry separating device of 14A at a next step in the sorting process.

DETAILED DESCRIPTION

This disclosure relates to autonomous robotic devices, systems, and methods for handling residential loads of laundry without relying on human labor. Laundry articles are collected from households and delivered to one or more process lines for cleaning, packing, and returning to the households. The autonomous processes are time and cost efficient, eliminate human intervention-based delays, eliminate line workers and associated potential introduction of human contaminants introduced by line workers, and eliminate any concerns with having private personal items handled by strangers.

The system includes one or more autonomous process lines comprising a plurality of autonomous robotic devices configured to work in concert to process one or more dirty loads of household laundry from a collection of dirty, non-uniform articles to individually separated, cleaned, folded, and packed laundry articles. The plurality of autonomous robotic devices operate without human intervention to efficiently and effectively launder a plurality of customers' dirty items. This disclosure relates to autonomous robotic devices configured to separate individual articles from a mass of a plurality of clean laundry articles and hand off the separated articles to a repositioning robot for repositioning prior to folding, and systems of separating and repositioning devices autonomously functioning in concert and having at least one shared lifter.

Figure 1:
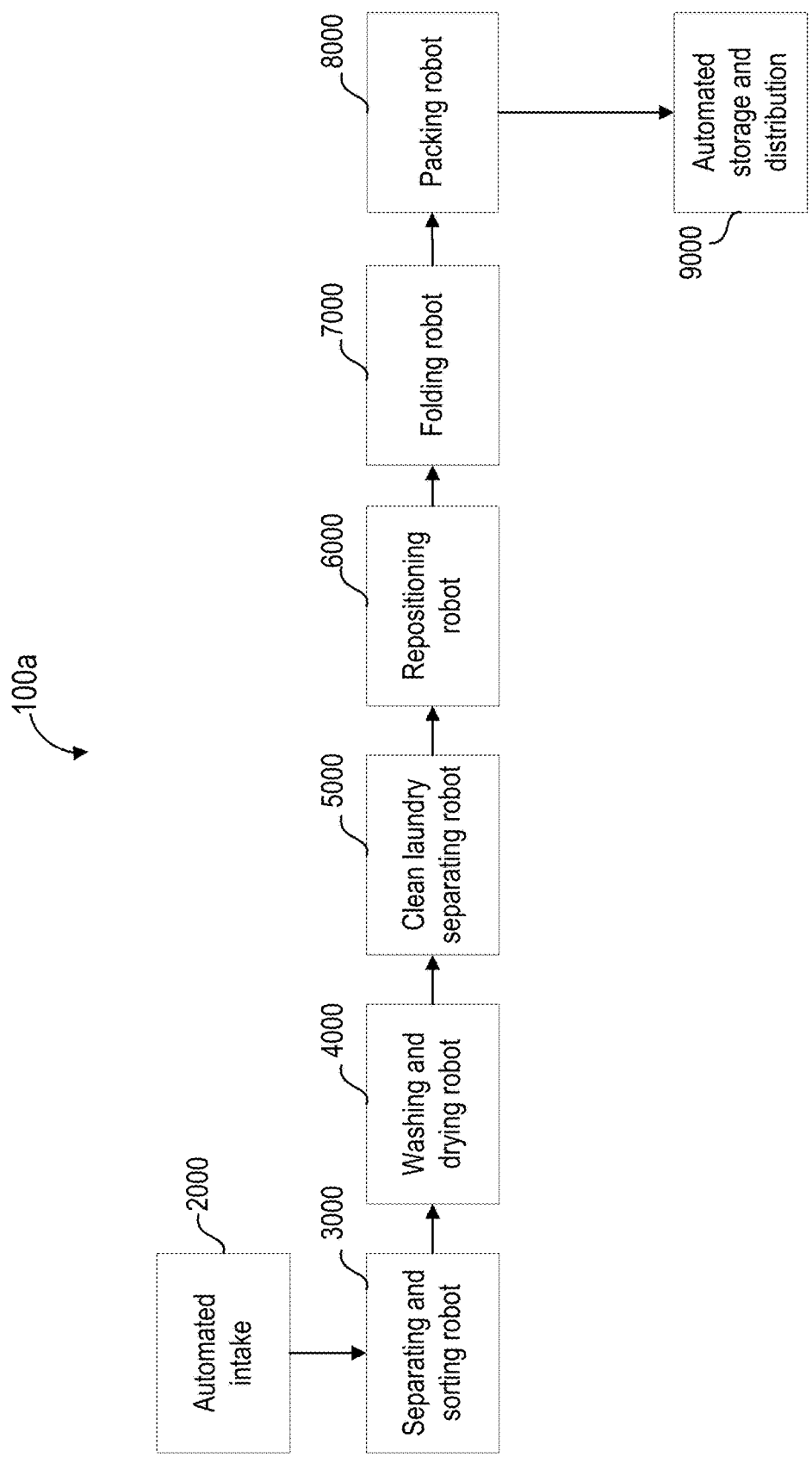
FIG. 1 depicts a schematic of an example autonomous robotic laundry process line.

As shown in FIG. 1, in implementations of the system, a process line 100a comprises a plurality of autonomous robots configured to operate in series without human intervention to process and transport dirty laundry through the cleaning process, and then fold and repackage the clean laundry for return to a household. In one implementation, the process line 100a comprises an automated intake robot 2000 for receiving a load of dirty household laundry comprising a plurality of deformable laundry articles. The deformable laundry articles can be non-uniform in type, size, shape, color, and fabric. For example, the plurality of deformable laundry articles can include items commonly laundered in homes, such as sheets, towels, table cloths, and adult and children's garments, for example, tee shirts, pants, socks, undergarments, dresses, dress shirts, and blouses. The autonomous intake robot 2000 is configured to introduce the plurality of deformable laundry articles to a dirty laundry separating and sorting robot 3000 configured to separate out each one of the deformable laundry articles of the plurality of deformable laundry articles. In implementations, the separating and sorting robot 3000 is configured to sort each one of the separated deformable laundry articles into one or more related batches for washing. In implementations, the separating and sorting robot 3000 is configured to intelligently batch the separated each one of the deformable laundry articles according to a programmed sorting algorithm based, for example, on criteria including at least one of material color, material type, article size, customer washing preference, water temperature requirements, and load size (e.g., weight and/or physical volume). In implementations, the separating and sorting robot 3000 is configured to identify and record the number and types of garments in the load of laundry and provide this information to one or more robots of the process line 100a.

The separating and sorting robot 3000 outputs one or more intelligently sorted batches of deformable laundry articles to one or more washing and drying robots 4000 for laundering. The one or more washing and drying robots 4000 output the clean laundry articles to a clean laundry separating robot 5000. Implementations of the clean laundry separating robot 5000 can be similar or identical to the separating and sorting robot 3000. The clean laundry separating robot 5000 is configured to separate a load of clean laundry into individual deformable laundry articles for introduction into a repositioning robot 6000. In implementations, the repositioning robot 6000 receives a single deformable laundry article and manipulates and repositions it for automated introduction into a folding robot 7000, which automatically folds the laundry article for introduction to a packing robot 8000. In implementations, the packing robot 8000 automatically and autonomously packs the clean load of laundry comprising the plurality of clean and folded deformable laundry articles into a shipping container for automated redistribution to the customer. In implementations, the shipping container is a reusable container. In implementations, the shipping container is a disposable container. In implementations, the shipping container is a non-deformable container with an ingress protection rating that includes an intrusion protection rating of 5 or 6 and a moisture protection rating of any and all of 1 through 6 in accordance with the Ingress Protection Code, IEC standard 60529. In reusable implementations, the shipping container can be washable.

Figure 2:
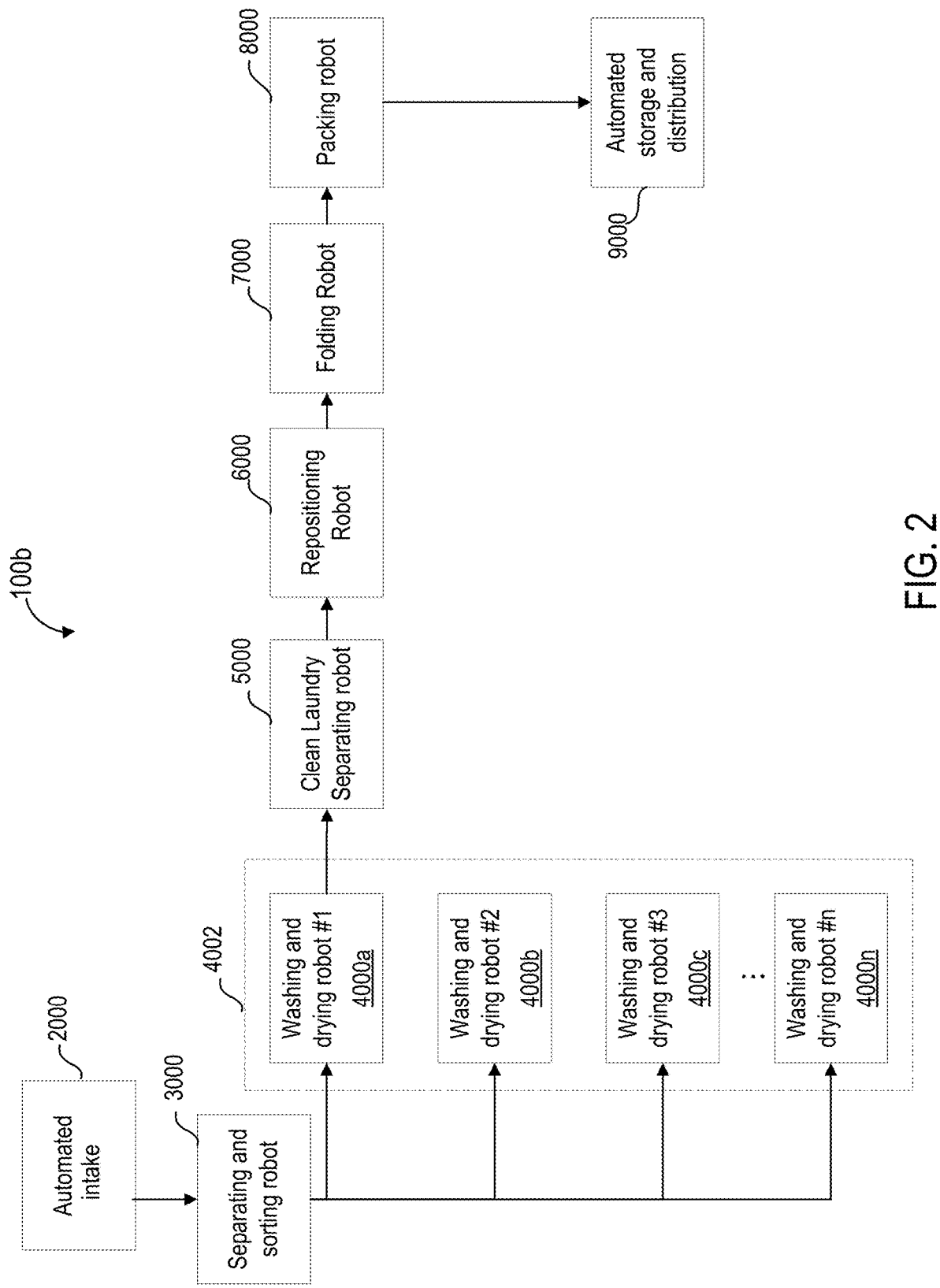
FIG. 2 depicts a schematic example of a system for controlling an autonomous robotic process line.
Figure 3:
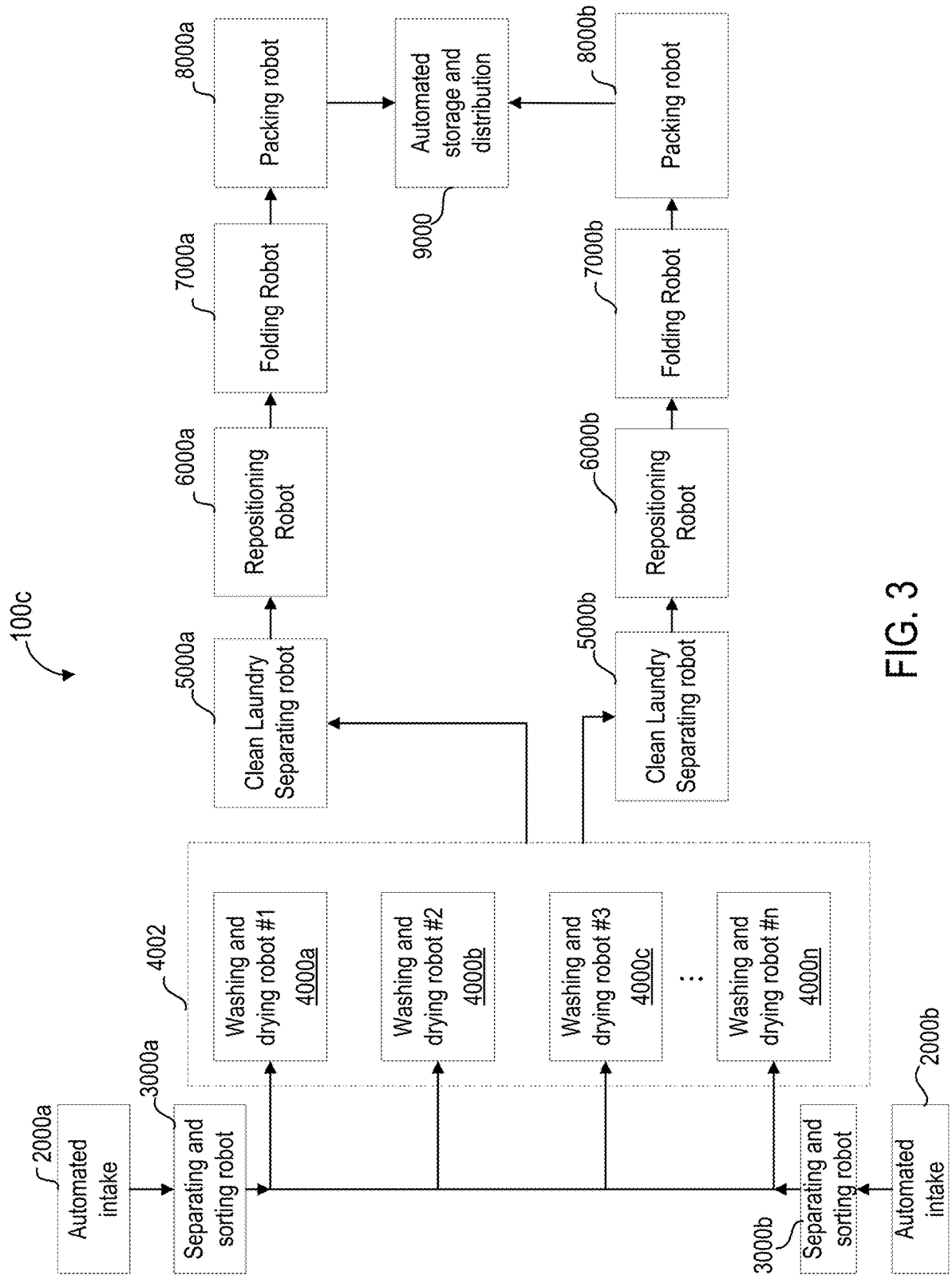
FIG. 3 depicts a schematic of a plurality of autonomous robotic laundry process lines including a plurality of intakes and outputs and a plurality of washing and drying robots.

Implementations of the process line 100a of household laundry cleaning robots can comprise one or more of each of the robots depicted in FIG. 1. For example, as shown in FIG. 2, each autonomous process line 100b can include a bank or cluster 4002 of washing and drying robots 4000a-n. In other implementations, as shown in FIG. 3, the autonomous process line 100c includes a cluster 4002 of washing and drying robots 4000a-n shared by two or more sets of automated intake robots 2000a-b and dirty laundry separating and sorting robots 3000a-b and two or more sets of clean laundry separating robots 5000a-b, repositioning robots 6000a-b, folding robots 7000a-b, and packing robots 8000a-b. Additionally, two or more of the robots can be combined in a single module in alternate implementations. In implementations, one or more of the robots in the process line 100a-c are configured to communicate over wired connections or wireless communication protocols. For example, in implementations, one or more robots in the process line 100a-c can communicate with another one or more robots in the process line 100a-c over a wired BUS, LAN, WLAN, 4G, 5G, LTE, Ethernet, BLUETOOTH, or other IEEE 801.11 standard.

Figure 4:
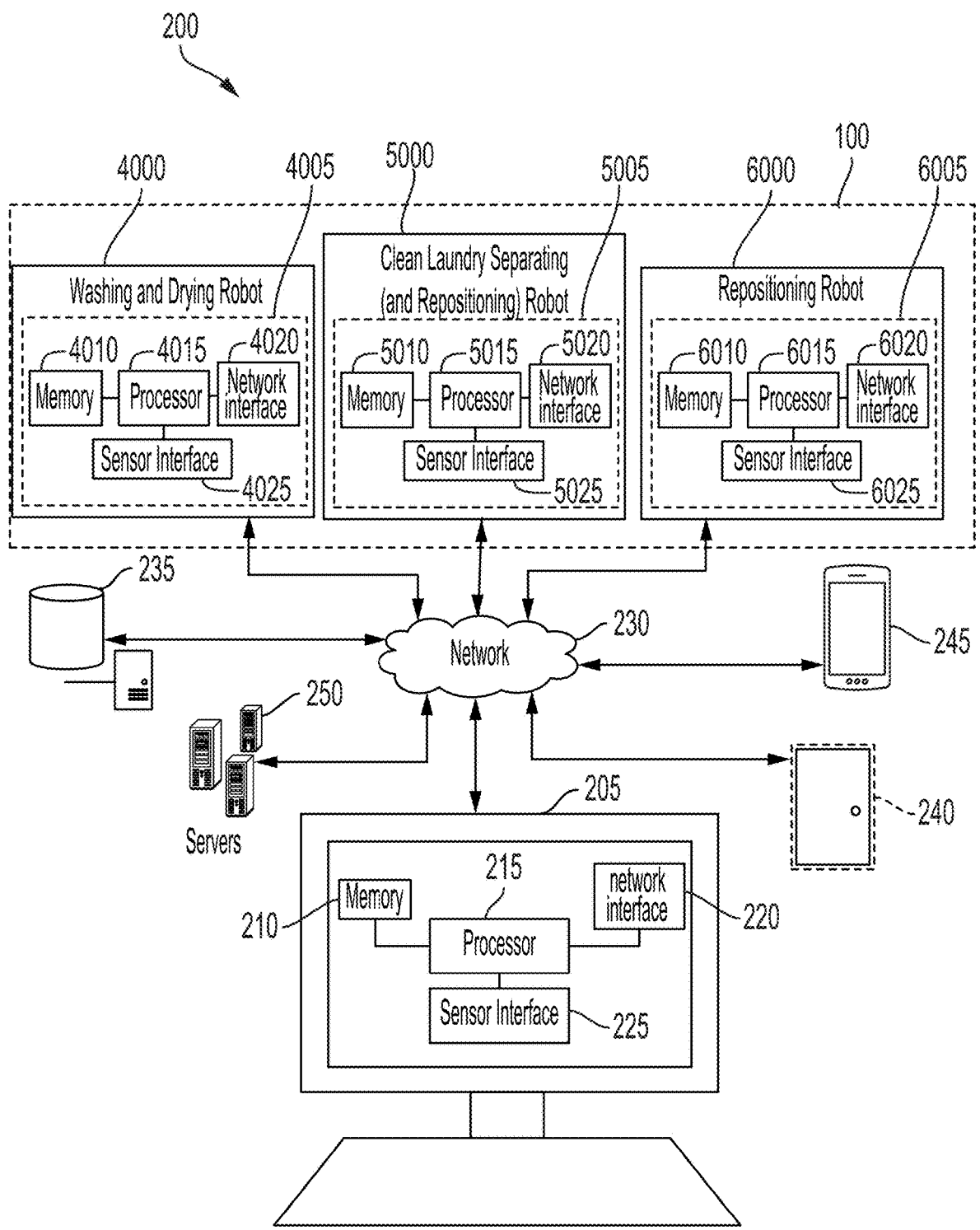
FIG. 4 depicts a schematic example of a system for controlling an autonomous robotic laundry process line.

Referring to FIG. 4, an example of a system 200 of operatively connected robots is shown. FIG. 4 depicts a schematic implementation of a portion of an autonomous robotic process line 100, 100a-c. A washing and drying robot 4000 is configured to provide washed and dried loads of dirty deformable laundry articles to the autonomous clean laundry separating robot 5000. The clean laundry separating robot 5000 is configured to provide individual deformable laundry articles to the repositioning robot 6000 for spreading apart in preparation for folding. The washing and drying robot 4000 is in operative communication with a clean laundry separating robot 5000 and outputs a load of clean laundry for separation by the clean laundry separating robot 5000. Each robot 4000, 5000, 6000 includes a controller 4005, 5005, 6005 configured to operate the associated robot.

For example, in implementations, the autonomous clean laundry separating robot 5000 includes a controller 5005. The controller 5005 includes a processor 5015 in communication with a memory 5010, a network interface 5020, and a sensor interface 5025. The processor 5015 can be a single microprocessor, multiple microprocessors, a many-core processor, a microcontroller, and/or any other general purpose computing system that can be configured by software and/or firmware. In implementations, the memory 5010 contains any of a variety of software applications, data structures, files and/or databases. In one implementation, the controller 5005 includes dedicated hardware, such as single-board computers, application specific integrated circuits (ASICs), and field programmable gate arrays (FPGAs).

A network interface 5020 is configured to couple the controller 5005 to a network 230. The network 230 may include both private networks, such as local area networks, and public networks, such as the Internet. It should be noted that, in some examples, the network 230 may include one or more intermediate devices involved in the routing of packets from one endpoint to another. In implementations, the network interface 5020 is coupled to the network 230 via a networking device, such as a bridge, router, or hub. In other implementations, the network 230 may involve only two endpoints that each have a network connection directly with the other. In implementations, the network interface 5020 supports a variety of standards and protocols, examples of which include USB (via, for example, a dongle to a computer), TCP/IP, Ethernet, Wireless Ethernet, BLUETOOTH, ZigBee, M-Bus, CAN-bus, IP, IPV6, UDP, DTN, HTTP, FTP, SNMP, CDMA, NMEA and GSM. To ensure data transfer is secure, in some examples, the controller 5005 can transmit data via the network interface 5020 using a variety of security measures including, for example, TLS, SSL or VPN. In implementations, the network interface 5020 includes both a physical interface configured for wireless communication and a physical interface configured for wired communication. According to various embodiments, the network interface 5020 enables communication between the controller 5005 of the clean laundry separating robot 5000 and at least one of the plurality of robots 2000, 3000, 4000, 6000, 7000, 8000, 9000 of the process line 100, 100a-c.

Additionally or alternatively, the network interface 5020 is configured to facilitate the communication of information between the processor 5015 and one or more other devices or entities over the network 230. For example, in implementations, the network interface 5020 is configured to communicate with a remote computing device such as a computing terminal 205, database 235, server 240, smartphone 245, and server farm 250. In implementations, the network interface 5020 can include communications circuitry for at least one of receiving data from a database 235 and transmitting data to a remote server 240, 250. In some implementations, the network interface 5020 can communicate with a remote server over any of the wired protocols previously described, including a WI-FI communications link based on the IEEE 802.11 standard.

In some examples in accordance with FIG. 4, the network 230 may include one or more communication networks through which the various autonomous robots and computing devices illustrated in FIG. 4 may send, receive, and/or exchange data. In various implementations, the network 230 may include a cellular communication network and/or a computer network. In some examples, the network 230 includes and supports wireless network and/or wired connections. For instance, in these examples, the network 230 may support one or more networking standards such as GSM, CMDA, USB, BLUETOOTH®, CAN, ZigBee®, Wireless Ethernet, Ethernet, and TCP/IP, among others. In implementations, the network 230 can implement broadband cellular technology (e.g., 2.5 G, 2.75 G, 3 G, 4 G, 5 G cellular standards) and/or Long-Term Evolution (LTE) technology or GSM/EDGE and UMTS/HSPA technologies for high-speed wireless communication.

Although the controller 5005 is described herein in particular, one or more of the plurality of robots 2000, 3000,

4000, 6000, 7000, 8000, 9000 of the process line 100 includes similar components having similar functionality.

Figure 5:
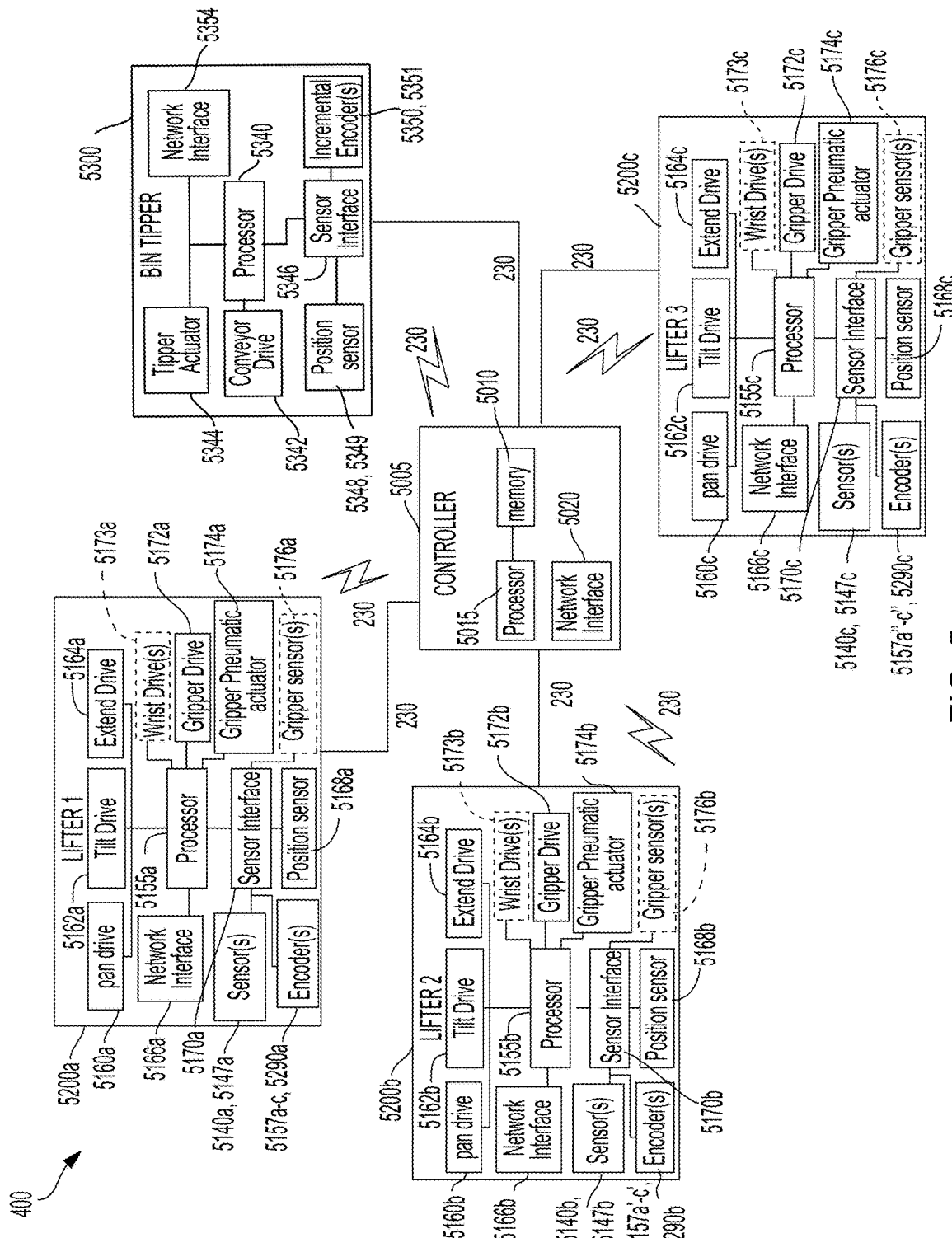
FIG. 5 depicts a schematic example of a system of autonomous devices configured to separate household laundry articles.

Turning to FIG. 5, a schematic of an implementation of autonomous clean laundry separating system 400 is shown. The system 400 includes one or more of the features and devices described with regard to the embodiments of FIGS. 1-4. In implementations, the clean laundry separating system 400 comprises a plurality of interactive autonomous robotic devices and sensors. In implementations the system 400 comprises at least three lifters 5200a-c each comprising an arm 5210a-c, a controller 5005, and at least one bin tipping assembly 5300 for receiving a bin containing one or more clean laundry articles 12a-n from a washing and drying device 4000 and delivering the one or more clean laundry articles 12a-n onto a receiving surface of the clean laundry separating system 5000. In implementations, the controller 5005 is in wired or wireless operative communication with processors and drives of all of the foregoing. Each autonomous device of the system 400 of FIG. 5 will be described subsequently with regard to implementations.

Figure 6:
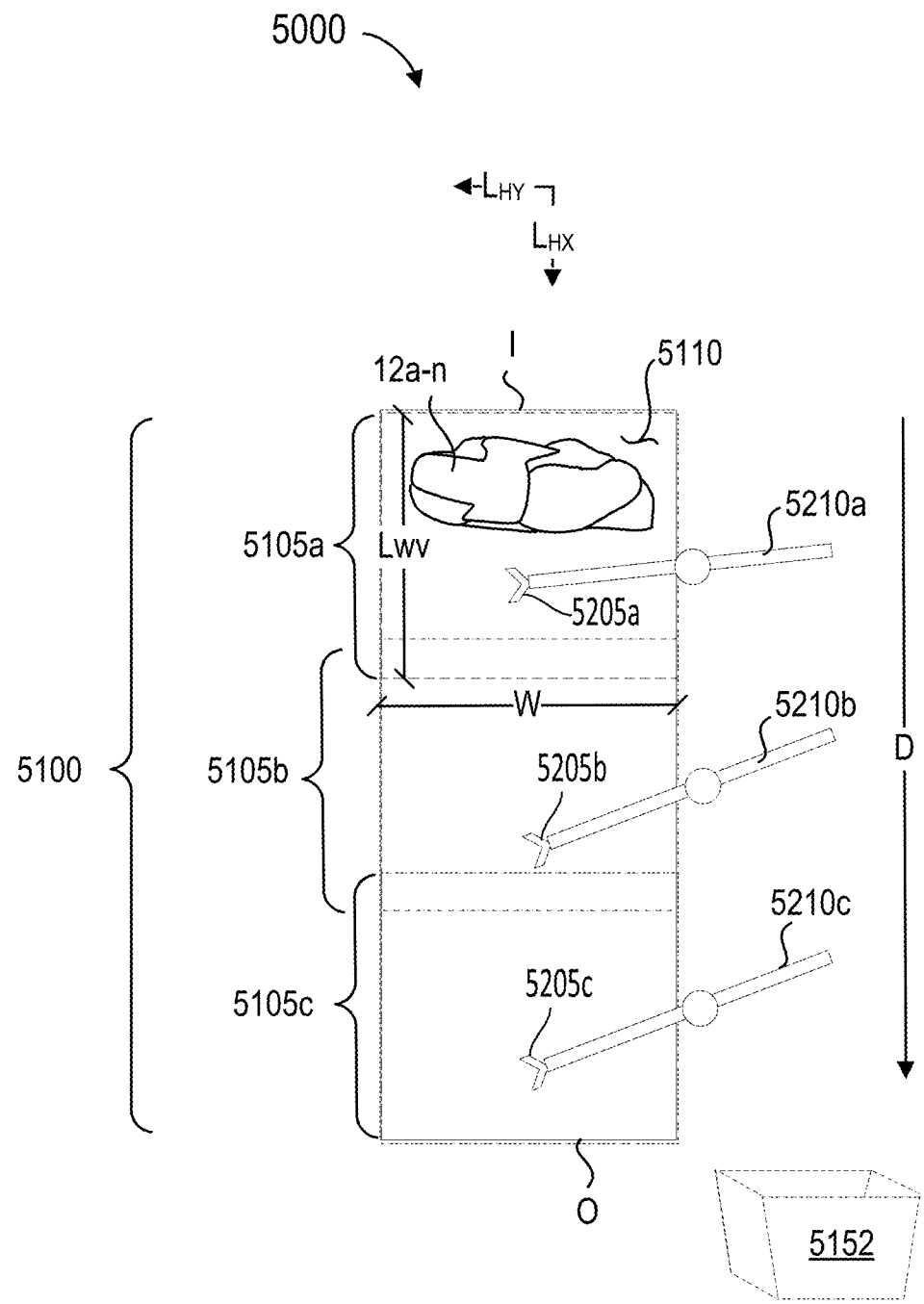
FIG. 6 depicts a top view of a schematic example of an autonomous laundry separating device.
Figure 7:
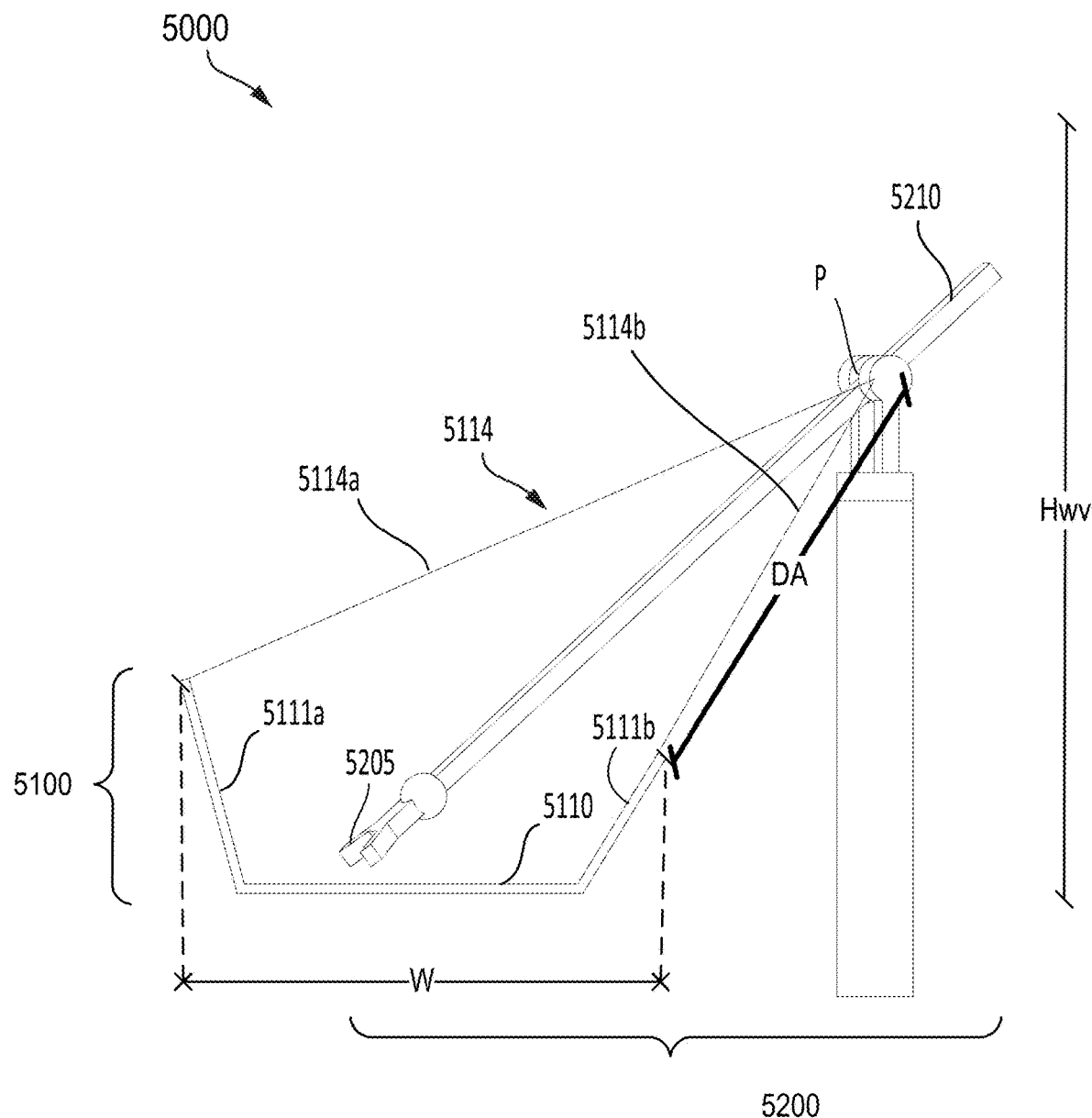
FIG. 7 depicts a perspective end view of a schematic example of an autonomous laundry separating device.
Figure 8:
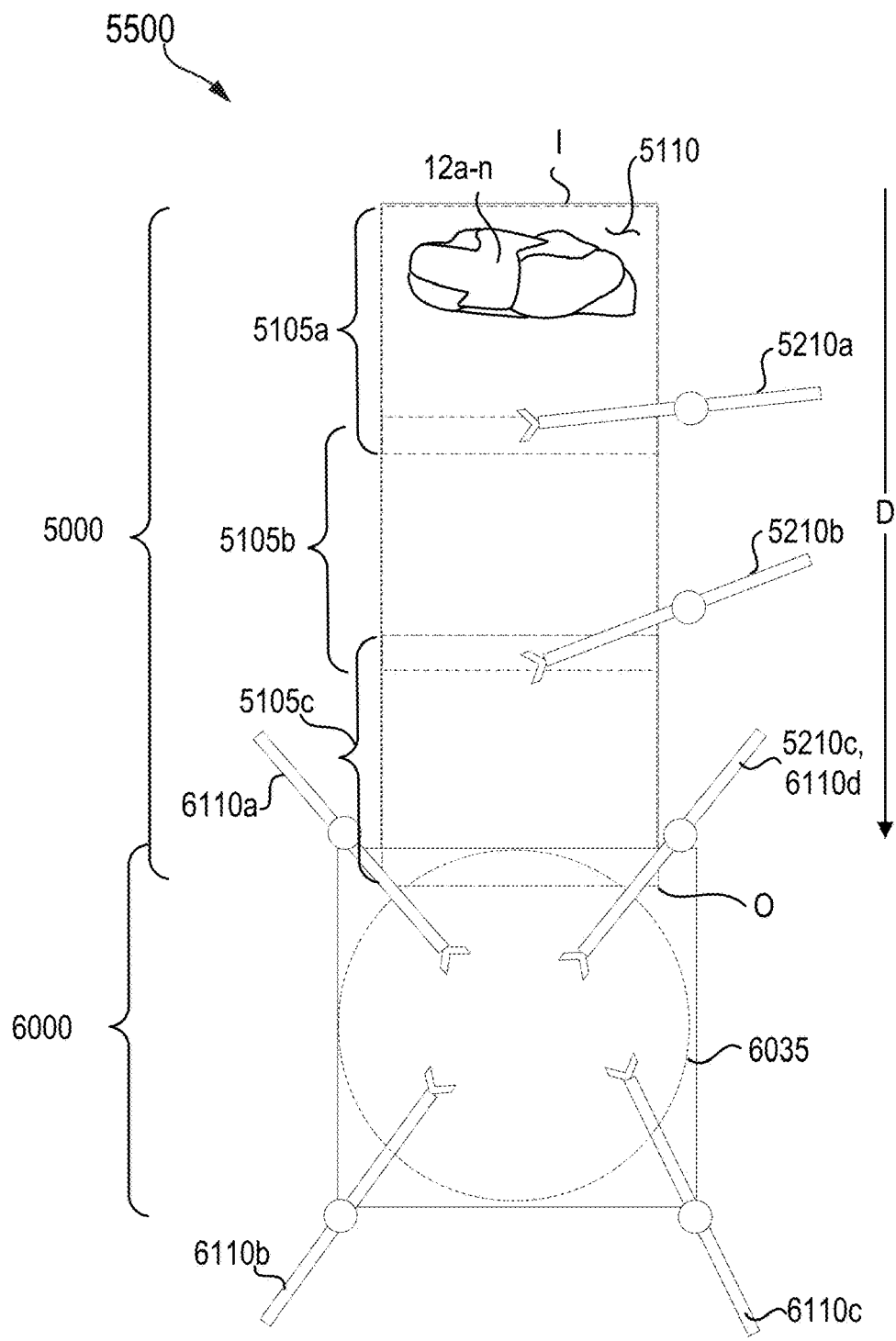
FIG. 8 depicts a top view of a schematic example of an autonomous laundry separating and repositioning system.

Turning now to FIGS. 6-8, an implementation of an autonomous separating device 5000 (also alternatively referred to hereinafter as "a robotic device" and a "separating robot") is shown for separating individual laundry articles of a plurality of clean deformable laundry articles 12a-n and handing each individual deformable laundry articles off to a repositioning robot one at a time. The plurality of deformable articles comprise a load of clean household laundry. The one or more loads of household laundry can comprise two or more article types of at least one of different sizes, different shapes, different colors, and different fabrics. The autonomous sorting device 5000 is configured to separate each article from a loose pile, a bin, and/or a tangled clump of laundry articles so that each individual article can be separately repositioned (e.g., spread apart and placed on a movable surface) by a repositioning robot 6000 for repositioning prior to folding. The clean laundry articles 12a-n are automatically conveyed to the autonomous separating device 5000 from one or more washing and drying robots 4000 and are automatically introduced into the device 5000 as will be described subsequently with regard to implementations.

Figure 9A:
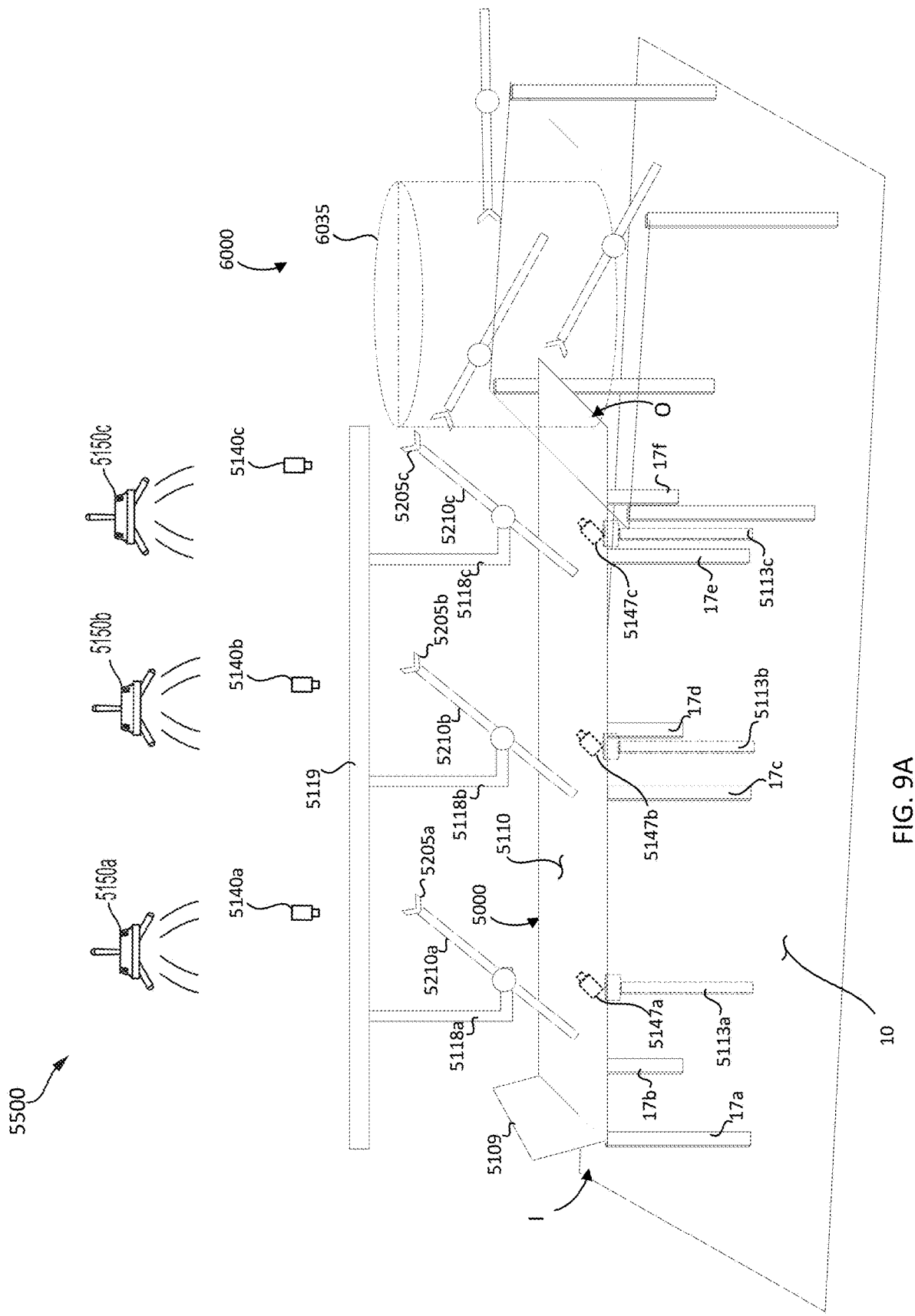
FIG. 9A depicts a side view of a schematic example of an autonomous laundry separating and repositioning system with a surface of a reposition conveyor shown as transparent for clarity in illustrating relative positions of the conveyor and an adjacent separating platform.
Figure 9B:
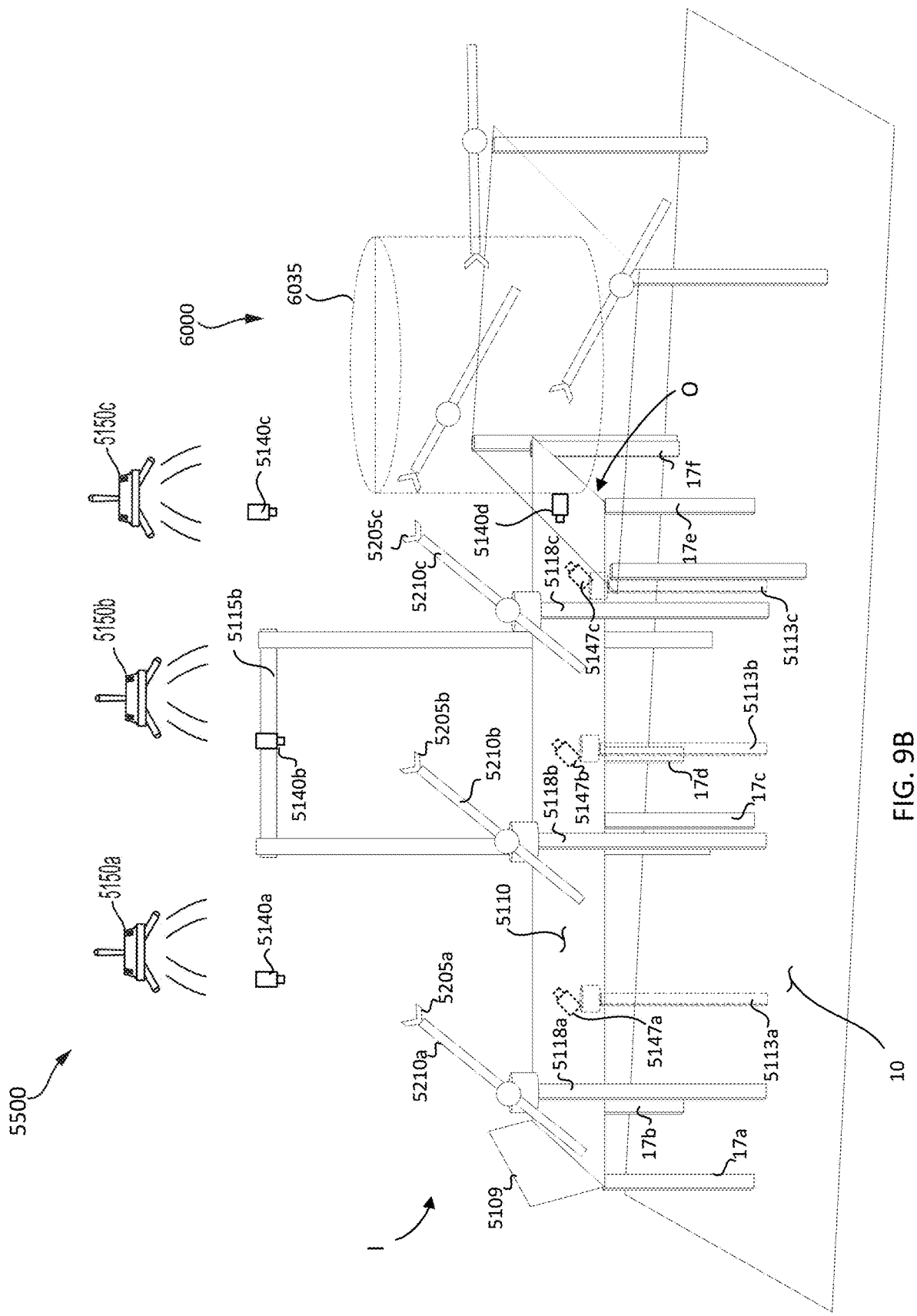
FIG. 9B depicts a side view of a schematic example of an autonomous laundry separating and repositioning system with a surface of a reposition conveyor shown as transparent for clarity in illustrating relative positions of the conveyor and an adjacent separating platform.

The device 5000 includes a platform 5100 comprising a plurality of sequential work volumes 5105a-d and a stationary floor 5110 extending between an inlet end "I" and an outlet end "O" of the platform 5100. In implementations, the stationary floor 5110 comprises a substantially level surface extending from the inlet end I to the outlet end O. Additionally or alternatively, the stationary floor 5110 comprises a substantially continuous surface extending throughout all of the plurality of sequential work volumes 5105a-d. In implementations, the platform 5100 is raised above a floor. In implementations, the platform 5100 can comprise the floor 5110, a ceiling, and four walls. Alternatively, in implementations, the platform 5100 comprises a trough with at least two sidewalls 5111a-b, as shown in the end view of FIG. 7. The at least two sidewalls extend the length of the platform, from an inlet end to an outlet end to form an elongated trough. In implementations, the sidewalls 5111a-b rise up and out from the floor 5110 to form a flat bottomed "V" shaped cross section or, alternatively, a U-shaped cross section with a rounded bottom. Alternatively in implementations, the platform 5100 is a continuous floor with on walls. Additionally or alternatively, in implementations, as shown in FIGS. 9A-9B the platform can comprise a back stop 5109 disposed at the inlet end I for retaining a plurality of deformable articles 12a-n on the floor 5110 prior to and during separation into individual articles for handing off to one or more repositioning robots 6000. (FIGS. 9A-9B have the sidewalls 5111a-b omitted for clarity.)

Turning back to FIG. 6, a portion of the stationary floor 5110 within a first work volume 5105a of the plurality of sequential work volumes 5105a-d is configured to receive thereon the plurality of deformable articles 12a-n adjacent the inlet end I. In implementations, the device 5000 includes a plurality of arms 5210a-c disposed in series along the platform 5100, each one of the plurality of arms 5210a-c comprising an actuatable terminal gripper 5205a-c configured to selectively grasp at least one of the plurality of deformable articles 12a-n and at least one motor 5125a-c configured to at least one of slide, rotate, tilt, extend, and retract the terminal gripper 5205a-c. In implementations, each of the plurality of arms 5210a-c is associated with and anchored adjacent a corresponding one of the plurality of sequential work volumes 5105a-c. As previously described, the plurality of deformable articles 12a-n are emptied onto the floor 5110 from a bin (not shown) conveyed from the autonomous washing and drying robot 4000. In implementations, the floor 5110 can receive the bin conveyed from the autonomous washing and drying robot 4000 so that a closest one of a plurality of arms 5210a-d can reach into the bin to retrieve one or more deformable articles 12a-n. In other implementations, the bin can be disposed adjacent the platform on a floor 10 near the inlet end I within reach of a closest one of the plurality of arms 5210a.

As shown in FIGS. 9A-9B, the device 5000 comprises at least one sensor 5140a-c disposed at least one of on, adjacent to, the plurality of sequential work volumes 5105a-d. In implementations, the at least one sensor 5140a-c can include one or more cameras disposed at least one of on, adjacent to, and within the sequential work volumes. In implementations, the at least one sensor 5140a-c is configured to be affixed to a ceiling or other building structure or a structural support 5115b at least one of affixed to and affixed adjacent the platform 5100 so that the at least one sensor 5140a-c is disposed at a static, calibrated position relative to the platform. In implementations, the at least one sensor is a camera, and the camera is calibrated to at least one of the floor 5110 of the platform 5100 and one or more of the plurality of arms 5210a-c. The at least one sensor 5140a-c is configured to detect at least one of the plurality of deformable articles 12a-n disposed within an associated one of the plurality of sequential work volumes, and output a signal indicative of at least one of the presence and location of the at least one of the plurality of deformable articles 12a-n relative to the terminal gripper 5205a-c of the one of the plurality of arms 5210a-c associated with the one of the plurality of sequential work volumes 5105a-c.

In implementations, the at least one sensor 5140a-c is a single camera (e.g., 5140b) comprising a field of view encompassing the entire floor 5110 of the platform 5100. implementations, the at least one sensor 5140a-c comprises two cameras comprising adjacent fields of view collectively encompassing the entire floor 5110 of the platform 5100. In implementations, the at least one sensor 5140a-d is three or more cameras comprising adjacent field of views collectively encompassing the entire floor 5110 of the platform 5100.

The device 5000 comprises a controller, such as controller 5005, that is in operable communication with the at least one drive motor 5125a-c for moving the arms 5210a-c, the actuator 5174a-c of each of the plurality of terminal grippers 5205a-c, and the at least one sensor 5140a-c of the plurality of sequential work volumes 5105a-c. As will be described subsequently with regard to implementations, the controller 5005 is configured to orchestrate movements of the plurality of arms 5210*a-c* within the platform 5100 and actuation of the associated terminal grippers 5205*a-c* to grasp, hoist, and move an initially grasped one or more of the plurality of deformable articles 12*a-n* down the series of arms 5210*a-b* such that a single article 12*n* is grasped by an arm 5210*c* closest to the outlet end O. The controller 5005 is configured to receive a signal from the at least one sensor 5140*a-c* of the plurality of sequential work volumes 5105*a-c* indicative of at least one of the plurality of deformable articles 12*a-n* being disposed within at least one of the plurality of sequential work volumes 5105*a-c*. The controller 5005 is configured to determine a location of the at least one of the plurality of deformable articles 12*a-n* on the stationary floor 5110 relative to an arm 5210*a-c* adjacent the work volume 5105*a-c* within which the article is disposed, instruct the at least one drive motor 5125*a-c* to position the terminal gripper 5205*a-c* of the associated arm 5210*a-c* at the determined location to grasp the at least one of the plurality of deformable articles 12*a-n*, and instruct an actuator of the terminal gripper 5205*a-c* of the associated arm 5210*a-c* to close on the at least one of the plurality of deformable articles 12*a-n*. The controller 5005 is configured to instruct the at least one drive motor 5125*a-c* to raise the closed terminal gripper 5205*a-c* of the associated arm 5210*a-c* and the grasped at least one of the plurality of deformable articles 12*a-n* to a hoist height above the stationary floor, and move the hoisted article toward the outlet end O into an adjacent work volume 5210*a-c*. The controller 5005 is configured to instruct the actuator of the terminal gripper to open the gripper to release the at least one of the plurality of deformable articles 12*a-n* in the adjacent work volume, and receive a signal from at least one sensor 140*a-c* in the adjacent work volume of the plurality of sequential work volumes 5105*a-c*. The controller 5005 is configured to determine, based on the received signal, at least one of one or more of the plurality of deformable articles 12*a-n* being present on the stationary floor 5110, and none of the plurality of deformable articles 12*a-n* are present on the stationary floor 5110.

In implementations, such as those of FIGS. 6-8, the plurality of sequential work volumes 5105*a-d* comprises three or more work volumes, and each one of the three or more arms 5210*a-c* is associated with and disposed adjacent one of the three or more work volumes 5105*a-d* for operating primarily within the associated work volume. In implementations, each of the plurality of arms 5210*a-c* is associated with a work volume 5105*a-d* directly adjacent at least one other work volume associated with another one of the plurality of arms 5210*a-c*. For example, in FIGS. 6-8, each one of three arms 5210*a-c* is associated with a corresponding one of three sequential work volumes 5105*a-c*. In implementations, an outlet-facing end of each of the three or more work volumes 5105*a-d* overlaps with an inlet-facing end of an adjacent sequential one of the three or more work volumes 5105*a-d* such that each arm of the plurality of arms 5210*a-c* is configured to extend into one or more adjacent work volumes of the plurality of sequential work volumes 5105*a-c*. Although three work volumes are shown, the work volumes 5105*a-n* can be any number greater than one, where "n" represents a value greater than one.

Additionally or alternatively, as shown in FIG. 8, in implementations, a system 5500 for separating and repositioning a plurality of deformable articles comprises a separating robot 5000 disposed in line with a repositioning robot 6000. In implementations the outlet end O of the last sequential work volume 5105*c* overlaps with a repositioning work volume 6035 of a repositioning robot 6000 disposed in line with the separating robot 5000 for receiving a separated one of the plurality of deformable articles 12*a-n* grasped by the last one 5210*c* of the plurality of arms 5210*a-c* along the length of the platform 5100. In implementations, adjacent work volumes 5105*a-c* overlap for at least 0.30 meter (e.g., about 1 ft) for the full vertical height of the work volume 5105*a-d*, from the floor 5110 to a maximum suspension height (e.g., maximum hoist height) within the work volumes 5105*a-c*. The adjacent work volumes 5105*a-c* overlap for the full width W of the platform, and in implementations, as shown in FIG. 7, each one of the plurality of arms 5210*a-c* (generally referred to as 5210) is configured to extend to any point on the floor 5110 within an associated work volume 5105*a-c* of the platform 5100 and throughout the width W, length $L_{WV}$, (FIG. 6) and height $H_{WV}$ of the work volume. For example, the height $H_{WV}$ of the work volume can be in a range of between about 5 and 20 feet (~1.5 m to 6 m). In implementations, the height $H_{WV}$ is between about 10-15 feet (e.g., 3 to 4.5 meters). In implementations the height $H_{WV}$ of the work volume 5105*a-c* is the volume of space extending between the floor 5110 and a height that is accessible by the arm 5210*a-c* at full extension.

If the controller 5005 determines one or more of the plurality of deformable articles 12*a-n* is present on the stationary floor 5110 in the adjacent work volume into which the one or more articles was dropped, the controller 5005 is further configured to iteratively perform one or more grabs, rotations (or slides in a linear mounted gripper implementation), and drops down the line of sequential arms 5210*a-c* and work volumes 5105*a-c*. In implementations, upon determining the presence of one or more of the plurality of deformable articles 12*a-n*, the controller 5005 is configured to determine a location of the at least one of the plurality of deformable articles 12*a-n* on the stationary floor 5110 relative to an arm 5210 associated with the adjacent work volume, and instruct the at least one drive of the arm associated with the adjacent work volume to position the terminal gripper 5205 of the arm 5210 associated with the adjacent work volume at the determined location to grasp the at least one of the plurality of deformable articles 12*a-n*.

As will be described subsequently with regard to schematic implementations, the controller 5005 is configured to instruct an actuator 5174*a-c* of the terminal gripper 5205 of the arm 5210 associated with the adjacent work volume 5105 to close on the at least one of the plurality of deformable articles 12*a-n*, and instruct the at least one drive motor 5125*a-c* to raise the closed terminal gripper 5205 of the arm 5110 associated with the adjacent work volume and the grasped at least one of the plurality of deformable articles to a hoist height H1 above the stationary floor, and move the gripper 5205 (e.g., at least one of slide, pan, tilt, and extend, e.g., rotate) toward the outlet end O into at least one of the next sequential adjacent work volume of the three or more work volumes 5210*a-c* and the repositioning work volume 6035. The controller 5005 is configured to instruct the actuator of the terminal gripper 5205 to open the gripper to release the at least one of the plurality of deformable articles 12*a-n* in the next sequential adjacent work volume down the line toward the outlet end O of the platform 5100. As in the previous iteration, the controller 5005 is configured to receive a signal from at least one sensor 5140*a-n*, and determine, based on the received signal, at least one of: one or more of the plurality of deformable articles 12*a-n* being present on the stationary floor 5110 and none of the plurality of deformable articles 12a-n are present on the stationary floor 5110.

Alternatively, in implementations, rather than an engaged gripper 5205 releasing each article 12 on the floor 5110 of an adjacent work volume 5105 following a hoist, the gripper of an available arm in a receiving work volume 5105 can grip an edge of the article 12 (e.g., a lowest hanging point), hoist the gripped edge to the hoist height and the longest engaged gripper 5205 can release the article 12.

In implementations, the controller 5005 is configured to stop iterating when each one of the plurality of deformable articles 12a-n passes beyond the outlet end O as a solitary deformable article and no deformable articles remain on the platform 5100.

In implementations, as will be subsequently described with regard to an illustrative embodiment, the controller 5005 is further configured to instruct two or more of the plurality of arms 5210a-c to operate simultaneously within each respective one of the plurality of sequential work volumes 5105a-c. In implementations, terminal grippers 5205a-c of the two or more of the plurality of arms 5210a-c operating simultaneously are configured to simultaneously grasp at least one of the plurality of deformable articles 12a-b. For example, to determine an article is a large sized item, two or more arms of the plurality of arms 5210a-c can simultaneously grasp the article and rotate apart to spread the article. The controller 5005 can be configured to estimate a size of the article 12 based on a distance separating the engaged terminal grippers 5205a-c. In implementations, the distance separating the engaged grippers can be predetermined and/or determined once tension is detected in the spread article. Tension can be detected, for example, by one or more sensors in communication the controller 5005 for detecting resistance to movement or by monitoring a motor current of the at least one drive of each arm engaged with the article. Alternatively, in implementations, the one or more sensors 5140 can detect the linearity of the top edge of the hoisted article. If the article is sagging and not forming a linear edge between engaged grippers, it's not spread apart. If the article forms a linear edge between engaged grippers, the article is held in tension and spread apart. The controller 5005 can provide information on the size of the article to one or more robots 6000, 7000, 8000 in the process line 100 configured to receive the article subsequently. For example, the controller 5005 of the separating device 5000 can inform a repositioning robot 6000 that a large article, such as a bed sheet, is entering the repositioning workspace, and the repositioning robot 6000 can respond accordingly as will be described with regard to implementations subsequently herein.

As previously described with regard to FIGS. 9A-9B, the device 5000 comprises at least one sensor 5140a-c disposed at least one of on, adjacent to, and within each one of the plurality of sequential work volumes 5105a-d. The at least one sensor 5140a-c can be at least one of downwardly and outwardly angled and comprises a field of view encompassing one or more work volumes 5105a-c of the platform 5100. Additionally or alternatively, as shown by way of example in FIGS. 9A-9B, the at least one sensor can include at least one transverse sensor 5147a-c disposed at least one of on, adjacent to, and within one or more work volumes 5105a-c. In implementations, the at least one transverse sensor 5147a-c can be disposed respectively adjacent a transparent window (not shown) on a sidewall 5111a-b. Additionally or alternatively, in implementations, one or more of the at least one transverse sensor 5147a-c and at least one upwardly angled sensor 3145a can be disposed respectively adjacent a transparent window on an arm side of the enclosed channel and a transparent window on a side wall opposite the arm wall.

In examples, the at least one sensor of each work volume of the plurality of work volumes 5105a-c is configured to at least one of detect one of one or more features and capture one or more images of the at least one of the plurality of deformable articles 12a-n disposed in the work volume. The at least one sensor 5140a-c, 5147a-c comprises at least one of a 3-D camera, an IR sensor, a 2-D camera, LIDAR, LADAR, a sonar proximity sensor, an ultrasonic ranging sensor, a radar sensor (e.g., including Doppler radar and/or millimeter-wave radar), and a pair of stereo depth cameras. In implementations, at least one sensor outputs to the controller 5005 at least one of a depth map, RGB images, and IR images. In implementations the at least one sensor 5140a-c, 5147a-c comprises a REALSENSE camera configured to output any of a depth map, RGB images, and IR images. In implementations, the at least one sensor 5140a-c, 5147a-c can be configured to output 3-D image data to the controller 5005. Additionally or alternatively, in implementations, the at least one sensor 5140a-c can be configured to output one or more 2-D images to the controller 5005. As previously described, in implementations, the at least one sensor is a camera, and the camera is calibrated to the floor 5110 of the platform 5100 and has a field of view encompassing one or more of the plurality of arms 5210a-c.

Figures 10A, 10B:
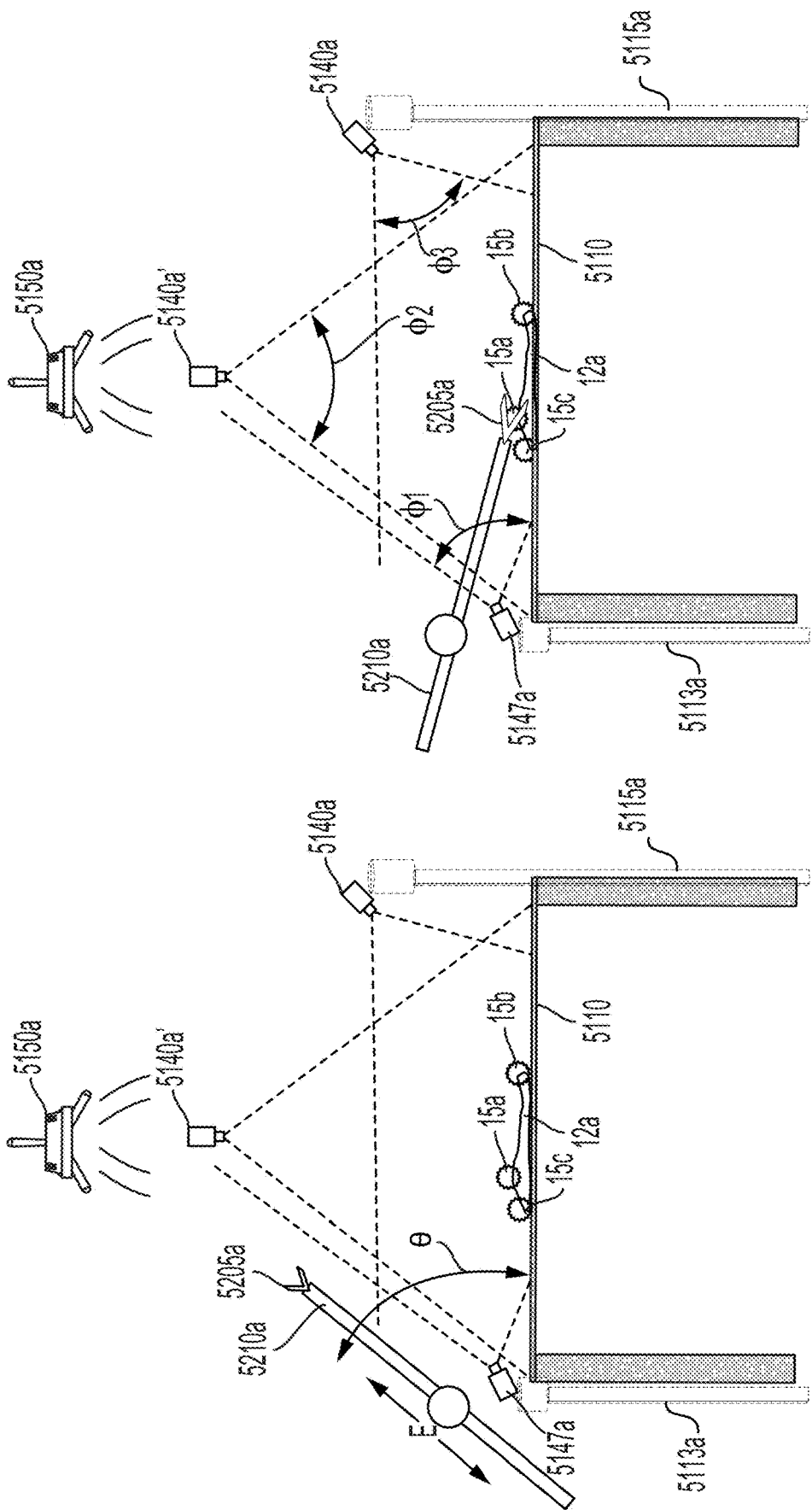
FIGS. 10A-B depict end view cross section schematics of an implementation of the autonomous laundry separating and sorting system.

In implementations, the at least one sensor 5140a-c, 5147a-c is positioned at least one of on, adjacent to, and within an associated one of the plurality of work volumes 5105a-c such that the at least one sensor 5140a-c, 5147a-c has an field of view encompassing the stationary floor 5110 within the associated one of the plurality of work volumes 5105a-c. In implementations, the at least one sensor 5140a-c, 5147a-c comprises a field of view encompassing the outer perimeter reachable by an associated one of the plurality of arms 5210a-c. In implementations, as shown in FIGS. 9A-9B, the at least one sensor 5140a-c, 5147a-c is disposed outside the platform 5100, above each of the plurality of sequential work volumes 5105a-c. As shown in FIGS. 10A-B depicting an end view of one work volume 5210a of the platform 5100, the at least one sensor 5140a' can be disposed above the platform 5100 and comprise a field of view ϕ2 encompassing the stationary floor 5110 within the associated work volume. Additionally or alternatively, the at least one sensor 5140a can be mounted to a frame 5115a surrounding the device 5000 or to a ceiling above the device, for example. Additionally or alternatively, as shown by way of example in FIGS. 8-10B, the at least one sensor can include at least one transverse sensor 5147a disposed at least one of on, adjacent to, and within an associated work volume 5105a. In implementations, as shown FIGS. 10A-B, the at least one transverse sensor 5147a is disposed outside the platform 5100. In implementations, the at least one transverse sensor 5147a-c is mounted to an anchored base (e.g., a pedestal) 5113a-c adjacent the platform 5100.

As shown in the schematic end view of a work volume 5105a in FIGS. 10A-B, in implementations the device 5000 the at least one sensor comprises at least one of a sensor 5140a' at aimed substantially downward at the stationary floor 5110, a sensor aimed downward and outward 5140a from adjunct a sidewall 5111a-b (not shown), and a transverse sensor 5147a such that the overlapping FOVs ϕ1-ϕ3 cover the entirety of the work volume extending upward from the floor 5110 and across width W of the platform 5100. Such implementations are particularly advantageous for determining whether and where any one of the plurality of deformable articles 12*a*-*n* remains in the platform 5100 prior to concluding the separating process on the plurality of deformable articles 12*a*-*n* and introducing a subsequent load of laundry articles onto the platform for separating. Additionally or alternatively, the at least one sensor is a single downward and outwardly angled sensor 5140*a* comprising a field of view φ3 spanning one or more of the work volumes 5105*a*-*c* of the platform 5100.

In implementations, one or more of the at least one sensor 5140*a*-*c* aimed substantially downward at the stationary floor 5110, a sensor aimed downward and outward 5140*a* from adjunct a sidewall 5111*a*-*b* (not shown), and a transverse sensor 5147*a*-*c* as previously described can be disposed within the platform 5100. In implementations, transverse sensor 5147*a*-*c*, for example, can be disposed within the platform 5100, adjacent the stationary floor 5110.

Figure 11:
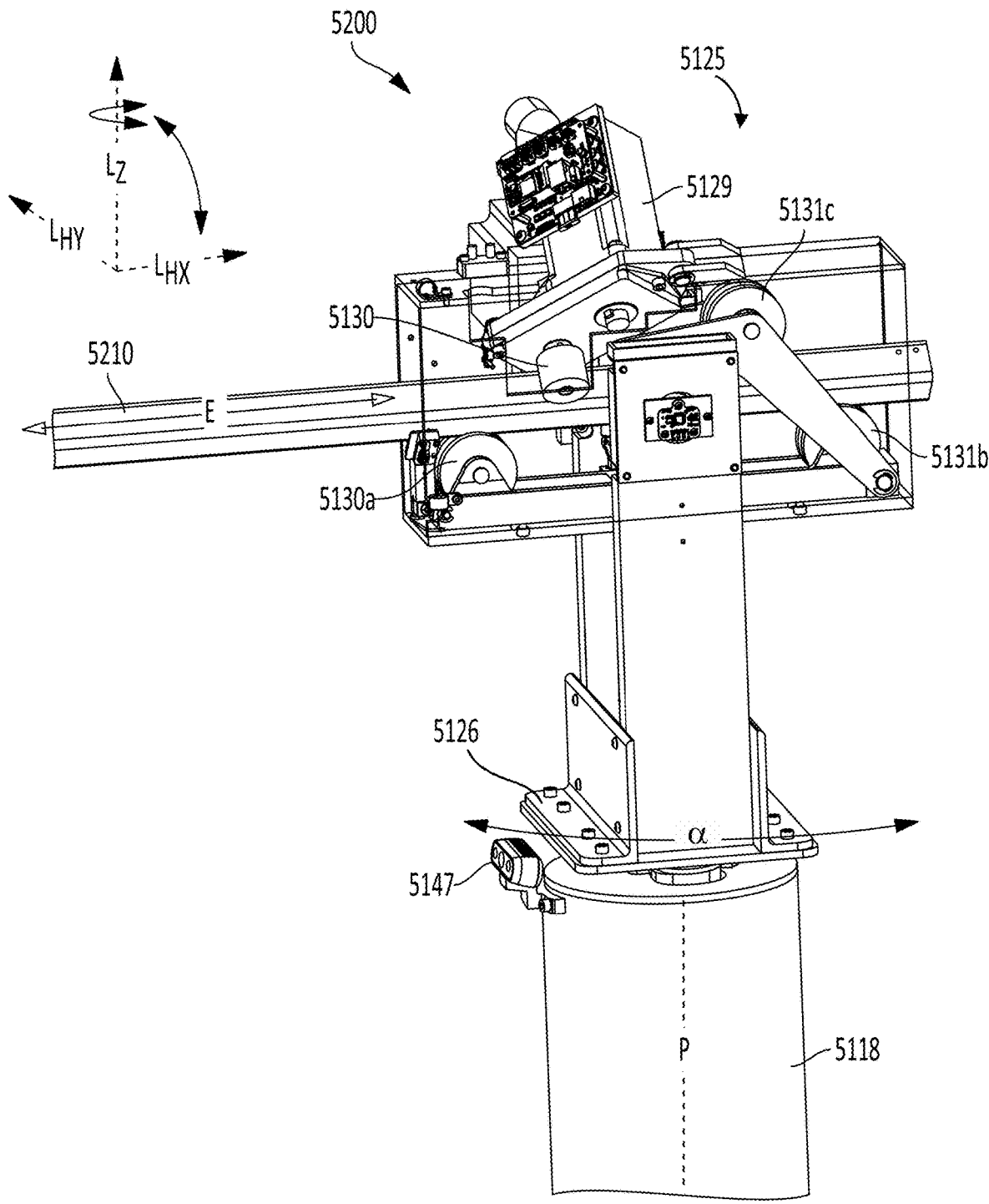
FIG. 11 depicts a portion of a base of an example lifter of an autonomous separating robot with partial transparency.
Figure 26:
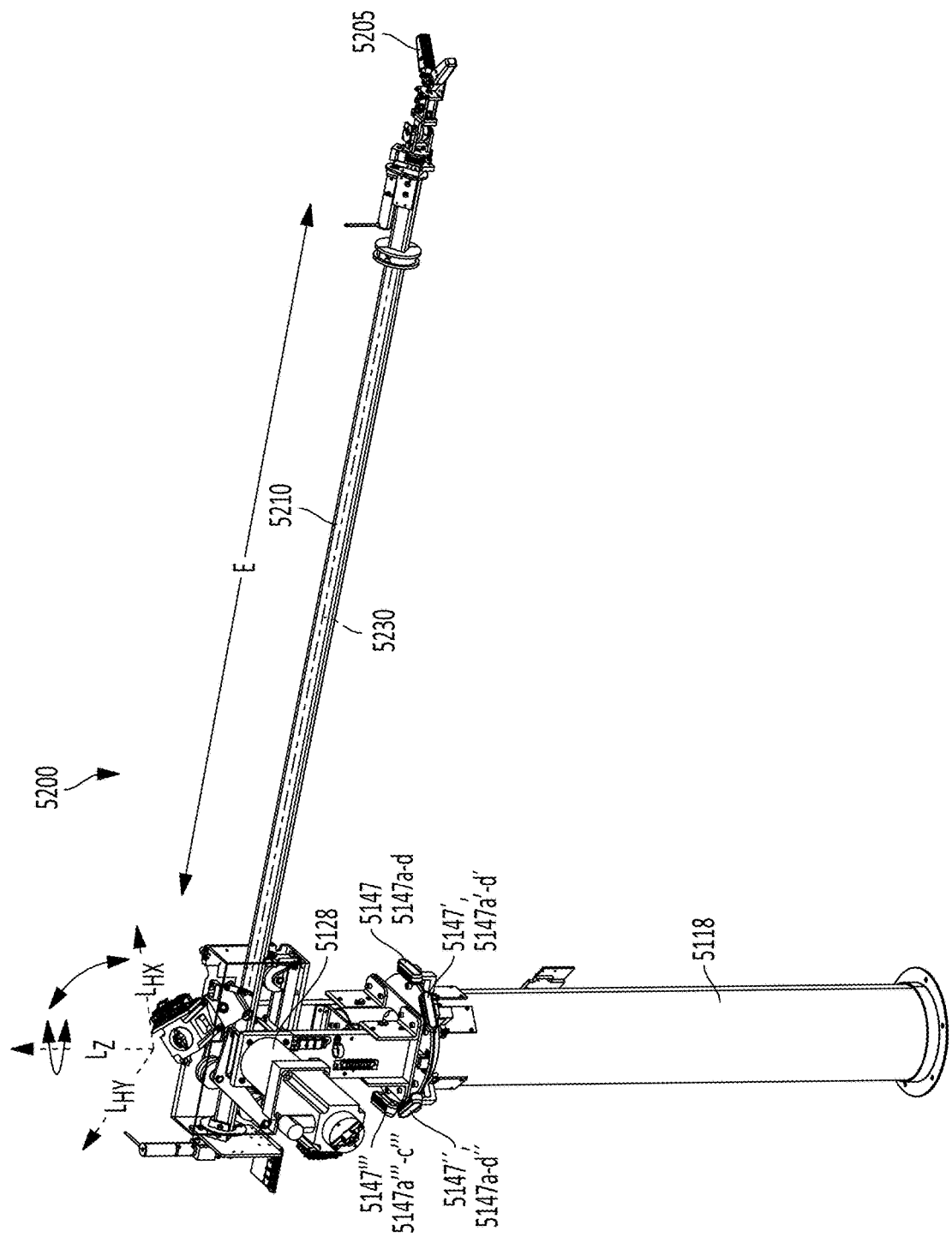
FIG. 26 depicts an example lifter of the repositioning robot.
Figure 27:
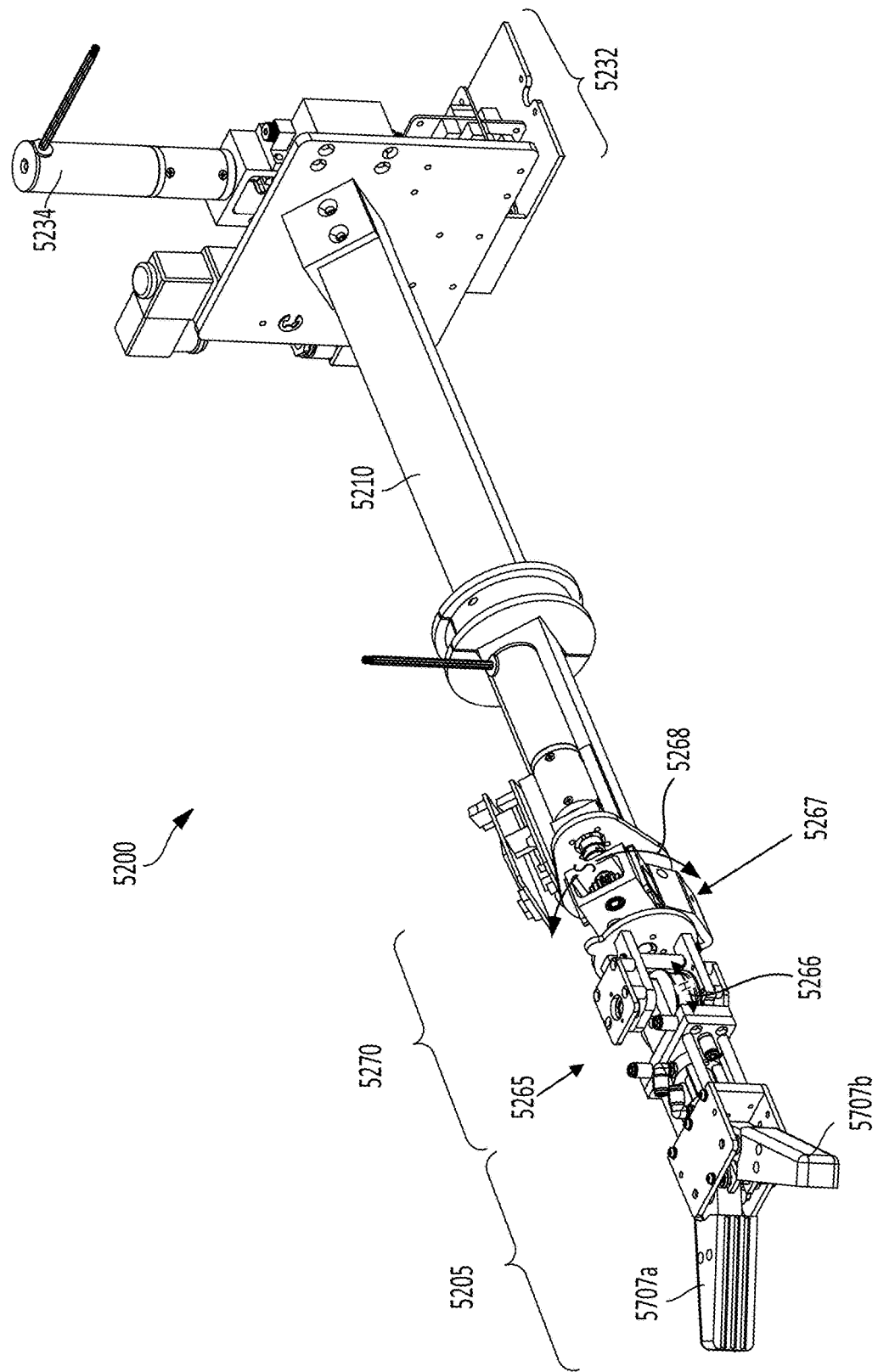
FIG. 27 depicts an end perspective schematic of an example of an arm and gripper of a lifter of an autonomous separating robot
Figure 28:
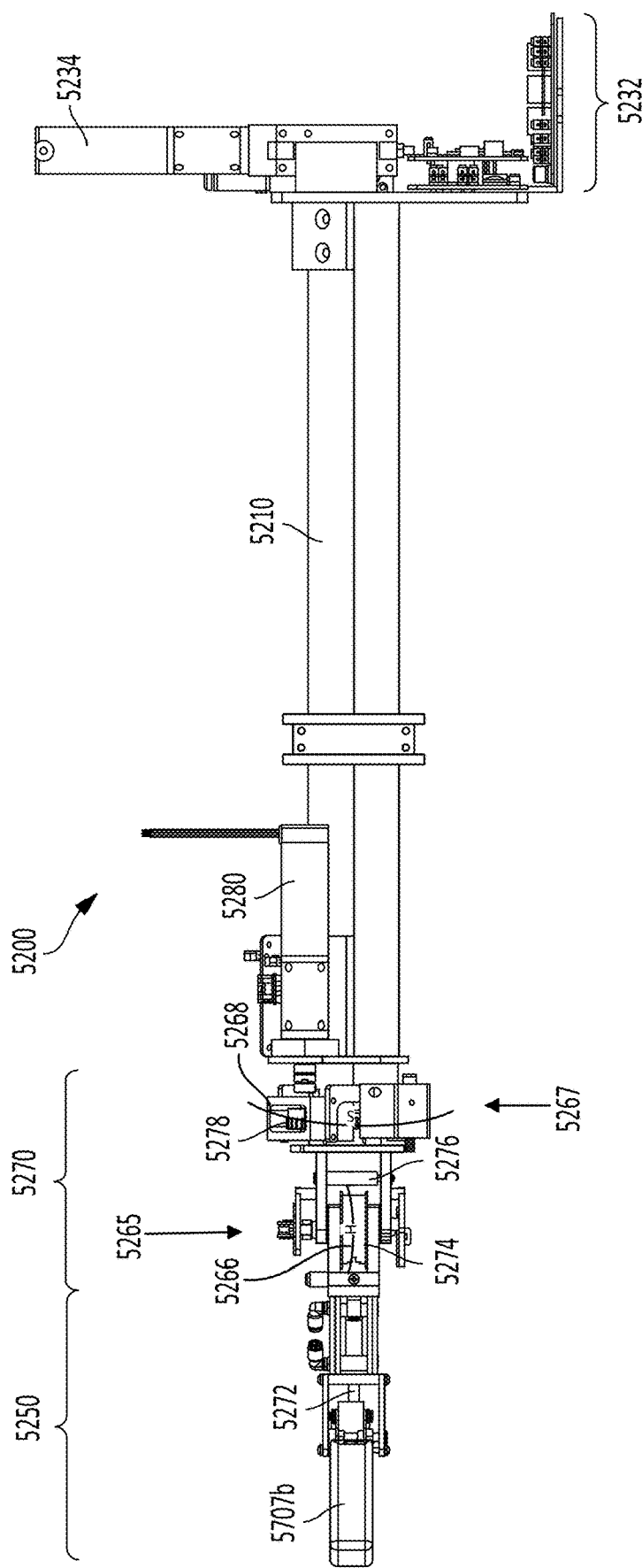
FIG. 28 depicts a side view of the example arm and gripper of FIG. 27.
Figure 29:
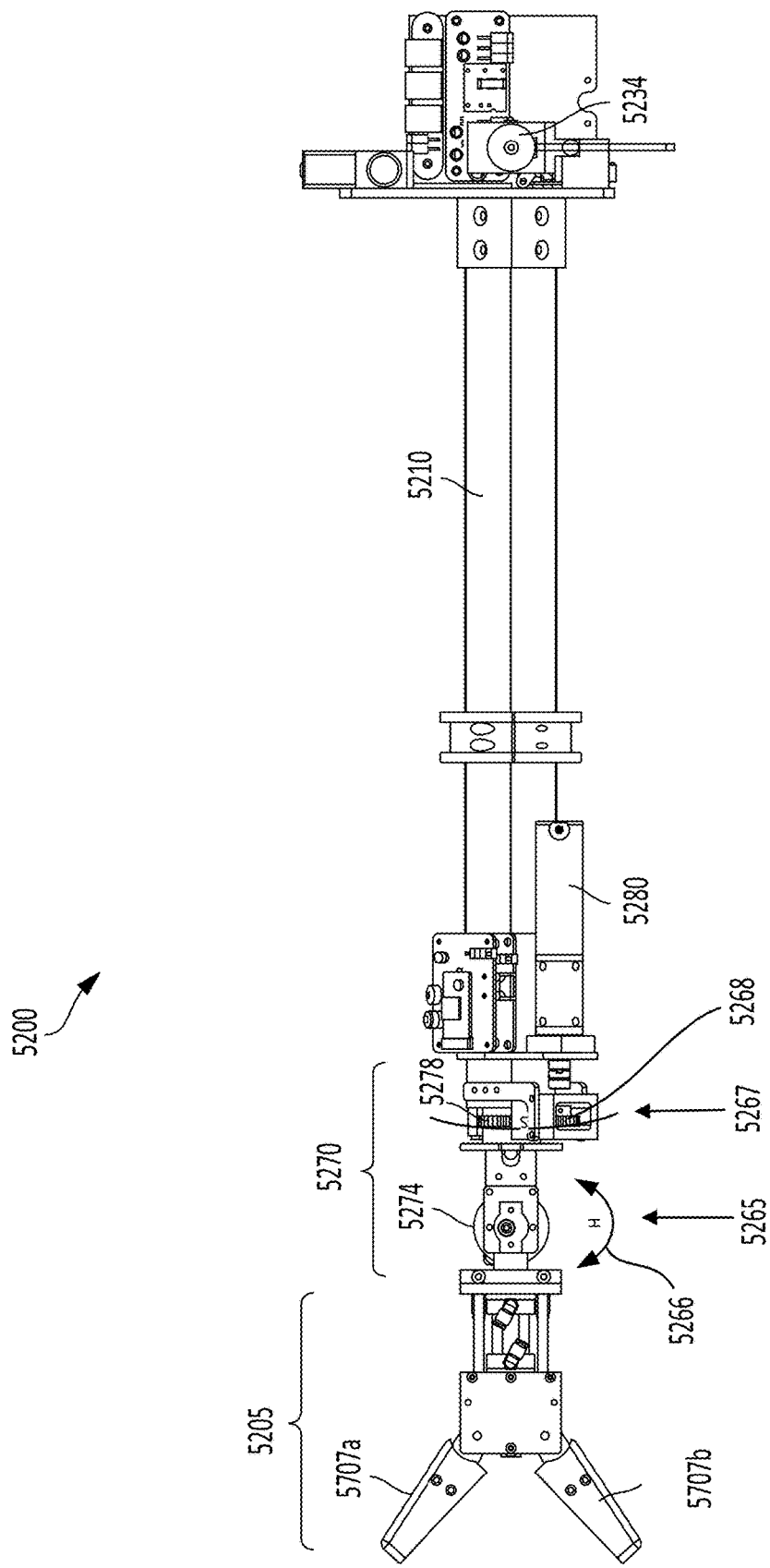
FIG. 29 depicts a side view of the example arm and gripper of FIG. 27 rotated out of the page 90 degrees.
Figure 30:
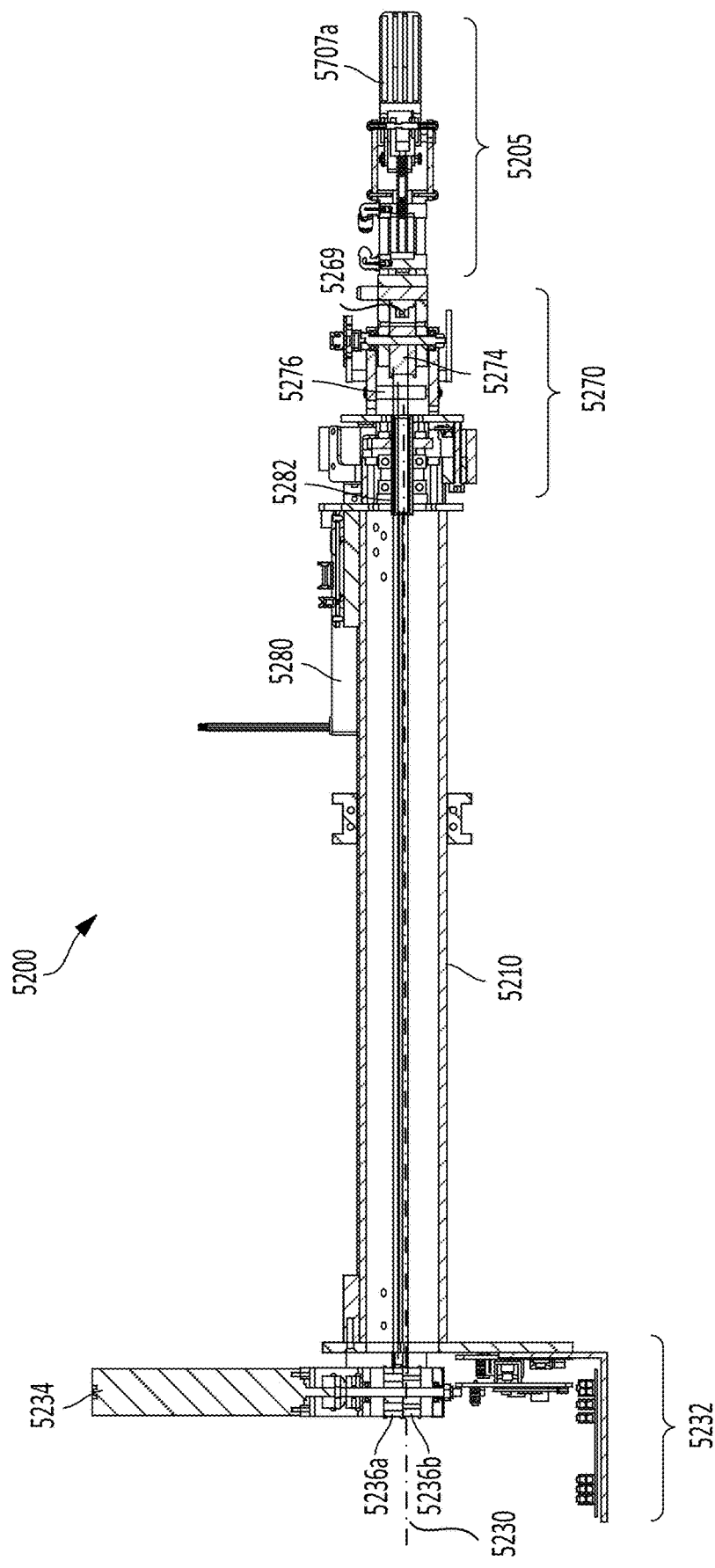
FIG. 30 depicts a cross sectioned side view of the example arm and gripper of FIG. 27.
Figure 31:
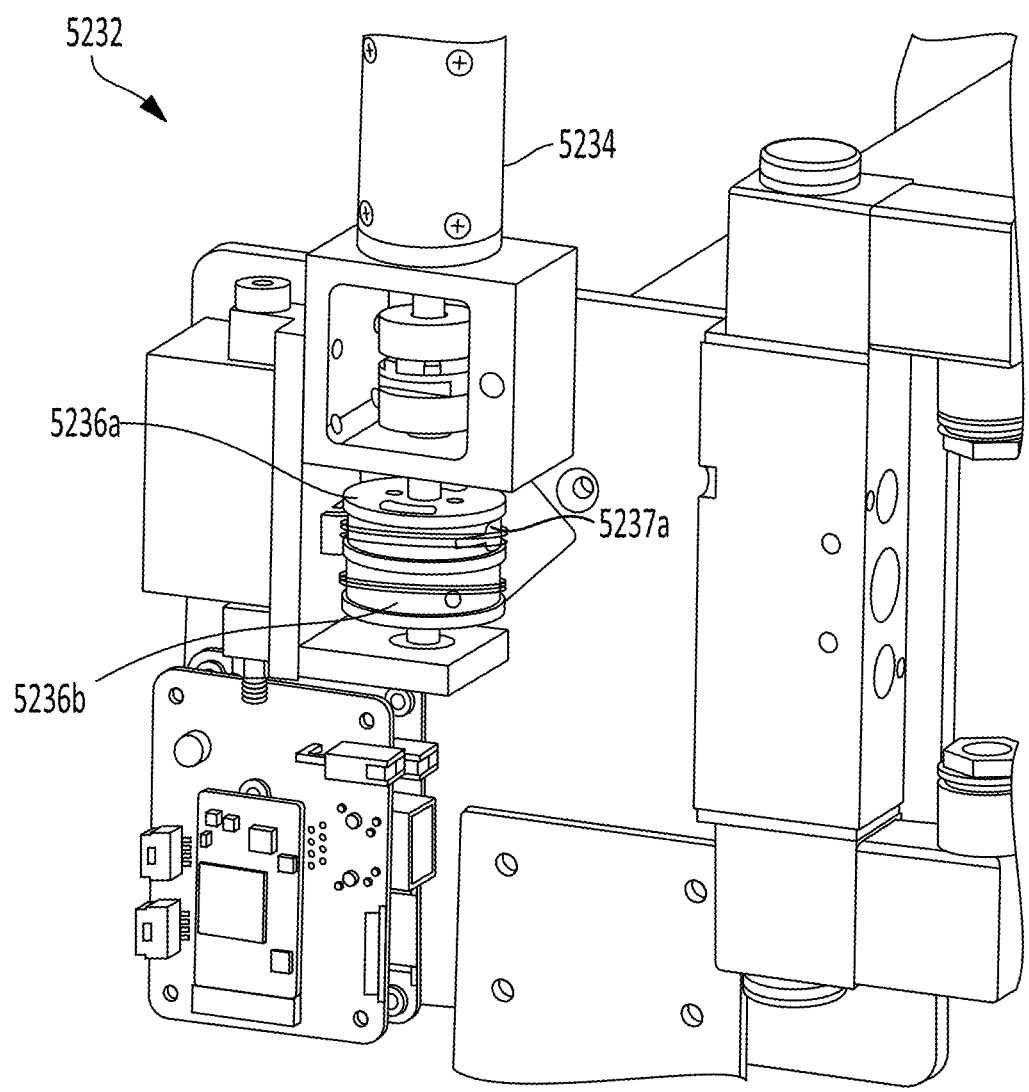
FIG. 31 depicts a schematic view of an example end portion of the arm of FIG. 27.

Additionally or alternatively, in implementations, as shown in FIGS. 11 and 26, the at least one transverse sensor 5147*a*-*c* is mounted to an associated base 5118*a*-*c* of each one of the plurality of arms 5210*a*-*c*. In implementations, the at least one sensor 5147, 5147*a*-*c*, is mounted lower than the arm 5210 and angled upward at an angle φ1 and having a field of view as shown in FIGS. 10A-B.

In implementations, as shown in FIGS. 10A-B, determining a location of the at least one of the plurality of deformable articles 12*a*-*n* on the stationary floor 5110 further comprises determining one or more grip points 15*a*-15*c* on the at least one of the plurality of deformable articles 12*a*-*n* at which the gripper 5205*a* will close on the article 12*a*. In implementations, the one or more grip points 15*a* are disposed at a high point (e.g., grip point 15*a*) of the at least one deformable article 12*a* of the plurality of deformable articles 12*a*-*n*. The high point can be a highest point or one or more points on the article 12*a*, the one or more highest points being raised relative to the planar surface of the floor 5110 beneath the article. Additionally or alternatively, in implementations, one or more grip points 15*b*-*c* are disposed on an edge of the at least one of the plurality of deformable articles 12*a*-*n* as determined by the controller 5005 based on signals received from the one or more sensors 5140, 5147. In implementations, as will be subsequently described with regard to embodiments, the controller 5005 is configured to receive or compute a mask 5800 of the article 12*a* to determine the edges of the article 12*a* (e.g., a continuous outline traced in 2D around the outer periphery of the article 12*a* on the floor 5110 of the platform 5100) and the one or more grip points 12*b*-*c* disposed on the edge.

As previously described with regard to implementations, the at least one sensor 5140*a*-*c* is a downwardly and/or outwardly angled camera disposed at, on, or adjacent at least one of a frame or enclosure adjacent to or surrounding the platform 5100 and a ceiling above the platform 5100. The camera is calibrated to the distance of the stationary floor 5110 and configured to detect a prominence of a deformable article 12 disposed on the floor 5110. In implementations, as shown in FIGS. 8-10B, the device 5000 further comprises one or more light sources 5150*a*-*c* in operable communication with the controller 5005. The one or more light sources 5150*a*-*c* can comprise at least one of adjustable brightness, intensity, and color, and are configured to adjust lighting on the platform 5100 for improving perception by the at least one sensor 5140*a*-*c*, 5147*a*-*c*. In implementations, one or more of the one or more light sources 5150*a*-*c* can be aimed directly or indirectly at the floor 5110 from above or aside the floor 5110. In implementations, the one or more light sources 5150*a*-*c* are disposed at, on, or adjacent at least one of a frame or enclosure surrounding the platform 5100 and a ceiling above the platform 5100.

Turning now to FIGS. 12-15, a series of partial views of the device 5000 are shown for exemplification. A floor 5110 of a platform 5100 is depicted along with a plurality of arms 5210*a*-*c* as previously described and boundaries of associated work volumes 5105*a*-*b* projected on the floor 5110. As previously described, the controller 5005 is configured to orchestrate movements of the plurality of arms 5210*a*-*c* within the sequential work volumes 5105*a*-*c* on and extending above the floor 5110 of the platform 5100 and actuate the associated terminal grippers 5205*a*-*c* to grasp, hoist, and release the articles 12*a*-*n* in series while actuating the at least one motor 5125*a*-*c* of each arm 5210*a*-*c* to pan, tilt and extend the arm.

In FIG. 12A, the controller 5005 is configured to receive a signal from the at least one sensor 5140*a*, 5147*a* in a first work volume 5105*a* indicative of at least one of the plurality of deformable articles 12*a*-*n* being disposed within the first work volume 5105*a*. Because the first work volume 5105*a* is configured to receive a load of clean laundry, the at least one article 12*a* is, in most instances, a mass of a plurality of deformable articles 12*a*-*n*, when "n" indicates the maximum number of separate articles in a load of laundry. The plurality of deformable articles 12*a*-*n* can be, for example, a non-uniform pile of washed and dried laundry and the articles comprising the pile of clean laundry can be overlapped, entangled, statically clung, and otherwise stuck together or piled atop one another. The controller 5005 is configured to determine a location of the at least one of the plurality of deformable articles 12*a*-*n* on the stationary floor 5110 relative to the associated arm 5210*a* (e.g., the first arm 5210*a* of the plurality of arms 5210*a*-*c*) of the first work volume 5105*a*.

In implementations, the controller 5005 is configured to aim the gripper 5205*a* of the first arm 5210*a* at the center of the area on the floor 5110 occupied by the plurality of deformable articles 12*a*-*n*. Additionally or alternatively, as described with regard to FIGS. 10A-B, the controller 5005 is configured to aim the gripper 5205*a* at one of one or more highest points 15*a* of the plurality of deformable articles 12*a*-*n*. Additionally or alternative, the controller 5005 is configured to determine a mask (e.g., mask 3800 of FIG. 59) an article 12 or the plurality of deformable articles 12*a*-*n* and edge points as previously described with regard to implementations, and instruct the gripper to aim to engage an article 12 at one of the determined one or more edge points 15*b*-*c*. In implementations, the controller 5005 is configured to instruct the gripper 5205 to aim to engage the article at one of the determined one or more edge points 15*b*-*c* that is closest to the outlet end O. In implementations, the controller 5005 is configured to determine a mask 3800 of an article 12*a* or a plurality of articles 12*a*-*n* disposed on the floor 5110, randomly select a point 15*a* within the area of the mask 3800, receive a depth signal from the one or more sensors (e.g., sensors 5140*a*-*c*, 5147*a*-*c*), and instruct a gripper 5205 to grab the article 12 at the depth sensed at the selected grip point 15*a* even if that is not the highest point on the article 12.

As shown in FIG. 12B, in implementations, the controller 5005 instructs at least one drive 5125*a*-*c* to position the terminal gripper 5205*a* of the first arm 5210*a* at the determined location to grasp the at least one of the plurality of deformable articles 12*a*-*n* by at least one of rotating, panning, and tilting the arm 5210*a* and the associated terminal gripper 5205*a* to the target location. Alternatively, in implementations comprising a vertical riser and/or linear gantry (not shown, e.g., arms attached to overhead linear stages for moving in the Lx-Ly plane and then descending vertically in the Lz axis to grip an article), the controller 5005 instructs at least one drive to slide, extend, raise and lower the terminal gripper in and along the work volumes.

In implementations, the controller 5005 receives a signal from the one or more sensors 5140*a-c*, 5147*a-c*, determines a depth location of the target grip point 15, and determines a target height to which the arm 5210 will move the gripper 5205, the target height being short distance (e.g., 1 cm-3 cm) directly above the target grip point 15. The arm 5210 then moves the gripper 5205 to the target height above the target grip point 15, positioning the joint at the base of the spread gripper fingers 5707*a-b* (FIGS. 22A-24A) adjacent the article 12 so that the fingers of the gripper 5205 do not push the article 12 away and out of reach. In implementations, the controller 5005 is configured to thus position the gripper so that the fingers 5707*a-b* of the gripper 5205 close on the target grip point 15 as the arm 5210 is lifting the article 12 off the floor 5110.

With the gripper 5205*a* positioned at least one of on or directly above the location of the target grip point 15, the controller 5005 instructs an actuator 5174*a* of the terminal gripper 5205*a* to close the gripper 5205*a* on the at least one of the plurality of deformable articles 12*a-n*. Additionally or alternatively, in implementations, after selecting the target point 15, the controller 5005 is configured to instruct the one or more drive motors 5125*a-c* to transit the gripper 5205 to a target location above the determined grip point, then slowly move down at a fraction of the transit speed (e.g. one half, one third, one quarter) in arriving at the target location. The controller 5005 instructs the at least one drive motor 5125*a-c* to press the gripper 5205 into the article 12 and then retract to a distance at or around 2 cm above the target location grip point while closing the fingers 5707*a-b* of the gripper 5205 around the grip point of the article 12. In this way, the gripper 5205 is able to grasp small articles successfully, articles such as baby socks and children's gloves, for example, without driving into them at full speed and potentially pushing them out of reach of the gripper fingers 5707*a-b*.

The controller 5005 is configured to instruct the at least one drive motor 5125*a-c* to raise the closed terminal gripper 5205*a* and the grasped at least one 12*a* of the plurality of deformable articles 12*a-n* to a hoist height H1 above the stationary floor 5110, leaving behind articles 12*b-n* in the received load, where "n" represents the maximum number of separable deformable articles 12*a-n* in the received load of deformable laundry articles. As will subsequently be described with regard to implementations, the first gripper 5205*a* nearest the inlet end I can grasp more than one deformable article 12*a-n* from the pile of laundry articles to hand off to the next arm 5201*b* in an adjacent work volume 5105*b*. As will be described in detail, the plurality of arms 5210*a-c* operate in sequence to grasp and release articles down the length of the platform 5100 such that by the third grasp by the third arm 5210*c*, the more than one initially grasped deformable articles are separated and a single article 12*a* is held aloft by the final arm 5210*c* adjacent the outlet O.

In implementations, the device 5000 can include one or more weight sensors disposed each of the plurality of arms 5210*a-c*, the one or more weight sensors being in operative communication with the controller 5005 and being configured to continuously detect a rate of change as each one of the plurality of deformable laundry articles 12*a-n* is lifted up from the floor 5110. The controller 5005 can then determine that one of the plurality of deformable laundry articles is raised to a hoist height H1 when the one or more weight sensors detect an unchanging rate of change of measured weight because the article is lifted completely off the floor 5110 and is no longer supported by the floor 5110, therefore imparting a maximum downward force on the engaged arm 5210*a*. Additionally or alternatively, the at least one sensor 5140*a-c* can detect a position of the terminal gripper above the floor 5110 so that the controller 5005 can determine that the gripper 5205 is at a predetermined hoist height H1. Additionally or alternatively, the at least one sensor 5140*a-c*, 5147*a-c*, can detect a position of the terminal gripper above the floor 5110 and output a signal to the controller indicative of this height position. Upon receiving the signal, the controller 5005 can then determine that the gripper 5205 is at a hoist height conducive for moving the article into an adjacent work volume 5105*b* for dropping there.

Additionally or alternatively, one or more encoders (e.g., motor encoders 5157*a-c*, *a'-c'*, *a"-c"*, FIG. 5) outputs a signal to the controller 5005, and the controller 5005 determines a hoist height of the gripper 5205 engaged with the article 12 by dynamically processing (e.g., processing the one or more encoders signals as the one or more motors 5125*a-c* are moving the arm 5210) the signal with a calibrated kinematics routine. In implementations, the hoist height is pre-set, and the controller 5005 uses calibrated kinematics to determine when the gripper reaches the pre-set hoist height. Additionally or alternatively, in implementations the at least one sensor 5140*a-c*, 5147*a-c* is configured to detect a gap between the hoisted article and the floor 5110, and output a signal to the controller 5005 for dynamic processing to determine when an article 12 is hoisted to a height at which a detectable gap (e.g., a region from which the detectable article is no longer sensed across the width of the platform 5100) appears between the hoisted article 12 and the floor 5110. In implementations, the at least one sensor 5140*a-c*, 5147*a-c* comprises a transverse field of view (e.g., across the width W of the platform) for dynamically detecting the appearance of a gap beneath the article 12 and above the floor 5110.

As shown in FIG. 13A, in implementations, the controller 5005 instructs the at least one drive motor 5125*a-c* to at least pan the arm 5210*a*, gripper 5205*a*, and hoisted article 12*a* in the direction D toward the outlet end O and into an adjacent work volume 5105*b*. Additionally, the controller 5005 can tilt and extend the first arm 5210*a* such that the terminal gripper 5205*a* is positioned within the second work volume 5105*b* accessible by the second arm 5210*b*. As shown in FIG. 13B, the controller 5005 is configured to instruct the actuator 5174*a* of the terminal gripper 5205*a* to open and release the article 12*a* in the adjacent work volume 5105*b*. The controller receives a signal from at least one sensor 5140*b*, 5147*b* in the adjacent work volume 5105*b* and determines, based on the received signal, that the deformable article 12*a* is present on the stationary floor 5110 (or above the stationary floor 5110 in implementations in which the second arm grabs the article while hoisted). Similar to the first arm 5210*a*, the second arm 5210*b* is configured to grasp the deformable article 12*a* from the stationary floor 5110 with the associated second work volume 5105*b*, rotate in the direction D toward the outlet end O of the platform 5100 and release the deformable article in the third work volume 5105*c*, as shown in FIG. 14A. Alternatively, in implementations comprising a vertical riser and/or linear gantry (not shown), the controller 5005 instructs at least one drive to slide, extend, raise and lower the terminal gripper in and along the work volumes.

In implementations, the controller 5005 is configured to determine whether a terminal gripper missed grasping the article prior to hoisting to the hoist height. For example, after the first arm 5210a has hoisted, rotated, and opened the terminal gripper 5205a in a second work volume 5105b, the controller 5005 of the device 5000 can determine that the article is not present on the floor 5110 within the second work volume based on one or more sensor signals from the at least one sensor 5140a-c, 5147a-c. The controller 5005 can then at least one of query and receive a signal from the at least one sensor 5140a, 5147a in the first work volume 5105a and determine a location of the deformable article on the floor 5110 within the first work volume 5105a. The controller 5005 can then repeat the instructions of positioning the terminal gripper 5205a of the first arm 5210a at the determined location to grasp the at least one article 12a of the plurality of deformable articles 12a-n, grasping, raising, rotating, and releasing the article in the second work volume 5105b.

In implementations, as will be described subsequently with regard to the method of operation, the controller 5005 can execute a miss recovery routine. In implementations, the miss recovery routine comprises moving the target grip point 15 inward from an edge by a distance in a range of between about 10-20 mm (e.g., 10 mm, 11 mm, 12 mm, 13 m, 14 mm, 15 mm, 16 mm, 17 mm, 18 mm, 19 mm, 20 mm) in a direction toward the inlet end I with each subsequent attempt after a missed grab. Additionally or alternatively, in implementations, the controller 5005 can determine a center of mass of the mask of the at least one article 12a on the floor 5110 and move the targeted grip point 15 toward the center of mass with each subsequent attempt after a missed grab. Alternatively, in implementations, the controller 5005 is configured to move the target grip point 15 to some other location within the area of the garment mask (e.g., mask 5800).

Figure 60:
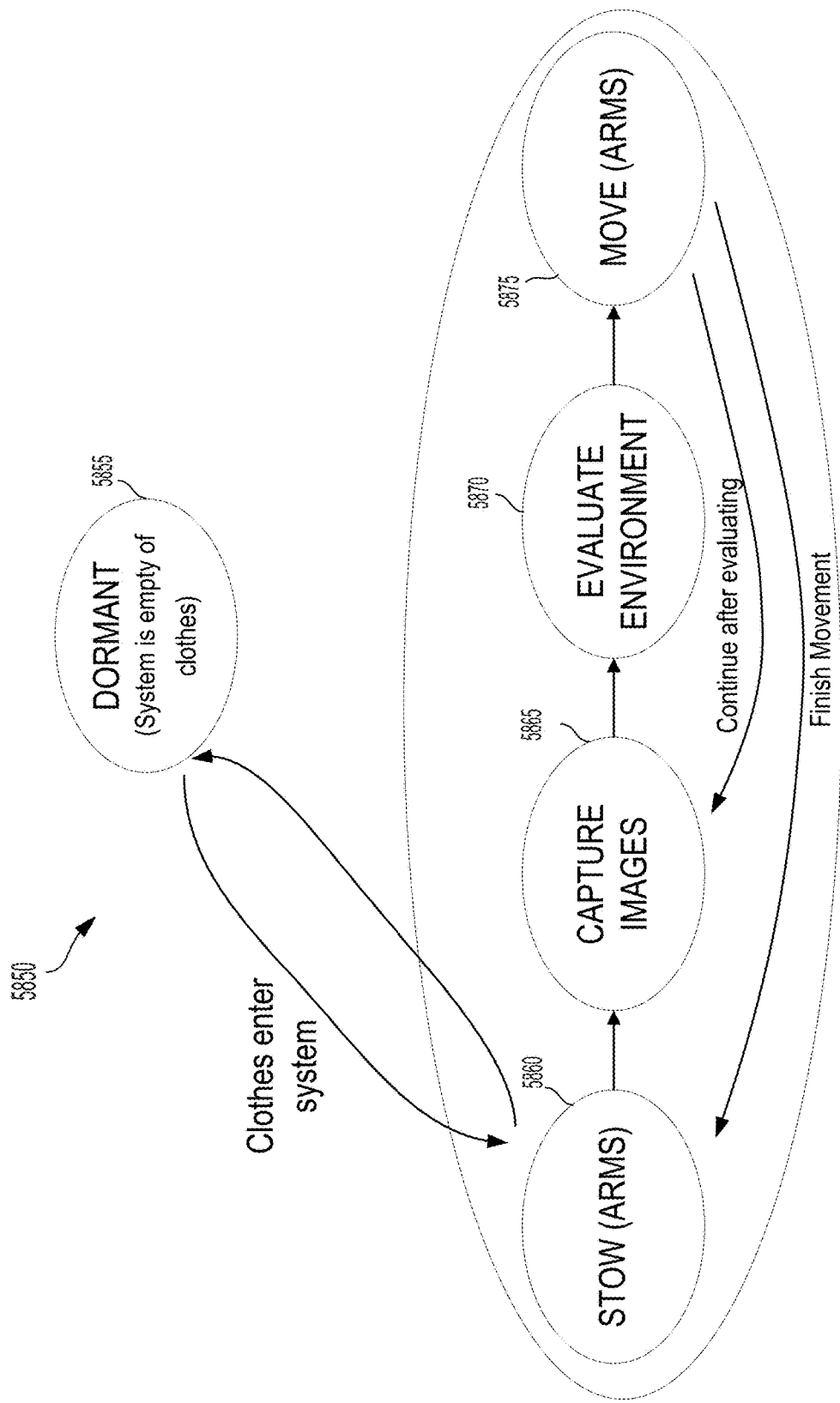
FIG. 60 depicts a state diagram of the autonomous laundry separating device.

In implementations, the controller 5005 selects the alternate grip point locations randomly, or by iterating attempted grasps at alternate locations in a deterministic manner. This ensures that the gripper 5205 will find a graspable portion of the article 12, accounting for any spacing between extensions and the core of a garment, such as between sleeves and the torso portions of a shirt, which may place a center of mass in an open location not occupied by the article 12. Additionally or alternatively, in implementations, the controller 5005 is configured to create a bounding box 5805 around the mask 5800 of the article 12 as shown in FIG. 60, the bounding box comprising a length LB and a width WB that places the mask 5800 inside the bounding box 5805. The controller 5005 is configured to choose a random point as the target grip point 15 based on the length LB and width WB of the bounding box, determine whether the grip point 15 is within the mask 5800 (e.g., grip point 15b) and not just within in the bounding box 5805 (e.g., 15a), and instruct a gripper 5205 to grasp the grip point 15b within the mask area corresponding to the location of the article 12. If the grip point was not within the mask 5800, the controller 5005 randomly selects a new target grip point with the bounding box 5805 and iteratively continues randomly selecting target grip points until a target point is within both the bounding box 5805 and the mask 5800. The randomness of determining a grip point 15 within the bounding box 5805 accounts for the difference in size between an end effector in software path planning (e.g., a single point) and the volume of the gripper 5205, which is a 3D element and not a single point, and results in successful grabs of the article 12 regardless of article size. This enables a gripper 5205 to grab very small items such as baby socks, for example. By comparison, targeting a center of mass could result in the joint at the base of the fingers 5707a-b of the gripper 5205 touching the floor 5110 of the platform 5100 and not reaching the article, even though the center of the gripper 5205 was directly above the given target point, such as an edge point of the small article or a point moved inward from an edge point toward a center of mass.

Additionally or alternatively, in implementations, after selecting the target grip point within the bounding box, the controller 5005 is configured to instruct the one or more drive motors 5125a-c to transit the gripper 5205 to a target location above the determined grip point, then slowly move down at a fraction of the transit speed in arriving at the target location. The controller 5005 instructs the at least one drive motor 5125a-c to press the gripper 5205 into the article and then retract to a distance at or around 2 cm while closing the fingers 5707a-b of the gripper 5205 around the grip point of the article. In this way, the gripper 5205 is able to grasp small articles successfully, articles such as baby socks and children's gloves, for example, without driving into them and potentially pushing them out of reach.

Figure 19:
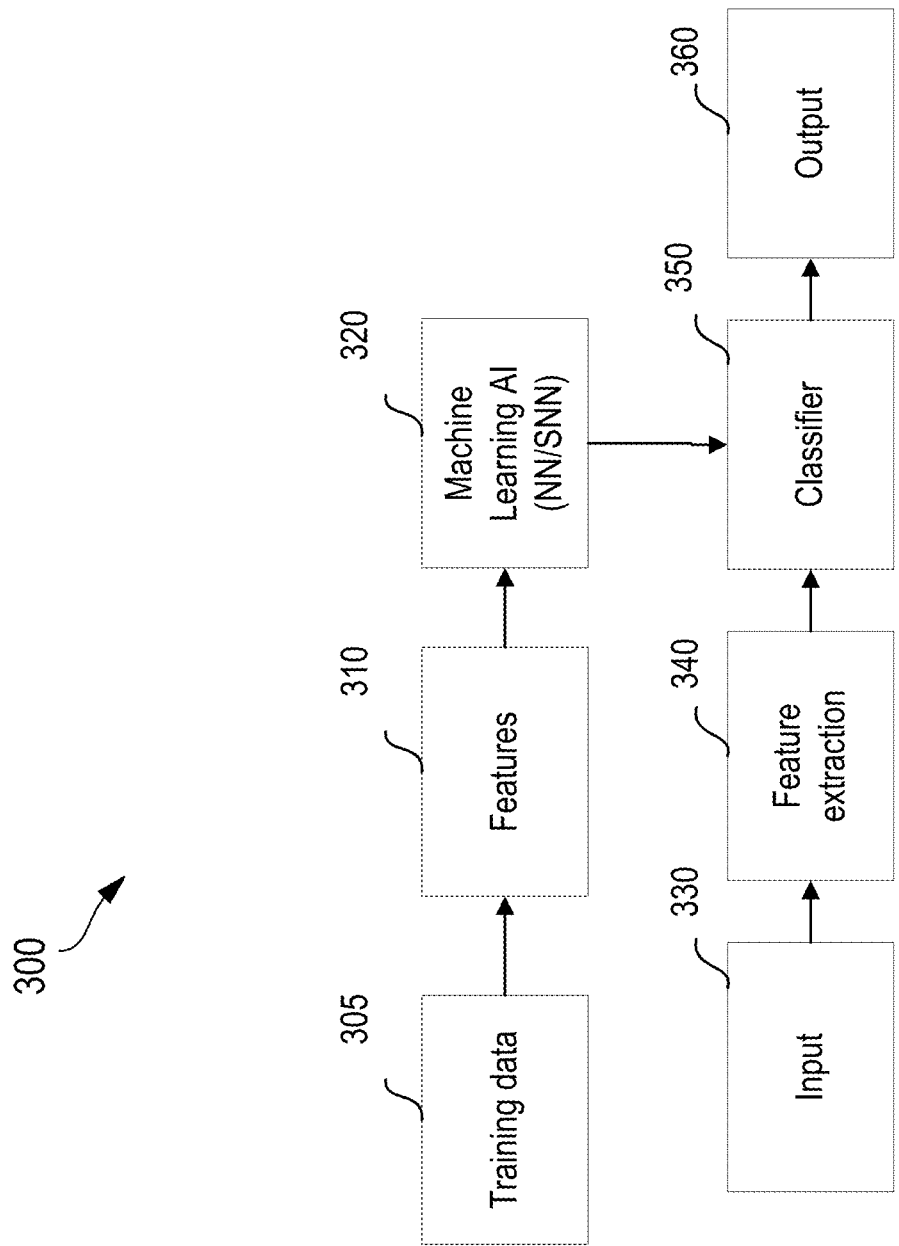
FIG. 19 depicts a schematic implementation of a neural network for classifying and sorting articles.

Each of the subsequent arms in the plurality of sequential arms 5210a-c similarly performs a grasp, move (e.g., rotation, slide), and drop, and down the line of sequential arms 5210a-c and work volumes 5105a-c. By performing sequential grasps, rotations, and drops the device 5000 increases the likelihood that each subsequent grasp will result in the terminal gripper of an arm retaining only a single article in the final work volume. By separating the load of the plurality of deformable articles 12a-n into single articles, the device 5000 is able to provide each article to one or more repositioning robots 6000 and folding robots 7000 for at least one of spreading, orienting, and folding, one article at a time. As shown in FIGS. 14B and 19, each article of the plurality of deformable articles 12a-n can be independently detected by the at least one sensor 5140a-c, 5147a-c and the controller 5005 can determine one or more characteristics related to at least one of type and size of the article. For example, the controller 5005 can determine whether an article requires folding or whether the article is a small item (e.g., sock, underwear, glove, etc.) that requires no folding. If an article is small and/or not suited for folding, the controller 5005 can instruct the arm 5210c adjacent the outlet end O to place the article into a separate area for processing without proceeding to either or both of the repositioning robot 6000 and folding robot 7000. For example, the arm 5210c adjacent the outlet end O can place an article 12a in a bin 5152 that is automatically conveyed to a queue for packing. Additionally or alternatively, the device 5000 is configured to deliver an article 12a onto a surface 5153 adjacent the platform 5100. In implementations, the surface is a conveyor. Additionally or alternatively, the surface comprises a portion of the repositioning robot as will be described subsequently with regard to implementations. In implementations, the separating robot 5000 can introduce a small article to a repositioning robot 6000 which can then place the small article in a small items bin 5152 and/or platform beneath and/or adjacent to the repositioning robot 6000.

Also as shown in FIG. 14B, one or more arms of the plurality of arms 5210a-c can operate simultaneously. For example, a third arm 5210c can drop an article 12a into a bin 5152 or onto a surface 5153 for further processing while a first arm 5210a is moving (e.g., rotating, sliding, extending) into the second work volume 5105b with a hoisted plurality of articles 12b-c in its terminal gripper 5205a, leaving behind the remaining plurality of deformable articles 12d-n on the floor 5110 at a load intake position adjacent the inlet end I. The first arm 5210a will drop the articles 12b-c from its terminal gripper 5205a onto the floor 5110 in the second work volume 5105b and the terminal gripper 5205b of the second arm 5210b is likely to grasp only one of the two deformable articles 12b-c dropped. Additionally or alternatively, in implementations, the controller 5005 is further configured to drive the at least one drive motor 5125a-c of an arm 5210 of the plurality of arms 5210a-c in at least one of alternating side-to-side and alternating up and down motions to shake a grasped deformable article of the plurality of deformable articles at the hoist height H1. By shaking the terminal gripper at the hoist height, the arm can free any articles that may be stuck together, e.g., statically attracted, or entangled. This shaking and/or snapping motion will separate two articles hoisted together when only a single article 12 is grasped. This helps prevent two articles 12 from being delivered to a next work volume 5105b-c and therefore helps ensure that only a single article 12 is grasped by the terminal gripper 5205c of the final arm 5210c in the sequentially placed plurality of arms 5210a-c.

Figure 15:
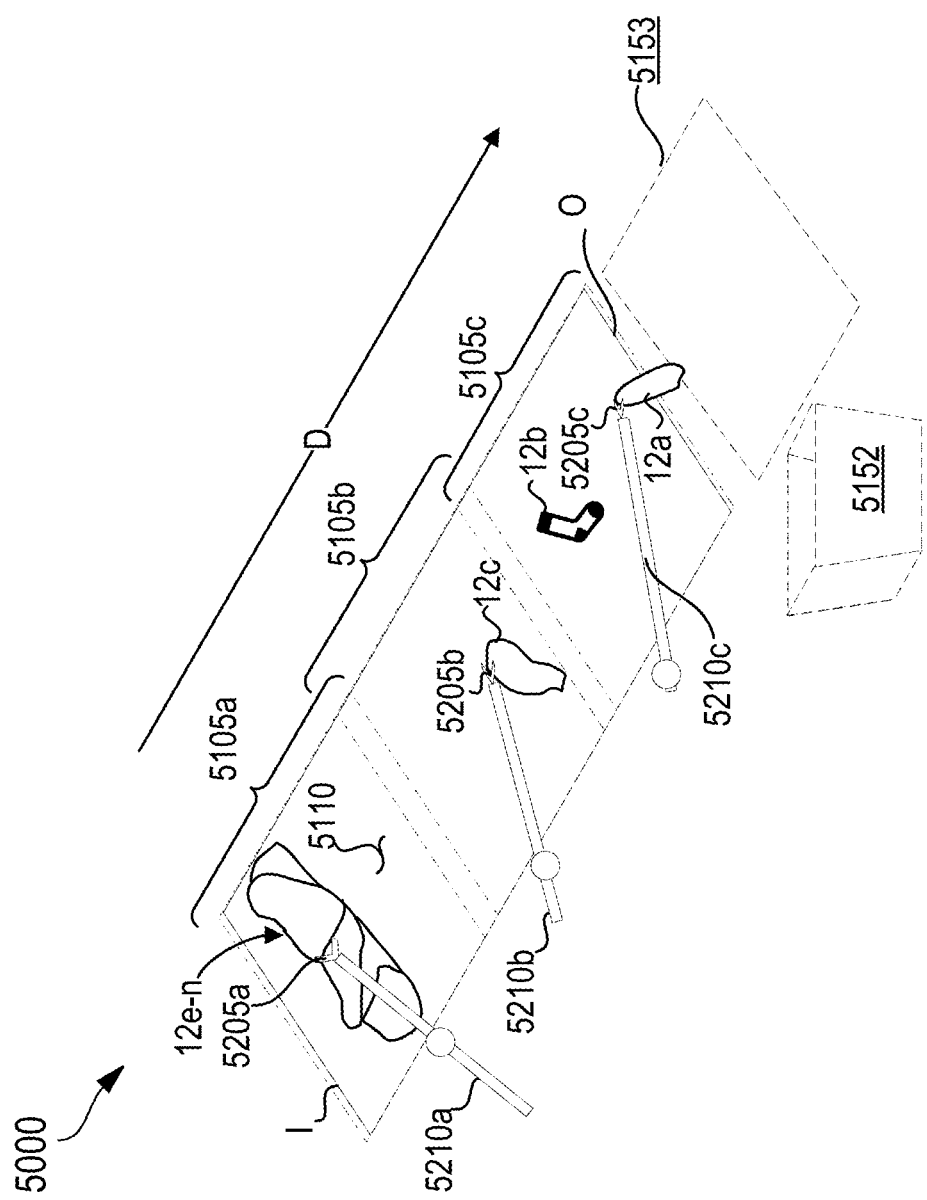
FIG. 15 depicts a schematic perspective view of a portion of the autonomous laundry separating device during the sorting process.

In implementations, as shown in FIG. 15, the controller 5005 is further configured to determine whether a work volume is clear of any articles before an arm drops another article into that work volume. For example, an article 12b can remain in the third work volume 5105c while a second arm 5210b waits for the third arm 5210c to finish cleaning the third work volume 5105c before releasing another article 12c into the third work volume 5105c. This prevents piling up more than one article in the third work volume 5105c and further ensures that only a single, separated article will be released beyond the outlet end O. Table 1 describes an implementation of a decision matrix executed by the controller 5005 based on sensor input for determining whether a work volume 5105, 5105a-c is clear of any articles 12, 12a-n before dropping another article into that work volume:

TABLE 1

| Population count at and in contact with gripper above floor | Floor mask | Work volume floor available to receive new article? | Meaning |
| --- | --- | --- | --- |
| Article detected | Empty | Yes | Grab successful |
| Article detected | Article detected | No | Maybe multiple articles grabbed, maybe large article grabbed |
| Empty | Empty | Yes | Grab successful, small article |
| Empty | Article detected | No | Missed grab/dropped article, or successful small article grab but multiple articles on floor 5110 |

In this implementation, after an arm 5210 performs an article 12 hoist, the controller 5005 will evaluate a population count of an output sensor signal (e.g., one or more sensors 5140a-c 5147a-c) to determine whether an article is detected in an area under the engaged arm 5210. In implementations, the population count comprises the number of points in a point cloud, and the points comprise at least one of points that have been voxelized and points that have not been voxelized. Alternatively, in implementations, determining a population count indicative of a successful hoist comprises the controller 5005 identifying correlated points between 3D points in a depth map with RGB pixels in an RGB image of the hoisted article based on the output signal of one or more sensors (e.g., one or more sensors 5140a-c, 5147a-c). This implementation of determining population count can also be used by the controller 5005 for classifying an article at the last hoist above the outlet end O based on at least one of a detected article size and color.

If the population count is detected as large (e.g., at or above a threshold value indicative of an article 12 being detected), the controller 5005 determines that the arm 5210 and gripper 5205 grabbed and hoisted at least one article 12. If the population count is below a threshold value, the controller 5005 determines that the grab missed grasping an article, in which case the article is still on the floor 5110, or the article wasn't missed but is smaller than a threshold population count, e.g., a sock. The controller 5005 determines whether an article is on the floor by evaluating the mask 5800. If the mask processing indicates an empty floor 5110, the controller 5005 determines the grab was successful and the article 12 in the gripper 5205 is small, therefore the floor beneath that arm is available for receiving a new article. If the controller 5005 analyzes the mask 5800 and determines the floor 5110 is not empty (e.g., an article 12 is detected on the floor 5110), the controller 5005 determines the floor 5110 is not available for receiving another article. In this instance when an article is detected in the gripper 5205 and on the floor 5110, either more than one article 12a-n had been deposited on the floor 5110 in the work volume 5105 and one article was hoisted and another left behind on the floor 5110, or the article in the hoisted gripper is large and extends down onto the floor 5110.

If the population count is below a threshold value and the floor mask 5800 does not indicate an article being present on the floor 5110, the floor 5110 is available to receive an article. This condition can indicate that the grab was successful, and the item hoisted is small (e.g., below a population count threshold). If the population count is below a threshold value and the floor mask indicates an article being present on the floor 5110, the work volume is not available for receiving another article. This condition indicates either a missed or dropped article or that a small item was successfully grabbed but another article remains on the floor 5110.

Additionally or alternatively to the above described conditions, in implementations, the controller 5005 is configured to account for shadows. For example, if an article is supposedly detected on the floor 5110 of the work volume 5105a of a hoisted arm 5210a, but the arm 5210b corresponding to the next sequential work volume 5105b is stowed, the controller 5005 determines the detected article is a shadow of the hoisted article 12 the engaged arm 5210 is waiting to move to the adjacent work volume 5105b. The controller 5005 can assume this is a shadow and not an article because the arm 5210b for the adjacent work volume 5105b would have tried to pick up the article 12 and would be in a hoisted position.

Additionally or alternatively, in implementations, the controller 5005 is configured to detect a missed grab by comparing the location of an identified edge grip point of an article with the last grabbed grip point. If the new grip point and the immediate prior grip point are located with a +/−5 mm of one another, the controller 5005 determines the arm missed the prior grab of the article and did not clear the work volume. Additionally, in implementations, the controller 5005 can receive a signal from the at least one sensor 5140a-c, 5147a-c and create a mask of the receiving work volume floor 5110 to determine whether an article was delivered there and/or left there by a gripper of the receiving work volume that also might have missed a grab and failed to clear the receiving work volume. If the controller determined the prior grab was missed, the new grip point will be moved randomly or deterministically within the mask 5800 of the article to a new location for gripping as will be described subsequently with regard to implementations.

In implementations, the controller 5005 is configured to stop iterating the sequential grasps, hoists, rotations, and drops when each one of the plurality of deformable articles 12*a-n* exits the platform 5100 as a solitary deformable article and no deformable articles remain in the platform 5100 as detected by the one or more sensors 5140*a-c*, 5147*a-c*). As will be subsequently described, the controller 5005 is configured to determine that the platform 5100 is clear of any deformable articles before accepting a new load of laundry (e.g., a new pile of deformable articles 12*a*'n') onto the stationary floor 5110 adjacent the intake end I.

Figure 16:
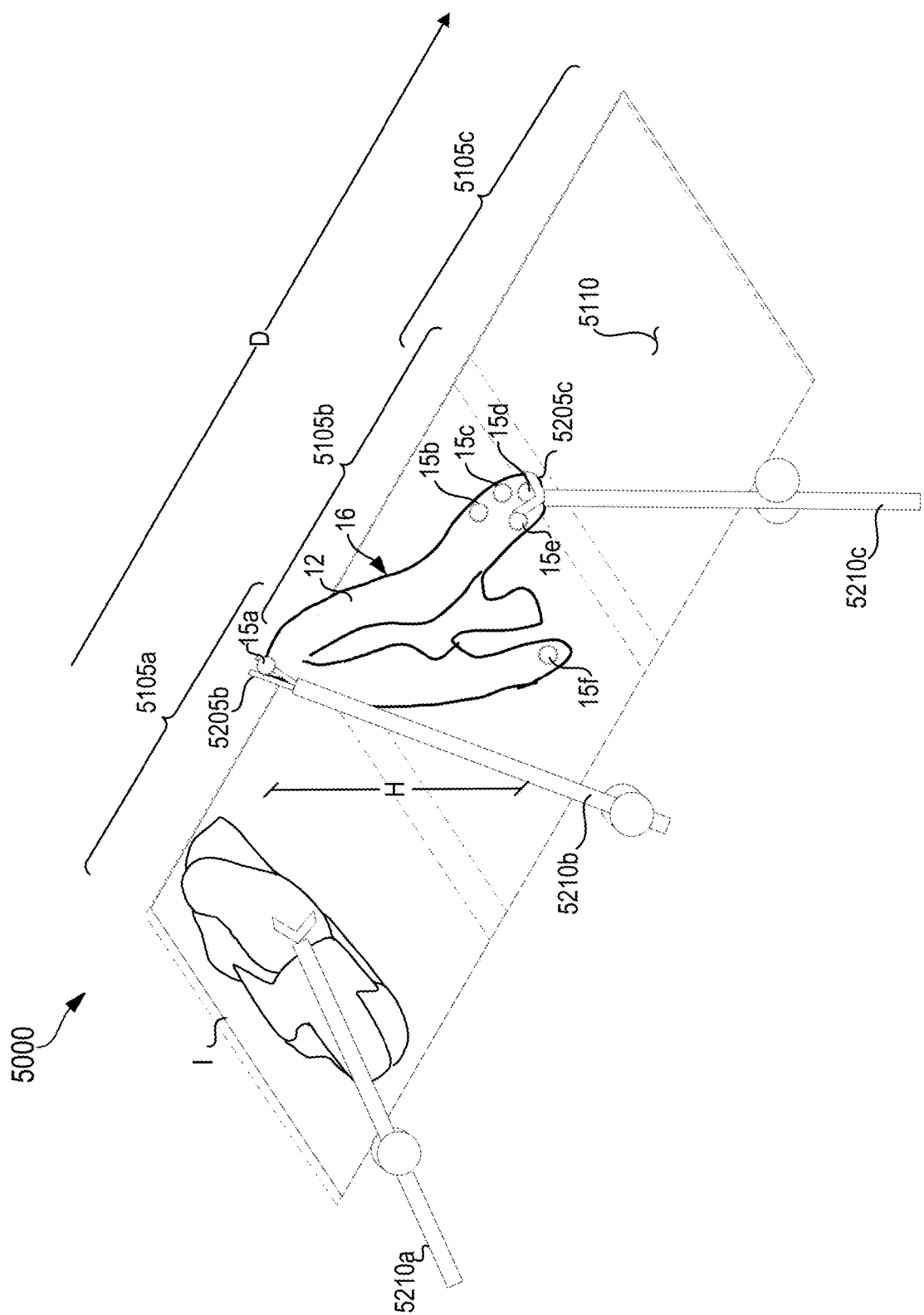
FIG. 16 depicts a schematic perspective view of a portion of an implementation of an autonomous laundry separating device beginning a two-arm hoist of a deformable article.
Figure 17:
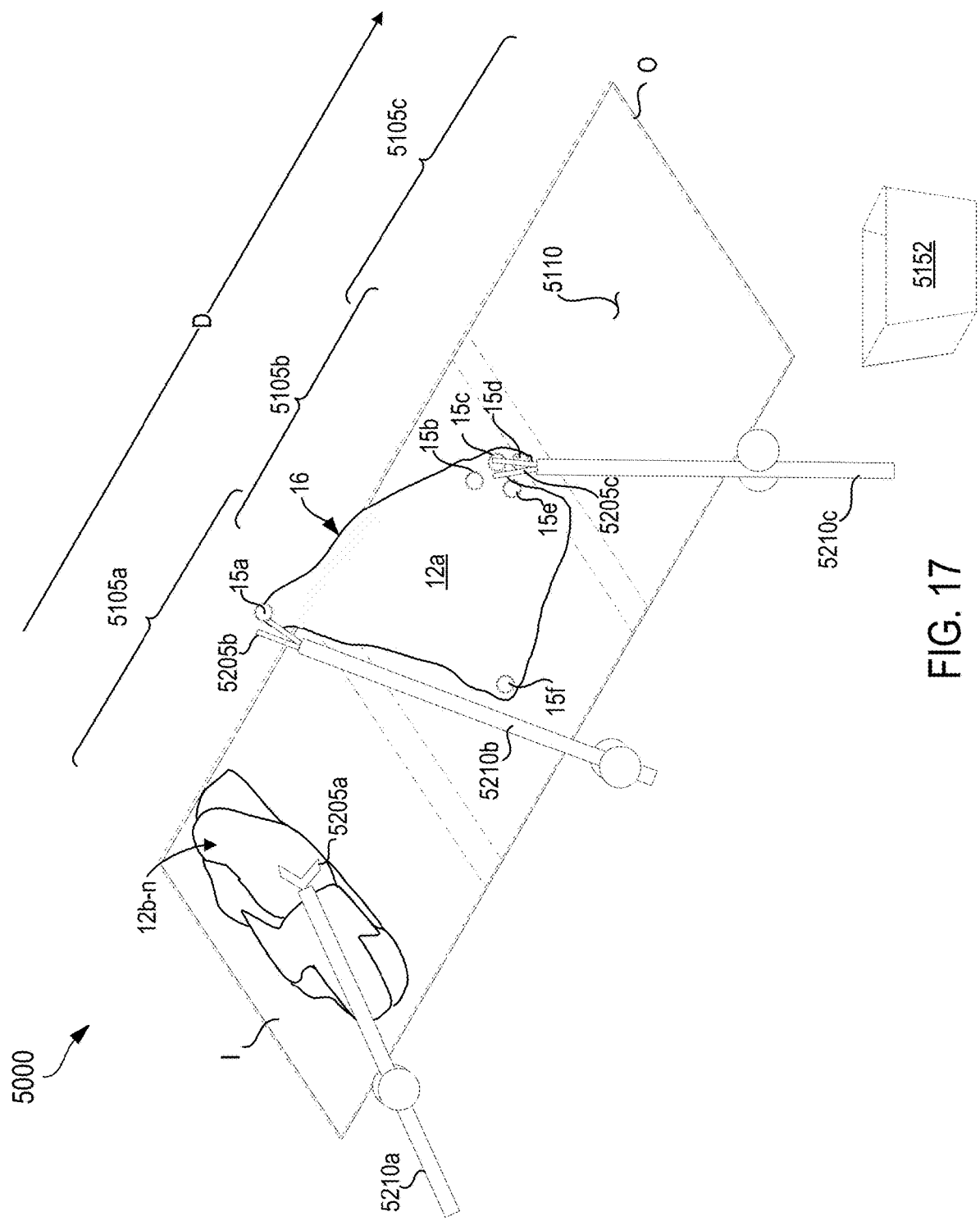
FIG. 17 depicts a schematic perspective view of a portion of the autonomous laundry separating device of FIG. 15 during a two-arm hoist of a deformable article.
Figure 18:
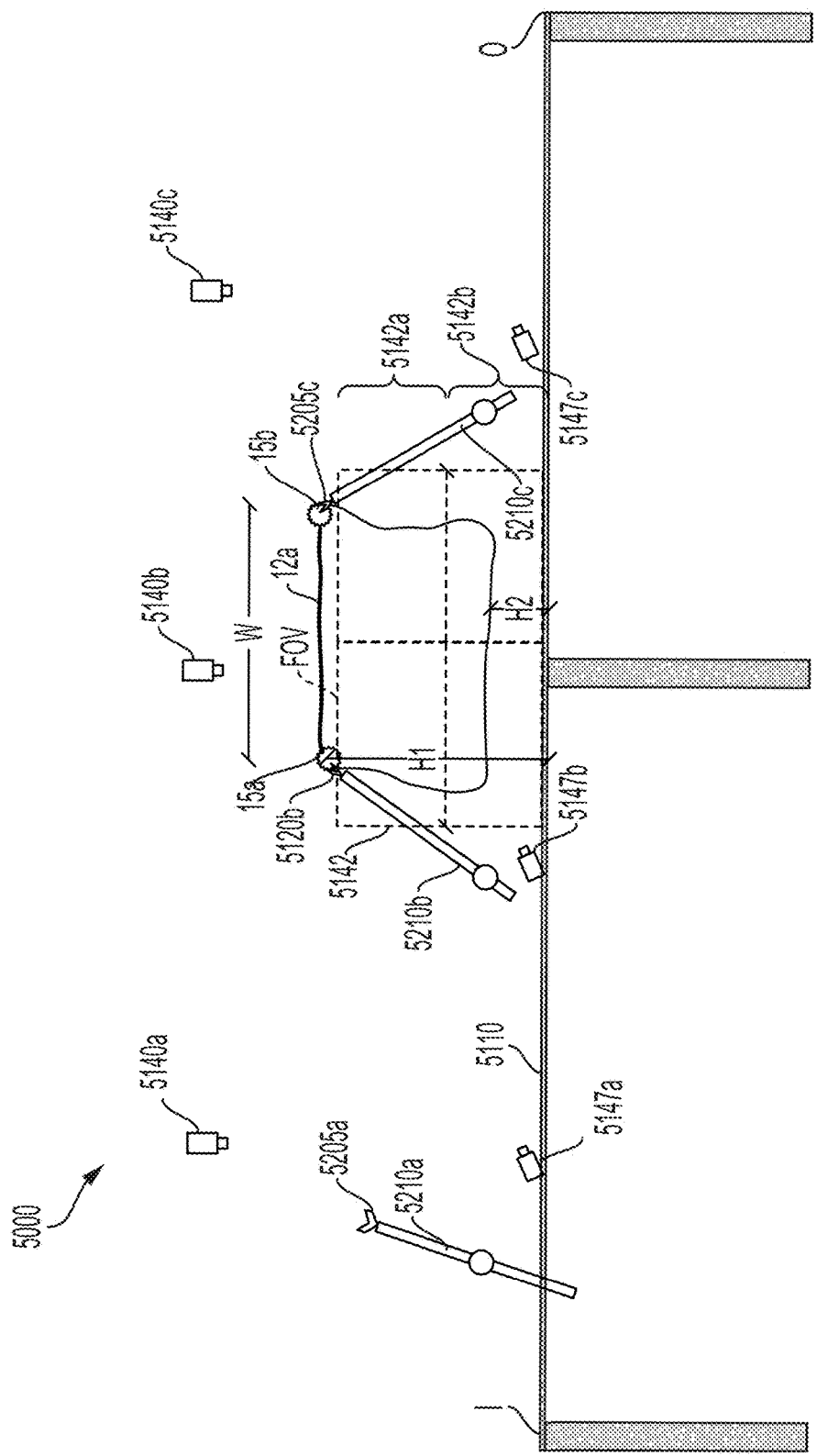
FIG. 18 depicts a schematic perspective view of a portion of the autonomous laundry separating device of FIG. 16 comprising a two-arm hoist of a deformable article.

Although the above implementations describe each of the plurality of arms 5210*a-c* moving (e.g., rotating) a grasped article 12 into an adjacent work volume and the associated terminal gripper 5205*a-c* releasing the article onto the floor 5110 in in the adjacent work volume, additionally or alternatively, in implementations, one or more of the terminal grippers 5205*a-c* of the two or more of the plurality of arms 5210*a-c* can simultaneously grasp at least one of the plurality of deformable articles 12*a-b* at a hoist height H1 without releasing the article onto the floor 5110 so that the article 12*a* is spread out. For example, as shown in FIGS. 16-18, the controller 5005 can determine one or more grip points 15*a-f* on a deformable article 12*a* hoisted by a second arm 5210*b*. In implementations, the one or more grip points 15*a* are disposed on an edge 16 of the deformable articles. The controller 5005 can instruct a terminal gripper 5205*c* of a third arm 5210*c* in a work volume 5105*c* adjacent the second work volume 5105*b* associated with the second arm 5210*b* to grip one of the one or more grip points 15*b-f*. For example, the terminal gripper 5205*c* of the third arm 5210*c* can grip the lowest grip point 15*d* on the article 12 as shown in FIG. 16 and raise the grasped grip point 15*d* of the article 12*a* to the hoist height H1 while the terminal gripper 5205*b* of the second arm 5210*b* is still engaged with the article 12*a* at the hoist height H1 as shown in the chronologically sequential schematics of FIGS. 16-18.

As shown in FIG. 18, one or more of the engaged second arm 5210*b* and engaged third arm 5210*c* can rotate away from one another to spread the article 12*a* to an uncrumpled state. The second terminal gripper 5205*b* can then release the article 12*a* leaving only the third gripper 5205*c* holding the article 12*a* at the hoist height H1. In this way, the plurality of grippers 5210*a-c* continually turn the article 12 between mid-air grasps and by the final grasp, the article is a single article ready for exiting the outlet end O for repositioning and folding. Additionally, in implementations, the controller 5005 can determine whether an article is a large sized item while two or more arms of the plurality of arms 5210*a-c* simultaneously grasp the article and move apart (e.g., rotate apart, move linearly apart) to spread the article to at least a threshold length. The controller 5005 can be configured to estimate a size of the article 12*a* based on a distance W separating the engaged terminal grippers 5205*a-c* once tension is detected in the spread article. Tension can be detected, for example, by one or more sensors in communication the controller 5005 for detecting resistance to movement or by monitoring a motor current of the at least one drive of each arm engaged with the article 12*a*. Alternatively, in implementations, the one or more sensors can detect the linearity of the top edge of the hoisted article. If the article is sagging and not forming a linear edge between engaged grippers, it's not spread apart. If the article forms a linear edge between engaged grippers, the article is held in tension and spread apart. The controller 5005 can access a memory 5010, 210, 235, 240, 250 in wired or wireless communication with the controller 5005, for example via a communication network, and cross reference the determined distance W with a database of size classifications. The determination of a size classification can inform how the repositioning robot 6000 and/or folding robot 8000 will handle the article for spreading out and folding.

Additionally or alternatively, in implementations, the at least one sensor 5140*a-c*, 5147*a-c* of the plurality of work volumes is configured to detect the one or more characteristics of each one of the plurality of deformable articles 12*a-n* and output a signal to the controller 5005 comprising the detected one or more characteristics. In implementations, the controller 5005 provides information comprising the detected one or more characteristics of the article to one or more robots 6000, 7000, 8000 in the process line 100 configured to receive the article subsequently. For example, the controller 5005 of the separating device 5000 can inform a repositioning robot 6000 that a large article, such as a bed sheet, is entering the repositioning workspace, and the repositioning robot 6000 can respond accordingly as will be described with regard to implementations subsequently herein.

In implementations, the at least one sensor 5140*a-c*, 5147*a-c* of each one of the plurality of work volumes comprises at least one of a 3-D camera, an IR sensor, a 2-D camera, LIDAR, LADAR, a sonar proximity sensor, an ultrasonic ranging sensor, a radar sensor, a pair of stereo depth cameras, and a spectrometer for determining fiber type of a deformable article. In implementations, the at least one sensor 5140*a-c* associated with each one of the plurality of work volumes outputs at least one of depth map, RGB images, and IR images. In implementations, the at least one sensor 5140*a-c* associated with each one of the plurality of work volumes configured to output 3-D image data to the controller 5005. Additionally or alternatively, the at least one sensor 5140*a-c* associated with each one of the plurality of work volumes is configured to output one or more 2-D images to the controller. As previously described, in implementations, the at least one sensor is a camera, and the camera is calibrated to the floor of the platform and one or more of the plurality of arms.

In implementations, the controller 5005 is configured to determine, based on a comparison of a received output signal of the at least one sensor to data stored in a memory in communication with the controller, at least one of an article type, an article color, an article size, and an article fabric. In implementations, at least one sensor is a 2-D camera, and the data associated with the deformable laundry article is size invariant image data comparable with database images of tagged articles and/or classes of articles.

In implementations, the memory comprises a neural network 300, and determining the one or more characteristics of each one of the plurality of deformable articles comprises processing the received output signal of the at least one sensor with a neural network classifier. In implementations, as shown in FIG. 19, the neural network 300 comprises a trained neural network, for example a convolutional neural network that operates quickly on 3D and/or 2D data and is configured to classify images from the 3D and/or 2D camera. In an implementation, the classification comprises generating a descriptor based on the output signal of the at least one sensor 5140*a-c*, 5147*a-c* associated with the plurality of work volumes, and classifying, using the neural network, the output signal based on the descriptor. The neural network is configured to output a probability that the output signal corresponds to a class of the stored data indicative of one or more deformable article types, for example. The classes of trained data in the neural network include data associated with many types of deformable articles. For example, as shown in FIG. 19, a neural network 300 can be trained with a set of training data 305. After training, the neural network 300 comprises a set of weights that can be used for neural network inference to determine whether an input 330 (e.g., output signal from the one of the at least one sensors 5140a-c, 5147a-c in the plurality of sequential work volumes 5105a-d of the device 5000) is within one of the trained classes. The classes of trained data in the neural network include data associated with many types of deformable laundry articles that comprise particular spreading characteristics (e.g., size, article—e.g., pants with legs, button down shirts, shirts with long sleeves, sweatshirts with hoods, etc.)

For example, size is a particularly important characteristic of a deformable article because a large item (e.g., a bed sheet, comforter, tablecloth, large bathrobe, etc.) can require particular processing steps within the repositioning robot 6000. The neural network, therefore can be used to determine whether a deformable article in the platform 5100 is of a large garment class. For example, in implementations such as that of FIG. 18, the controller 5005 is configured to receive an output signal comprising an image 5142 of a deformable article 12a engaged with at least one gripper (e.g., two or more grippers 5205b, 5205c) at a hoist height H1. The controller is configured to determine, based on the output signal, a number of pixels in each of an upper half 5142a and a lower half 5142b of the image, and based on the number of pixels in the lower half of the image exceeding a preset threshold that the at least one deformable article 12a comprises a large sized article. Additionally or alternatively, the controller 5005 can be configured to determine an overall pixel count occupied by the deformable article. Additionally or alternatively, the controller 5005 can be configured to determine a gap height H2 and, based on the gap height being equal to or less than a threshold distance, determine the deformable article 12a is of a large size class.

Figure 20:
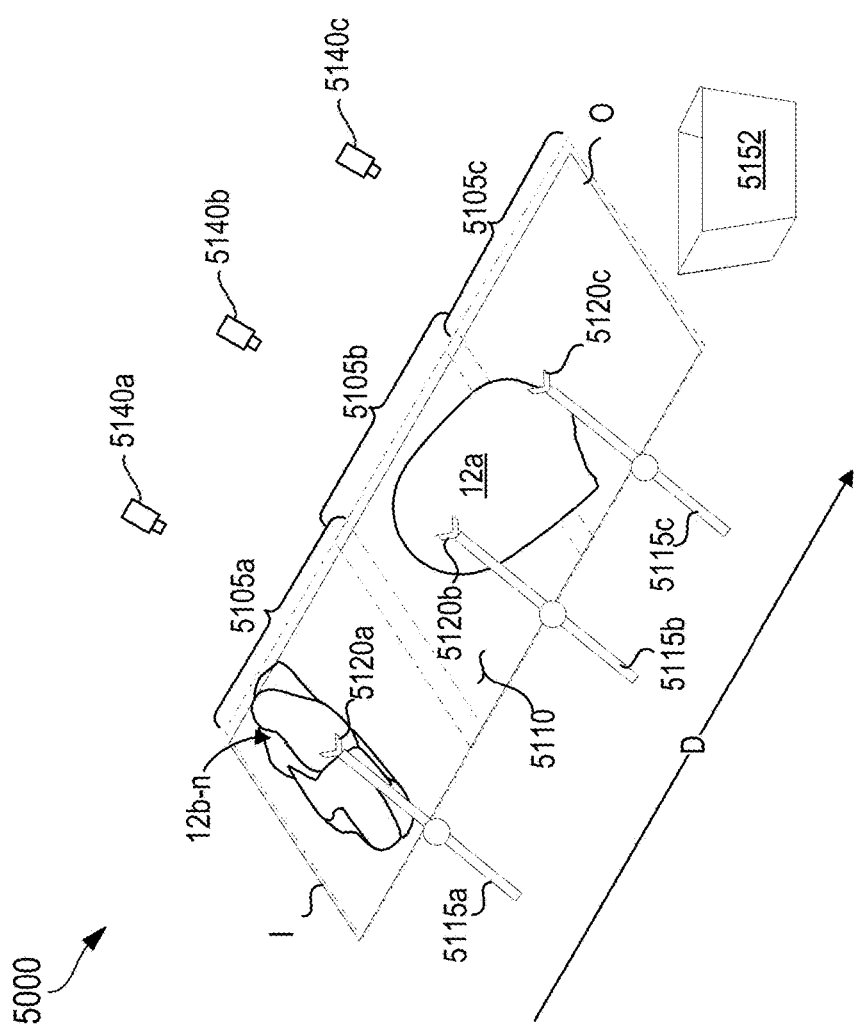
FIG. 20 depicts a schematic perspective view of a portion of the autonomous laundry separating device having a large deformable article therein.

In other implementations, such as that of FIG. 20, the controller 5005 can determine whether a deformable article is a large item by at least one of creating a mask 5800 and stitching images together from multiple cameras (e.g., multiple ones of the at least one sensors 5140a-c, 5147a-c) and identifying article size and position relative to the coordinates of the platform 5100. The controller 5005 is configured to create a single-image view of the entire floor 5110 of the platform and identify the deformable article 12 against the backdrop of the entire length of the floor 5110. Because the cameras 5140a-c are calibrated into the physical space of the platform 5100, the controller 5005 can determine where in physical dimensions of the platform the article begins and ends. For example, as shown in FIG. 20, the article 12a is a large size article spanning between the second and third work volumes 5105b-c.

As described with regard to implementations, the device 5000 comprises a plurality of arms 5210a-c for separating a plurality of deformable articles. As previously described, each of the plurality of arms 5210a-c is configured to pan, tilt, extend, and retract within an associated work volume 5105a-c of the platform 5100.

As previously described, the plurality of arms 5210a-c each further comprise a rod configured to extend from an anchor (e.g., base) 5118a-c at corresponding individually anchored positions as shown, for example, in the implementations of FIGS. 9A-9B and 26. The arm 5210 comprises a fully extended length of between about 0.25 m and 4 m. The plurality of arms 5210a-c are each configured to tilt and extend to a hoist height. In implementations, the hoist height comprises a predetermined height. Additionally or alternatively, the hoist height can be variable depending on the size of an article 12. The controller 5005 can dynamically determine a final hoist height, based on, for example, a received sensor signal that the article 12 is suspended above the floor 5110 of the platform. In implementations, the hoist height comprises a range of between about 0.5 to 4 m above the stationary floor 5110.

Figure 21:
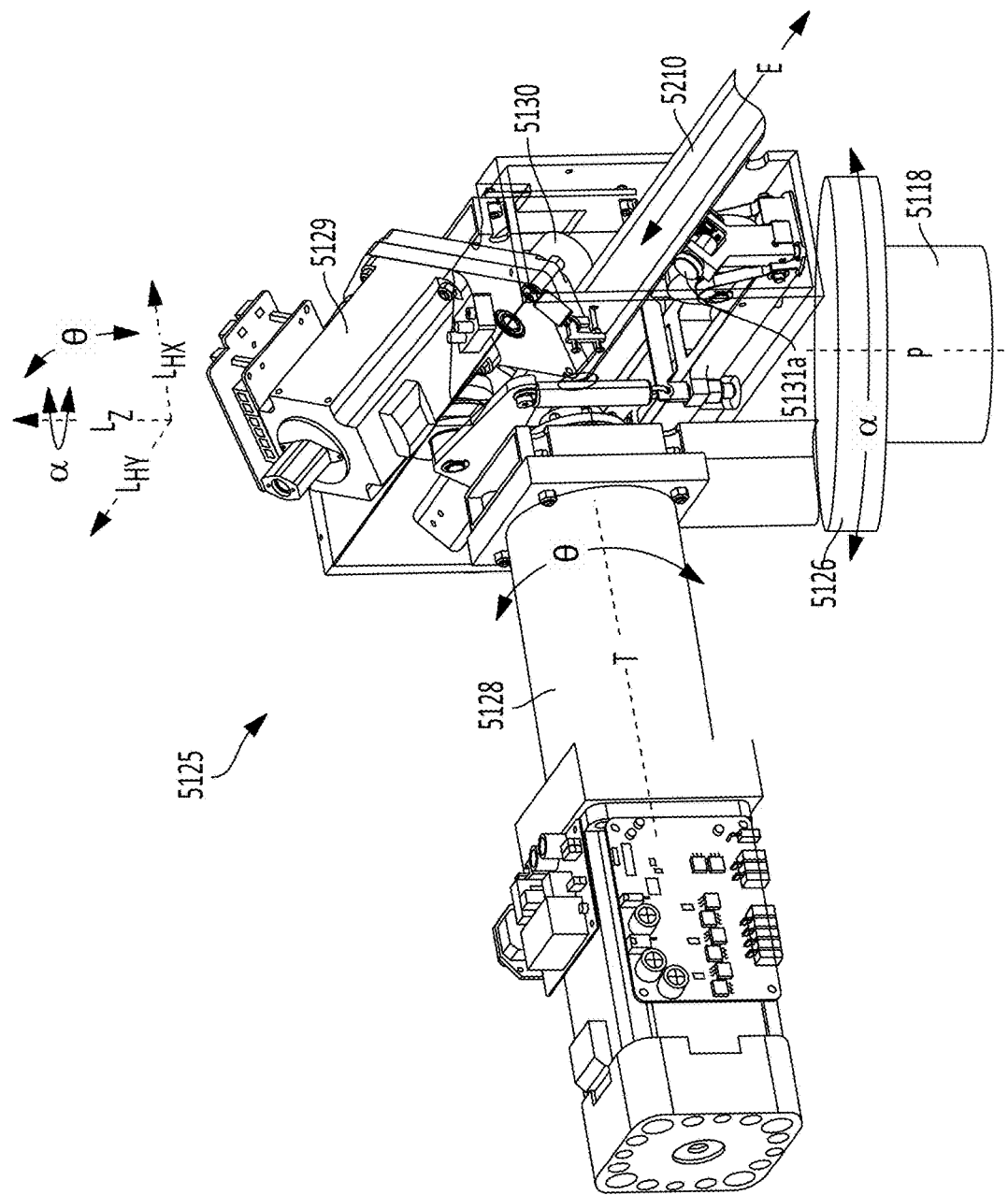
FIG. 21 depicts a view of a portion of a base of the lifter of FIG. 11 with partial transparency showing an implementation of a drive system of an arm of the autonomous laundry separating device.

Taking FIGS. 11 and 21 together, the arm 5210a-c comprises at least one drive motor 5125 disposed on an anchor, and, in implementations, the at least one drive comprises a pan drive motor 5126, a tilt drive motor 5128, and an extend drive motor 5129 as will be described in detail subsequently. In implementations, the plurality of anchors 5118a-c are each associated with one of the plurality of arms 5210a-c and disposed on at least one of a wall, the floor 10 beneath the platform 5100, a frame surrounding the platform 5100, an enclosure surrounding the platform, and a ceiling above the platform 5100. In implementations, each anchor 5118 comprises a columnar base disposed outside and immediately adjacent the platform 5100 and the associated one of the plurality of arms 5120a-c disposed on a corresponding base 5118a-c extends into one or more of the plurality of work volumes 5210a-c.

In implementations, as shown in FIGS. 6-9, for example, the plurality of arms 5210a-c are disposed along a length of the platform 5100 at individually anchored positions spaced apart from each of the other anchored positions by between about 150 cm to 400 cm. In examples, the two or more repositioning arms are disposed about the perimeter of the repositioning work volume at individually anchored positions spaced apart by between about 1.5 m to 3 m (e.g., 1.5 m, 2 m, 2.5 m, 3 m) or 5 to 9 feet (e.g., 5 ft, 5.25 ft, 5.5 ft, 5.75 ft. 6 ft, 6.25 ft, 6.5 ft, 6.75 ft, 7 ft, 7.25 ft, 7.5 ft, 7.75 ft, 8 ft, 8.25 ft, 8.5 ft, 8.75, 9 ft). In implementations, as shown in FIG. 7, for example, a pivot axis P each one of the plurality of arms 5210a-c is spaced apart from a closest edge of the platform 5100 by a distance DA of between about 100 mm-600 mm. In implementations, as shown in FIG. 7, for example, a pan axis P each one of the plurality of arms 5210a-c is spaced apart from the closest edge of the platform 5100 by a distance DA of approximately 580 mm. As previously described with reference to FIGS. 6-7, in implementations, the adjacent work volumes 5105a-c overlap for the full width W of the platform 5100, and each one of the plurality of arms 5210a-c is configured to extend to any point on the floor within an associated work volume 5105a-c and throughout the width W, length $L_{WV}$, and height $H_{WV}$ of the work volume, as indicated by the reach array 5114 of FIG. 7 having upper and lower bounds 5114a-b starting from a pan axis P and terminating at the platform 5100. The spacing between adjacent ones of the plurality of arms 5210a-c is determined by arm length and distance DA of the pivot axis P to the platform such that each one of the plurality of arms 5210a-c is configured to extend to any point on the floor within an associated work volume 5105a-c and throughout the width W, length $L_{WV}$, and height $H_{WV}$ of the associated one of the plurality of overlapping work volumes 5105a-c.

In implementations the plurality of arms 5210a-c comprises at least two arms. In implementations, the plurality of arms 5210a-c comprises three arms. In implementations, each one of the plurality of arms 5210a-c comprises an arm with no joints. In some implementations, at least one arm of the plurality of arms 5210a-c comprises an arm with one or more joints. In implementations, one of the one or more joints is a spherical joint. In alternative implementations, one or more of the plurality of arms 5210a-c comprises a stationary vertical riser along which a gripper translates up and down. The vertical riser can be disposed adjacent the platform 5100. In still yet other implementations, one or more of the plurality of arms 5210a-c comprises a rotatable riser along which a gripper translates bidirectionally. In implementations, rather than rotating between work volumes as described previously, one or more of the plurality of arms 5210a-c can be movably mounted to slide or motor along one or more tracks disposed above and/or aside the platform. The one or more movably mounted plurality of arms are configured to slide linearly between at least one of vertical and horizontal positions, the horizontal positions extending the length $L_{WV}$ of each work volume 5105a-c. In implementations, the movably mounted arms are configured to at least one of extend and tilt. Additionally, in implementations, the plurality of arms movably mounted to rails comprise one or more joints.

In the implementation of FIG. 9B, the device 5000 includes three arms 5210a-c connected to bases 5118a-c each anchored astride the platform 5100. In implementations, one or more of the bases 5118a-c is anchored to a floor 10 beneath the platform 5100. In other implementations as shown in FIG. 9A, one or more of the bases 5118a-c is anchored to a ceiling or support frame or beam 5119 located above the floor 5110 for providing access to an associated plurality of work volumes 5210a-c.

As previously described with regard to implementations, each of the plurality of arms 5210a-c comprises at least one drive motor 5125a-c. In implementations, each arm 5210 of the plurality of arms 5210a-c can comprise between at least one and three degrees of freedom. As shown in FIG. 21, in implementations, each arm 5210 of the plurality of arms 5210a-c can include a pan motor 5126, 5126a-c for rotating each associated arm 5210 through a rotational angular direction α about a vertical axis P centered on an associated base 5118, 5118a-c and parallel to schematically represented vertical axis $L_Z$. In implementations, each arm 5210 is disposed at anchored positions spaced apart by at least about a distance of at least 5-20 inches (e.g., approximately 12-50 cm) from the sidewalls 5111a-b of the platform 5100 so as to not interfere with the platform 5100 while maintaining effective working volumes for successfully grasping, hoisting, and rotating one or more articles 12 down the platform 5100. As shown in FIG. 5, in implementations, the pan motor 5126a-c comprises an encoder 5157a-a" for detecting a rotational position of the arm 5120a-c. In implementations, the pan motor 5126a-c is a controllable servo motor and comprises a speed encoder in operable communication with at least one of the processor 5155, 5155a-c and the controller 5005.

In implementations, each arm 5210 of the plurality of arms 5210a-c can include a tilt motor 5128, 5128a-c for raising and lowering the arm and associated terminal gripper 5205 with respect to the floor 5110, wherein the floor 5110 is in a plane defined axes $L_{HX}$ and $L_{HY}$ as shown in FIG. 6. The arm tilt motor 5128 is positioned at least a distance of 300 mm over the floor 5110. In implementations, a tilt motor 5128, 5128a-c comprises an encoder 5157b-b" for detecting a position of the arm 5210, 5210a-c. As shown in FIGS. 11 and 21, the tilt motor 5128 of a lifter 5200 comprising the arm 5210, base 5118, and plurality of drive motors 5125a-c is configured to tilt an arm 5210a-c in a rotational tilt direction θ about a tilt axis T approximately aligned with a longitudinal axis of the tilt motor 5128, 5128a-c, thus moving a gripper 5205 upward along the vertical axis $L_Z$ (e.g., z-axis).

In implementations, each arm 5210 of the plurality of arms 5210a-c can include an extend motor 5129, 5129a-c for pushing and pulling an associated arm 5210 forward and back in a linear direction along an axis E of each arm 5210 and thereby drive each gripper 5205 toward and away from its associated base 5118. For example, as shown in FIGS. 11 and 21, the extend motor 5129 drives a friction wheel 5130 configured to engage a surface of the arm 5120. The arm 5120 is seated in two or more rotatable support wheels 5131a-c configured to hold the arm in steady alignment as the friction wheel 5130 retracts and extends the arm 5120 therealong into and out of the work volume 5105, 5105a-d. In implementations, the rotatable support wheels 5131a-c comprise v-groove ball bearings and one or more corners of an arm 5120 are disposed on and movably supported by the v-groove of each bearing. Additionally or alternatively, in implementations, the rotatable support wheels 5131a-c comprise one or more crowned rollers having rounded edges to guarantee no wear on an engaged arm 5120, 5120a-c. In implementations, the rotatable support wheels 5131a-c are configured to withstand maximum radial and axial loads during high-acceleration motions of a heavy article (e.g., an article comprising a weight in a range of between about 3 kg to 5 kg) supported by each arm 5210a-c. Additionally or alternatively, the arm 5210 further comprises a rack disposed thereon for engaging with a pinion gear (not shown) engaged with the extend motor 5129 to prevent the arm 5210 from slipping during extend and retract motions in the direction of the bidirectional arrow representing axis E.

The one or more drive motors 5125a-c (e.g., pan motor 5126a-c, tilt motor 5128a-c, extend motor 5129a-c) can operate simultaneously, in some sub-combination, or alternate operation to move each gripper 5205a-c to a location within the platform 5100 for engaging a deformable laundry article disposed therein. Each gripper 5205a-c is configured to releasably engage the deformable laundry article and operate at least one of independently of and in tandem with another of the grippers 5205a-c to at least one of raise and suspend the deformable laundry article above the floor 5110 of the platform 5100.

In implementations, each arm 5210, 5210a-c can comprise an extruded beam configured to extend from an associated base 5118, 5118a-c. In implementations, an arm 5210 can have no joints along its length, and a length from end to end that measures between about 0.25 m and 4 m (e.g. 0.25 m, 0.5 m, 1.0 m, 1.25 m, 1.5 m, 1.75 m, 2.0 m, 2.25 m, 2.5 m, 2.75 m, 3.0 m, 3.25 m, 3.5 m, 3.75 m, 4.0 m). In implementations, each arm 5210 of the plurality of arms 5210a-c is an extendable arm comprising a fully extended length of between about 0.25 m and 4 m (e.g. 0.25 m, 0.5 m, 1.0 m, 1.25 m, 1.5 m, 1.75 m, 2.0 m, 2.25 m, 2.5 m, 2.75 m, 3.0 m, 3.25 m, 3.5 m, 3.75 m, 4.0 m). In examples, the extendable arm can include at least one of one or more flexible and/or compliant joints and two or more telescoping sections. In implementations, the at least one compliant joint comprises a compliant wrist disposed between the extendable rod of the arm 5210 and the terminal gripper 5205. Additionally or alternatively, as will be described subsequently with regard to implementations, the wrist of an arm 5210 comprises one or more of a swivel joint and hinge joint for bending the wrist and aligning the terminal gripper to close on a grippable edge of a hoisted article 12 rather than trying to pinch a planar surface.

Joints and telescoping arms can be implemented to accommodate space constraints, but the additional moving sections can create pinch points for potential entangling the deformable laundry article 12. Therefore, in implementations, each arm of the plurality of arms 5210a-c comprises no joints. In implementations, the motions of each arm 5210, 5210a-c have a resolution of +/−5 mm in all three cardinal directions ($L_{HX}$, $L_{HY}$, $L_Z$). This precision enables alignment of an associated gripper 5205, 5205a-c before grabbing a grip point 15a-f on a deformable laundry article 12. In implementations, each arm 5210, 5210a-c moves the associated gripper 5205, 5205a-c within a spherical work volume having a radius defined by the arm 5210, 5210a-c. The linear error introduced by degrees of pan and/or tilt at a full extension of the arm 5210, 5210a-c is +/−5 mm.

As previously described, in implementations, the two or more arms 5210, 5210a-c comprises three arms anchored along a length of the platform 5100. In implementations, as shown in FIGS. 12A-15, each arm 5210, 5210a-c has a range of motion that extends into an adjacent work volume 5105a-c. In implementations, adjacent work volumes 5105a-c overlap for at least 0.30 meter (e.g., about 1 ft) for the full vertical height $H_{WV}$ of the work volume 5105a-c, from the floor 5110 to a maximum suspension height (e.g., maximum hoist height) within the work volumes 5105a-c. As described previously with regard to FIG. 7, in implementations, each one of the plurality of arms 5210a-c is configured to extend to any point on the floor within an associated work volume 5105a-c and throughout the width W, length $L_{WV}$, and height $H_{WV}$ of the work volume. In implementations, the work volume 5105 comprises the volume of space extending between the floor 5110 and the hoist heights that is accessible by the arm 5210a-c at full extension, though a maximum pan range of movement and maximum tilt range of movement.

In implementations, the pan motor 5126a-c comprises a power output in a range of between about 30-1800 W. In implementations, the tilt motor 5128a-c comprises a power output in a range of between about 120-3550 W motor. In implementations, the extend motor 5129a-c comprises a power output in a range of between about 60-1690 W motor. The bottom end of the ranges comprise power ratings for pan, tilt, and extend motors controlling an arm 5210 repositioning an article 12 having a weight between about 0.1-1.25 kg or an article having a weight in the range of about 3-5 kg traversing a work volume 5105 slowly (2-5 seconds). The top end of the ranges comprise requirements for moving an engaged article 12 having a weight of between about 3-5 kg traversing the work volume 5105 quickly (1-2 seconds), wherein traversing the work volume comprises moving through a full range of motion of any individual motor 5125a-c (e.g., pan motor 5126a-c, tilt motor 5128a-c, extend motor 5129a-c). These ranges and values are intended to address the ranges and values of the plurality of varied laundry article types typically generated by a household. In any of the above implementations, traversing a work volume 5105a-c is defined as any traversal including at least one of a full range of pan, full range of tilt, and full range of extend motions of the arm 5210a-c and associated gripper 5205a-c.

In addition to pan, tilt, and extend motions, in implementations, additionally or alternatively, the controller 5005 is further configured to drive the at least one drive of an arm 5210 of the plurality of arms 5210a-c in at least one of alternating side-to-side and alternating up and down motions to shake a grasped deformable article 12 of the plurality of deformable articles at the hoist height. By shaking the terminal gripper 5205 at the hoist height, the arm can free any articles that may be stuck together, e.g., statically attracted, or entangled. This is possible because the terminal grippers 5205 are designed to securely grasp an article 12.

As shown in the system schematic of FIG. 5, the device 5000 comprises three or more arms 5210a-c in operable communication with at least one of their respective processors 5155a-c and the at least one controller 5005. In implementations, each one of the three or more arms 5210a-c comprises a pan drive 5160, tilt drive 5162, and extend drive 5164 configured to drive respective pan motors 5126a-c, tilt motors 5128a-c, extend motors 5129a-c of an arm 5210, 5210a-c as described with regard to implementations. In implementations, the pan motors 5126a-c, tilt motors 5128a-c, and extend motors 5129a-c comprise controllable motors (e.g., a brushless DC motor (BLDC)), Each arm 5210, 5210a-c comprises a network interface 5166, 5166a-c configured to communicate data and sensor signals to at least one of the respective processors 5155, 5155a-c and the at least one controller 5005 of the system 400 (via a wireless or wired communication network 230) for processing. The sensor signals can be output from one or more optical sensors 5140a-c, 5147a-c, one or more encoders 5157a-c, a'-c', a"-c", and one or more position sensors 5168, 5168a-c and routed via a sensor interface 5170, 5170a-c.

Additionally, each arm 5210, 5210a-c comprises a gripper drive 5172a-c and a gripper actuator 5174, 5174a-c in communication with at least one of the respective processors 5155, 5155a-c and the at least one controller 5005 of the system 400 (via a wireless or wired communication network 230). Additionally, in implementations, each arm 5210, 5210a-c comprises one or more gripper sensors 5176, 5176a-c (e.g., a Hall sensor for detecting an angular position of a gripper wrist that flexes relative to the longitudinal arm axis E) and fingertip pressure sensors disposed in the fingers of the gripper for detecting contact forces with an article of clothing and/or the workspace floor 5110.

As previously described, each arm 5210 of the plurality of arms 5210a-c terminates at an associated gripper 5205, 5205a-c. In implementations, each gripper 5205, including gripper fingers 5707a-b, can be manufactured from a lightweight, impact resistant material, such as aluminum or steel. In implementations, as shown in FIGS. 22A-24B, each gripper 5205 comprises at least two actuatable fingers 5707a-b. In implementations, the at least two actuatable fingers comprise an overmold 5708a-b comprising a durometer of between about 40 A to 80 A. For example, the overmold can comprise at least one of a polymer or copolymer including at least one of a rubber, a thermoplastic elastomer, (TPE), thermoplastic polyurethane (TPU), thermoplastic vulcanizates (TPV), and silicone. The overmold provides protection of the encapsulated fingers and any delicate fabrics of the deformable laundry article 12. Additionally, having a soft fingertip enables finer grasping or grabbing of deformable laundry articles 12 off of a surface, such as the floor 5110 of the platform 5100. In implementations, a gripping surface of each finger of a gripper 5205, 5205a-c comprises a textured surface, e.g., ribs, bumps, ridges, and/or other protuberance, for assisting with gripping the fabric of an article 12 with some degree of friction and/or perturbation. Additionally or alternatively, an outside surface (e.g., opposite the gripping surface) of each finger of a gripper 5210a-c comprises a smooth surface for preventing the fabric of an article 12 from sticking to an outside surface of the gripper 5205, 5205a-c. In implementations, the gripper 5205 is washable and capable of withstanding heavy liquid spray and/or immersion and can have an IP rating of at least one of IP65, IP66, and IP56. In implementations, each gripper 5205 is about 300 mm long, about 100 mm high, and weighs about 500 grams.

Figure 25A:
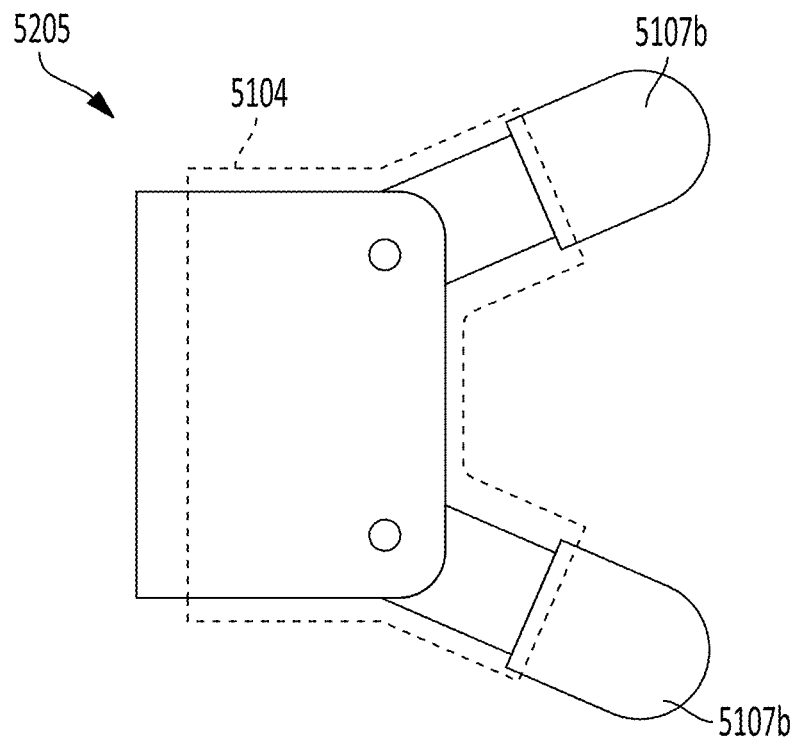
FIG. 25A depicts an example gloved gripper in an open position.
Figure 25B:
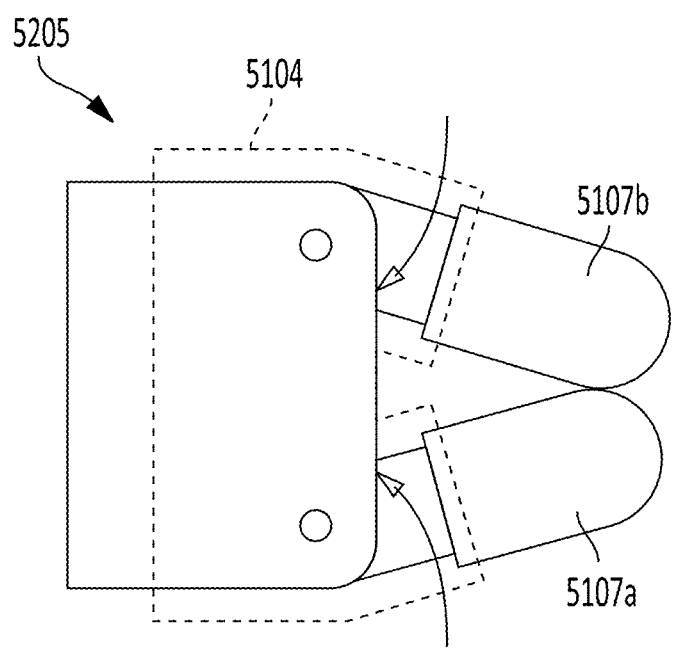
FIG. 25B depicts an example gloved gripper in a closed position.

In implementations, as shown in FIGS. 25A-B, the gripper 5205, 5205*a-c* comprises a glove 5104 or covering to prevent a deformable article from getting caught on at least one of a topography or interface of movable components of the gripper 5205, 5205*a-c* during the separating and hand off process. In implementations, the covering 5104 comprises a flexible, dirt repellant fabric. Additionally or alternatively, in implementations, the covering 5104 comprises a liquid-impermeable material configured for enabling washing of the covered gripper. In implementations, the covering 5104 can be at least one of polyester, rayon, thermoplastic polyurethane, nitrile, closed-cell foams, rubbers, silicone, and NEOPRENE. The glove, or covering 5104, is flexible and/or stretchable such that the fingers 7707*a-b* can move apart (FIG. 25A) and together (FIG. 25B) without any disruptive resistive forces.

Figure 24A:
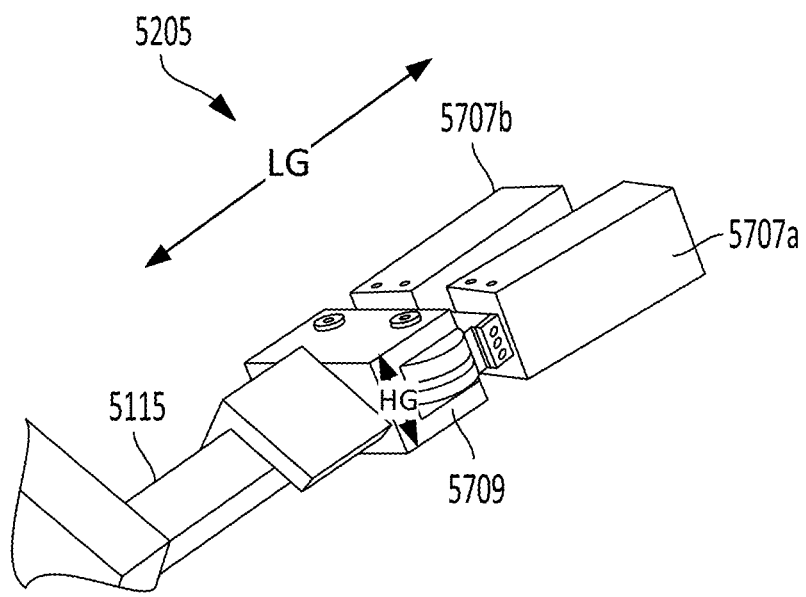
FIGS. 24A-B depict example grippers of the autonomous laundry separating device.
Figure 24B:
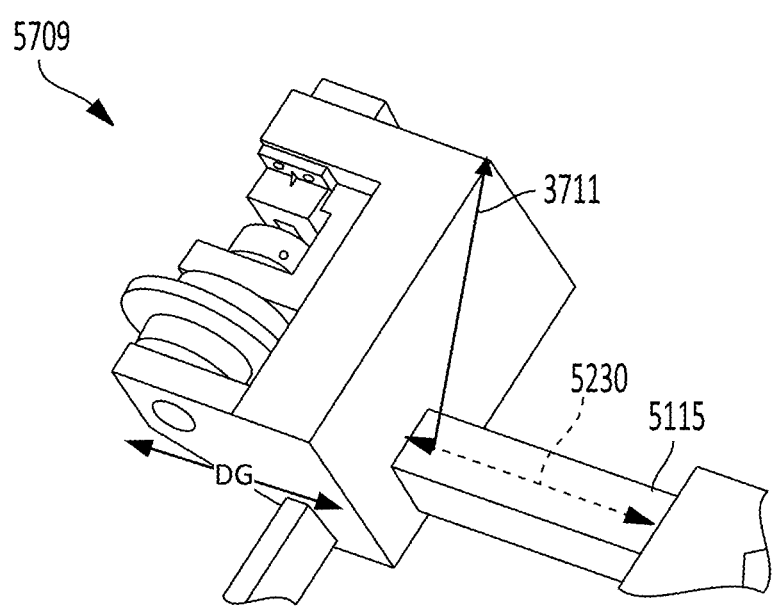

The at least two actuatable fingers 5707*a-b* can rotate about parallel pivot points 5706*a-b*. In implementations, the at least two actuatable fingers 5707*a-b* are configured to be actuated by a drive assembly 5709 to rotate simultaneously while gripping a deformable laundry article 12. The drive assembly 5709 can be in operable communication with the controller 5005. In implementations, the drive 5709 can be cable driven or pneumatically driven. The drive assembly 5709, as shown in FIG. 24B, can be mounted to the arm 5210 and can be 100 mm long and weigh 500 grams. In implementations, the drive 5709 comprises a cross section radius 5711 of less than 100 mm from the axis 5330 of the arm 5210 in any direction.

As previously described with regard to implementations, the gripping surface of the at least two actuatable fingers 5707*a-b* can comprise a textured surface for improved gripping. Additionally or alternatively, in implementations, the gripping surface of each one of the at least two actuatable fingers 5707*a-b* comprises one or more mechanical interlocks (not shown) disposed in the fingers configured to trap the gripped article 12. For example, the one or more mechanical interlocks can comprise at least one of rubber strips that mesh around the article 12 (e.g., like a zipper), a ball and socket, ridged teeth, and mating cones.

In implementations, a gripper 5205 can comprise the following design factors shown in table 2:

TABLE 2

| | |
|---|---|
| Grip strength | 50 N |
| Finger strength-to-force ratio | 2.0 |
| Grip force | 25 N |
| Contact distance | 80 mm |
| Grip torque | 2 N-m |
| Gripper transmission factor | 22 mm |
| Cable tension | 90 N (20 lbs) |
| Cable | 2045 SN [220 lb breaking strength, 7 × 19 construction, 1.12 mm diameter] |
| Motor pulley radius | 14 mm |
| Motor torque | 1.26 N-m |

In implementations, the following definitions apply to the design factors of table 1. Grip strength is the maximum force that can be applied to moving the deformable article 12. It can also be thought of as the force required to pull a deformable laundry article 12 out of a gripper 5205. The at least two actuatable fingers 5707*a-b* are configured to make contact with the deformable laundry article 12 and directly impart the force that moves the deformable laundry article 12 (grip strength). This force is due to a combination of friction (when the force is generally parallel to the gripping surface) and normal tension (for instance, when the deformable laundry article 12 is wrapped over one of the two or more fingers 5707*a-b*). In implementations, such as that depicted in FIGS. 23A-B, the gripper 65205 comprises a sweet spot SS which comprises the volume between the two fingers 5707*a-b* in which an article must be (e.g., the contact area CA) when the gripper actuates in order for the grasp to be successful.

Grip force is the force the two or more fingers 5707*a-b* push against each other (when empty) or the deformable laundry article 12 (when engaged). The grip force is determined by the grip torque and the contact distance CD (e.g., distance between finger pivot 5706 and contact point with the deformable laundry article 12). If the deformable laundry article 12 is engaged at a single point, the grip force equals the grip torque divided by the contact distance. In embodiments, calculations are based on the center of the contact area defining the contact point. Strength-to-force ratio is the ratio between grip strength and grip force. In implementations, grip strength and grip force are directly proportional so that the ratio is fixed for a given combination of finger 5707, deformable laundry article 12 type and shape. In other implementations, grip strength and grip force have a sigmoidal relationship. For example, this applies to grippers 5205 that create a normal force or otherwise 'lock' the deformable laundry article 12 into place between the fingers 5707*a-b*. Grip torque is the torque on the joints of the fingers 5707*a-b*. This is dependent on the cable tension and gripper geometry and can be increased by increasing the lever arm in the gripper 5205, but this increases the gripper size. Cable tension is dependent on the motor torque and lever arm at the motor. This sets the minimum diameter of the cable. Cable tension can be increased by decreasing the motor lever arm, but in implementations using a pulley wheel, a minimum diameter is required to ensure the cable does not break. Motor torque is minimized to reduce cost and weight of the motor.

Figure 22A:
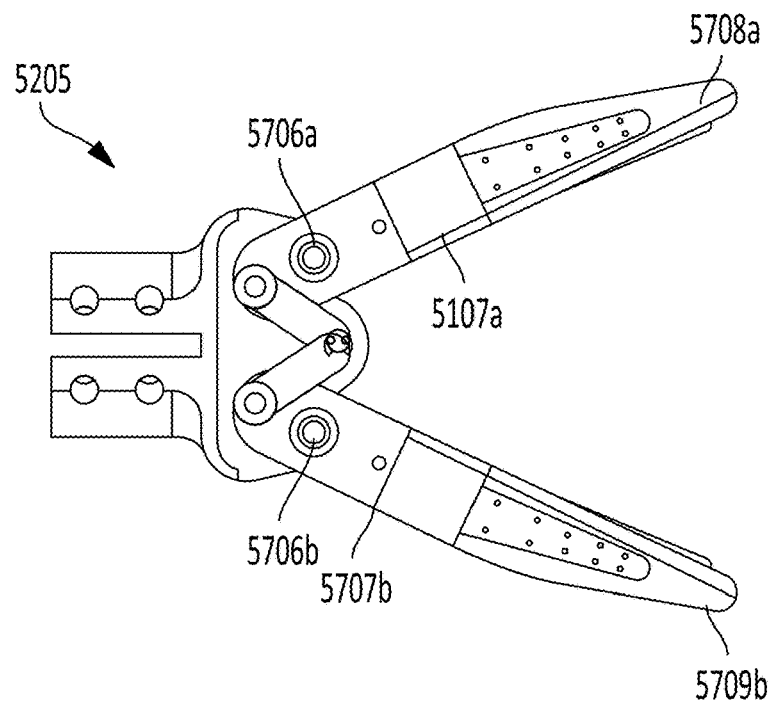
FIGS. 22A-B depict example grippers of the autonomous laundry separating device.
Figure 22B:
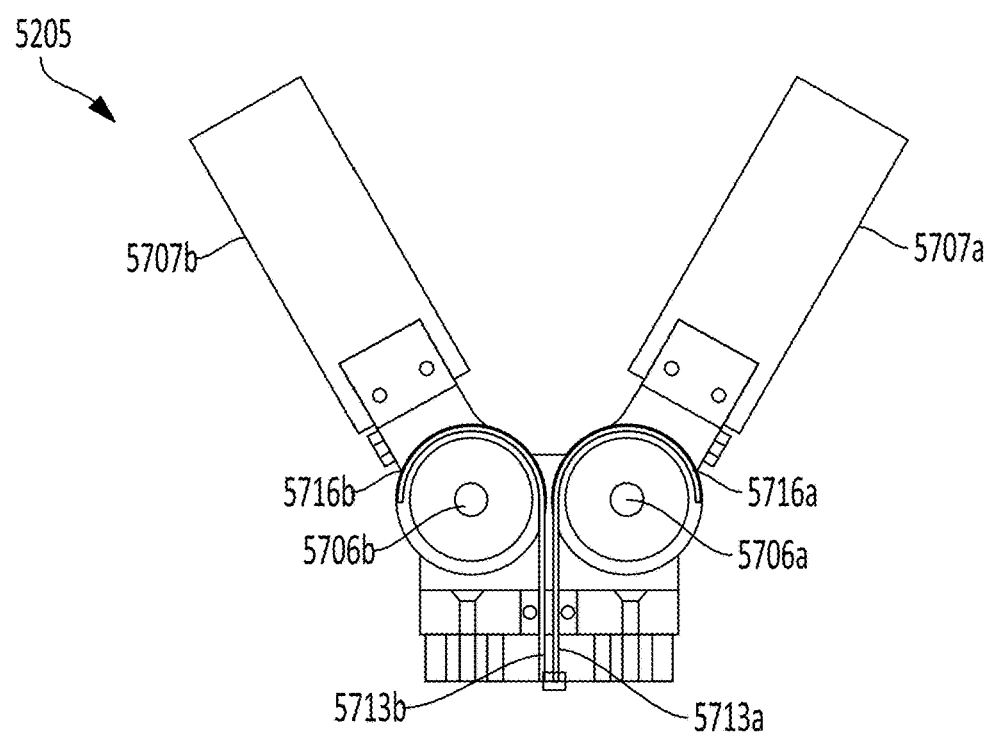
Figure 23A:
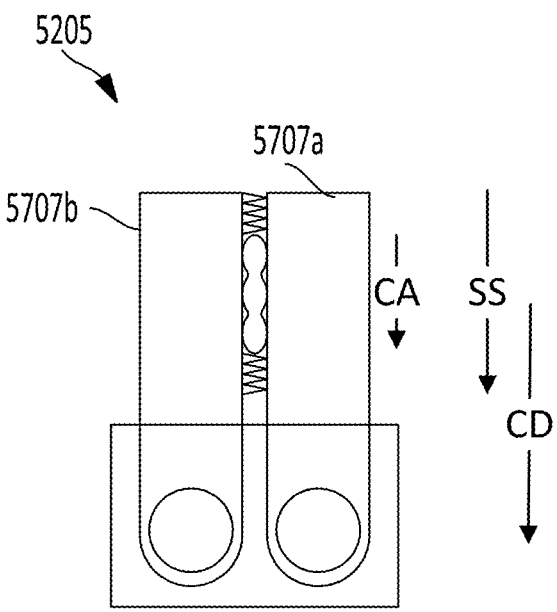
FIGS. 23A-B depict example grippers of the autonomous laundry separating device.
Figure 23B:
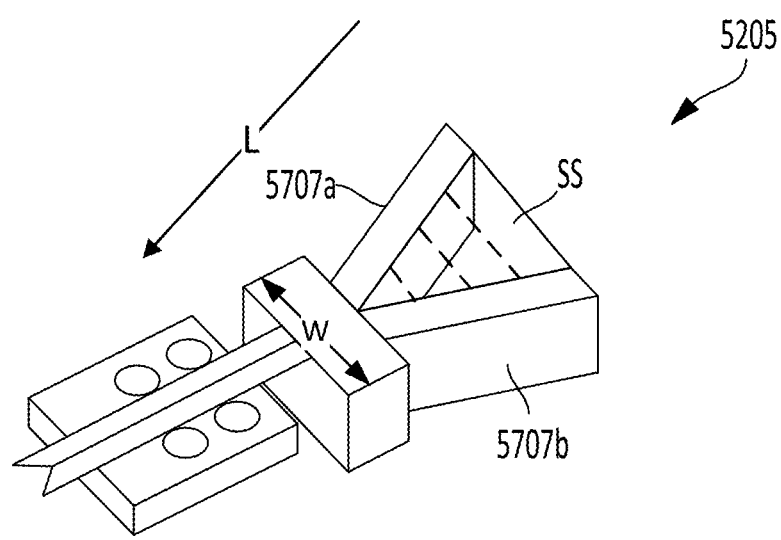

FIGS. 22A-B show exemplary grippers comprising linkages and pulleys for moving the fingers 5707*a-b* by turning translational cable displacement into angular motion. In one implementation employing a pulley (FIG. 22B), two cables 5713 are threaded through the finger joints 5716. In another implementation employing linkages (FIG. 22A), a single cable is looped around a pin. The linkage system is configured to amplify torque as the fingers 5707*a-b* close.

Figure 34:
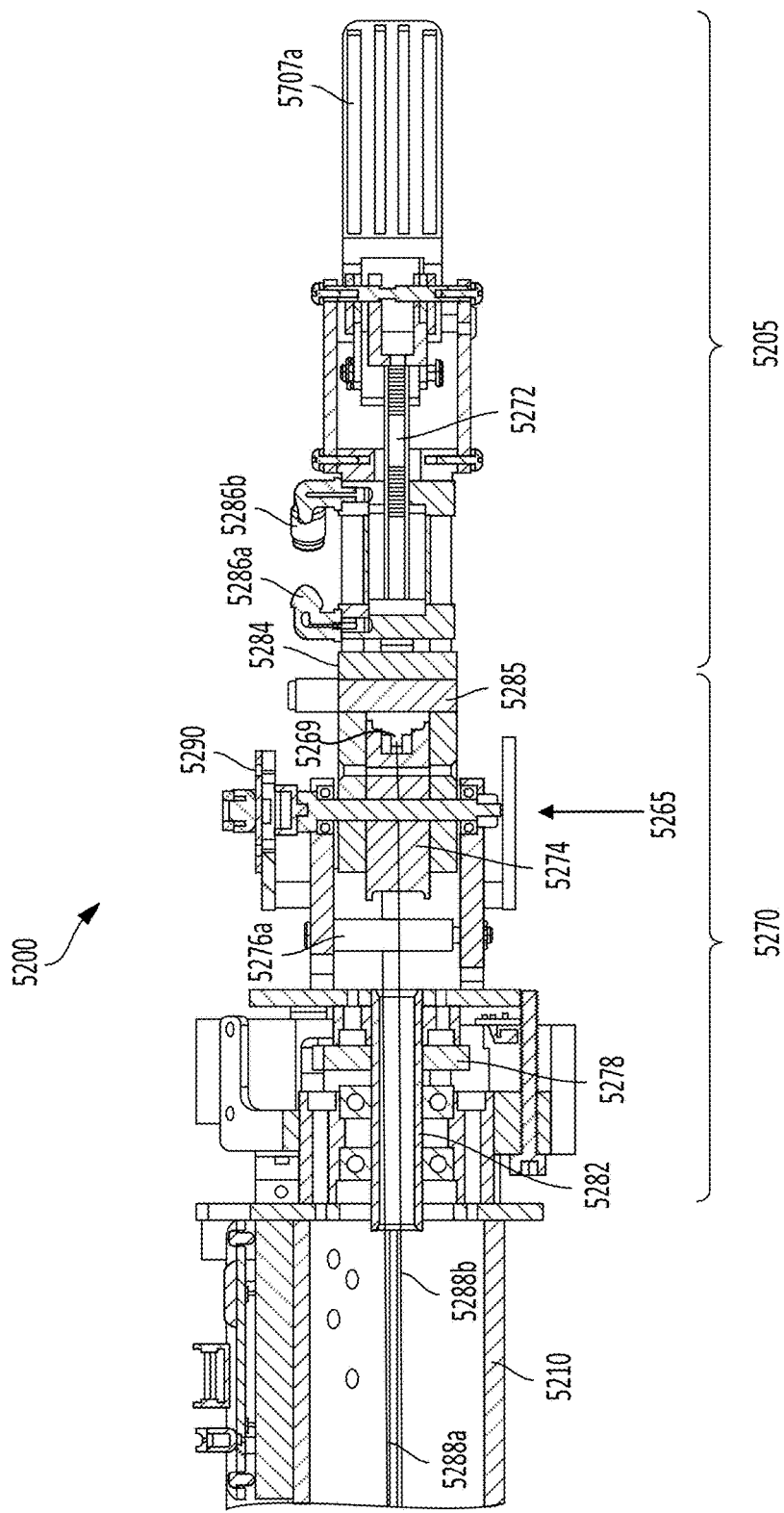
FIG. 34 depicts a cross section schematic view of an example wrist portion of the arm of FIG. 27.
Figure 35:
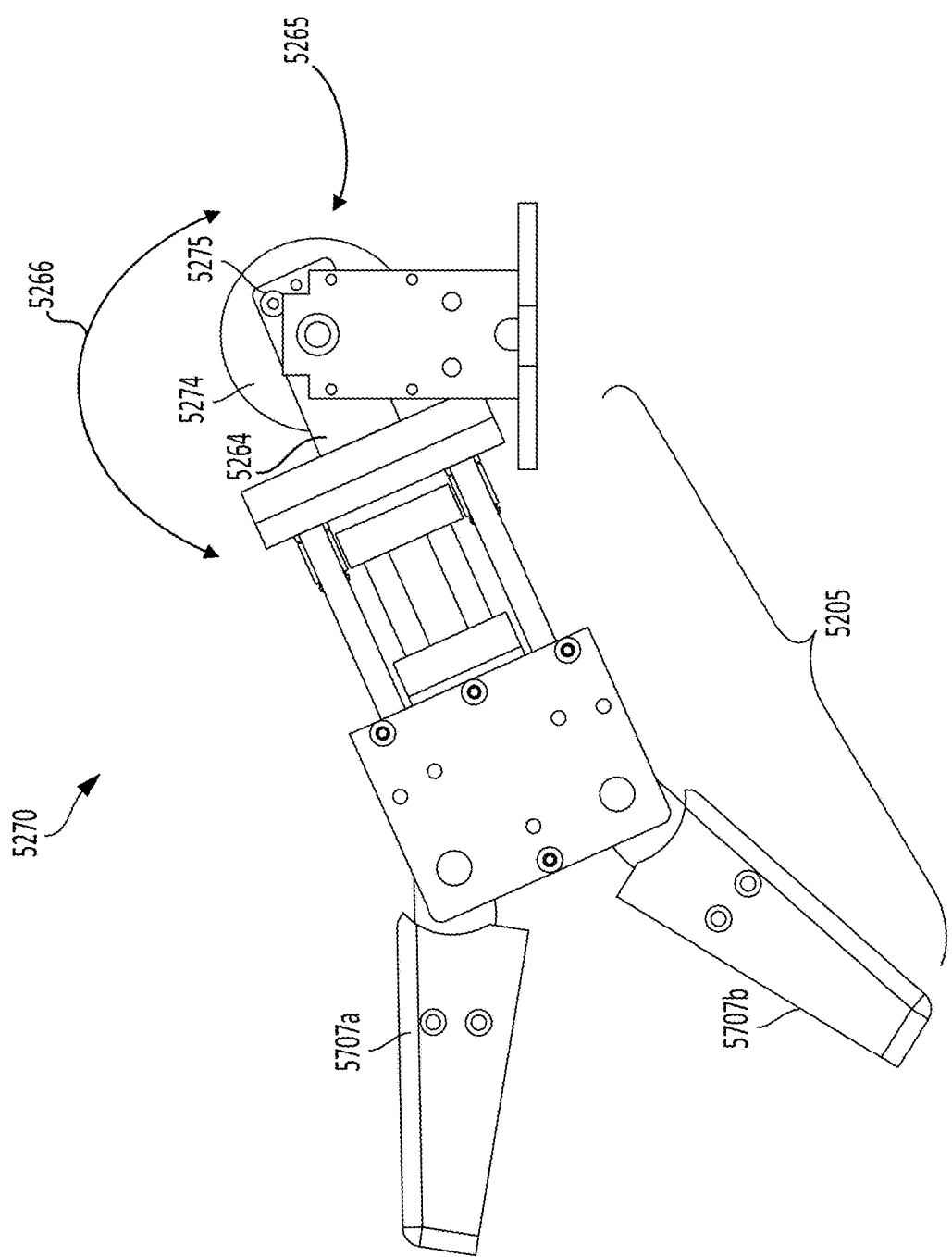
FIG. 35 is an example schematic of a hinged gripper of FIG. 27 in a fully flexed state.
Figure 36:
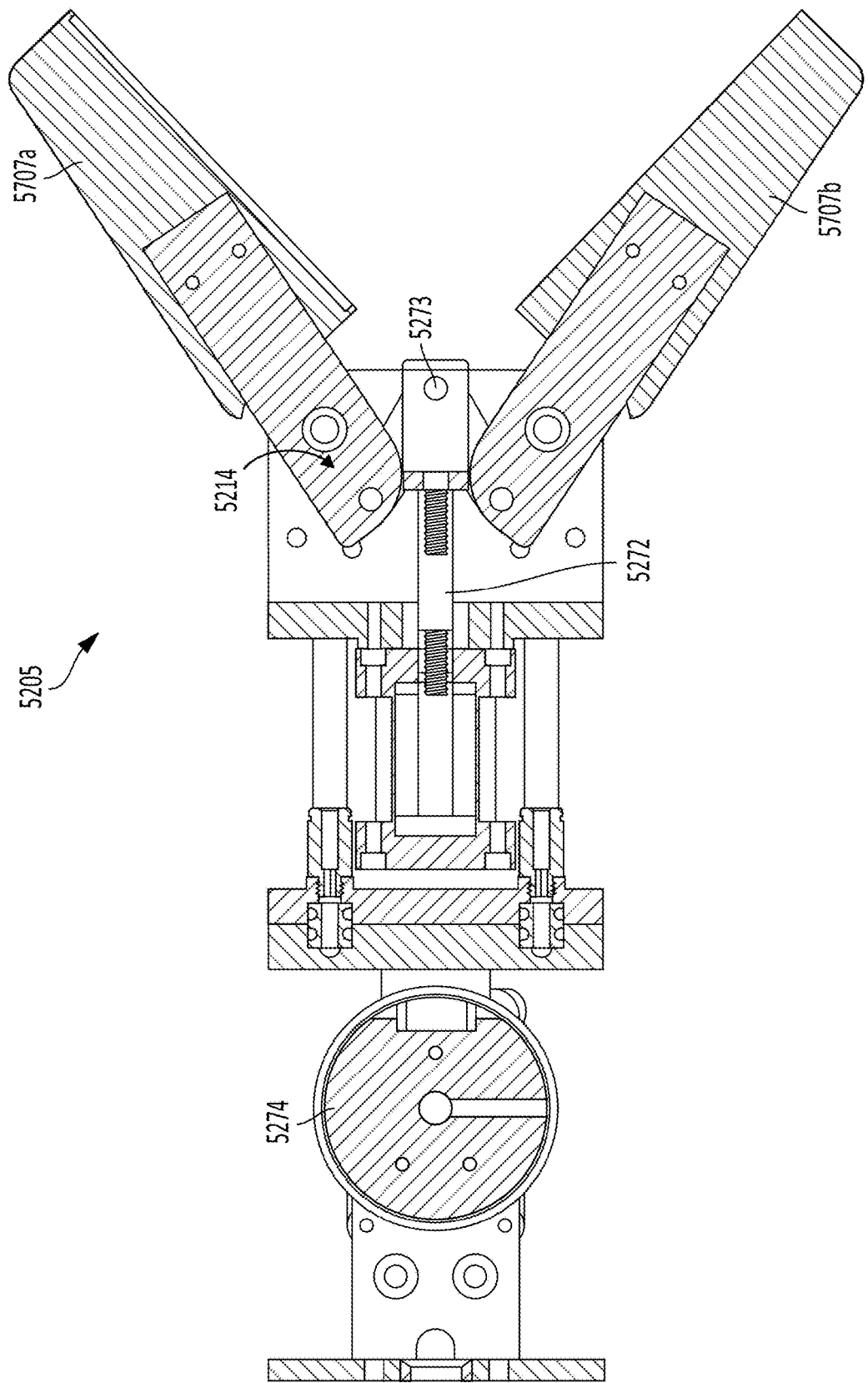
FIG. 36 depicts a cross section view of an example schematic of a hinged gripper of FIG. 27 in an open gripper state with the hinge cover plate removed.
Figure 37:
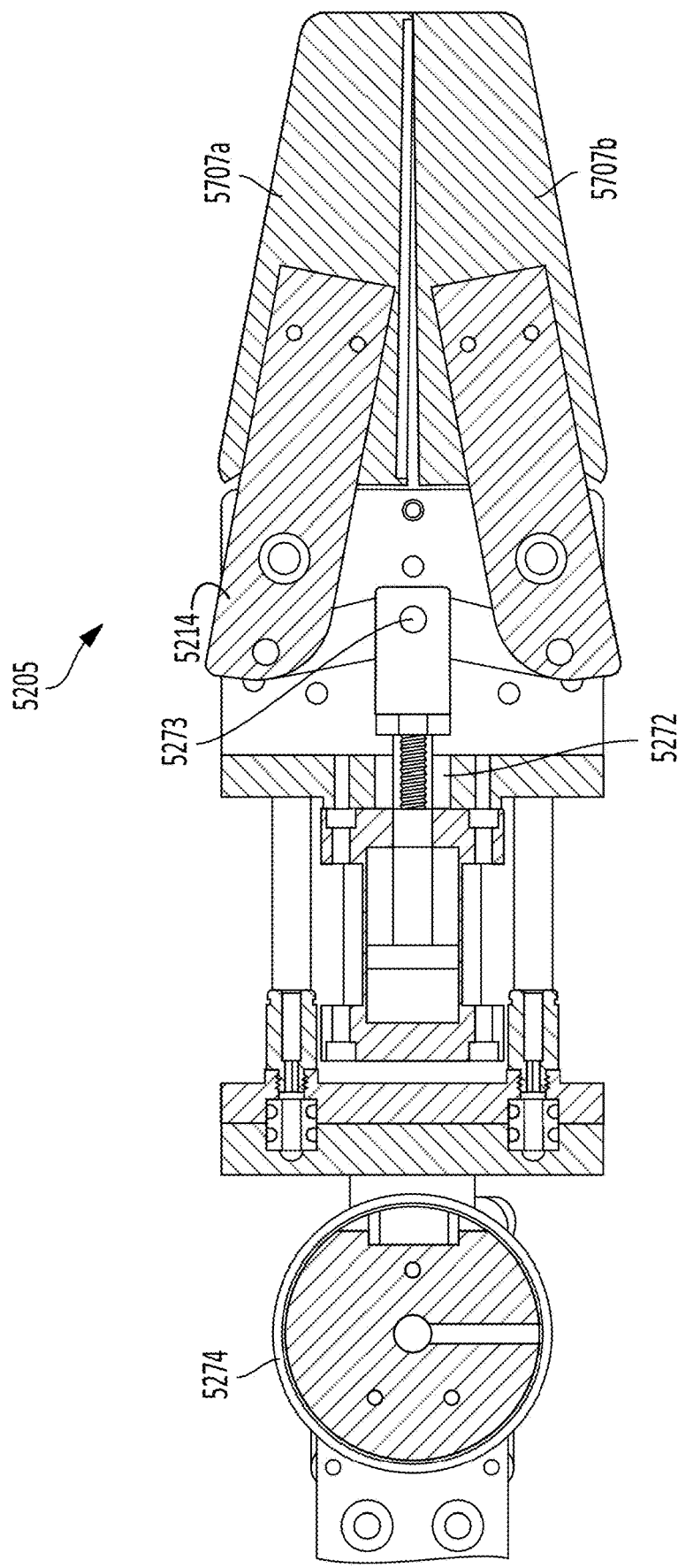
FIG. 37 depicts the hinged gripper of FIG. 36 in a closed gripper state.

In other implementations, as shown in FIGS. 27-37, the grippers 5205, 5205*a-b* can comprise a pneumatic actuator. In implementations, as depicted in FIGS. 36-37, the fingers 5707*a-b* are joined by linkages 5214 to one another and an actuatable cylinder 5272. The gripper 5205 is lightweight, quickly actuated, and built to withstand cycles on order of magnitude in the millions or higher. In implementations, at least one pneumatic tube runs through a hollow conduit extending the length of the arm 5210. In implementations, two pneumatic tubes run through the hollow conduit, each one of the pneumatic tubes configured to be in fluid connection with one of two sides of a pneumatic actuator. The gripper mechanism is driven by a linear motion, which is translated into finger rotation by the linkages 5214 symmetrically disposed about the actuatable cylinder 5272. In implementations, the controller 5005 actuates the gripper 5205 to close (e.g., clamp shut) the fingers 5707*a-b* by pressurizing one side of a pneumatic actuator. In implementations, the controller 5005 actuates the gripper 5205 to open (e.g., spread apart) the fingers 5707*a-b* by pressurizing the other side of the pneumatic actuator. Additionally or alternatively, in implementations, the fingers can be held open by a cylinder and return spring assembly, which can be weak enough to allow any tangled deformable laundry article 12 to slip off the fingers. Pneumatic actuators have the advantage of being easy to seal against ingress of dirt and germs.

As described herein with regard to implementations, the arm 5210 comprises a hollow tube. In implementations, two or more cables running through the arm comprise at least one of one or more pneumatic tubes, one or more power cables for a swivel joint 5267 (FIGS. 27-29), and one or more Ethernet cables for the swivel joint 5267. Additionally, or alternatively, in implementations, two or more cables are configured to connect to a breakout box on the non-gripper end of the arm 5210. Alternatively, the arm 5210 can comprise a switch (not shown) on the non-gripper end of the arm and minimize the amount of cables running therethrough.

In implementations, the cables 5229 going through a pan joint of a lifter 5200 (e.g., an assembly of an arm 5210, gripper 5205, base 5118, and drive motors 5125a-c) can comprise, for example, a plurality of Ethernet cables. The plurality of Ethernet cables comprise at least two of the following: one for communicating with the tilt drive, one for communicating with the extend drive, one for communicating with a wrist assembly 5270 swivel drive, and one for communicating with a wrist assembly 5270 hinge drive, one of which hinge and swivel drive cables also communicates with a drive of the gripper 5205 for opening and closing the fingers 5707a-b. Additionally or alternatively, in implementations, the cables 5229 going through a pan joint of a lifter 5200 comprise a plurality of power cables comprising two 8-conductor power cables configured to transmit power for the tilt and extend motors, and two 2-conductor power cables, one of which powers all logic (e.g., logic for extend and tilt) and the other of which provides power to a wrist assembly 5270, gripper 5205 control, logic for the wrist and gripper 5205. Additionally or alternatively, in implementations, the cables 5229 going through the pan joint of a lifter 5200 comprise at least one pneumatic tube configured to open and close the gripper 5205.

In implementations, the cables extending from through the hollow of the arm 5210 to the wrist assembly 5270 and gripper 5205 comprise at least one of the following cables: a cable for transmitting swivel motor power for the wrist assembly 5270, at least one cable for transmitting logic power, at least one cable for transmitting wrist assembly 5270 swivel motor data (e.g., Ethernet cable), one pneumatic tube for opening the gripper 5205, one pneumatic tube for closing the gripper 5205, at least one hinge actuation cable 5218, 5218a,b (e.g., steel cable), at least one hinge encoder cable, and at least one hinge limit switch cable.

Alternatively, in implementations, the cables 5229 going through a pan joint of a lifter 5200 comprise, for example, one Ethernet cable connected to a switch and communicating with the tilt drive, extend drive, wrist assembly 5270 swivel drive, wrist assembly 5270 hinge drive, gripper 5205, and any additional sensors (e.g., absolute position sensors). Additionally or alternatively, in implementations, the cables 5229 going through a pan joint of a lifter 5200 comprise a plurality of power cables comprising one 8 or more conductor power cable configured to transmit power for the tilt, extend, wrist assembly 5270 swivel drive, and wrist assembly 5270 hinge drive and a 2-conductor power cable configured to transmit power for the logic. In implementations, one 8 or more conductor power cable is configured to transmit power for all motor drives and that power is also regulated to provide power for all logic. Additionally or alternately, in implementations, the power cable can be any number of conductors, configured to be flexible enough to allow pan rotation and with sufficient current-carrying capacity to power all motor drives and logic. In implementations, the cables further comprise at least one pneumatic tube to power opening and closing a pneumatic gripper.

In implementations, as shown in FIGS. 27-30, and 32 the lifter 5200 comprises an arm 5210 terminating at a wrist assembly 5270 and a gripper 5205 releasably fixed thereto. The wrist assembly 5270 terminating at the gripper 5205 configured to extend into the work volume. Disposed on the opposite end of the arm 5210 is a backend assembly 5232 which will be described subsequent in detail with regard to the implementation of FIG. 31.

As previously described with regard to FIG. 5, in implementations, each lifter 5200a-d comprises an actuatable wrist assembly 5270 comprising a wrist drive 5173 in operable communication with the controller 5005 for rotating and/or tilting the wrist assembly 5270 to which a gripper 5205 is attached. Additionally or alternatively, in implementations, each lifter 5200 comprises one or more gripper sensors 5176 such as one or more sensors for detecting an angular position of a gripper 5205 comprising a rotatable and/or hinged wrist and fingertip pressure sensors disposed in the fingers of the gripper for detecting contact forces with an article of clothing and/or the workspace floor 5110.

Figure 32:
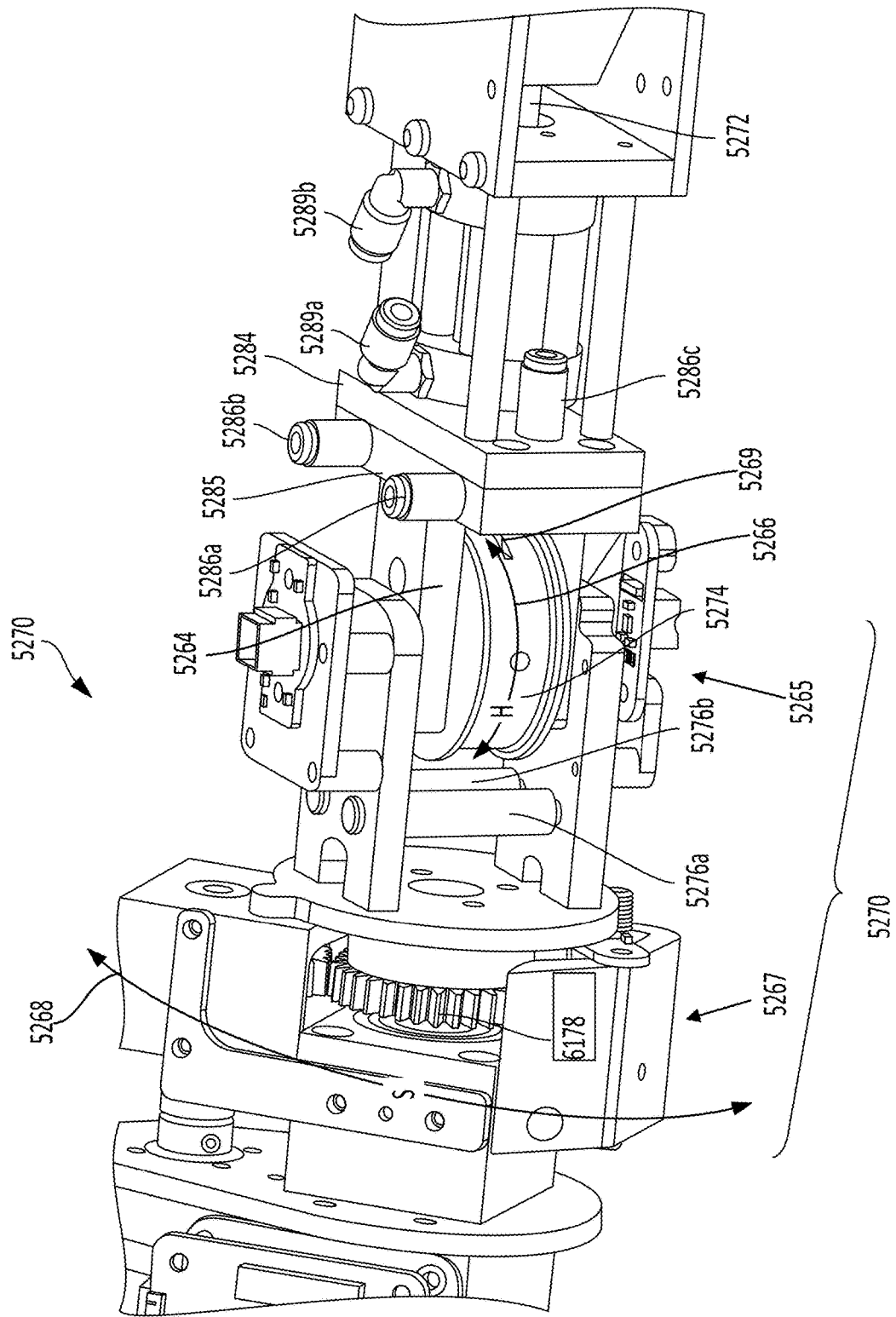
FIG. 32 depicts a schematic view of an example wrist portion of the arm of FIG. 27.
Figure 33:
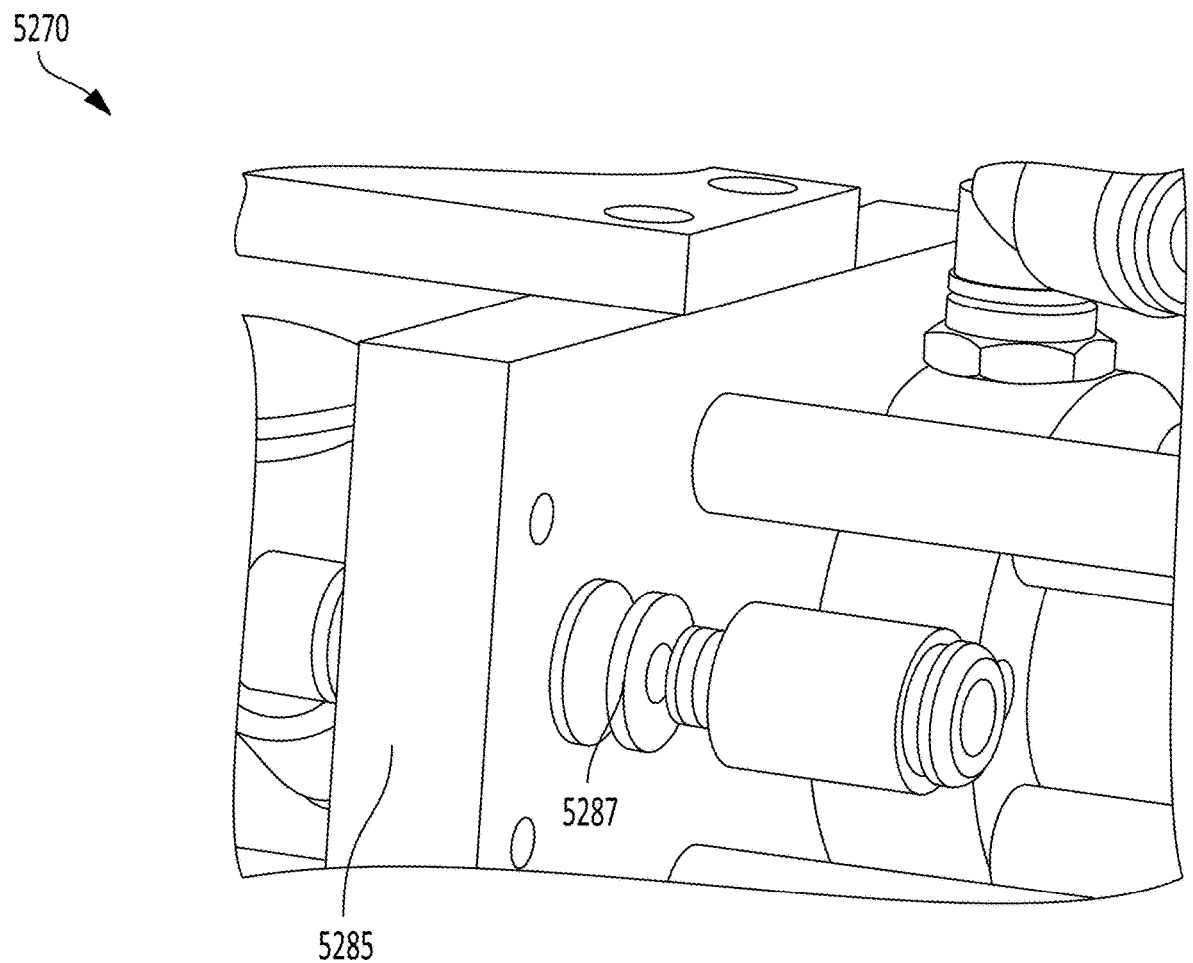
FIG. 33 depicts a close up, partially exploded view of air fittings of the wrist portion of FIG. 32.

As shown for example in the cross section view of the wrist assembly 5270 of FIGS. 34 and 36-37, an actuatable cylinder 5272 is configured to move in and out so that a center pin 5273 between the linked fingers 5707a-b of the gripper 5205 moves down during actuation of the cylinder 5272 and the fingers 5707a-b of the gripper 5205 close like a vice grip. The actuated cylinder 5272 is configured to pull at 10 lbs force so that fingers 5707a-b of the gripper 5205 close with at least 10 lbs force thereby enabling a very strong grip with single pneumatic actuator. In implementations, the fingers 5707a-b of the gripper 5205 close with a force therebetween in a range of between about 5 and 30 lbs of force. In implementations, the fingers 5707a-b of the gripper 5205 close with a force therebetween in a range of between about 10 to 15 lbs of force. The pneumatic actuatable cylinder 5272 is lightweight compared to gripper actuated with a motor, and the gripper 5205 is compact because the actuatable cylinder 5272 disposed thereon does not require power and data cables extending through a rotation joint. In implementations, the actuatable cylinder 5272 is configured to be back driven. In implementations, the wrist assembly is easy to remove and service. As shown in FIGS. 32-33, air is routed to a back block 5285 at, for example, a pressure of 20 psi. The front block 5284 comprises a plurality of pass throughs sealed with O-rings to prevent leakage. FIG. 33 shows a pass through and O-ring 5287 with the front block 5284 removed. All actuation passes through the front and rear blocks where wrist assembly 5270 is mounted to the remainder of the wrist disposed on the arm 5210. Pneumatic tubes extend from back fittings 5289a-b disposed on the back block 5285 and pass down the hollow center of the arm. The passthroughs are routed through front fittings configured to connect to pneumatic cylinder actuator fittings 5289a-b.

In implementations comprising a pneumatic cylinder at 100 psi, a gripper 5205 can comprise the following design factors shown in table 3:

TABLE 3

| | |
|---|---|
| Grip strength | 50 N |
| Finger strength-to-force ratio | 2.0 |
| Grip force | 25 N |

TABLE 3-continued

| | |
|---|---|
| Contact distance | 80 mm |
| Grip torque | 2 N-m |
| Gripper transmission factor | 22 mm |
| Piston force | 90 N (20 lbs) |
| Piston bore size (assuming 100 psi) | 7/16" |

In implementations, as shown in FIGS. 27-30, 32, and 34, the wrist assembly 5270 comprises a hinge joint 5265 and a swivel joint 5267. This hinge joint 5265 enables the wrist assembly 5270 to tilt the gripper 5205 from side to side in the direction of arrow 5266 for an improved grasping angle and the swivel joint 5267 enables the wrist assembly 5270 to rotate bidirectionally around a longitudinal axis 5230 of the arm 5210 in the direction of double arrow 5268. This enables the wrist assembly 5270, for example to, twist and disentangle the gripper 5205 attached thereto from an entangled article stuck thereon and/or twisted on or both fingers 5707a-b of the gripper 5205. In implementations, during a twist maneuver, the lifter is configured to drop the gripper 5205 down and move it away from the article out at or faster than the speed of gravity such that the article thereon falls freely onto the floor 5110.

In implementations, as shown in FIGS. 32 and 34, the hinge joint 5265 comprises a pulley 5274 comprising a slot 5269 in one side comprising a central "divot" (e.g., rectangular opening wider than the remainder of the slot). The divot (not shown) is configured to receive therein an end stop (e.g., a swage or ferrule) (not shown) of each of two cables 5288a-b. The inner wall between the slot 5269 and the divot prevents the at least two cables 5288a-b from sliding. As the pulley 5274 turns, it pulls the at least two cables 5288a-b and relies on the strength of the swage to retain the ends of the cables in the slot 5269. In implementations, the at least two cables 5288a-b are configured to thread through the slot 5269 on the outside surface of the pulley 5274 with the swage secured therein, wrap around pulley 5274, and extend down the hollow interior of the arm 5210. Friction forces imparted by wrapping the two cables 5288a-b around the pulley 5274 alleviates some of the force imparted on the swage.

In implementations, as the gripper 5205 swivels around the swivel joint 5267, the at least two cables 5288a-b will cross and touch. In implementations, the at least two cables 5288a-b therefore are coated to prevent wear from crossing and touching.

Because the extend arm 5210 is straight, the at least two cables 5288a-b are protected from wear cycles that would otherwise be associated with routing over one or more additional pulleys. The at least two cables 5288a-b extend from the pulley 5274 to respective idler wheels 5276a-b and a pass through a tube 5282 configured to direct the at least two cables 5288a-b into the hollow interior of the arm 5210. The at least two cables 5288a-b extend through the hollow interior down the length of the arm 5210 and out the back end of the arm 5210 to two motor end pulleys 5236a-b as shown in FIGS. 30-32 and 34. The two motor end pulleys 5236a-b are rotated by motor 5234. Because the hinge motor 5234 is mounted on the back end (e.g., the end opposite the gripper 5205) of the arm 5210, the gripper end of the arm 5210 remains lightweight for improved agility in gripping and raising the mass of an article. The hinge motor 5234 being mounted on the back end of the arm 5210 relieves the tilt motor from having to lift that weight and makes the lifter 5200 more capable of moving heavier articles.

In implementations, the motor end pulleys 5236a-b are "split" for improved tensioning, each one of the pulleys receiving an end of a respective one of the at least two cables 5288a-b. The at least two cables 5288a-b extending out the back end of the arm 5210 are respectively for laterally tilting the wrist assembly 5270 in opposite directions as indicated by bidirectional arrow 5266. One of the cables 5288a-b emanates from a left side of the pulley slot 5269 of the pulley 5274 and the other from the right side of the gripper side pully slot 5269. In implementations, the right side cable 5288b is constructed by dropping a terminating swage into the central divot of the slot 5269. With a terminating swage of the cable secured inside the hinge pulley 5274 the cable extends out of slot 5269, wraps clockwise 3 times (omitted for clarity) around the pulley 5274, and extends down the arm 5210 to the back end assembly 5232. The right side cable 5288b extends out the back of the arm 5210 and wraps three times around the bottom motor end pulley 5236b. Coming from the right, the right side cable wraps 3 times clockwise around the bottom motor end pulley 5236b. After the cable is wrapped around, the swage drops into a divot the bottom motor end pulley 5236b with the cable passing through a slot 5237b (not shown) of the bottom motor end pulley 5236b. A second of the cables 5288a-b emanates from a left side of the hinge pulley 5274 and extends in the same way from the pulley 5274 to the back end assembly 5232 but wraps counter clockwise around the top pulley 5236a before the terminating end is secured in the slot 5237a. The top pulley and bottom pulley thus wrap and unwrap lengths of the at least two cables 5288a-b as they are rotated by the motor 5234 to tilt the gripper 5205 at the hinge joint 5265 along the bi-directional arrow 5266 at the hinge joint 5265.

In implementations, for tensioning the left and right cables 5288a-b, the entire assembly for the motor 5234 is disposed on a swivel arm having therein an adjustable bolt that pulls the entire motor assembly back in tension. If the distances of the left and right cables 5288a-b are different, this could result in uneven tension. Therefore, in implementations, an initial tension is applied before a final tensioning of the motor assembly swivel arm. Because the two motor end pulleys 5236a-b are split with one dedicated to each of the left and right cables 5288a-b, they can be tensioned against one another before being bolted down. In implementations, one or more bolts are disposed between the two motor end pulleys 5236a-b, and the two pulleys 5236a-b can be twisted in opposite directions with, for example, a spanner wrench before bolting down. This tensioning ensures the lengths of the left and right cables 5288a-b are effectively even.

Turning now to FIG. 35, the wrist assembly 5270 is shown tilted at the hinge joint 5265 in one direction of the bi-directional arrow 5266. In implementations, the tilt angle is past 90 degrees (e.g., horizontal). In implementations, the tilt angle comprises a range of between about 5 to 35 degrees past a 90 degree tilt angle in either direction. In implementations, the tilt angle comprises a range of about 25 to 30 degrees past a 90 degree angle in either direction.

In implementations, the wrist assembly 5270 comprises an absolute position sensor for detecting and measuring the motion of the hinge joint 5265, such as a hinge encoder 5290 (e.g., a magnetic quadrature encoder, FIG. 5) disposed behind a wrist plate and a magnet disposed on an outer corner 5275 (e.g., the corner that sees the extreme tilt angle) of a hinge flange 5264 of the hinge joint 5265. In implementations, an encoder encodes motion of the hinge (e.g., an encoder over the hinge bolt).

Turning now to the swivel joint 5267 that enables the wrist assembly 5270 to rotate up to 180 degrees in either direction along bidirectional arrow 5268, around a longitudinal central axis 5230 of the arm 5210, in implementations, the swivel joint 5267 does not comprise an absolute encoder is not absolutely encoded. In implementations, the swivel joint 5267 comprises an incremental encoder and/or speed encoder disposed on a back shaft of a swivel motor 5280 directly connected to the swivel joint 5267. Additionally or alternatively, in implementations, the swivel joint comprises an absolute position sensor (e.g., encoder) in addition to a speed encoder being disposed on a back shaft of a swivel motor 5280.

Additionally or alternatively, in implementations, other wrist designs are contemplated that rotate greater than 180 degrees. For example, implementations of the wrist assembly can comprises a limit switch to determine rotation position. The wrist assembly can comprise a non-contact switch that uses a magnetic detent and a hard-stop. Such a wrist can rotate up to about 720 degrees, for example.

Returning now to the wrist of FIG. 35, in implementations, the swivel joint 5267 comprises the swivel motor 5280 configured to drive a drive gear 5278 enmeshed with an idler gear that is enmeshed with a swivel output gear. This configuration allows the wrist assembly 5270 to rotate without any slip and without requiring tensions otherwise required by a belt driven swivel joint 5267. The amount of stress imparted to the at least two cables 5288*a-b* over their length (e.g., in implementations, approximately 6 foot (e.g., ~2 m) lengths down the hollow of the arm 5210) are relatively low as the swivel joint 5267 swivels such that the swivel joint 5267 is able to rotate bidirectionally, up to 180 degrees.

Figure 38A:
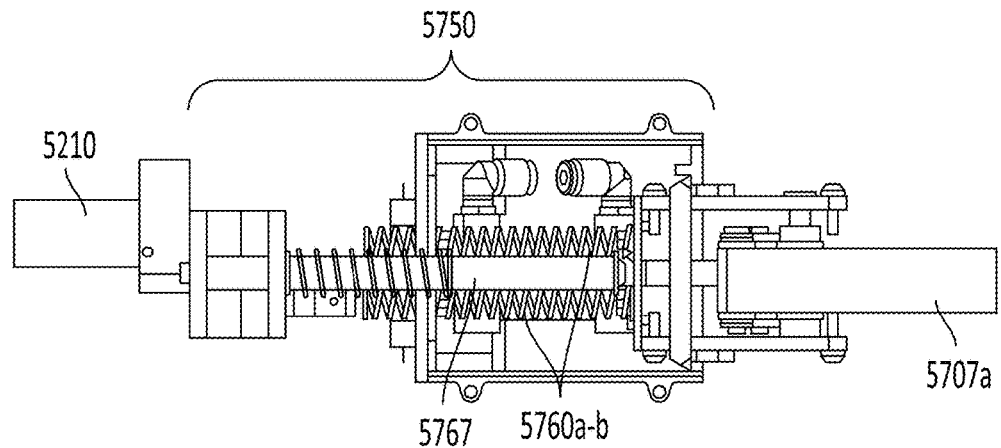
FIG. 38A depicts a side cut away view of an example compression wrist of the autonomous laundry separating device.
Figure 38B:
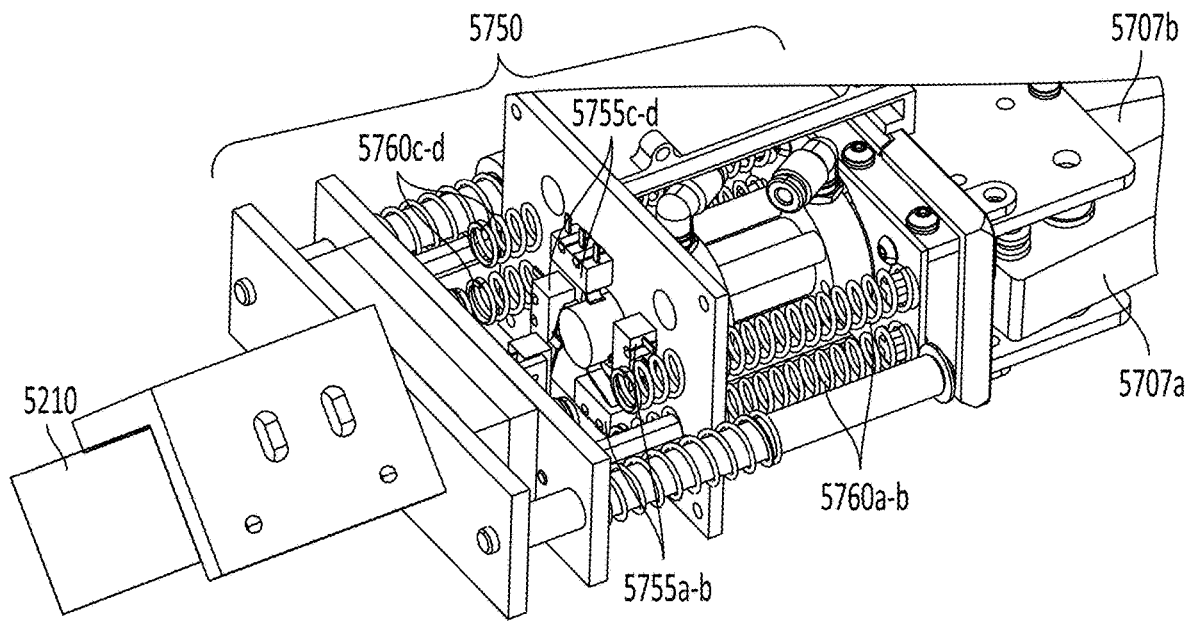
FIG. 38B depicts a back perspective cut away view of the wrist of FIG. 38A.
Figure 39:
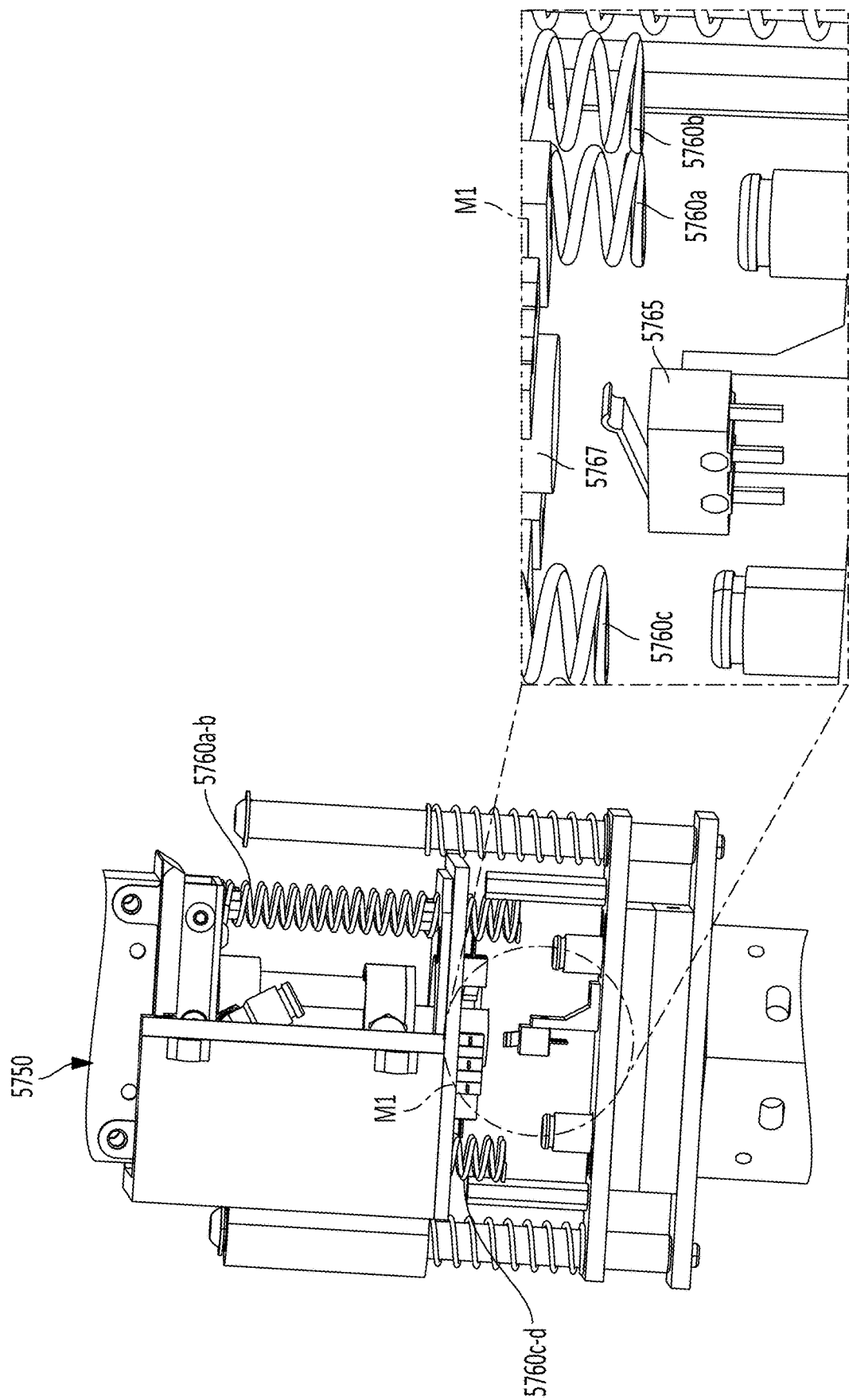
FIG. 39 depicts a side perspective cut away view and close up of a portion of the wrist of FIGS. 38A-B.

Turning to FIGS. 38A through 39, in implementations, the gripper 5205 further comprises a wrist 5750 comprising a plurality of sensors 5755*a-d*, 5765 configured to sense an application of force on the gripper 5205 as applied various directions including at least one of up and down, sided to side, and axially. The plurality of sensors 5755*a-d*, 5765 are configured to output a signal to the controller 5005. The wrist 5750 is disposed between the fingers 5707*a-b* and the arm 5210. In implementations, the wrist 5750 comprises a plurality of compression springs 5760*a-d* configured to flex and compress under an application of force and a rod 5767 disposed between the springs is configured to trip one or more limit switch sensors 5755*a-d*, 5765 under an application of a threshold force. For example, the rod 5767 can compress and trip one of the one or more limit switch sensors 5755*a-d*, 5765 under an application of 5 pounds of force. Although the sensors are described as limit switches, in implementations, the plurality of sensors 5755*a-d*, 5765 can be one or more analog sensors configured to detect how much the terminal gripper has moved. In implementations, the sensor 5765 behind the rod 5767 is configured to detect if the gripper 5205 has hit the floor 5110 of the platform 5100 head on, thereby applying an axial force.

In implementations, the controller 5005 receives one or more signals from the plurality of sensors 5755*a-d*, 5765 and determines the application of a side-to-side force indicative of a deformable article being snagged on a first arm or terminal gripper while the terminal gripper of a subsequent arm of the plurality of arms grasps the article. In implementations, the controller 5005 receives one or more signals from the plurality of sensors 5755*a-d*, 5765 and determines the application of a threshold amount of axial force applied as the terminal gripper 5205 pushes against the floor 5110 of the platform 5100 to sweep up and grasp an article 12 resting on the floor. For example, an article such as a thin silk scarf, may be smooth and comprises a low profile. The terminal gripper 5205 can comprise flexible fingers 5707*a-b* and be configured to accommodate being driven into the floor with a threshold amount of force (e.g., 1 lbf, 2 lbf, 3 lbf) while enabling the flexible fingers 5707*a-b* to be actuated in a grasping motion. In implementations, the controller 5005 receives one or more signals from the plurality of sensors 5755*a-d*, 5765 and determines the application of a threshold amount of axial force applied as the terminal gripper 5205 pushes against a pile of deformable articles to ensure the terminal gripper 5205 is positioned with the pile of deformable articles for successfully grasping at least one article.

Figure 40:
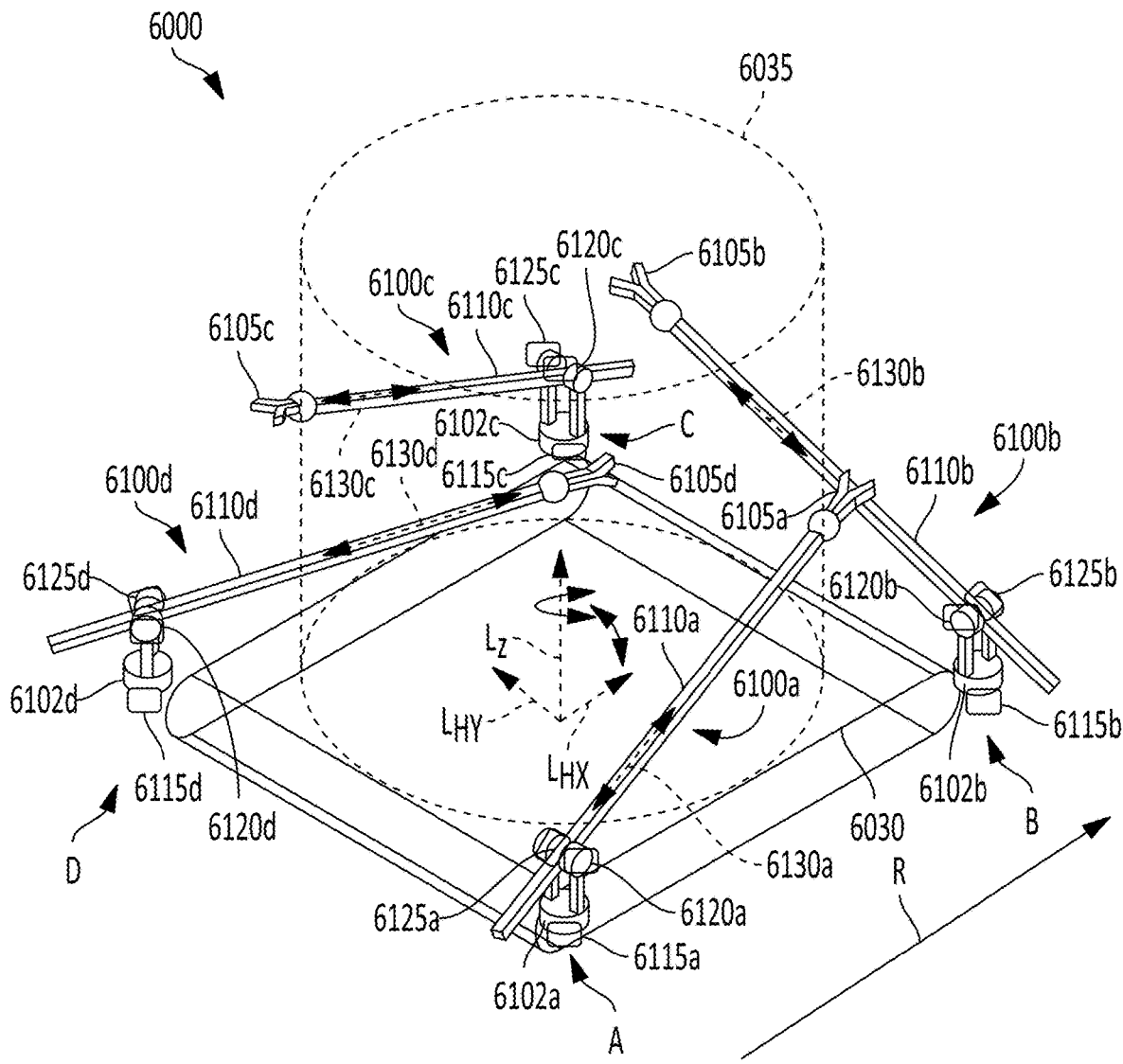
FIG. 40 depicts an isometric view of an example repositioning robot of an autonomous robotic laundry process line.
Figure 41:
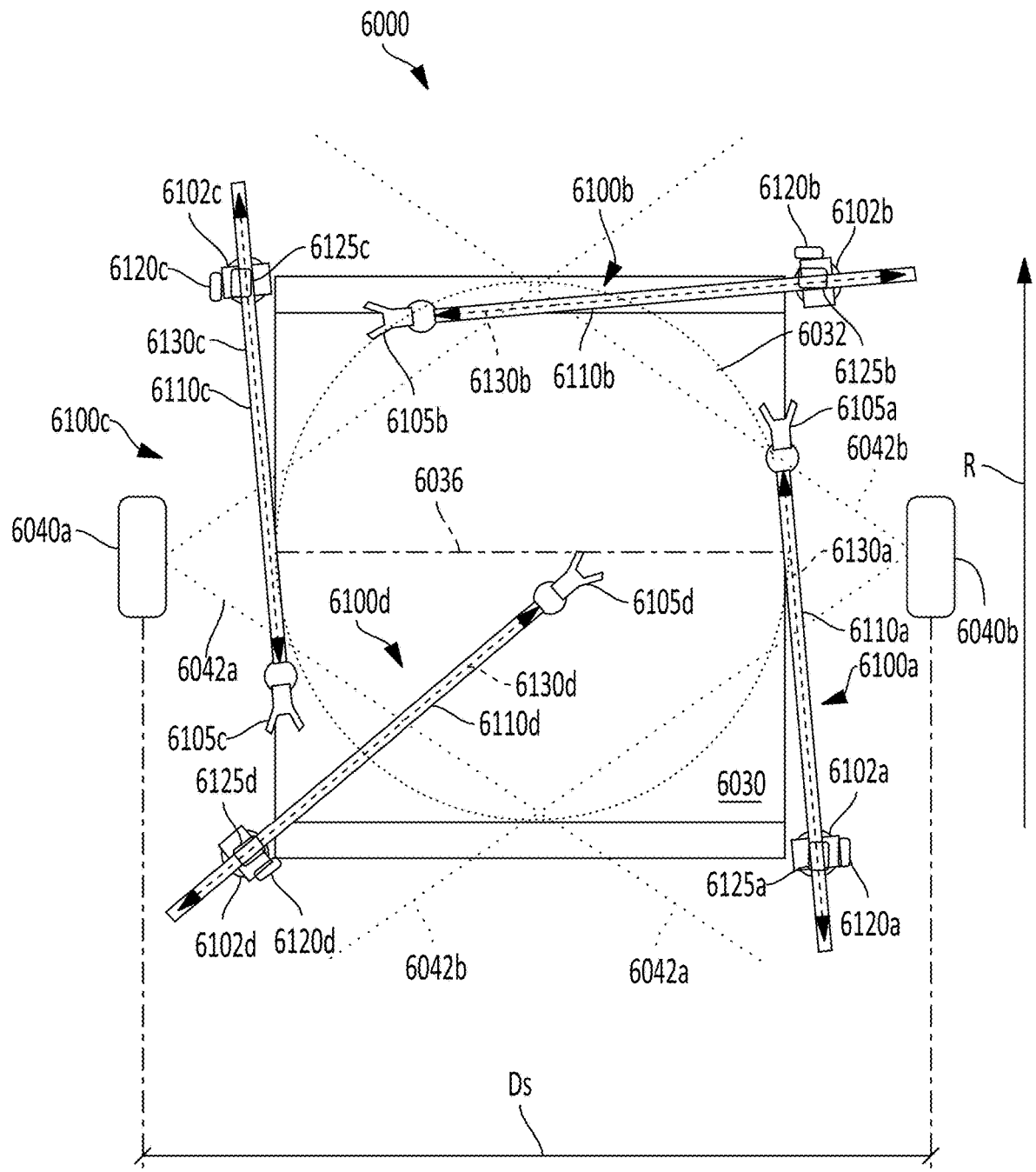
FIG. 41 depicts a plan view of an example autonomous repositioning robot of a robotic laundry process line.

As described previously with regard to FIGS. 8-9B, in implementations, a system 5500 for separating and repositioning a plurality of deformable articles comprises a separating robot 5000 disposed in line with a repositioning robot 6000, such as that of FIGS. 40-41. In implementations, the outlet end O of the separating robot 5000 overlaps with a repositioning work volume 6035 of a repositioning robot 6000 disposed in line with the separating robot 5000. In implementations, the repositioning robot 6000 is configured to receive a separated one of the plurality of deformable articles 12*a-n* grasped by the last one 5210*c* of the plurality of arms 5210*a-c* along the length of the platform 5100. The arm 5210*c* associated with the clean laundry separating robot 5000 can extend into the work volume 6035 of the repositioning robot 6000 such that the deformable article 12 does not touch a conveyor 6030 of the repositioning robot prior to repositioning. In other implementations, the laundry article is introduced onto the conveyor 6030 by clean laundry separating robot 5000, and a lifter 6100*a-d* of the repositioning robot 6000 grips the article 12 and raises it off of the conveyor 6030 to the suspension height. In implementations, the clean laundry separating robot 5000 could introduce the laundry article 12 to the work volume 6035 by dropping it in from a height. Alternatively, a conveyor could place the laundry article 12 at an edge of the work volume 6035, and the conveyor 6030 of the repositioning robot could move the laundry article to a center of the work area 6032. In implementations an arm 6110*a-d* associated with a lifter 6100*a-d* of the repositioning robot could reach outside of the work volume 6035 to retrieve the laundry article from the clean laundry separating robot 5000. In implementations, the two or more lifters 6100-*d* of the repositioning robot are of the same arm and terminal gripper construction described previously with regard to implementations of the separating robot 5000, for example with regard to the implementations of FIGS. 11, 21, and 27-37.

In implementations, the controller 5005 of the separating robot is configured to receive a signal from at least one of the plurality of sensors 5140*a-c* in the plurality of work volumes 5105*a-c* of the separating robot and at least one of two or more sensors of the repositioning robot 6000. Additionally or alternatively, the controller 5005 of the separating robot 5000 is configured to receive information based on the two or more sensors and communicated by the controller 6005 of the repositioning robot 6000. The controller 5005 is configured to determine, based on the received signal, at least one of the following: one or more of the plurality of deformable articles 12*a-n* is present on the stationary floor 5110, none of the plurality of deformable articles are present on the stationary floor, and one or the plurality of deformable articles is disposed within a repositioning work volume of the repositioning robot 6000. In implementations, the controller 5005 is configured to determine, before instructing the terminal gripper within the repositioning work volume to release the one of the plurality of deformable articles, at least one of the two or more repositioning lifters 6100 is engaged with the one article 12a of the plurality of deformable articles in the repositioning work volume 6035. Additionally or alternatively, the controller 5005 is configured to determine that one of the plurality of deformable articles is disposed on a conveyor 6030 of the repositioning robot 6000.

Turning now to FIG. 40, an implementation of a repositioning robot 6000 (also alternatively referred to hereinafter as "a robotic device") for repositioning a deformable laundry article for folding is shown. In implementations, a conveyor 6030 is disposed at a bottom of a work volume 6035 indicated by dashed lines in FIG. 40. The work volume is the volume of space within which the repositioning robot 6000 repositions the deformable laundry article above the conveyor 6030. In implementations, the work volume 6035 includes a diameter of between about 1.5 m to 3 m (e.g., 1.5 m, 2 m, 2.5 m, 3 m) or 5 to 9 feet (e.g., 5 ft, 5.25 ft, 5.5 ft, 5.75 ft, 6 ft, 6.25 ft, 6.5 ft, 6.75 ft, 7 ft, 7.25 ft, 7.5 ft, 7.75 ft, 8 ft, 8.25 ft, 8.5 ft, 8.75, 9 ft) and a height of 1.5 to 3 m or 5 to 9 feet (e.g., 5 ft, 5.25 ft, 5.5 ft, 5.75 ft, 6 ft, 6.25 ft, 6.5 ft, 6.75 ft, 7 ft, 7.25 ft, 7.5 ft, 7.75 ft, 8 ft, 8.25 ft, 8.5 ft, 8.75, 9 ft). In implementations, work volume comprises between about 5 to 25 cubic meters of workspace within which to reposition, or spread out, a deformable laundry article. The conveyor 6030 is configured to transfer the deformable laundry article beyond a perimeter of the work volume 6030 once the repositioning robot 6000 has repositioned the deformable laundry article in accordance with one or more threshold qualifications for folding, which will be described subsequently with regard to implementations.

The repositioning robot 6000 comprises two or more lifters 6100a-d. In implementations, the two or more lifters 6100a-d of the repositioning robot are of the same arm and terminal gripper construction described previously with regard to implementations of the arm 5210, base 5118, at least one drive 5125a-c and gripper 5105 assembly of the separating robot 5000 as shown in FIGS. 11, 21, and 27-37. In implementations, as shown in FIG. 8, one lifter 6100d of the two or more lifters 6100a-d comprises an arm (e.g., arm 5210c, 6110d) shared with a separating robot 5000, and the shared arm 5210c, 6110d is configured to introduce the deformable laundry article to the work volume 6035 in a suspended (e.g., hoisted) configuration. Additionally or alternatively, the conveyor 6030 can be configured to receive thereon the deformable laundry article in an initial configuration for repositioning by the two or more lifters 6100a-d.

Returning to FIG. 40, in implementations, the two or more lifters 6100a-d are disposed about the perimeter of the work volume 6035 at individually anchored positions A-D spaced apart from each of the other anchored positions by between about 30 cm to 400 cm. In one implementation, the two or more lifters 6100a-d are spaced apart by a distance of between about 1.5 m to 3 m (e.g., 1.5 m, 2 m, 2.5 m, 3 m) or 5 to 9 feet (e.g., 5 ft, 5.25 ft, 5.5 ft, 5.75 ft, 6 ft, 6.25 ft, 6.5 ft, 6.75 ft, 7 ft, 7.25 ft, 7.5 ft, 7.75 ft, 8 ft, 8.25 ft, 8.5 ft, 8.75, 9 ft). In implementations the two or more lifters 6100a-d comprise four lifters evenly spaced about the work volume 6035. In implementations, the two or more lifters 6100a-d comprise four lifters unevenly spaced about the work volume 6035. In implementations, the two or more lifters 6100a-d comprise four lifters spaced about the work volume 6035 at corners defining a rectangle. In one implementation, the two or more lifters 6100a-d include at least one lifter comprising an arm 6110a-d. In implementations, at least one lifter of the two or more lifters 6100a-d comprises an arm 6110a-d with no joints. In some implementations, at least one lifter of the two or more lifters comprise an arm with one or more joints. In alternative implementations one or more of the two or more lifters comprises a stationary vertical riser along which a gripper translates up and down. In still yet other implementations, one or more of the two or more lifters comprises a rotatable riser along which a gripper translates bidirectionally.

In the implementation of FIGS. 40-41, the repositioning robot 6000 includes four lifters 6100a-d connected to bases 6102a-d each anchored astride the conveyor 6030 proximate an associated corner of the conveyor 6030. In implementations, one or more of the bases 6102a-d is anchored to a floor 10 beneath the conveyor 6030. In other implementations, one or more of the bases 6102a-d is anchored to a ceiling or support frame located above the conveyor for providing access to the work volume 6030. Each of the two or more lifters 6100a-d comprises a gripper 6105a-d, an arm 6110a-d supporting the gripper 6105a-d, and at least one drive motor 6115a-d, 6120a-d, 6125a-d schematically represented in FIGS. 40-41 and identical to the previously described implementations of the at least one drive motor 5125a-c of the plurality of arms 5210a-c. Each arm 6110a-d can comprise between one and three degrees of freedom.

In implementations, each lifter of the two or more lifters 6100a-d can include a pan motor 6115a-d for rotating each lifter and its associated arm 6110a-d about a vertical axis centered on an associated base 6102a-d and parallel to schematically represented vertical axis LZ. In implementations, each arm 6110a-d is disposed at anchored positions spaced apart by at least about a distance of 7.5 to 8.25 inches from the conveyor 6030 so as to not interfere with the conveyor 6030 while panning. In implementations, each lifter of the two or more lifters 6100a-d can include a tilt motor 6120a-d for raising and lowering the gripper 6105 with respect to a surface of the conveyor 6030 defined by axes LHX parallel to the direction of travel, or run direction D, of the conveyor 6030 and LHY perpendicular to the direction of travel of the conveyor 6030. The arm tilt motor 6120a-d is positioned at least a distance of 300 mm over the conveyor 6030. In implementations, each lifter of the two or more lifters 6100a-d can include an extend motor 6125a-d for pushing and pulling an associated arm 6110a-d forward and back in a linear direction along an axis 6130a-d of each arm 6110a-d and thereby driving each gripper 6105a-d toward and away from its associated base 6102a-d.

The one or more drive motors 6115a-d, 6120a-d, 6125a-d can operate simultaneously, in some sub-combination, or alternate operation to move each gripper 6105a-d to a location within the work volume 6035 for engaging a deformable laundry article disposed there. Each gripper 6105a-d is configured to releasably engage the deformable laundry article and operate at least one of independently of and in tandem with another of the two or more lifters 6100a-d, 5210c to at least one of raise, suspend, and rotate an engaged grip point the deformable laundry article above the conveyor 6030.

In implementations, each arm 6110a-d can comprise an extruded beam configured to extend from an associated base 6102a-d at one of the individually anchored positions A-D. In implementations, an arm 6110a-d can have no joints along its length, and a length from end to end that measures between about 0.25 m and 4 m (e.g. 0.25 m, 0.5 m, 1.0 m, 1.25 m, 1.5 m, 1.75 m, 2.0 m, 2.25 m, 2.5 m, 2.75 m, 3.0 m, 3.25 m, 3.5 m, 3.75 m, 4.0 m). In implementations, each arm 6110a-d is an extendable arm comprising a fully extended length of between about 0.25 m and 4 m (e.g. 0.25 m, 0.5 m, 1.0 m, 1.25 m, 1.5 m, 1.75 m, 2.0 m, 2.25 m, 2.5 m, 2.75 m, 3.0 m, 3.25 m, 3.5 m, 3.75 m, 4.0 m). In examples, the extendable arm can include at least one of one or more flexible joints and two or more telescoping sections. Joints and telescoping arms can be implemented to accommodate space constraints, but the additional moving sections can create pinch points for potential entangling the deformable laundry article 12. In implementations, the motions of each arm 6110a-d have a resolution of +/−5 mm in all three cardinal directions (Lx, Ly, Lz). This precision enables alignment of an associated gripper 6105a-d before grabbing a grip point 15a-d on a deformable laundry article 12. In implementations, each arm 6110a-d moves the associated gripper 6105a-d within a spherical work volume having a radius defined by the arm 6110a-d. The linear error introduced by degrees of pan and/or tilt at a full extension of the arm 6110a-d is +/−5 mm.

Figure 42:
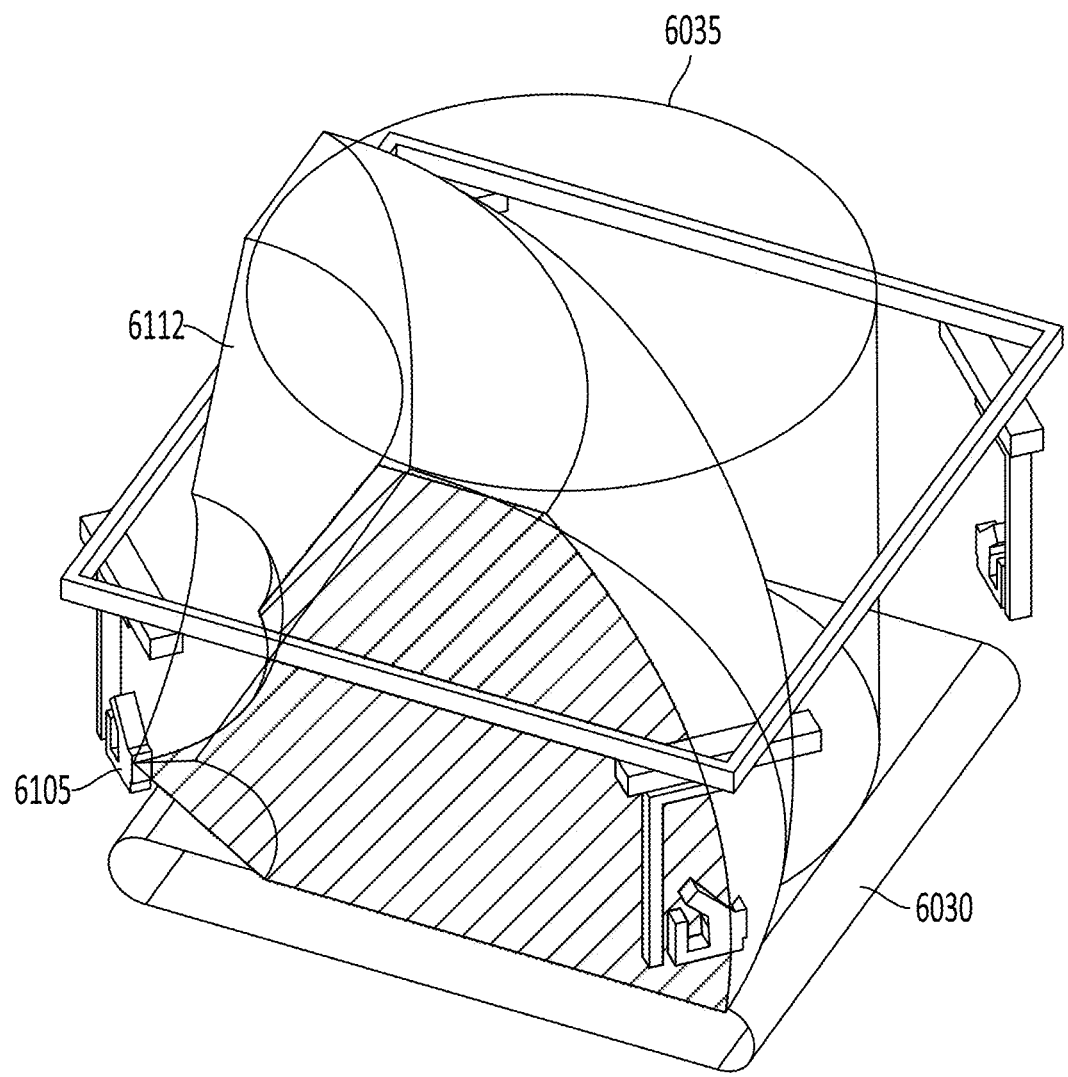
FIG. 42 depicts a schematic example transit volume of one lifter of an autonomous repositioning robot.
Figure 43:
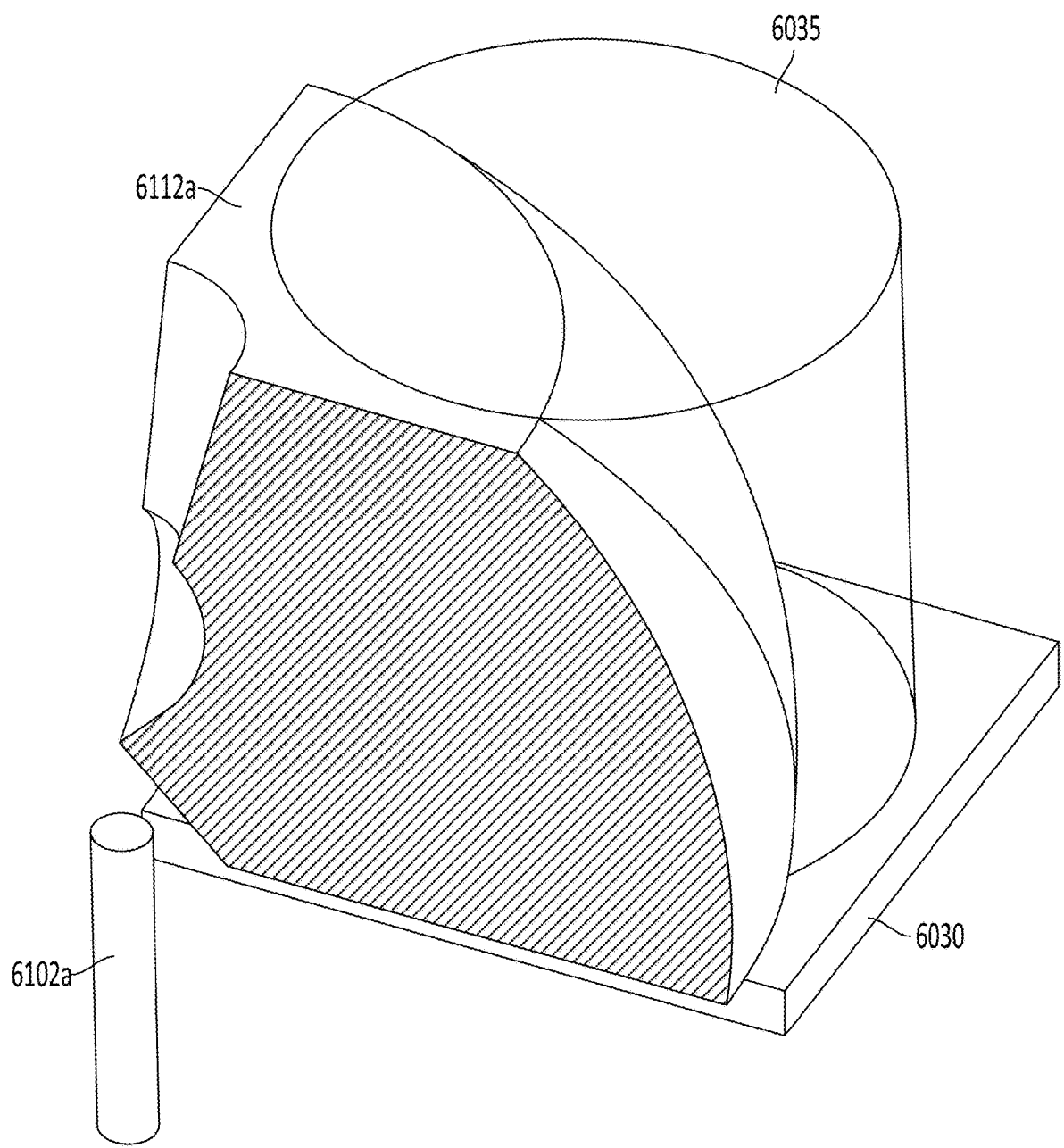
FIG. 43 depicts a schematic example of overlapping transit volumes of two lifters of an autonomous repositioning robot.

As previously described, in implementations, the two or more arms 6110a-d comprise four arms anchored about the work volume. In implementations, as shown in FIGS. 42-43, each arm has a range of motion defining a traversable volume 6112, 6112a-d that overlaps with the traversable volumes 6112a-d defined by a range of motion of each of the other the two or more arms 6110a-d. In implementations, adjacent arm traversable volumes 6112a-d overlap for at least 0.30 meter (e.g., about 1 ft) for the full vertical height of the work volume 6035, from a surface of the conveyor 6030 to a maximum suspension height within the work volume 6035. Overlapping the traversable volumes 6112a-d within the work volume 6035 ensures that the two or more lifters 6100a-d are configured to access a deformable laundry article 12 disposed within the work volume regardless of position and orientation. This enables the repositioning robot 6000 to select a nearest or best positioned associated gripper 6105a-d of the two or more lifters 6100a-d with which to engage the deformable laundry article successfully and efficiently In addition to the two or more lifters 6100a-d and associated grippers 6105a-d, implementations of the repositioning robot 6000 include at least one sensor 6040, 6040a, 6040b disposed at a fixed location relative to the work volume 6035. In implementations, as shown in FIG. 41, two or more sensors 6040a, 6040b are disposed at two or more fixed locations about the work volume 6035 and spaced apart by a distance Ds ranging between about 30 cm to 400 cm. In implementations, the two or more sensors 6040a, 6040b are positioned apart from the two or more lifters 6100a-d. In implementations, the two or more sensors 6040a, 6040b are stationary and anchored apart from the associated bases 6102a-d of each of the two or more lifters 6100a-d. In implementations, the two or more sensors are not collocated with the two or more lifters 6100a-d. In other implementations, such as previously described with regard to implementations of the at least one sensor 5140, 5147 of the separating robot 5000 shown in FIGS. 9A-10B, the two or more sensors 6040a, 6040b are co-located at one or more of the individually anchored positions A-D and are anchored to be stationary. In implementations, such as previously described with regard to implementations of the at least one sensor 5140a-c, 5147a-c of the separating robot 5000 shown in FIGS. 9A-10B, the two or more sensors 6040a, 6040b are anchored to a floor and at locations astride the conveyor. In implementations, the two or more sensors 6040a, 6040b are mounted to a single base 6102, 6102a-d of one or more of the lifters 6100a-d and aimed apart to sense a wide field of view. For example, the sensed wide field of view comprises two or more adjacent conveyors 6030a-b, as will be described subsequently with regard to implementations. In other implementations, one or more of the two or more sensors 6040a, 6040b can be anchored above the conveyor, attached to one or more of a ceiling and a support structure disposed about the work volume 6035 without interfering with the motion of the two or more lifters 6100a-d.

In implementations, the two or more sensors 6040a, 6040b are configured to at least one of detect one or more features and capture one or more images of the deformable laundry article disposed within the work volume 6035. The two or more sensors 6040a, 6040b are configured to output a signal comprising the at least one of the detected one of one or more features and captured one or more images. In implementations the output signal can be communicated to the processor 6015 of the repositioning robot 6000 by the network interface 6020 as described previously with regard to the implementations of FIG. 4. Also with reference to FIG. 4, the repositioning robot 6000 includes a memory 6010 configured to store data indicative of one or more repositioned deformable laundry articles. The memory can receive and store information about one or more deformable articles provided by a controller 5005 the separating robot 5000 in wired or wireless communication with the controller 6005 of the repositioning robot 6000. In implementations, the repositioning robot 6000 comprises a controller in operative communication with the memory 6010, the two or more sensors 6040a, 6040b, and the at least one drive motor 6115a-d, 6120a-d, 6125a-d and gripper 6105a-d of each of the two or more lifters 6100a-d. In implementations, the controller 6005 includes the processor 6015 as described with regard to FIG. 4. In other implementations, one or more of the controller and memory can be implemented by another network entity in communication with the processor 6015 of the repositioning robot 6000 via the network 230. For example, a computing terminal 205 can be configured to execute some or all of the controller functions and an external database 235 can store the data indicative of one or more repositioned deformable laundry articles. The data can be stored in look up tables and accessible by one or more robots of the process line 100 and one or more network entities, such as the computing terminal 205.

Figure 44:
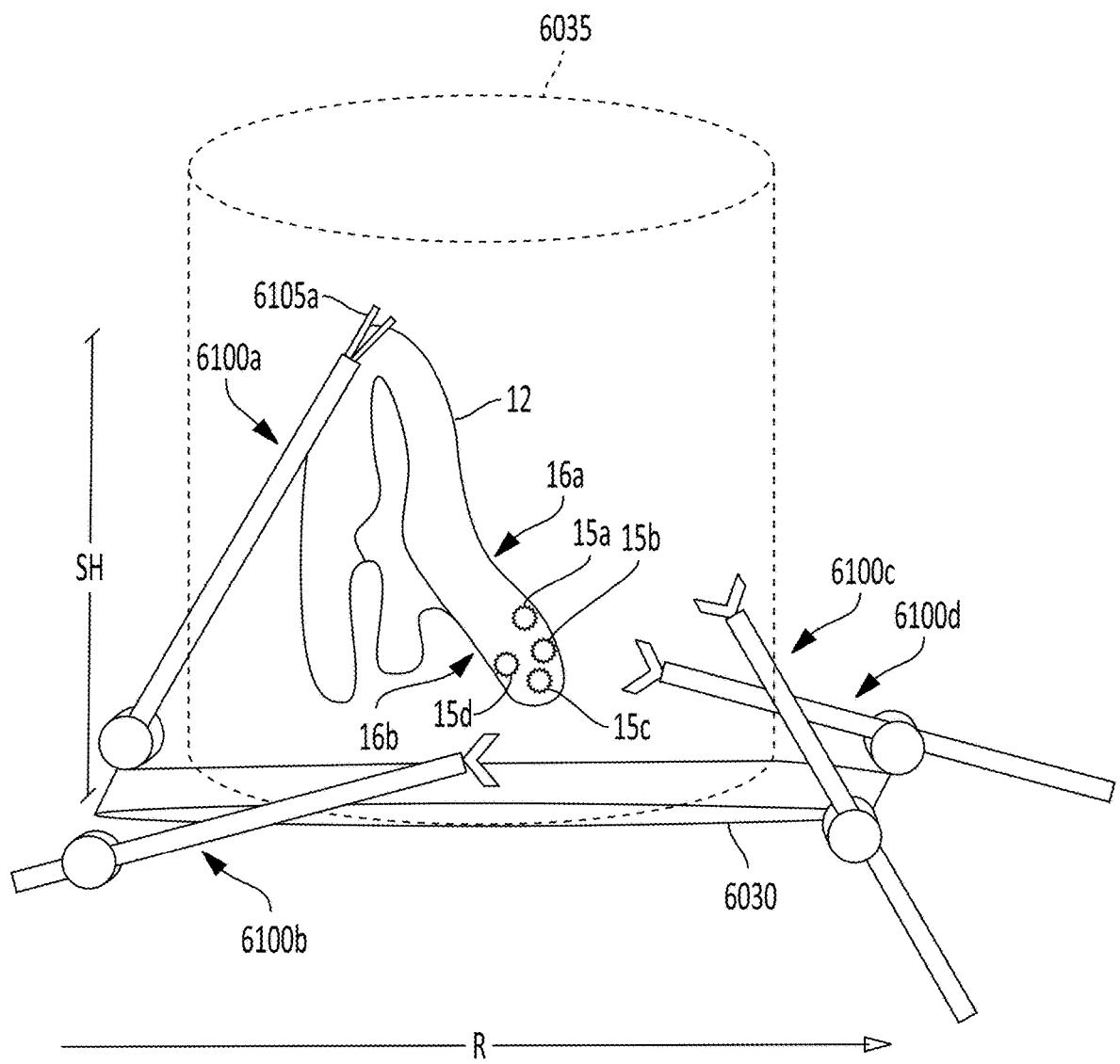
FIG. 44 is a schematic of an example of an autonomous repositioning robot initiating a repositioning process for a laundry article within a work volume.

In implementations, the controller 6005 is configured to receive the output signal from one or more of the two or more sensors 6040a, 6040b. Referencing FIG. 44, the controller 6005 is configured to identify, based on the output signal, one or more grip points 15a-d adjacent one or more free-hanging edges 16a-b of the deformable laundry article 12 suspended above the conveyor 6030 by one 6100a of the two or more lifters 6100a-d. In implementations, the one or more grip points 15a-d are within 6 mm to 130 mm of the at one or more free-hanging edges. In some implementations, the one or more grip points include one or more free-hanging edges. In other implementations, the one or more grip points need not be collocated or even tangential to one or more free-hanging edges. In implementations, the repositioning robot 6000 is configured to grip anywhere on the deformable laundry article 12 and does not need to grip an edge of the article 12. In implementations, the one or more grip points are at the corners of a laundry article and two or more lifters are configured to simultaneously engage and grip the one or more corners of the laundry article and at least one of expand the article, lift the article, and lower expanded (spread out) article onto the conveyor.

Figure 45:
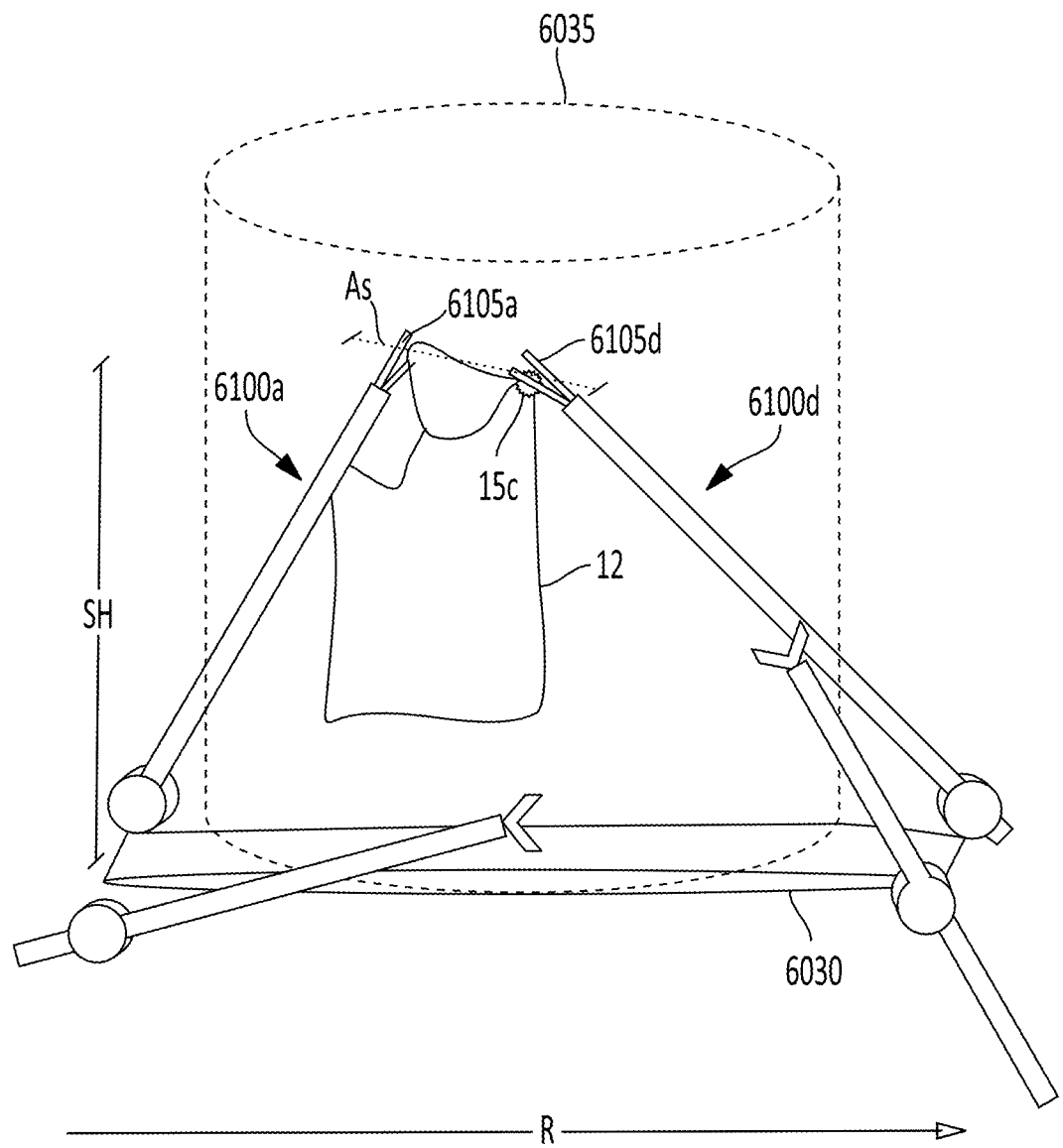
FIG. 45 is a schematic of an example of an autonomous repositioning robot repositioning a laundry article within a work volume.

While the article 12 is suspended above the conveyor 6030, a gripper 6105a associated with the one lifter 6100a of the two or more lifters is engaged with the deformable laundry article 12 and positioned at (e.g., raised to) a suspension height SH. The controller 6005 is configured to instruct another of the two or more lifters 6100b-d to grip, with an associated gripper 6105b-d, one grip point 15c of the one or more grip points 15a-d on the deformable laundry article 12 and lift the gripped one 15c of the one or more grip points the suspension height SH, as shown in FIG. 45. As described previously, in implementations, the gripper 6105a first lifting the deformable article 12 to a suspension height SH is the terminal gripper 5205c of the arm 5210c of the separating robot 5000 closest to the outlet end O and the repositioning work volume 6035. Sharing an arm between the separating robot 5000 and the repositioning robot 6000 provides efficiency in transitioning between the functions of both robots and speeds up the process line while minimizing the number of drops and grabs associated with the article 12. In implementations, as shown in FIGS. 9A-B, the floor 5110 of the platform 5100 of the separating robot 5000 is lower than the floor or conveyor 6030 of the work volume 6035 of the repositioning robot 6000. The difference in height can range from between about 15 cm to 120 cm. In implementations a sensor 5140d disposed beneath the conveyor 6030 and having a field of view aimed down the length of the platform 5100 is configured to detect one or more articles 12a-n within and/or hoisted above the platform 5100. The arm 5210c shared between the separating robot 5000 and the repositioning robot 6000 can hoist a large and/or long deformable article 12 (e.g., a bed sheet, a bathroom, a beach towel) to a maximum suspension height of the separating robot 5000 and a gripper 6105a-e of a lifter 6100a-e of the repositioning robot can grip along a middle portion (e.g. middle third) of the vertical length of the hoisted article 12 so that the article 12 does not fall onto the conveyor 6030. The shared arm 5210c is therefore able to present a favorable gripping region along a graspable length of the article 12 to a gripper 6105a-e of the repositioning robot 6000.

The controller 6005 of the repositioning robot 6000 is configured to determine whether the deformable laundry article 12 suspended by the one lifter 6100a and the another lifter 6100d of the two or more lifters 6100a-d is repositioned based on a comparison of the output signal to the data indicative of one or more repositioned deformable laundry articles. If the controller 6005 determines based on the comparison that the deformable laundry article 12 is repositioned, the controller is configured to instruct the one lifter 6100a and the another lifter 6100d of the two or more lifters to lower the repositioned deformable laundry article 12 onto the conveyor 6030, and release the repositioned deformable laundry article 12 disposed on the conveyor 6030. If the controller determines based on the comparison that the deformable laundry article 12 is not repositioned, the controller 6005 is configured to instruct another of the one or more lifters 6100a-d to engage and lift to the suspension height another grip point of the deformable laundry article 12 and instruct the one lifter 6100a to disengage from the deformable laundry article 12. The controller then instructs the longest engaged gripper to move the shared axis between the grippers in a consistent direction around a central normal Z axis of the conveyor such that the shared axis between the grippers is at least one of parallel to or perpendicular to a run direction of the conveyor. The controller 6005 is configured to iteratively instruct the two or more lifters 6100a-d to sequentially grip, lift, rotate, and optionally release the deformable laundry article 12 until the comparison indicates that the deformable laundry article 12 is repositioned (e.g., spread out and in a state ready for folding by an autonomous folding robot 7000).

As described previously, the deformable laundry article 12 is one of a plurality of deformable laundry articles comprising two or more article types of at least one of different sizes and different shapes. For example, the deformable laundry article 12 can be one of a plurality of laundry articles comprising a single load of household laundry. Household laundry can comprise many types of bodily worn garments and cloth articles requiring washing (e.g., sheets, tablecloths, curtains, bath rugs). These garments and articles are deformable meaning they do not hold their shape when lifted by a single grip. Because garments and other cloth articles are supple, they deform when raised by a single grip. Different items of the plurality of laundry articles may have different thickness and stiffness values depending on the material and style of the item. For example, a woven bathmat will be stiffer than a silk blouse. The plurality of laundry articles in a single load of household laundry also can comprise many different laundry articles each having a different weight. Additionally, the size of each deformable laundry article 12 of the plurality of laundry articles can vary greatly within a single load of laundry, such that repositioning each deformable laundry article 12 requires maneuvers particular to each article. The repositioning robot 6000 is configured to reposition articles of varying size and weight. In one implementation, each of the two or more article types comprises a longest dimension of between about 4 cm to 500 cm, and the data indicative of one or more repositioned deformable laundry articles comprises data associated with each of the two or more article types.

In implementations, the controller 6005 of the repositioning robot 6000 receives one or more characteristics of the deformable article 12 from the controller 5005 of the separating robot, as previously described. Additionally or alternatively, the repositioning robot 6000 can determine information about a deformable laundry article from the output signal of the two or more sensors 6040a, 6040b. As previously described, the two or more sensors 6040a, 6040b are configured to at least one of detect one or more features and capture one or more images of the deformable laundry article disposed within the work volume 6035 and output a signal comprising the at least one of the detected one of one or more features and captured one or more images. In implementations, the one or more features are indicative of at least one of position and orientation of the article relative to the two or more sensors. Additionally or alternatively, the one or more features can be indicative of a topology of the deformable article and the controller is further configured to analyze the input signal to determine whether the topology matches at least one datum associated with the one or more repositioned deformable laundry articles.

In implementations, the two or more sensors 6040a, 6040b can comprise at least one of a 3-D camera, an IR sensor, a 2-D camera, LIDAR, LADAR, a sonar proximity sensor, an ultrasonic ranging sensor, a radar sensor (e.g., including Doppler radar and/or millimeter-wave radar), and a pair of stereo depth cameras. In implementations, the two or more sensors 6040a, 6040b output to the controller 6005 at least one of a depth map, RGB images, and IR images. In implementations the two or more sensors 6040a, 6040b comprises a REALSENSE camera configured to output any of a depth map, RGB images, and IR images. In implementations, the two or more sensors 6040a, 6040b can be configured to output 3-D image data to the controller 6005. Additionally or alternatively, in implementations, the two or more sensors 6040a, 6040b can be configured to output one or more 2-D images to the controller 6005.

In one implementation, one or more of the two or more sensors 6040a, 6040b can be an imaging sensor including at least one of an infrared range sensor and a volumetric point cloud sensor configured to generate range value date representative of the deformable laundry article 12 within the work volume 6035. The two or more sensors 6040a, 6040b can be configured to generate presence value data representative of the deformable laundry article within the observed work volume. In implementations, the arms 6110a-d of the two or more lifters 6100a-d are monolithic extrusions sized to reduce blind spots for an imaging sensor of the two or more sensors 6040a, 6040b. For example, each arm 6110a-d can have a cross section of a square tube having sides of a length in a range of between about 0.5 inch to 2 inches and a wall thickness in a range of between about 1/16 inch and 1/2 inch. Such a geometry ensures resistance to moment forces without preventing the two or more sensors 6040a, 6040b from successfully detecting one or more grip points 15a-d on the deformable article 12.

In some implementations, one or more of the two or more sensors 6040a, 6040b can be an imaging sensor including a structured-light 3D scanner that measures the three-dimensional shape of the deformable article 12 using projected light patterns. Projecting a narrow band of light onto a three-dimensionally shaped surface produces a line of illumination that appears distorted from other perspectives than that of the projector, and can be used for an exact geometric reconstruction of the surface shape (light section). In some implementations, one or more of the two or more sensors 6040a, 6040b can be an imaging sensor including a time-of-flight camera (TOF camera), which is a range imaging camera system that resolves distance based on the known speed of light, measuring the time-of-flight of a light signal between the camera and the subject for each point of the image. The time-of-flight camera is a class of scannerless LIDAR, in which the entire scene is captured with each laser or light pulse, as opposed to point-by-point with a laser beam, such as in scanning LIDAR systems. Additionally or alternatively, in some implementations, one or more of the two or more sensors 6040a, 6040b can be a scanning LIDAR sensor. In some implementations, one or more of the two or more sensors 6040a, 6040b can be a three-dimensional light detection and ranging sensor (e.g., Flash LIDAR) using ultraviolet, visible, or near infrared light to image objects. In some implementations, the imaging sensor includes one or more triangulation ranging sensors, such as a position sensitive device. A position sensitive device and/or position sensitive detector (PSD) is an optical position sensor (OPS) that can measure a position of a light spot in one or two-dimensions on a sensor surface.

Figure 46A:
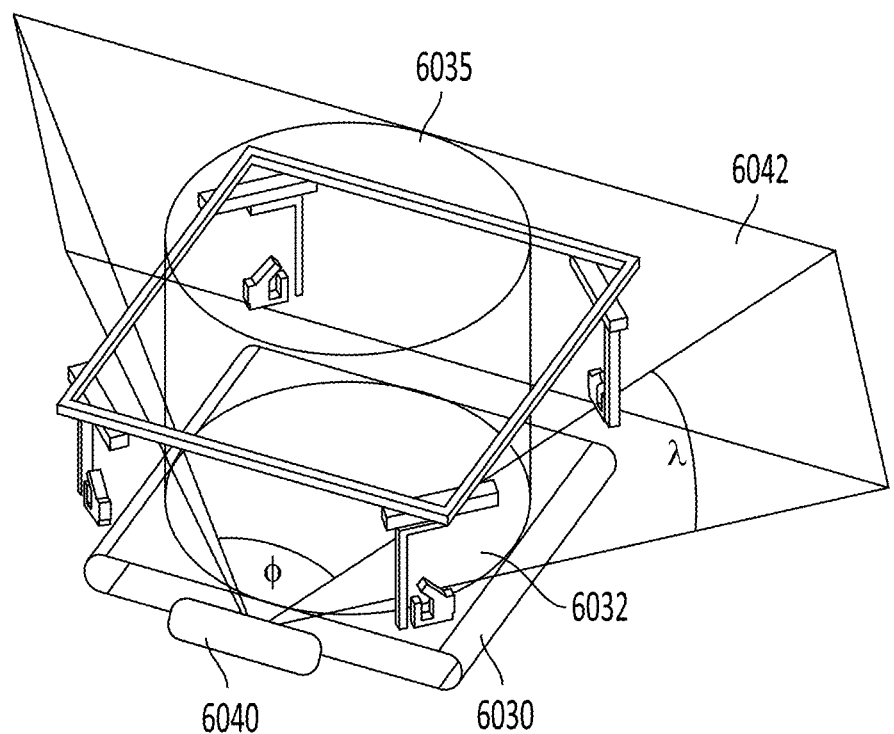
FIG. 46A depicts an orthogonal view of example sensor fields of view relative to the work volume of an autonomous repositioning robot.
Figure 46B:
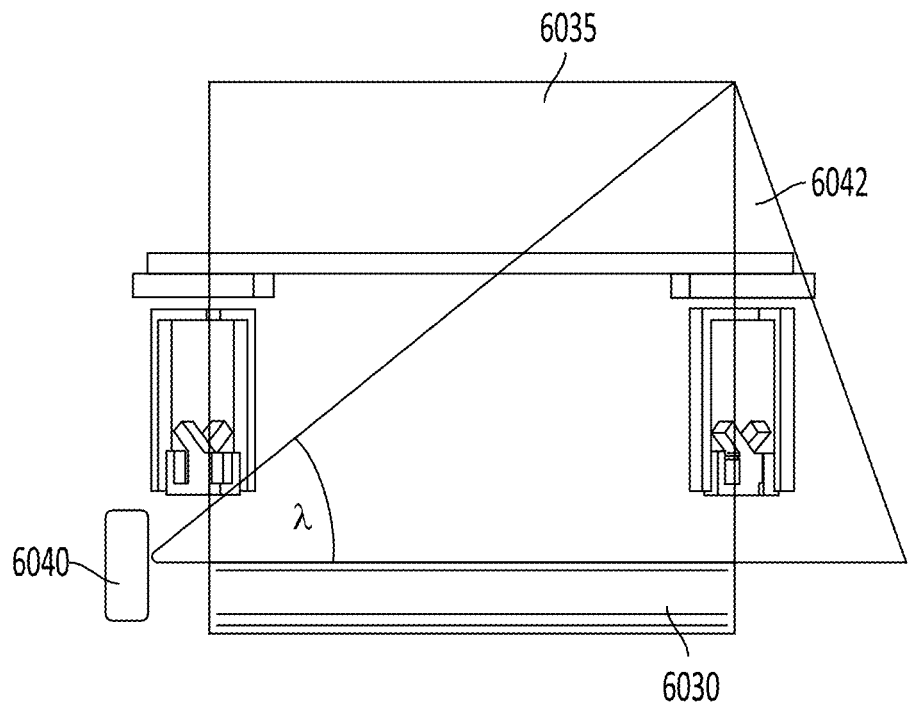
FIG. 46B depicts a side view of the example sensor field of views of FIG. 46A relative to the work volume of the autonomous repositioning robot.

In implementations, such as that of FIGS. 41 and 46A-B, at least one of the two or more sensors 6040a, 6040b is a 2-D camera configured to output a 2-D image to the controller 6005 and the data associated with repositioned deformable laundry article 12 is size invariant image data. In implementations, such as that of FIGS. 41 and 46A-B, the two or more sensors 6040a, 6040b are configured to output a 3-D image to the controller 6005 and the controller is further configured to determine a pose of the deformable laundry article 12 based on the 3-D image. The pose of the deformable laundry article 12 can be relative to at least of a coordinate space of the work volume 6035, which has a fixed coordinate space relative to the two or more sensors 6040a, 6040b, and a position and orientation of the conveyor 6030 disposed at the bottom of the work volume 6035. In implementations, the two or more sensors 6040a, 6040b are configured to provide two or more 2-D images to the controller 6005 and the controller 6005 is further configured to determine a pose of the deformable laundry article 12 within the work volume 6035, which has a fixed coordinate space relative to the two or more sensors 6040a, 6040b.

In implementations the two or more sensors 6040a, 6040b are 3-D point cloud sensors, such as the REAL SENSE depth camera, positioned at about the height of the conveyor 6030 such that the field of view of each camera is aimed at the work volume 6035. As shown in FIGS. 46A-B, the two or more sensors 6040a, 6040b can be positioned such that each camera comprises a field of view 6042 comprising a vertical angle γ ranging between about 35 and 65 degrees and a horizontal angle λ of between about 50 and 90 degrees. As shown in FIGS. 41 and 46A-B, the field of view 6042, 6042a, 6042b extends at least to a center of the work volume 6035 and projects across between about 80 to 90 percent of a work area 6032 comprising the portion of the conveyor 6030 intersecting with the work volume. In implementations, as shown in FIG. 41, the two or more sensors 6040a, 6040b comprise overlapping fields of view 6042a, 6042b. The overlapping fields of view 6042a, 6042b ensure that between about 80 to 100 percent of the work volume 6035 is sensed at any point in time. The controller 6005 of the repositioning robot 6000, therefore, can identify the presence of a deformable laundry article 12 within the work volume 6035 and can detect one or more grip points 15a-c on the deformable article 12 suspended above the conveyor. Because the locations of the stationary two or more sensors 6040a, 6040b are fixed relative to the anchored locations of the two or more lifters 6100a-d, and the controller 6005 can path plan the motion of each of the two or more lifters 6100a-d to engage with the one or more grip points 15a-c detected in coordinate space within the work volume 6035.

In implementations, at least one of the two or more sensors 6040a, 6040b is a 3-D point cloud sensor. The memory 6010 further comprises a trained neural network, for example a convolutional neural network, configured to classify images from the 3-D point cloud sensor, and the comparison of the output signal to the data indicative of one or more repositioned deformable laundry articles comprises an analysis based on the neural network. In implementations, the comparison comprises generating a descriptor based on the output signal of the two or more sensors 6040a, 6040b, and classifying, using the neural network, the output signal based on the descriptor. The neural network is configured to output a probability that the output signal corresponds to a class of the stored data indicative of one or more repositioned deformable laundry articles. The classes of trained data in the neural network include data associated with many types of deformable laundry articles that are repositioned and ready for folding. That is, the neural network informs the controller 6005 of a probability that the deformable laundry article 12 is ready for folding.

Figure 47:
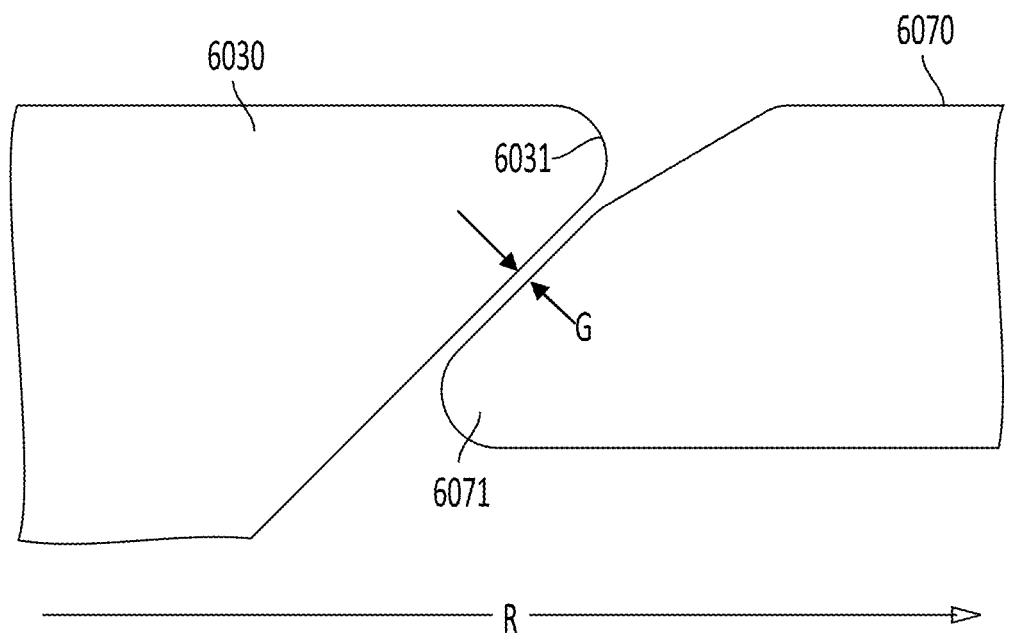
FIG. 47 is a schematic of overlapping portions of an example repositioning robot conveyor and transit conveyor of an autonomous robotic laundry process line.

Referring to FIG. 47, a leading edge portion of a conveyor 6030 is shown in conjunction with a transfer conveyor 6070 configured to be disposed outside the work volume 6035. In implementations, the conveyor 6030 can have an angled leading edge 6031 configured to nest with an angled receiving end 6071 of the transfer conveyor 6070 configured to move back and forth on rails between the repositioning robot 6000 and the folding robot 7000. The transfer conveyor is configured to deposit the repositioned deformable laundry article 12 received by the conveyor 6030 onto a receiving surface of the folding robot 7000. In other implementations, the controller 6005 can be configured to instruct the one lifter 6100a and the another lifter 6100d of the two or more lifters (FIG. 31) having associated engaged grippers 6105a,d to sweep the repositioned one of the plurality of deformable laundry articles 12 onto a surface outside the work volume. The surface can be, for example, a transfer conveyor 6070 or a surface of the folding robot 7000. In other implementations, the conveyor 6030 can be replaced by a tilting surface configured to receive thereon a repositioned deformable laundry article and tilt to release the article 12 under the force of gravity onto another surface such as the transfer conveyor 6070 or a surface of the folding robot 7000. In other implementations, the conveyor 6030 can be positioned higher than a stationary transfer conveyor partially stacked therebeneath in a waterfall configuration.

Figure 49:
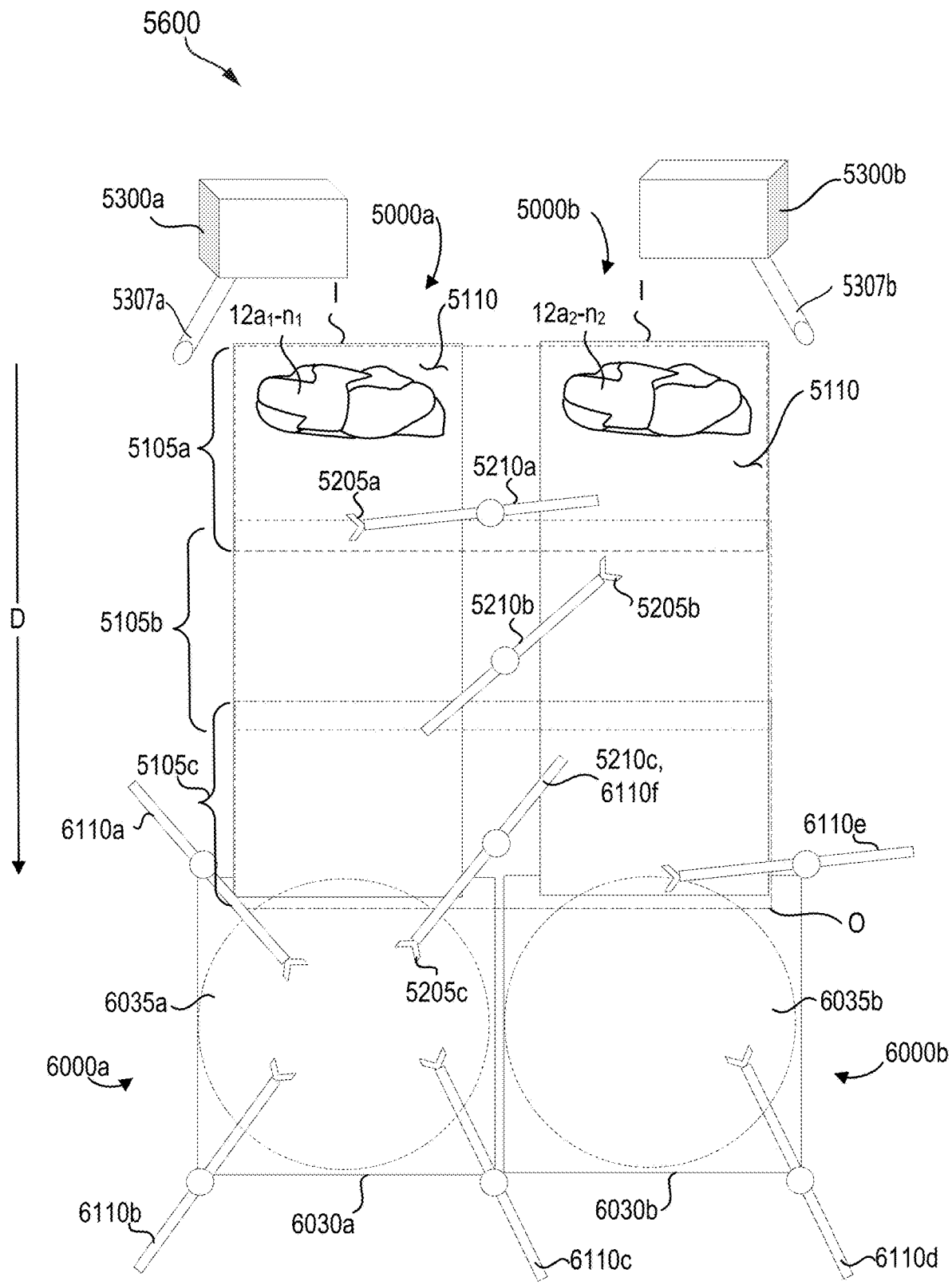
FIG. 49 depicts a top view of a schematic example of an autonomous laundry separating and repositioning system comprising two separating platforms and two repositioning robots.
Figure 50:
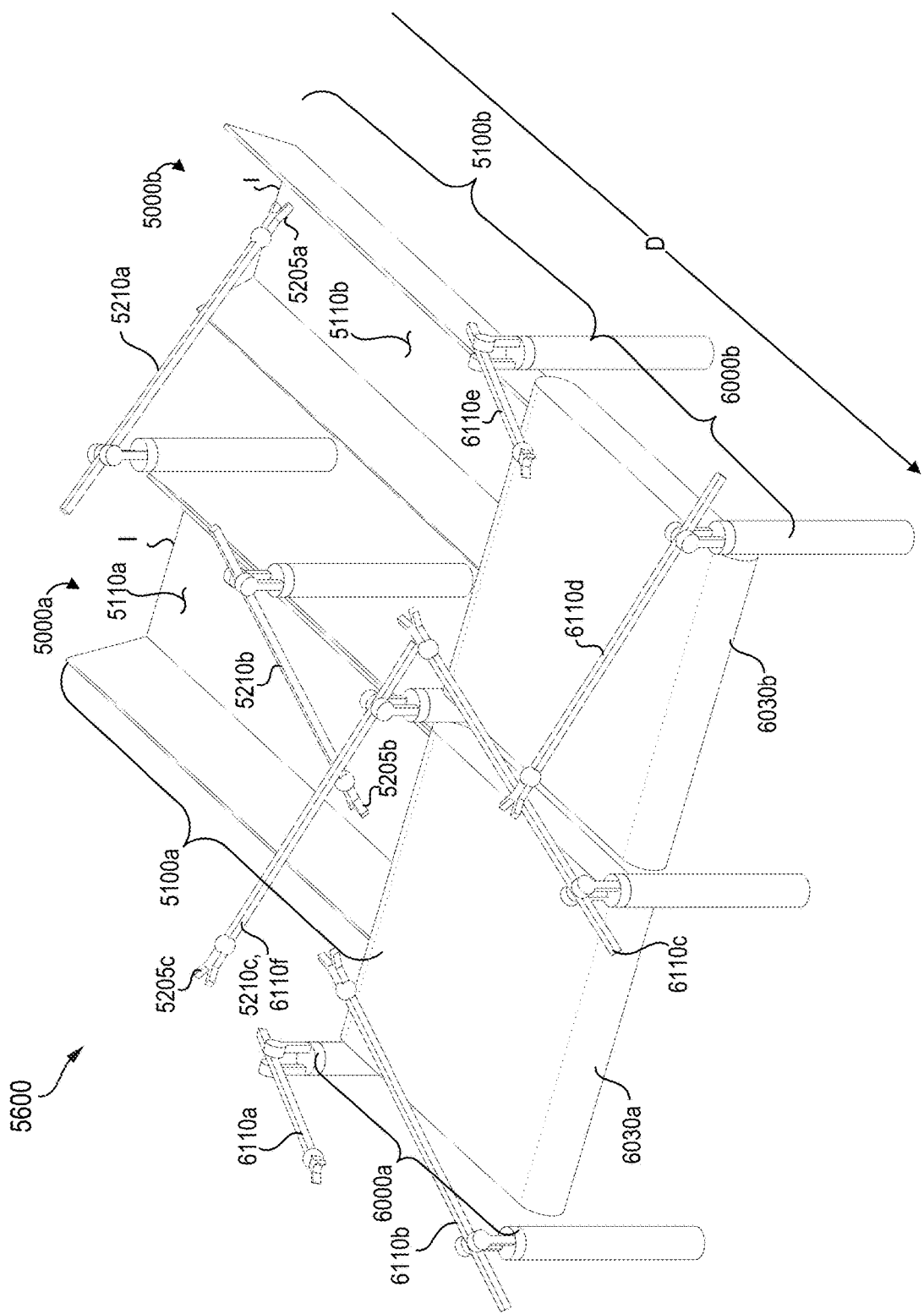
FIG. 50 depicts a perspective view of a portion of the schematic example of FIG. 49.
Figure 51:
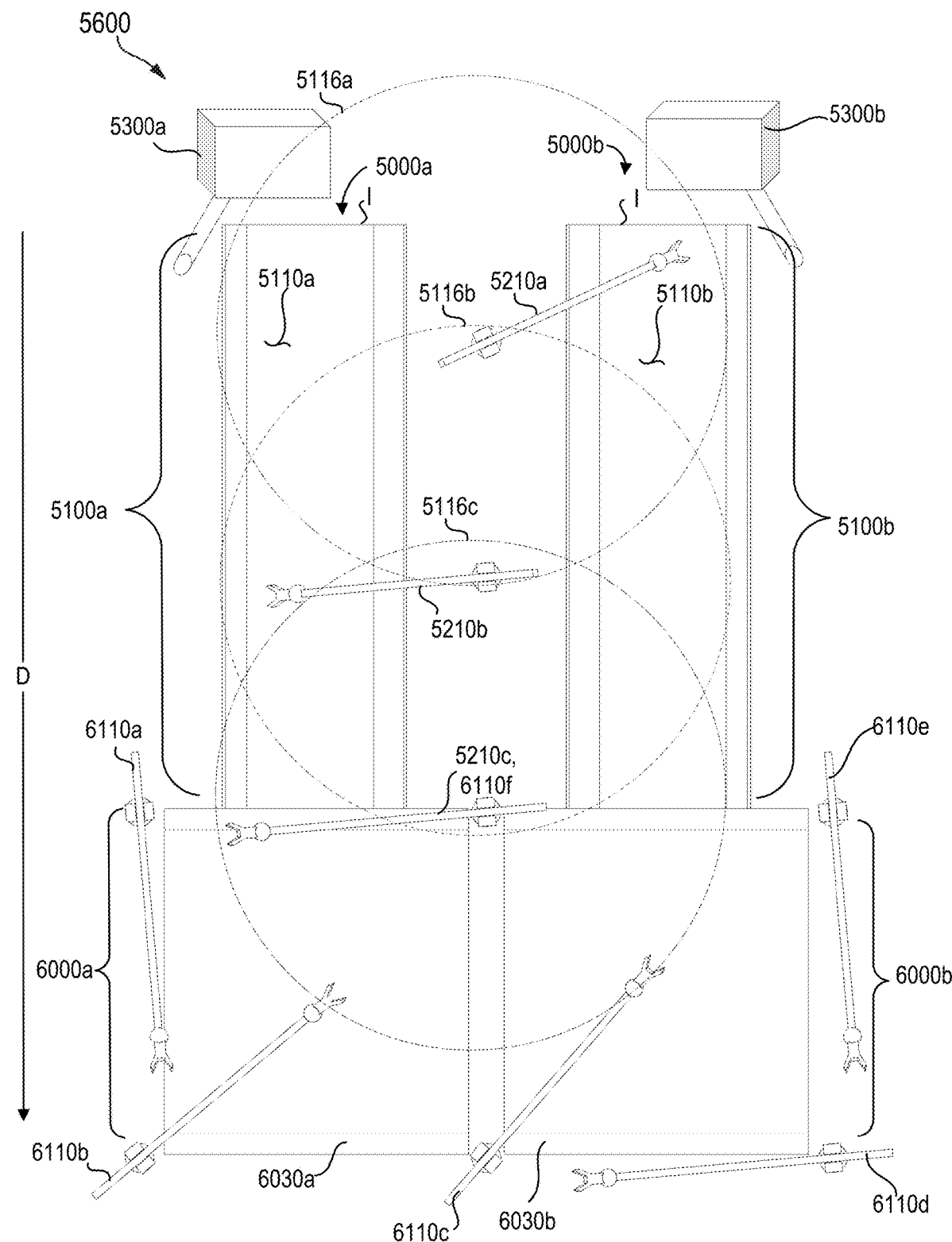
FIG. 51 depicts a top view of the schematic example of FIG. 50.

Although the system 5500 of separating and repositioning a plurality of deformable articles is described in implementations as comprising a separating robot 5000 in line with a repositioning robot 6000, in implementations, as shown in FIGS. 49-51, a system 5600 of separating and repositioning a plurality of deformable articles $12a_1$-$n_1$, $12a_2$-$n_2$ belonging to a single customer (e.g., household address) comprises two separating robots 5000a-b and two shared repositioning robots 6000a-b, and at least one of the plurality of arms 5210a-c of the two separating robots 5000a-b and at least one of the arms 6110a-e of a plurality of lifters 6100a-e of the repositioning robot 6000 are shared between two or more robots of the system 5600 as will be described subsequently with regard to implementations.

In implementations, as shown in FIGS. 49-51, a plurality of arms 5210a-c are disposed in series between a pair of parallel platforms 5100, each one of the plurality of arms being configured to rotate in a range 5116a of between 180 and 360 degrees so that each arm of the plurality of arms can access either one of the pair of parallel platforms 5100a-b to separate a plurality of deformable articles $12a_1$-$n_1$, $12a_2$-$n_2$ therein. A plurality of sweep circles 5116a-c of the corresponding ones of the plurality of arms 5210a-c are represented in FIG. 51, for example. In implementations, the plurality of arms 5210a-c comprises the features and functions previously described with regard to implementations herein throughout. Each of the plurality of sharable arms comprises an actuatable terminal gripper configured to selectively grasp at least one of the plurality of deformable articles $12a_1$-$n_1$, $12a_2$-$n_2$ and at least one drive motor configured to configured to at least one of rotate, tilt, extend, and retract the terminal gripper, each of the plurality of arms being associated with the plurality of sequential work volumes 5105a-c. In implementations, the plurality of sequential work volumes extend across the pair of parallel platforms 5100a-b so that effectively, each of the pair of platforms 5100a-b comprises a series of work volumes 5105a-b that are parallel to the series of work volumes of the other platform.

Figure 52B:
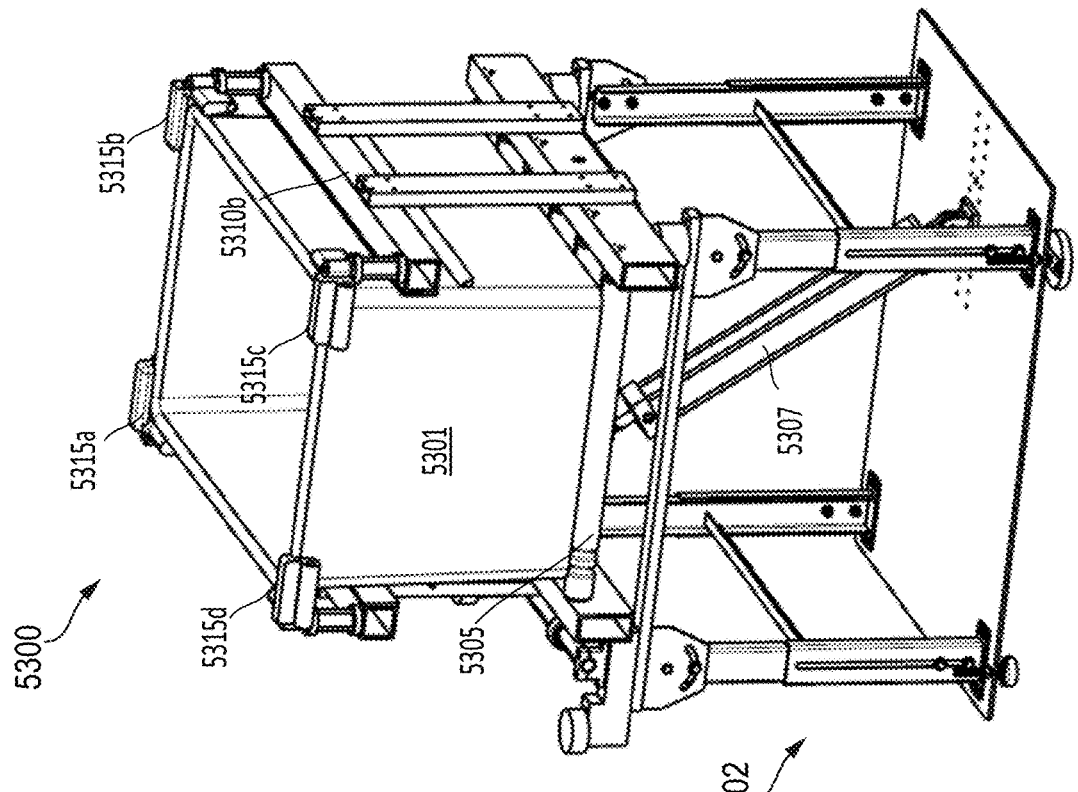
FIG. 52B depicts a rear perspective rear view of the bin tipper of FIG. 52A.
Figure 52A:
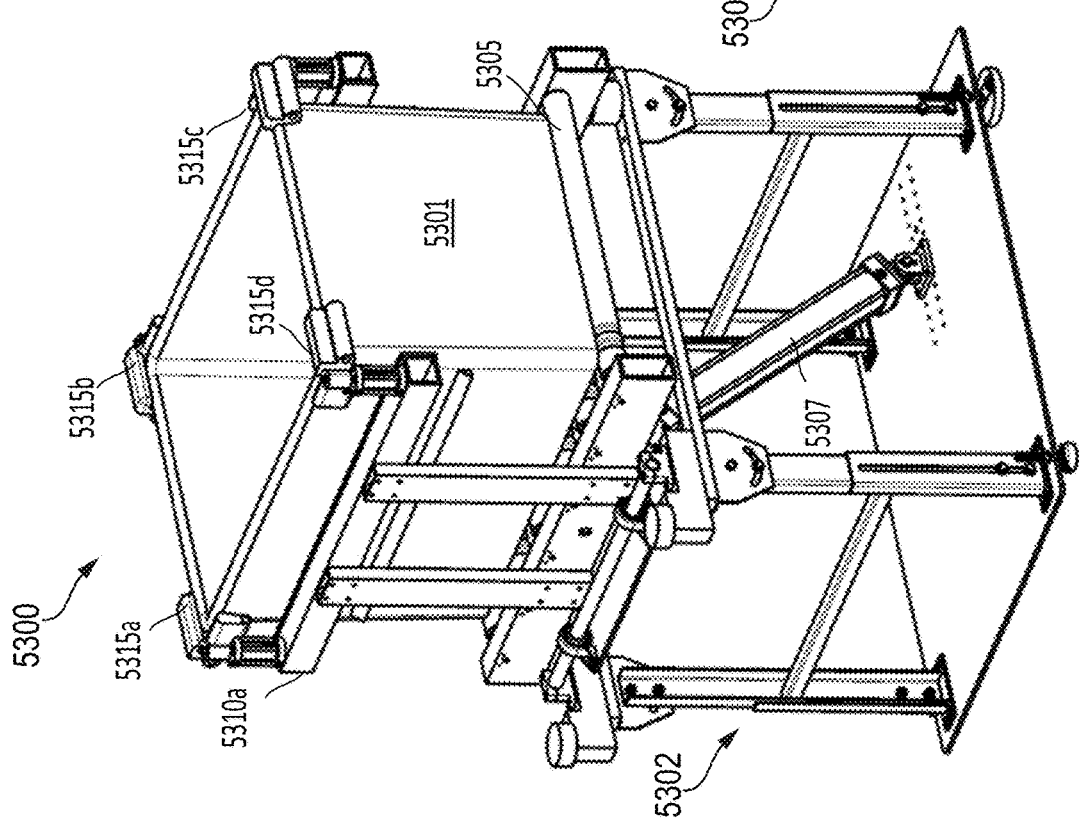
FIG. 52A depicts a front perspective view of a bin tipper for delivering one or more laundry articles to a platform of the separating robot in an upright position.
Figure 53:
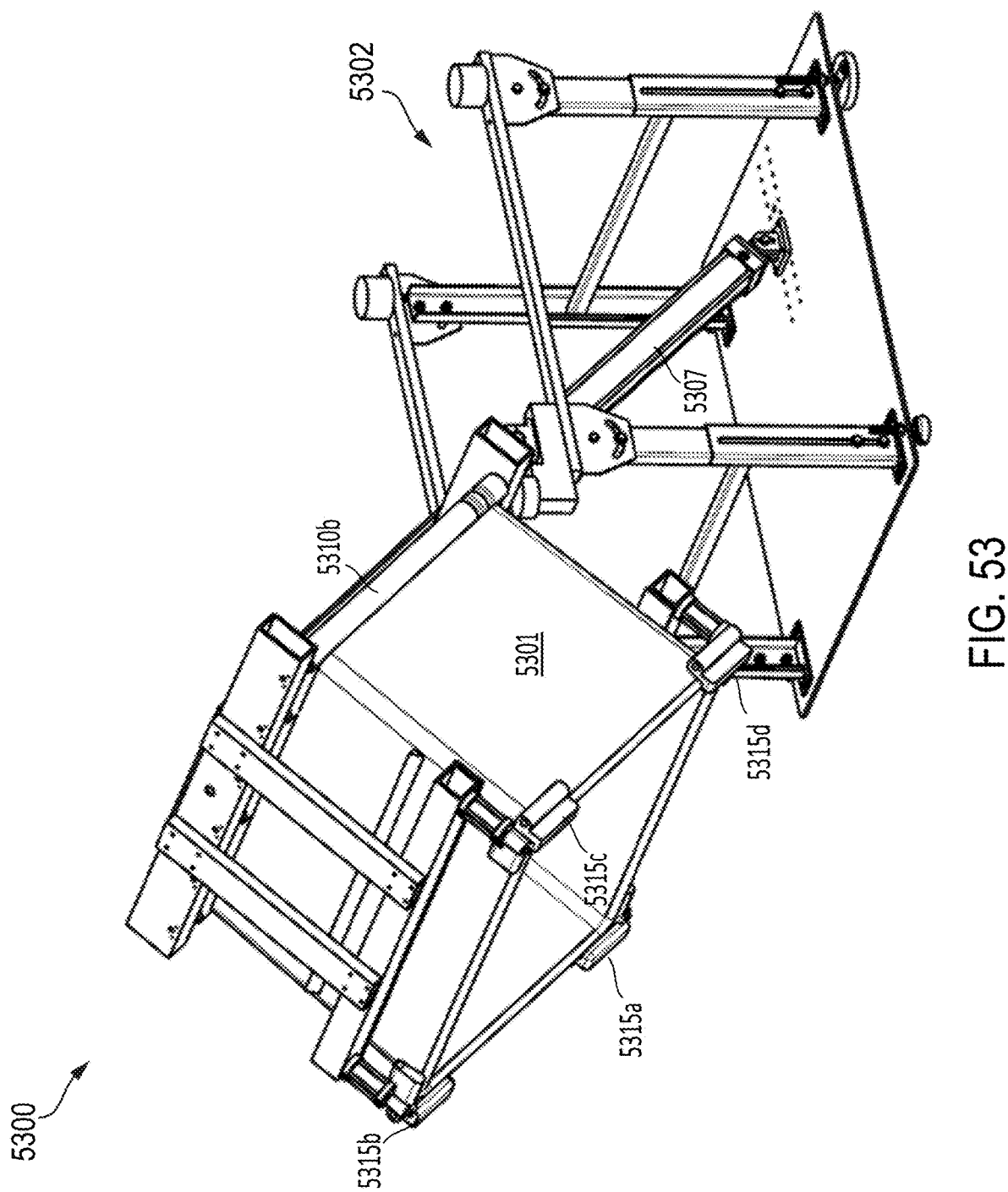
FIG. 53 depicts a front perspective view of the bin tipper of FIG. 52A in a tipped position.
Figure 54:
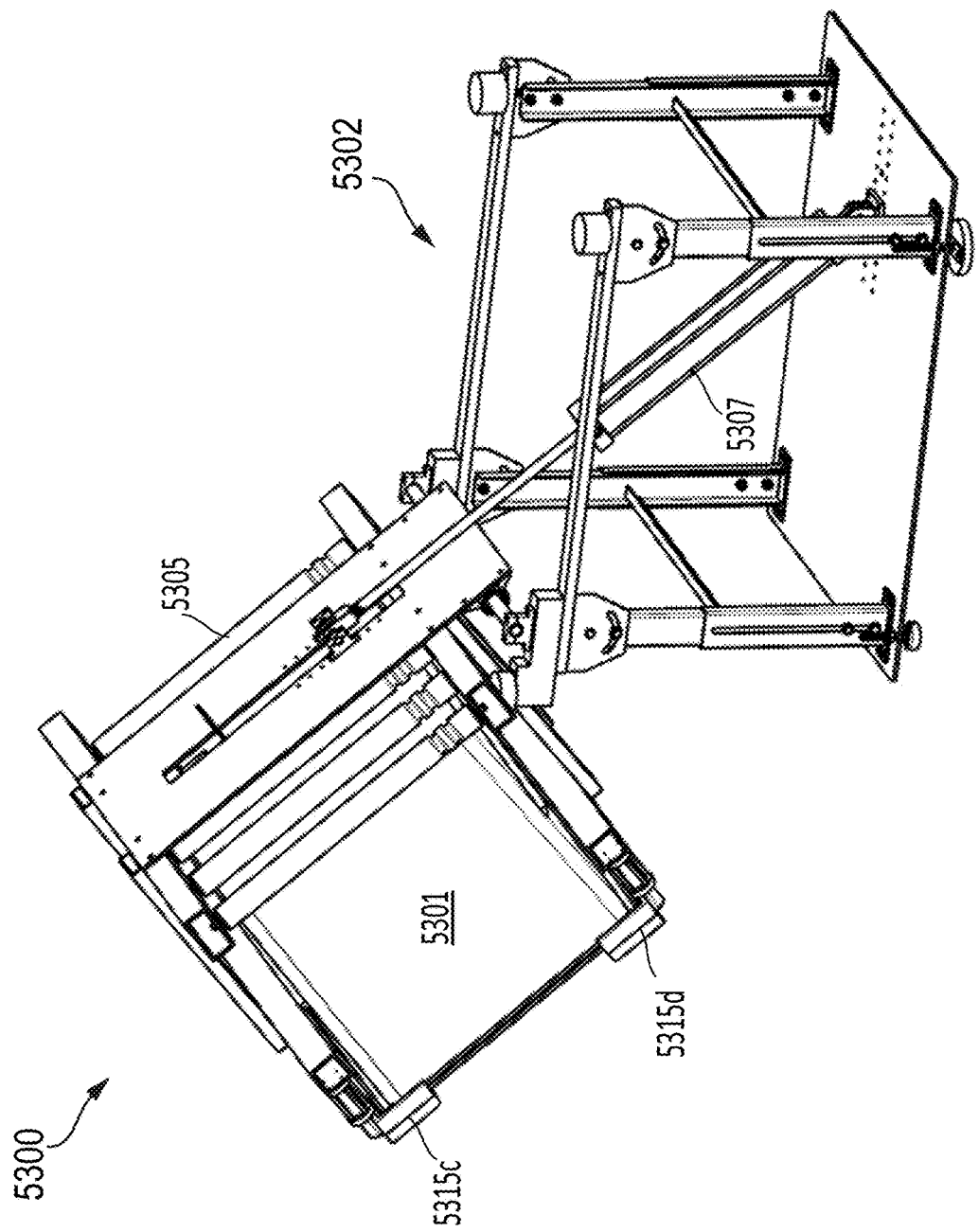
FIG. 54 depicts a rear view of the tipped bin tipper of FIG. 53.

As shown in FIG. 34, each parallel platform 5100a-b is configured to receive thereon one or more deformable articles $12a_1$-$n_1$, $12a_2$-$n_2$. In implementations, as shown in the schematic views of the separating and repositioning system 5600 FIGS. 49 and 51, the one or more deformable articles are $12a_1$-$n_1$, $12a_2$-$n_2$ delivered autonomously to the platform 5100 by one or more bin tippers 5300a-b. In implementations, as shown in FIGS. 52-54 bins are autonomously transited from one or more washing and drying devices 4000 and received onto a conveyor or support surface 5305 of the bin tipper 5300. In implementations, the bin tipper 5300 comprises a pair of side rails 5310a-b configured to constrain a bin 5301 containing clean deformable one or more laundry article 12a-n thereon. In implementations, at least one of the pair of side rails 5310a-b comprises a clamp configured to actively constrain a bin 5301 there between. Additionally or alternatively, the bin tipper comprises a plurality of corner restraints 5315a-d for restraining two or more corners of the bin 5301 during tipping such that the bin 5301 does not fall off the conveyor 5305.

In implementations, the conveyor 5305 is movably supported on a base 5302 configured to be disposed on a floor 10 beneath the system 5500, 5600. In implementations, the conveyor 5305 pivots at one point to tip the entire conveyor 5305 and bin 5301 disposed thereon in a range of between about 45 to 60 degrees from horizontal to ensure all deformably articles 12a-n therein fall out onto one of the platforms 5100a-b. In implementations, the bin tipper 5300 comprises a pneumatic cylinder 5307 comprising a linear valve control and a rubber stopper disposed inside the piston cylinder. In implementations, the bin tipper 5300 further comprises one or more coupling forks configured to secure the pneumatic cylinder 5307 to at least one of the conveyor 5305 and the base 5302. Additionally, in implementations, the bin tipper 5300 further comprises a sensor (e.g., a camera) disposed thereabove to detect whether the bin 5301 is fully emptied after tipping and signal to the controller 5005 to tip again if any one or more articles 12 are detected therein after the conveyor 5305 returns the bin 5301 to an upright orientation.

Turning to the system schematic of FIG. 5, the bin tipper 5300 comprises a processor 5340 in wired or wireless communication with the controller 5005 via a network interface 5354. The bin tipper 5300 comprises a conveyor drive 5342 in operable communication with a reversible conveyor motor (not shown) configured to receive a full bin 5301 onto the conveyor 5305 and eject the bin 5301 once emptied. In implementations, the conveyor 5305 further comprises an incremental shaft encoder 5350, 5351 on the conveyor motor (not shown) configured to rotate the conveyor rollers by a measurable amount to move a bin 5301 into a clamping positioning within the bin tipper 5300. Additionally or alternatively, the conveyor 5305 comprises at least one position sensor 5348, 5349 configured to detect a position of a bin 5301 on the conveyor 5305 and transmit a signal to the processor 5340 of the bin tipper 5300 to actuate the clamping side rails 5310a-b and/or corner restraints 5315a-d to retain the bin 5301 for tipping. In implementations, the position sensor 5348, 5349 comprises at least one of one or more non-contacting electromagnetic switches (e.g., Hall effect sensors), one or more mechanical limit switches, one or more photoelectric proximity switches (e.g., break beams), one or more inductive sensors, and one or more time of flight distance sensors. In implementations, the bin tipper 5300 further comprises a tipper actuator 5344 in operable communication with the pneumatic cylinder 5307 configured to rotate the conveyor 5305 to invert a bin 5301 clamped therein. Additionally, in implementations, the bin tipper comprises one or more limit switches 5351 configured to detect at least one of the tipper being upturned and the tipper being inverted.

Figure 55:
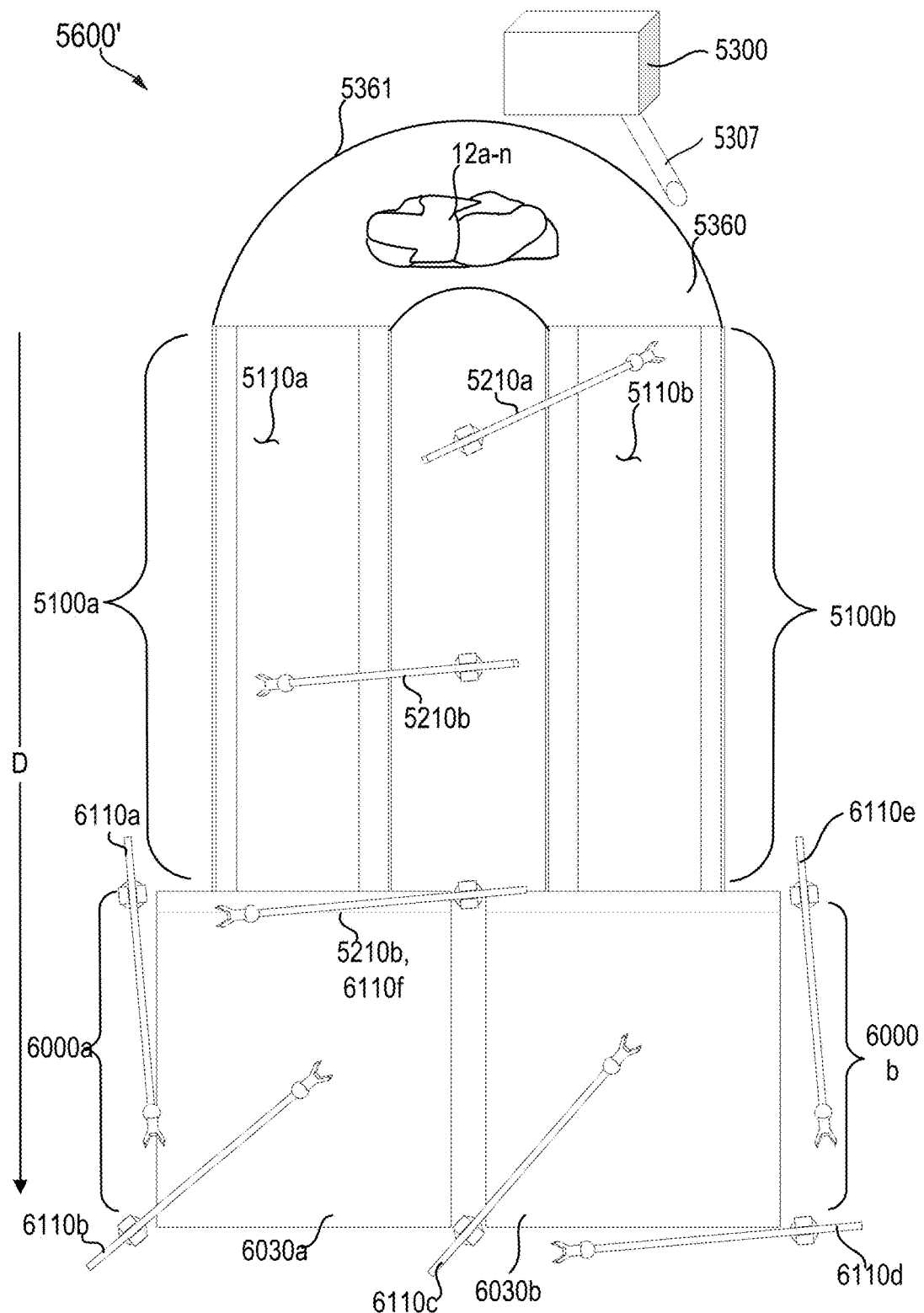
FIG. 55 depicts an alternate embodiment of a separating and repositioning system having a shared intake bay serviced by a shared bin tipper.

In implementations, as shown in FIGS. 49 and 51, each platform 5100a-b of the system 5600 comprises a dedicated bin tipper 5300a-b. Alternatively, in implementations, a single bin tipper 5300 can service both platforms 5100a-b of the system. For example, as shown in FIG. 55, the system 5600' can include a shared receiving bay 5360 accessible by the first arm 5210 for retrieving one article 12 from a plurality of articles 12a-n delivered to the receiving bay 5360 by the bin tipper 5300. In implementations, the receiving bay comprises at least one outside wall 5361 configured to retain the delivered articles 12a-n thereon. Additionally, the receiving bay 5360 comprises a floor that forms a continuous floor 5110 with the floors 5110a-b of the adjacent platforms 5100a-b and backstops 5109 (FIGS. 9A-B) are omitted.

In implementations of the system 5600, 5600' of shared arms and two platforms 5100a-b, the one or more deformable articles are configured to be grasped from the initially amassed plurality of deformable articles 12a-n and passed from an inlet end I to an outlet O end via a series of grasps, hoists, rotations, and releases as described previously with regard to FIGS. 12A-15. Because two platforms 5100a-b share the plurality of arms 5210a-c in the system 5600, an arm not in use grasping and hoisting an article in one of the two platforms 5100a-b can rotate into a parallel work volume of the other of the two platforms 5100a-b to grasp, hoist, rotate and release one or more articles being separated to a single article. In this way, the plurality of arms 5210c service both platforms, increasing the throughput of the process. Additionally and advantageously, sharing the plurality of arms 5210a-c between the platforms 5100a-b eliminates a second "keep out" zone for any technicians or other personnel servicing the process line. This establishes two lanes of processing with a single keep out zone, e.g., an area traversed by autonomously moving robots. Additionally and advantageously, this also reduces overall capital equipment cost and increases the utilization of each arm. Because the separating robot 5000 takes less time to process a clean load of deformable articles 12a-n than other robots in the processes line, any latency imparted by sharing arms between platforms 5100 does not gate the throughput of the overall process line 100. The bandwidth of a process line 100 and facility comprising a plurality of process lines 100a-n, is increased by the space savings of sharing a plurality of arms 5210a-c between two platforms 5100. Additionally, the overall cost expense is less because of the higher utilization of each pair of platforms 5100a-b (and subsequent downstream robots) compared to a single platform serviced by a plurality of arms 5210a-c. These cost savings and efficiencies can be shared with customers. The compact process line 100 setup furthermore reduces the overall facility size and the environmental costs associated with heating, cooling, and otherwise maintaining the facility.

Additionally, in implementations, the controller 5005 is configured to track the position and location of each of the plurality of arms 5210a-c in coordinate space and instruct each arm 5210a-c of the plurality of arms to at least one of retract, extend, and tilt before rotating into the other of the two platforms 5100a-b. By tracking a pose of each arm, the controller 5000 is able to prevent collisions during arm rotations between parallel platforms.

In implementations, the controller 5005 is further configured to monitor the state of the plurality of deformable articles disposed on the floor 5110a-b of each platform 5100a-b and determine when a single article has been presented to one of the parallel repositioning robots 6000a-b.

In implementations, the controller 5005 of the separating robot is configured to receive a signal from at least one of the plurality of sensors 5140a-c in the plurality of work volumes 5105a-c of the separating robot and at least one of two or more sensors of the repositioning robot 6000. Additionally or alternatively, the controller 5005 of the separating robot 5000 is configured to receive information based on the two or more sensors and communicated by the controller 6005 of the repositioning robot 6000. The controller 5005 is configured to determine, based on the received signal, at least one of the following: one or more of the plurality of deformable articles 12a-n is present on the stationary floor 5110, none of the plurality of deformable articles are present on the stationary floor, and one or the plurality of deformable articles is disposed within a repositioning work volume of the repositioning robot 6000. In implementations, the controller 5005 is configured to determine, before instructing the terminal gripper within the repositioning work volume to release the one of the plurality of deformable articles, at least one of the two or more repositioning lifters is engaged with the one of the plurality of deformable articles in the repositioning work volume. Additionally or alternatively, the controller 5005 is configured to determine that one of the plurality of deformable articles is disposed on a conveyor of the repositioning robot 6000.

Figure 48:
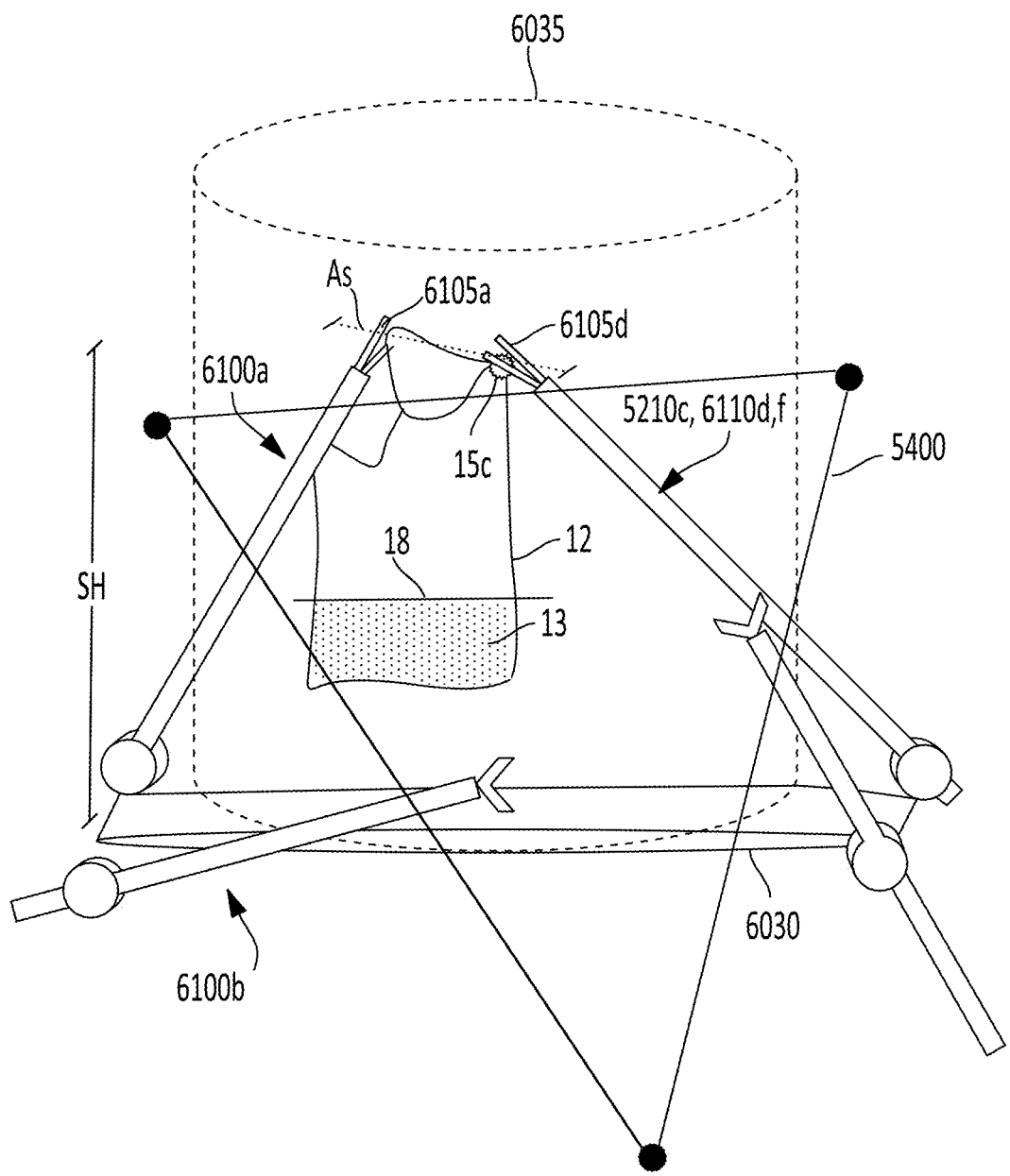
FIG. 48 depicts a plane projected on a hoisted article for identifying grip points and determining whether to hinge and/or swivel a wrist of an arm to grip an edge of the hoisted article.

As shown in FIG. 48, in implementations the plurality of lifters 6100a-f of the one or more repositioning robots of the system 5500, 5600 comprises a wrist assembly 5270 that enables a gripper 5205, 6105 to swivel and hinge as previously described with regard to the implementations of FIGS. 27-37. This enables a gripper 6105 of the repositioning robot to orient itself such that the fingers of the gripper close around a more easily gripped edge of a hoisted article 12 rather than attempting to grip a planar surface of an article hoisted by a last arm 5210c of the separating robot, which is, in implementations, a shared arm 5210c, 6110f shared between the repositioning robot 6000 and the separating robot 5000.

In implementations, as shown in FIG. 48, at least one controller 5005, 6005 of the separating robot 5000 and repositioning robot 6000 processes a point cloud 13 of an article 12 (e.g., an article detected by one or more sensors 5140, 6140, 5147 configured to output a point cloud 13 to the controller) to produce a plane 5400 of the article 12. From that the controller 5005, 6005 determines the angle between the plane and an available gripper 5210, 6105 to calculate the angle to which the hinge joint on the wrist 5270 (of an arm 6110) will move to grab an edge of the article. In implementations, the at least one controller 5005, 6005 can use at least one of principal component analysis (PCA), point cloud boxing techniques, graph searching and voxel selection, and a mesh and normals analysis to determine the edge of the plane of the article 12 along which a gripper will grab.

As described previously with regard to implementations, each separating robot 5000, 5000a-b is configured to detect a large article of the plurality of deformable articles 12a-n. For example, the controller 5005 can determine that an article is a large article such as a bed sheet and communicate this information to one or more controllers 6005a-b of the parallel repositioning robots 6000a-b. As shown in FIGS. 56A-57C, the plurality of lifters 6110a-e of the repositioning robots 6000a-b and the shared arm 5210c, 6110f are configured to cooperatively interact to reposition a large article 12 to a folded or quasi folded state prior to delivering the article to a subsequent robot in the process line, such as the folding robot 7000 and/or the packing robot 8000.

Figure 56A:
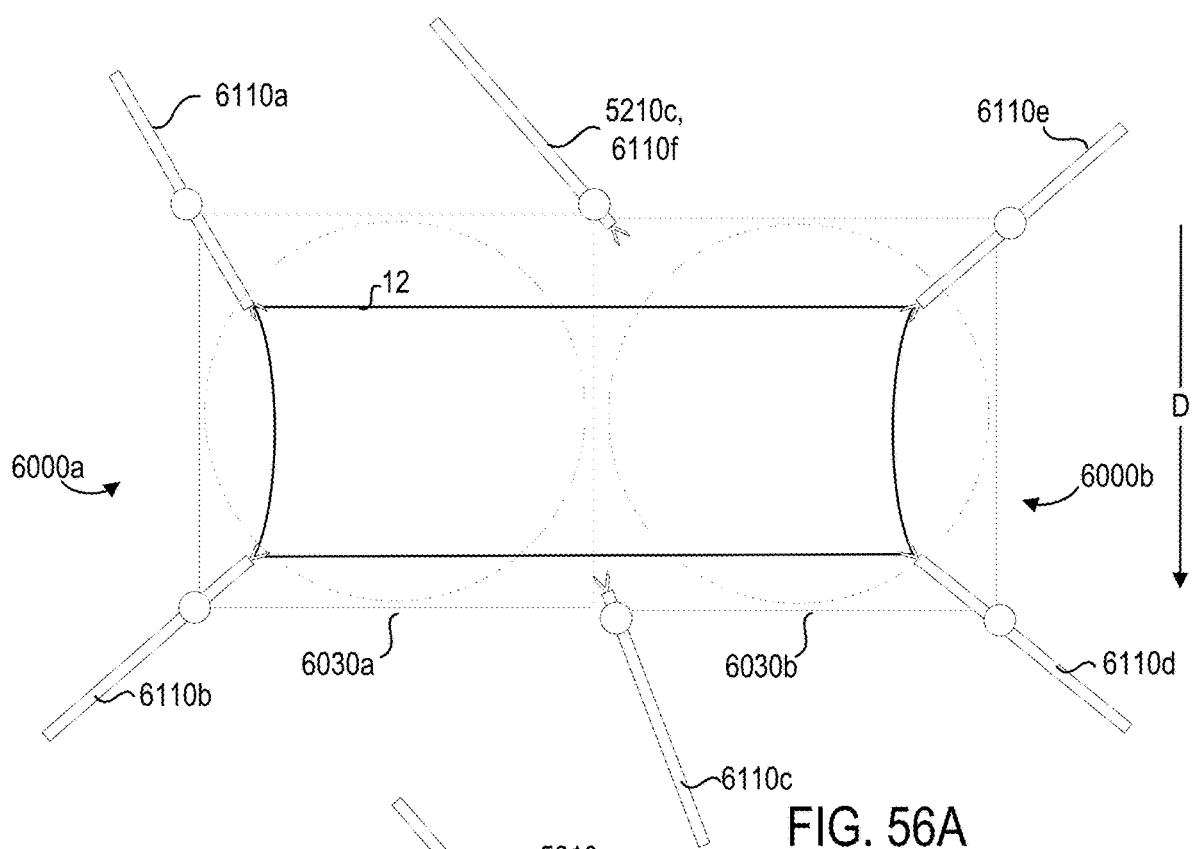
FIG. 56A depicts a schematic top view of a portion of the autonomous laundry separating and repositioning system at the start of a process of repositioning a large article.
Figure 56B:
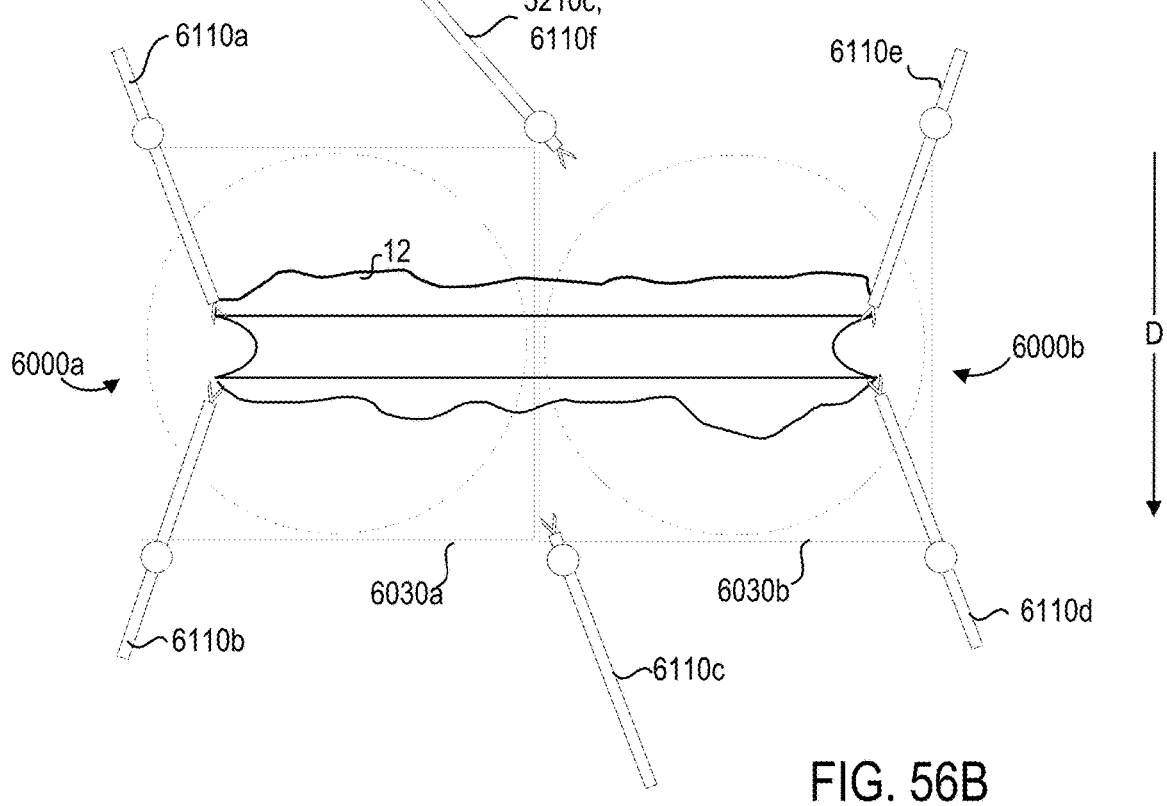
FIG. 56B depicts the implementation of the autonomous laundry separating and repositioning system of 56A at a next step in the sorting process.
Figure 57A:
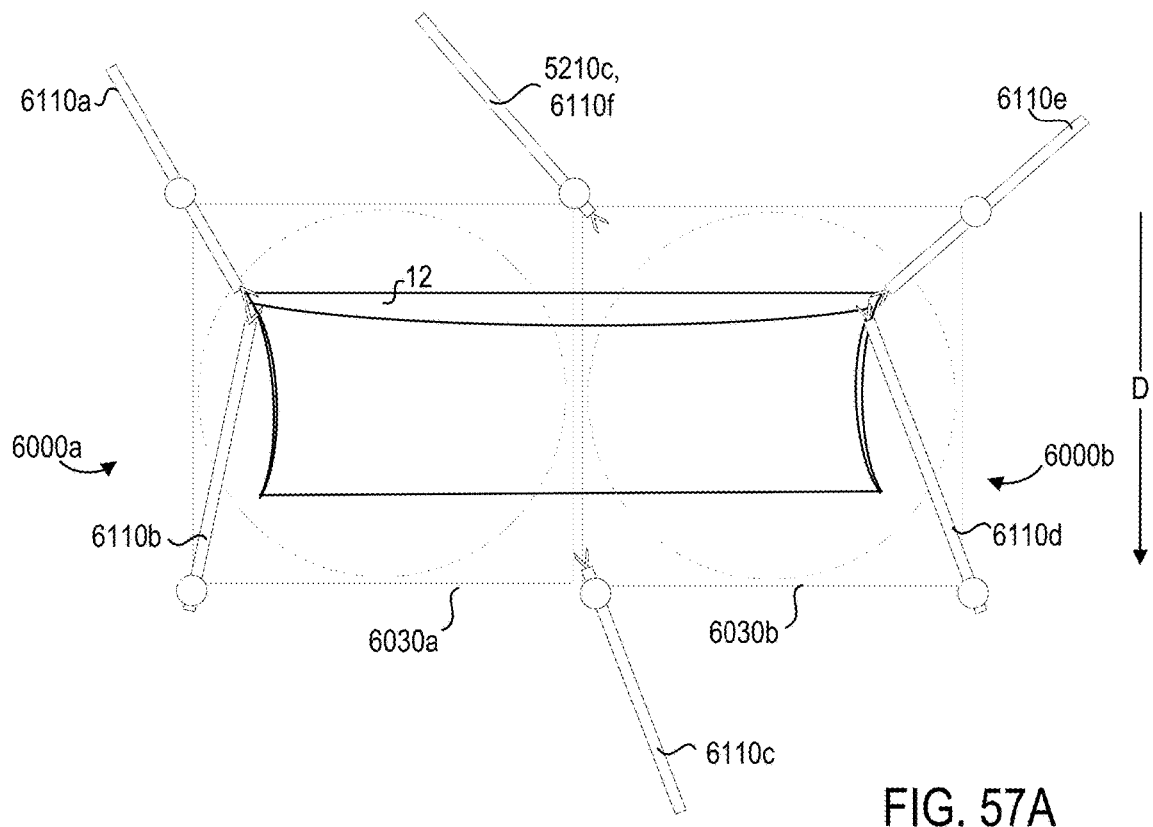
FIG. 57A depicts the implementation of the autonomous laundry separating and repositioning system of 56B at a next step in the sorting process.
Figure 57B:
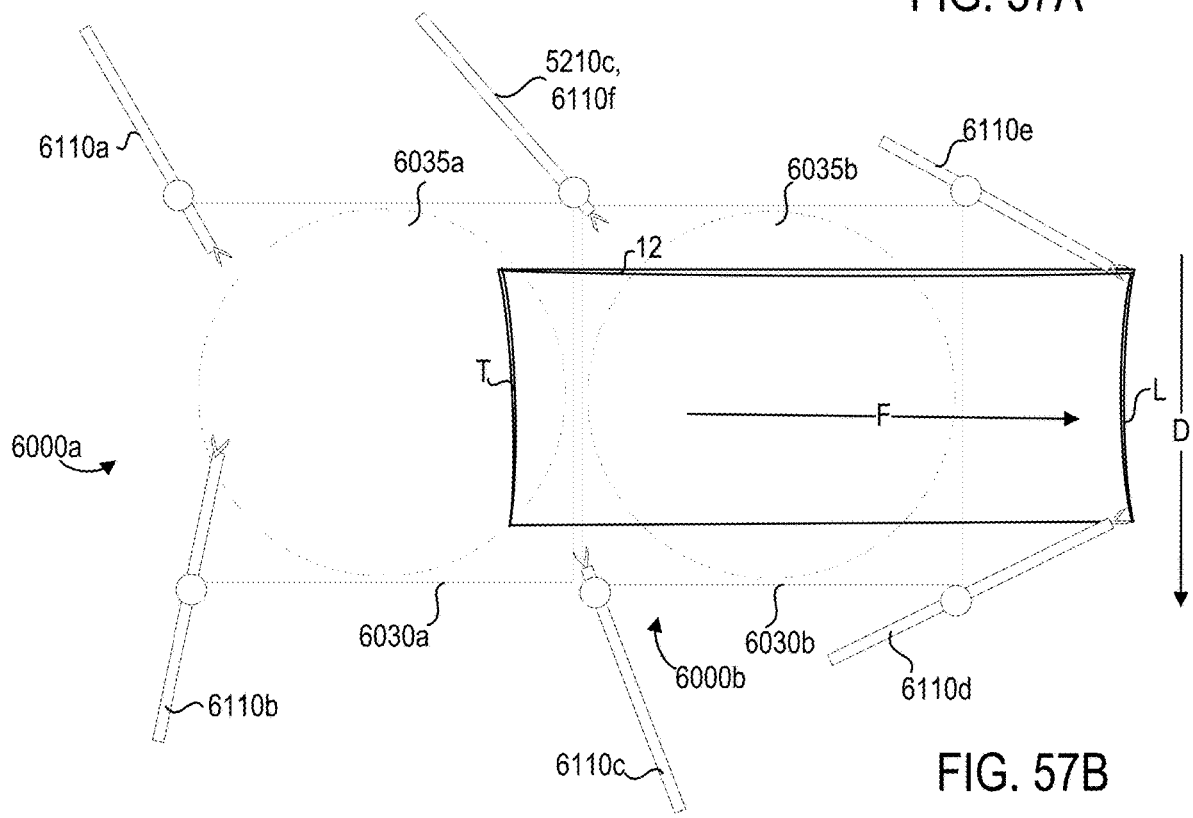
FIG. 57B depicts the implementation of the autonomous laundry separating and repositioning system of 57A at a next step in the sorting process.
Figure 57C:
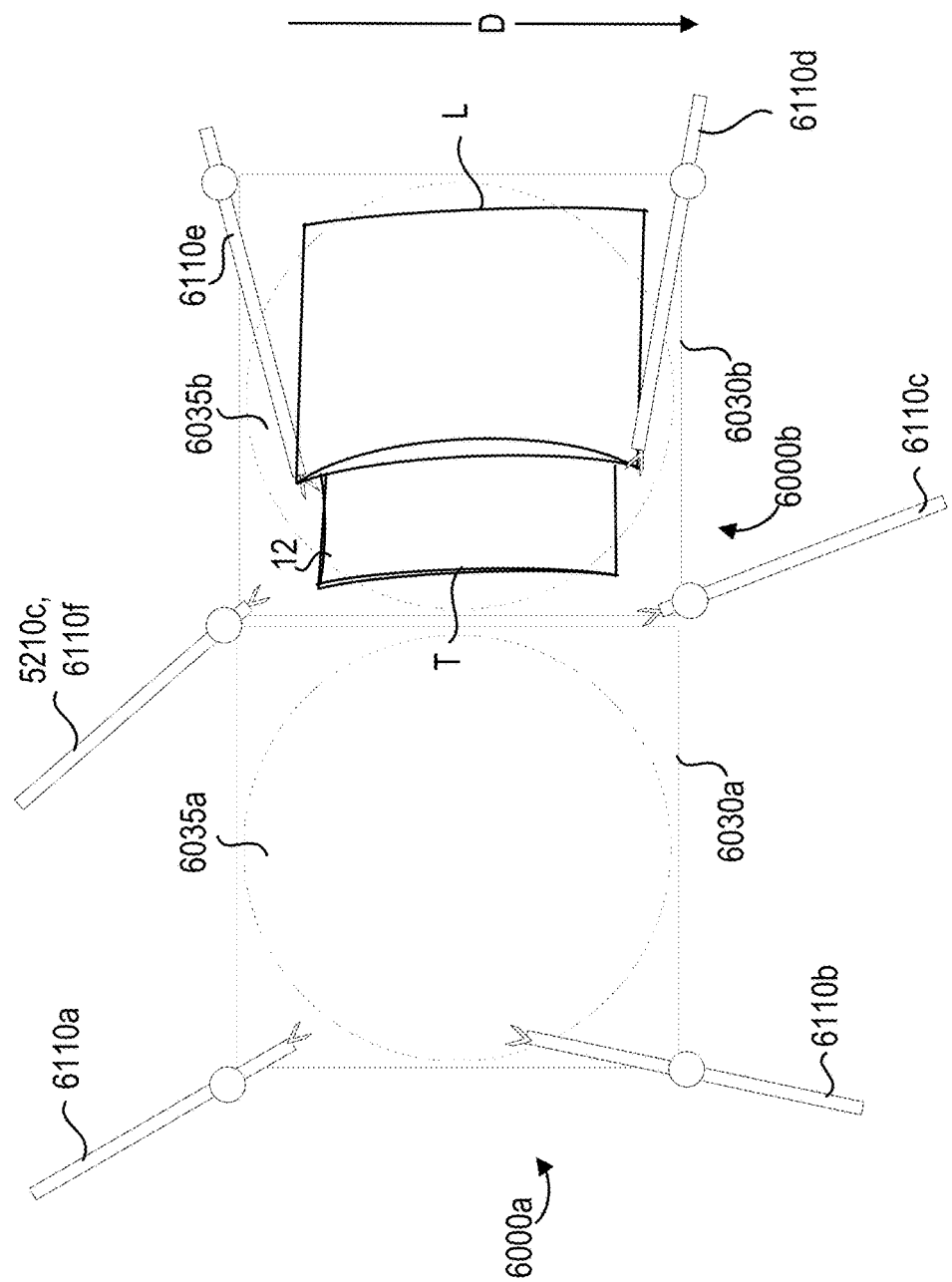
FIG. 57C depicts the implementation of the autonomous laundry separating and repositioning system of 57B at a next step in the sorting process.

As shown in the implementation of FIG. 56A, folding a large bed sheet 12 can comprise an initial grasp of all four corners by the arms 6110a-b, 6110d-e of the lifters at the outer corners of the combined area occupied by the two parallel repositioning robots 6000a-b. As shown in FIG. 56B, the arms 6110a-b, 6110d-e engaged with the corners of the sheet can move inward to fold the sheet 12 in half along its length with the lower portion of the sheet resting on the two conveyors 6030a-b. As shown in FIG. 57A, the corners are matched and lowered to the conveyor floor while one or more controllers 6005a-b of the two parallel repositioning robots 6000a-b instructs the two conveyors 6030a-b to rotate in the direction D. This rotation "sweeps" the loosely folded sheet outward while the two engaged grippers of the arms 6110a, 6110e lower the matched corners and the smoothed sheet is ready for repositioning and further folding. As shown in FIG. 57B, two corner arms 6110d-e of one of the repositioning robots 6000b grab both layers of the folded sheet at the corners and pull a leading edge L the sheet 12 outside the repositioning work volume 6035b at least until a trailing edge T enters the work volume 6035b. As shown in FIG. 57C, the engaged two corner arms 6110d-e then lower the grasped corners of the sheet 12 onto the conveyor 6030b atop the corners of the trailing edge T. The folded sheet 12 is within the work volume 6035b of a single conveyor 6030b and the controller 6005b can instruct the conveyor 6030 or another robot in the process line to move the folded sheet 12 off to at least one of a folding robot 7000 (for additional folding) and a packing robot 8000. Alternatively, in implementations, after the folding step of FIG. 57A, the middle arms 5120c, 6110f and 6110c are configured to grab the sheet 12 at a center of the long-axis and hoist the sheet up and sweep it over to lie flat on at least one of the conveyors 6030a-b.

Figure 58:
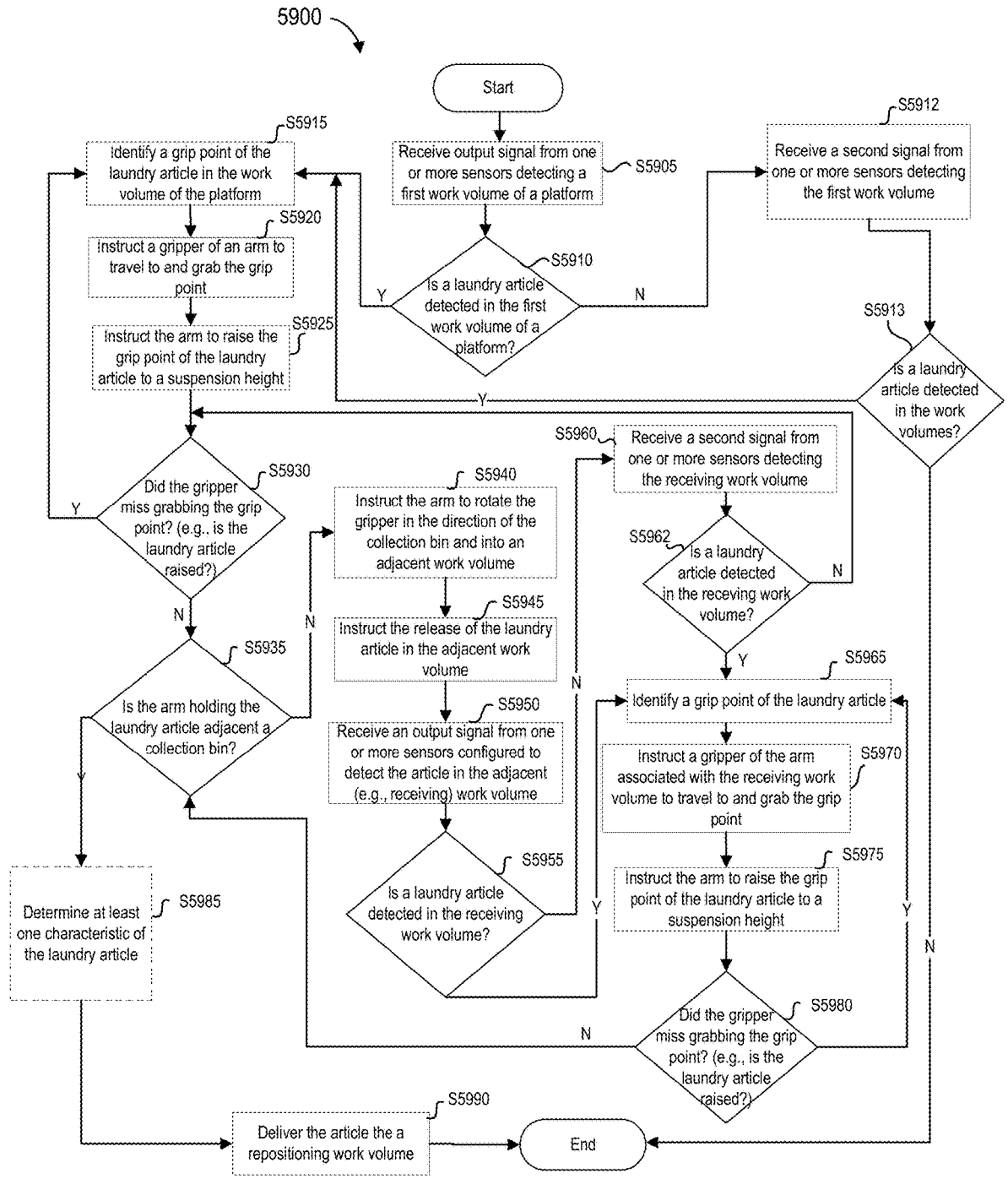
FIG. 58 depicts an implementation of a method of autonomously separating a load of clean laundry with an autonomous separating device.

Referring now to FIG. 58, any of the examples and implementations described previously with regard to an autonomous separating 5000 are applicable to implementations described herein with regard to a method 5900 of robotically separating a deformable article (e.g., also referred to herein as a "deformable laundry article") from an amassed plurality of deformable articles for delivering to at least one of a repositioning robot 6000, a folding robot 7000, and a packing robot 8000. Any of the methods described hereinafter applicable in combination with any and all of the processes, devices, and systems described previously with regard to implementations.

Figure 59:
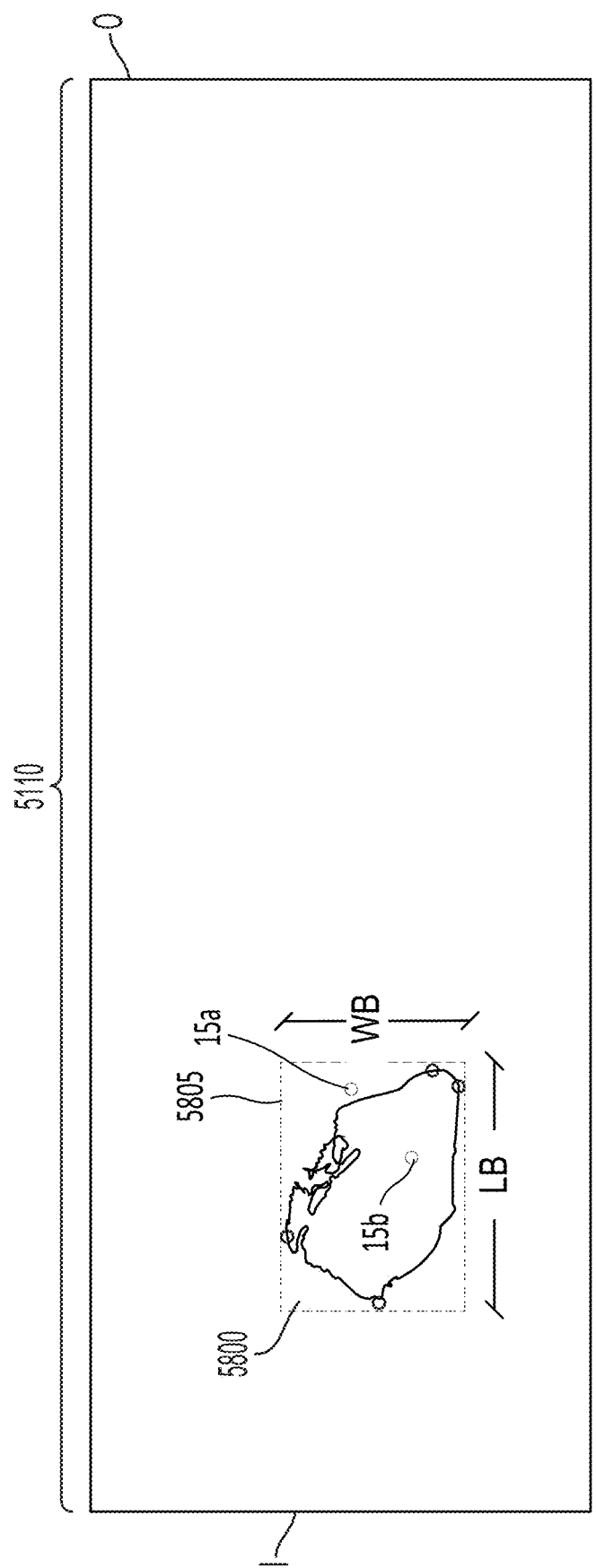
FIG. 59 depicts a schematic of an implementation of a detection system of the autonomous laundry separating device.

In implementations, a method 5900 of autonomously (e.g., robotically) separating a plurality of deformable laundry articles into constituent single articles for folding and packaging, comprises receiving S5905, at a controller, a signal from at least one sensor disposed at least one of on, adjacent to, and within an associated one of a plurality of sequential work volumes, the signal being indicative of at least one of the plurality of deformable laundry articles being disposed within the associated one of the plurality of sequential work volumes. The method comprises determining S5910, based on the received signal, a location of the at least one of the plurality of deformable articles on a stationary floor 5110 of the associated one of the plurality of sequential work volumes 5105a-c. As described previously with regard to implementations, the plurality of sequential work volumes are constituent to a platform 5100 and the stationary floor 5110 of the platform 5100 extends between an inlet end I and an outlet end O. A portion of the stationary floor 5110 adjacent the inlet end I is configured to receive thereon the plurality of deformable laundry articles 12a-n. If the controller 5005 determines, based on the received signal, that a laundry article is not detected, in implementations, the method comprises receiving S5912 a second signal from another of the at least one sensor. For example, in implementations, the first signal can be at least one of a 2D and 3D image and the second signal can be another at least one of a 2D and 3D image. In implementations, the second signal can be, for example as shown in FIG. 59, a 2D mask 5800 derived from an image of the floor 5110 platform. The 2D mask comprises an outline of the peripheral edge of an article disposed on the floor 5110. In implementations the first signal can include an IR greyscale image or RGB image of the floor 5110 and the second signal can include an IR greyscale image or RGB image of the article disposed on the floor. In implementations, the controller can take an absolute difference in luminance value of the background image of the floor and the luminance value of the article to find an edge between the article and floor thereby creating a mask, or outline, of the article. Additionally or alternatively, in implementations, the controller 5005 receives the input signal of one or more sensors (e.g., one or more sensors 5140a-c, 5147a-c), takes an absolute difference between the bits of background and running images, uses a threshold to make that difference image black and white, and then applies at least one of eroding and blurring to generate the final mask. This reduces potential errors caused by lighting differences.

The method comprises determining S5913 wherein an article 12 is detected based on the second signal. If no article is detected, the method concludes. If an article is detected, the method comprises identifying S5915 a grip point on the article and instructing S5920 at least one drive of at least one of a plurality of arms disposed in series along the platform to at least one of rotate, tilt, extend, and retract a terminal gripper 5205 configured to selectively grasp at least one of the plurality of deformable laundry articles at the determined grip point. As described herein with regard to implementations, each one of the plurality of arms is associated with one of the plurality of sequential work volumes. The controller instructs an actuator of the terminal gripper to close on the at least one of the plurality of deformable laundry articles. The method comprises instructing the at least one drive to raise S5925 the closed terminal gripper and the grasped at least one of the plurality of deformable laundry articles to a hoist height above the stationary floor, and rotate S5940 toward the outlet end into an adjacent work volume (e.g., a "receiving work volume"). In implementations, the method comprises determining S5930 whether the gripper missed grasping the grip point and repeats the instructions of identifying S5915 a grip point, instructing the arm to rotate, tilt, extend and/or retract the gripper to the grip point, instruct the gripper to grasp the grip point, and instruct the arm S3925 to raise the gripper and grasped article to a hoist height.

As described previously with regard to implementations, the method can comprise the controller 5005 executing a subroutine for a miss recovery if the controller 5005 determines the gripper has not grasped the article 12. In implementations, the miss recovery routine comprises moving the target grip point 15 inward from an detected edge of the one or more articles 12a-n by a distance in a range of between about 5-10 mm with each subsequent attempt after a missed grab (e.g., grasp by the gripper). Additionally or alternatively, in implementations, the controller 5005 can determine a center of mass of the mask of the at least one article 12 on the floor 5110 of the work volume and move the targeted grip point 15 from the outer most edge of the at least one article 12 toward the center of mass with each subsequent attempt after a missed grab.

In implementations, method comprises the controller 5005 selecting the alternate grip point locations randomly, or by iterating attempted grasps at alternate grip point locations in a deterministic manner. This ensures that the gripper 5210 will find a graspable portion of the article 12, accounting for any spacing between extensions and the core of a garment, such as between sleeves and the torso portions of a shirt, which may place a center of mass in an open location not occupied by the article 12. Additionally or alternatively, in implementations, the controller 5005 is configured to create a bounding box 5805 around the mask 5800 of the article 12 as shown in FIG. 59, the bounding box comprising a length LB and a width WB that places the mask 5800 inside the bounding box 5805. The controller 5005 is configured to choose a random point as the target grip point 15 based on the length LB and width WB of the bounding box, determine whether the grip point 15 is within the mask (e.g., grip point 15b) and not just within in the bounding box (e.g., 15a), and instruct a gripper 5210 to grasp the grip point 15b within the mask area corresponding to the location of the article 12. If the grip point was not within the mask 5800, the controller 5005 randomly selects a new target grip point with the bounding box 5805 and iteratively continues randomly selecting target grip points until a target point is within both the bounding box 5805 and the mask 5800. The randomness of determining a grip point 15 within the bounding box 5805 accounts for the difference in size between an end effector in software path planning (e.g., a single point) and the volume of the gripper 5210, which is a 3D element and not a single point, and results in successful grabs of the article 12 regardless of article size. This enables a gripper 5210 to grab very small items such as baby socks, for example. By comparison, targeting a center of mass could result in the joint at the base of the fingers of the gripper 5210 touching the floor 5110 of the channel 5100 and not reaching the article, even though the center of the gripper 5210 was directly above the given target point, such as an edge point of the small article or a point moved inward from an edge point toward a center of mass.

Additionally or alternatively, prior to instructing the drive to rotate S5940 the arm toward the outlet end into an adjacent work volume, the method comprises determining 5935 whether the arm holding the article at the hoist height is adjacent at least one of a collection bin, collection platform, and repositioning robot conveyor at an outlet end. If the arm is not adjacent the outlet end, the method comprises instructing S5945 the actuator of the terminal gripper to open the gripper to release the at least one of the plurality of deformable laundry articles in the adjacent work volume. The method comprises receiving S5950 a signal from at least one sensor in the receiving work volume of the plurality of sequential work volumes, and determining S5955, based on the received signal, a state comprising at least one of one or more of the plurality of deformable laundry articles are present on the stationary floor, and one or more of the plurality of deformable laundry articles are not present on the stationary floor. (In implementations comprising hand-offs of a hoisted article without releasing the article on the floor, the controller is configured to determine whether the one or more of the plurality of hoisted articles are present above the stationary floor or not.)

If the controller determines, based on the received signal, that the laundry article is not detected, in implementations, the method comprises receiving S5960 a second signal from another of the at least one sensor. For example, in implementations, the first signal can be at least one of a 2D and 3D image and the second signal can be another at least one of a 2D and 3D image. In implementations, the second signal can be, for example as shown in FIG. 59, a 2D mask 5800 derived from an image of the floor 5110 of platform 5100. The 2D mask comprises an outline of the peripheral edge of an article disposed on the floor 5110. In implementations the first signal can include an IR greyscale image or RGB image of the floor 5110 and the second signal can include an IR greyscale image or RGB image of the article disposed on the floor. The controller 5005 can take an absolute difference in luminance value of the background image of the floor and the luminance value of the article to find an edge between the article and floor thereby creating a mask, or outline, of the article. Additionally or alternatively, in implementations, the controller 3005 receives the input signal of one or more sensors (e.g., one or more sensors 5140a-c, 5147a-c), takes an absolute difference between the bits of background and running images, uses a threshold to make that difference image black and white, and then applies at least one of eroding and blurring to generate the final mask. This reduces potential errors caused by lighting differences.

The method comprises determining S5962 whether the second signal indicates an article being detected in the receiving work volume. If any article is not detected, the method returns to determining S5930 whether the previous gripper missed the grab or potentially dropped the article prior to entering the receiving (adjacent) work volume. If the article is on the floor of the prior work volume, the method returns to identifying S5915 a grip point, instructing S5920 the gripper to travel to the grip point, and instructing S5925 the previous arm to hoist the article.

If the article is determined S5962 to be in the receiving work volume, either detected from the signal of a first of the at least one sensor or a second signal of the at least one sensor, the method comprises identifying S5965 a grip point of the laundry article and instructing S5970 a gripper of the arm associated with the receiving work volume to travel to and grasp the grip point. The method comprises instructing S5975 the arm to raise the article engaged in the gripper to a suspension height and confirm S5980 whether the laundry article is raised. If the article is not detected in the gripper at the hoist height, the method comprises repeating the steps of identifying S5965 a grip point of the laundry article, instructing S5970 a gripper of the arm associated with the receiving work volume to travel to and grasp the grip point, and instructing S5975 the arm to raise the article engaged in the gripper.

The method comprises determining 5980 whether the gripper missed grabbing the grip point. If the gripper missed, the method comprises executing a miss recovery subroutine as previously described. If the gripper did not miss, the method comprises determining 5935 whether the arm holding the article at the hoist height is adjacent an outlet end O of the platform 5100. If the arm is not adjacent the outlet end, the method iteratively repeats S5940-S5980 until the arm holding the article is the arm closest to the outlet end O. The method optionally comprises determining S5985 at least one characteristic of the laundry article 12 and delivering S5990 the article to at least one of collection bin, collection platform, and repositioning robot conveyor disposed adjacent the outlet end of the platform.

In implementations, the method comprises stopping iterating the grasps, rotations, and releases when each one of the plurality of deformable laundry articles exits the platform, passing over the outlet end O as a solitary deformable article. In implementations, the method comprises instructing two or more of the plurality of arms to operate simultaneously within each associated one of the plurality of sequential work volumes. In implementations, the method comprises instructing terminal grippers of two or more of the plurality of arms operating simultaneously to simultaneously grasp at least one of the plurality of deformable articles. In implementations, the method comprises instructing the at least one drive of an arm with an engaged terminal gripper to move the terminal gripper in at least one of alternating side-to-side and alternating up and down motions to shake a grasped deformable article at the hoist height. In implementations, the method comprises receiving a contact sensor signal from at least one contact sensor on a gripping surface of the terminal gripper indicative of none of the plurality of deformable laundry articles being grasped in the terminal gripper at the hoist height. In implementations, the rather than an engaged gripper releasing each article 12 on the floor 5110 of an adjacent work volume 5105 following a hoist, the gripper 5205 of an available arm 5210 in a receiving work volume 5105 can grip an edge of the article 12 (e.g., a lowest hanging point), hoist the gripped edge to the hoist height and the longest engaged gripper can release the article 12.

As depicted in FIG. 60, the separating device 5000 is a state machine that operates based on a current state of the platform 5100. Between runs of processing loads of one or more deformable articles, the platform 5100 and the plurality of arms 5210*a-c* therein are in a dormant state 5855, the platform 5100 being devoid of any articles. Once a load of one or more articles 12*a-n* enter the platform 5100, the arms 5210*a-c* are in a stowed position 5860 at rest. The device 5000 captures images 5865, evaluates 5870 the environment of the platform 5100 and based on a state of the one or more articles 12*a-n* within the platform 5100, moves the arms 5875 to action as described previously with regard to implementations. The device 5000 iteratively cycles through the states of capturing images 5865, evaluating 5870 the environment, and moving 5875 the arms 5210*a-c* until all of the one or more articles 12*a-n* are sorted out of the platform 5100. The arms 5210*a-c* then resume their stowed state 5860 and the device 5000 again is in a dormant state 5855 awaiting at least one of cleaning and receiving a next load of one or more deformable articles 12*a'-n'*.

Figure 61:
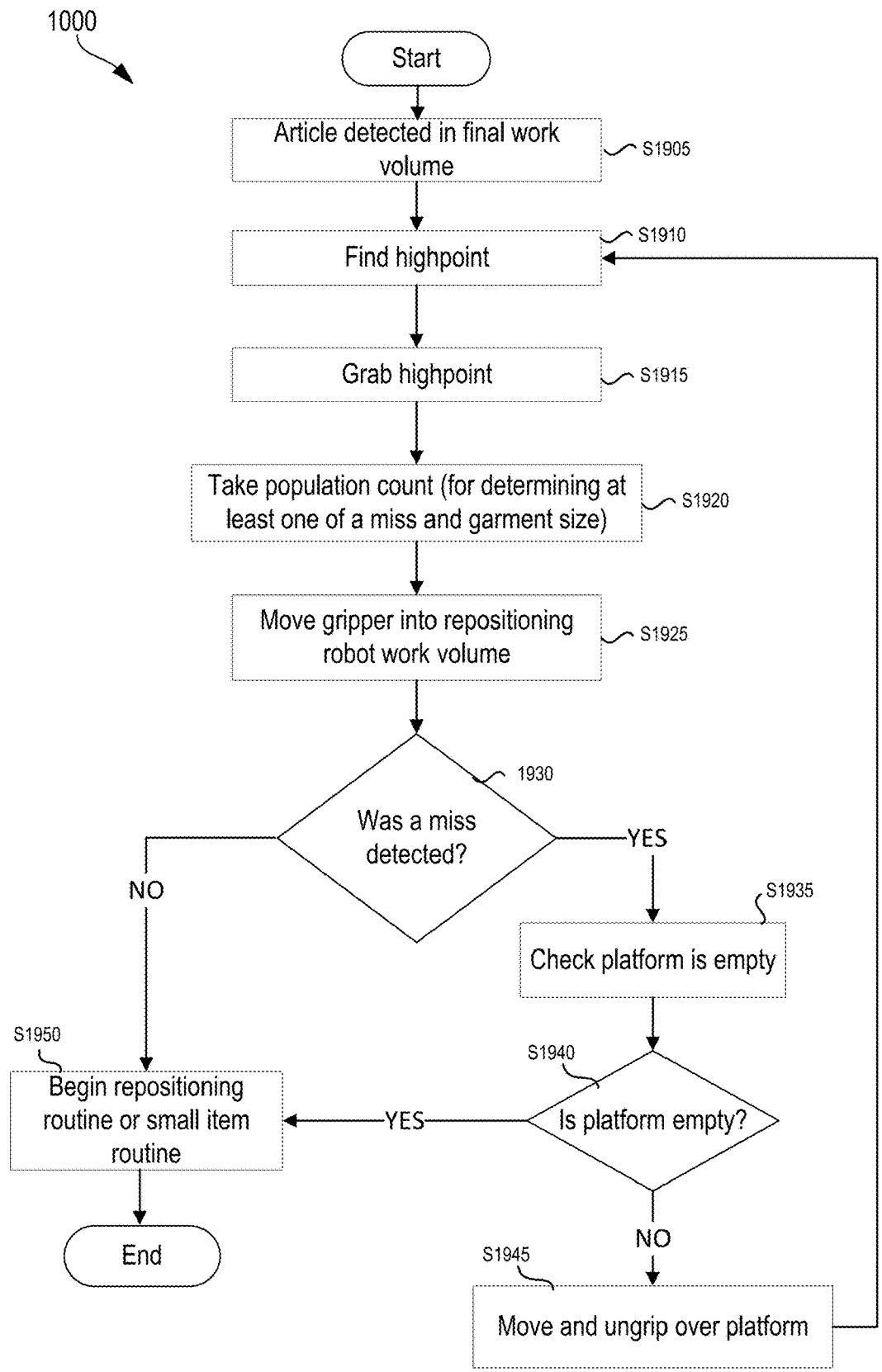
FIG. 61 depicts an implementation of a method of handing off an article between a separating robot and a repositioning robot in a separating and repositioning system.

As depicted in FIG. 61, a method 1000 of executing a handing off between the separating robot 5000 and the repositioning robot 6000 comprises detecting S1905 an article in the final work volume 5105 (e.g., the work volume comprising the outlet end O) with the at least one of the one or more sensors 5140*a-c*, 5147*a*-7, finding S1910 a high point on an article, and instructing the gripper 5210*c* of the final work volume to grab S1915 the high point. The method 1000 comprises taking S1920 a population count at least one of at and just below the gripper raised to a first height above the floor 5110, the first height placing the gripper 5205*c* within a field of view of at least one sensor 5140*d* disposed beneath a repositioning robot conveyor 6030 (as shown in FIG. 9B). In implementations, the at least one sensor 5140*d* disposed beneath the repositioning robot conveyor 6030 is a camera comprising a field of view aimed down the length of the platform 5100. The controller 5005 then instructs the at least one motor 5125*a-c* to raise the gripper to a final hoist height and move S1925 the gripper into the work volume 6035 of the repositioning robot 6000.

The controller then determines S1930, based on the population count, whether the grab was missed (or alternatively successful) and/or if the article grabbed by the gripper is small and requires special disposition. If the threshold population count is above a threshold value, the article was grabbed and is not small. Because the article grab was not missed and is not small, the gripper delivered the article to the repositioning robot work volume 6035 and a repositioning routine begins S1950.

If the threshold population count is below the threshold value, a miss is detected. The missed grab could be either a true miss, or the grab was successful but the article is small (e.g., comprises a detected point cloud below a threshold value) and requires special disposition (e.g., rerouting) to a packing robot 8000 without being folded by a folding robot 7000. If a miss is determined S1930, the controller S1935 checks whether the platform 5100 is empty. If the platform is empty, the miss detection is false and the repositioning robot 6000 executes a small article routine on the small article delivered to the work volume 6035. The small article routine can comprises at least one of a lifter of the repositioning robot 6000 hoisting the article and delivering it to a collection bin or conveyor adjacent the repositioning robot work volume 6035 for delivery to a packing robot 8000 without folding and the conveyor receiving the article thereon and transiting the article out of the work volume and to the folding robot 7000 for retrieval by a packing robot 8000 without folding.

If a miss is detected and the platform 5100 is not empty, the controller instructs the last arm 5210*c* to move the gripper back over the platform to a location other than above the detected high point and release the gripper 5205*c* (e.g., ungrip) over the platform 5100 so that when the controller iterates finding S1910 the highpoint, the gripper is ready to grab S1915 the highpoint, once again attempting a grab of the article.

If the gripper 5205*c* had been holding a small item while another item remained on the platform 5100 in the final work volume, the small item will be deposited back onto the platform 5100 when the gripper returns and ungrips over the platform. Because the gripper ungrips at a location other than the high point, the gripper is unlikely to grasp the small article again when it grabs S1915 the highpoint.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g., a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Other examples are within the scope and spirit of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

What is claimed is:

1. A system for separating and repositioning a plurality of deformable articles amassed in a collection, comprising:
a platform comprising a plurality of sequential work volumes and a stationary floor extending between an inlet end and an outlet end of the platform, a portion of the stationary floor within a first work volume of the plurality of sequential work volumes being configured to receive thereon the plurality of deformable articles adjacent an inlet end;
a plurality of arms disposed in series along the platform, each one of the plurality of arms comprising an actuatable terminal gripper configured to selectively grasp at least one of the plurality of deformable articles and at least one arm drive motor configured to move the terminal gripper within one or more sequential work volumes to pass the one or more of the plurality of deformable articles sequentially through the plurality of sequential work volumes;
at least one separation sensor disposed at least one of on, adjacent to, and within the plurality of sequential work volumes, the at least one sensor configured to
detect at least one of the plurality of deformable articles disposed within an associated one of the plurality of sequential work volumes, and
output a signal indicative of at least one of a presence and location of the at least one of the plurality of deformable articles relative to the terminal gripper of one of the plurality of arms closest to the deformable article;
a conveyor adjacent the outlet end of the platform and disposed at a bottom of a repositioning work volume, the repositioning work volume being configured to receive therein the terminal gripper of an arm of the plurality of arms closest to the outlet end and one of the plurality of deformable articles engaged by the terminal gripper;
two or more repositioning arms disposed about a perimeter of the repositioning work volume at individually anchored positions spaced apart by between about 150 cm to 400 cm, each of the two or more repositioning arms comprising a gripper and at least one repositioning drive motor and configured to
move within the repositioning work volume for releasably engaging a deformable laundry article, and
operate at least one of independently of and in tandem with another of the two or more repositioning arms and the arm of the plurality of arms closest to the outlet end of the platform to at least one of raise and suspend the deformable laundry article above the conveyor;
two or more repositioning sensors disposed at two or more fixed locations about the work volume, each of the two or more repositioning sensors configured to
at least one of detect one or more features and capture one or more images of the deformable laundry article disposed within the work volume, and
output a signal comprising the at least one of the detected one of one or more features and captured one or more images; and
a controller in operable communication with the at least one arm drive motor, the at least one repositioning drive motor, the at least one separation sensor, and the two or more repositioning sensors, the controller configured to
receive a signal from the at least one separation sensor of the plurality of sequential work volumes indicative of at least one of the plurality of deformable articles being disposed within the at least one of the plurality of sequential work volumes,
determine a location of the at least one of the plurality of deformable articles relative to a closest arm of the plurality of arms,
instruct the at least one drive motor to position the terminal gripper of the closest arm at the determined location to grasp the at least one of the plurality of deformable articles,
instruct an actuator of the terminal gripper of the closest arm to close on the at least one of the plurality of deformable articles,
instruct the at least one drive motor to
raise the closest arm and associated closed terminal gripper and the grasped at least one of the plurality of deformable articles to a hoist height above the stationary floor, and
move toward the outlet end into at least one of an adjacent work volume and the repositioning work volume for handing off to at least one of an adjacent one of the plurality of arms in series and one of the two or more repositioning arms,
receive a signal from at least one of the at least one separation sensor and at least one of the two or more repositioning sensors, and
determine, based on the received signal, a state comprising at least one of
one or more of the plurality of deformable articles are present in the plurality of work volumes,
none of the plurality of deformable articles are present in the plurality of work volumes, and
one of the plurality of deformable articles is disposed within the repositioning work volume.

2. The system of claim 1, wherein moving the terminal gripper comprises the at least one arm drive motor at least one of rotating, tilting, extending, translating, and retracting the terminal gripper.

3. The system of claim 1, wherein each one of the plurality of arms is associated with and disposed adjacent to one of the plurality of sequential work volumes.

4. The system of claim 1, wherein the controller is further configured to instruct the actuator of the terminal gripper to open the gripper to release the at least one of the plurality of deformable articles in at least one of the adjacent work volume and the repositioning work volume.

5. The system of claim 4, wherein the controller is further configured to, before instructing the terminal gripper within the repositioning work volume to release the one of the plurality of deformable articles, determine that at least one of the two or more repositioning arms is engaged with the one of the plurality of deformable articles in the repositioning work volume.

6. The system of claim 1, wherein the two or more repositioning sensors are positioned apart from the two or more repositioning arms.

7. The system of claim 1, wherein the two or more repositioning sensors are each positioned on at least one base supporting one of the two or more repositioning arms.

8. A system for separating a plurality of deformable articles amassed in a collection for individual folding, comprising
a pair of parallel platforms separated by a gap, each of the pair of parallel platforms comprising a plurality of work volumes disposed sequentially along a stationary floor extending between an inlet end and an outlet end of the platform, a portion of the stationary floor within a first work volume of the plurality of sequential work volumes being configured to receive thereon the plurality of deformable articles adjacent the inlet end,
a plurality of arms disposed in series in the gap between the pair of parallel platforms, each one of the plurality of arms being configured to rotate in a range of between 180 and 360 degrees, each one of the plurality of arms being associated with parallel ones of the plurality of sequential work volumes of the pair of parallel platforms, each one of the plurality of arms comprising
 an actuatable terminal gripper configured to selectively grasp at least one of the plurality of deformable articles within either one of the pair of parallel platforms, and
 at least one drive motor is configured to at least one of rotate, tilt, extend, and retract each terminal gripper into the associated ones of the plurality of sequential work volumes;
at least one sensor disposed at least one of on, adjacent to, and within the plurality of sequential work volumes of the pair of parallel platforms, the at least one sensor configured to
 detect at least one of the plurality of deformable articles disposed within one of the plurality of sequential work volumes of the pair of parallel platforms, and
 output a signal indicative of at least one of a presence and location of the at least one of the plurality of deformable articles relative to the terminal gripper of the one of the plurality of arms associated with the one of the plurality of sequential work volumes of the pair of parallel platforms; and
a controller in operable communication with the at least one drive motor and the at least one sensor of each of the parallel platforms, the controller configured to
 receive a signal from the at least one sensor in an associated one of the plurality of sequential work volumes indicative of at least one of the plurality of deformable articles being disposed within the associated one of the plurality of sequential work volumes of the pair of parallel platforms,
 determine a location of the at least one of the plurality of deformable articles on the stationary floor within a work volume of one of the pair of parallel platforms relative to the arm associated with the work volume,
 instruct the at least one drive motor to at least one of rotate the associated arm into the other of the pair of parallel platforms and position the terminal gripper of the associated arm at the determined location to grasp at least one of the plurality of deformable articles,
 instruct an actuator of the terminal gripper of the associated arm to close on the at least one of the plurality of deformable articles,
 instruct the at least one drive to
  raise the closed terminal gripper of the associated arm and the grasped at least one of the plurality of deformable articles to a hoist height above the stationary floor of one of the pair of parallel platforms, and
  rotate toward the outlet end into an adjacent work volume of the one of the pair of parallel platforms,
 instruct the actuator of the terminal gripper to open the gripper to release the at least one of the plurality of deformable articles in the adjacent work volume,
 receive a signal from the at least one sensor of the plurality of sequential work volumes, and
  determine, based on the received signal, a state comprising at least one of one or more of the plurality of deformable articles are present on the stationary floor of at least one of one of the pair of parallel platforms, and
  none of the plurality of deformable articles are present on the stationary floor of at least one of the pair of parallel platforms.

9. The system of claim 8, further comprising pair of parallel conveyors, each one of the pair of parallel conveyors being disposed adjacent the outlet end of each one of the pair of parallel platforms and disposed at a bottom of a repositioning work volume, the repositioning work volume being configured to receive therein the terminal gripper of an arm of the plurality of arms closest to the outlet end and one of the plurality of deformable articles gripped by the terminal gripper.

10. The system of claim 9, further comprising two or more repositioning arms disposed about a perimeter of the repositioning work volume at individually anchored positions spaced apart by between about 150 cm to 400 cm, each of the two or more repositioning arms comprising a gripper and at least one repositioning drive motor and being configured to
 move within the repositioning work volume for releasable engaging a deformable laundry article, and
 operate at least one of independently of and in tandem with another of the two or more repositioning arms and the arm of the plurality of arms closest to the outlet end of the platform to at least one of raise and suspend the deformable laundry article above the conveyor.

11. The system of claim 10, further comprising two or more repositioning sensors disposed at two or more fixed locations about the work volume and spaced apart by between about 30 cm to 400 cm, each of the two or more repositioning sensors configured to
 at least one of detect one or more features and capture one or more images of the deformable laundry article disposed within the work volume, and
 output a signal comprising the at least one of the detected one of one or more features and captured one or more images, the signal being indicative of the deformable laundry article being spread apart for folding.

12. The system of claim 11, wherein the two or more repositioning sensors are each positioned on at least one base supporting one of the two or more repositioning arms.

13. The system of claim 11, wherein the at least one sensor comprises two cameras disposed on a base supporting the arm closest to the outlet end, each one of the two cameras having a field of view one of the pair of work volumes.

14. The system of claim 11, further comprising a controller in operable communication with the at least one arm drive motor, the at least one repositioning drive motor, the at least one separation sensor, and the two or more repositioning sensors, the controller configured to
 receive a signal from the at least one separation sensor of the plurality of sequential work volumes indicative of at least one of the plurality of deformable articles being disposed within the associated one of the plurality of sequential work volumes,
 determine a location of the at least one of the plurality of deformable articles on the stationary floor relative to the associated arm,
 instruct the at least one drive motor to position the terminal gripper of the associated arm at the determined location to grasp the at least one of the plurality of deformable articles, instruct an actuator of the terminal gripper of the associated arm to close on the at least one of the plurality of deformable articles, instruct the at least one drive motor to
- raise the arm and associated closed terminal gripper of the arm and the grasped at least one of the plurality of deformable articles to a hoist height above the stationary floor, and
- rotate toward the outlet end into at least one of an adjacent work volume and an adjacent one of the pair of repositioning work volumes, instruct the actuator of the terminal gripper to open the gripper to release the at least one of the plurality of deformable articles in at least one of the adjacent work volume and the adjacent one of the repositioning work volumes, receive a signal from at least one of at least one separation sensor and at least one of the two or more repositioning sensors, and determine, based on the received signal, a state comprising at least one of
- one or more of the plurality of deformable articles are present on the stationary floor,
- none of the plurality of deformable articles are present on the stationary floor, and
- one of the plurality of deformable articles is disposed within the adjacent one of the repositioning work volumes.

15. The system of claim 14, wherein the controller is further configured to, before instructing the terminal gripper within the adjacent one of the repositioning work volumes to release the one of the plurality of deformable articles, determine that at least one of the two or more repositioning arms is engaged with the one of the plurality of deformable articles in the adjacent one of the repositioning work volumes.

16. The system of claim 14, wherein the one of the plurality of deformable articles disposed within the adjacent one of the repositioning work volumes is disposed on the conveyor.

17. The system of claim 14, wherein the controller is further configured to actuate the repositioning drive motor of one or more of the two or more repositioning arms of each one of the pair of parallel conveyors.

18. The system of claim 17, wherein the controller is further configured to simultaneously activate two or more of the arm drive motor of the separating arm closest to the outlet end of the pair of platforms and the two or more repositioning arms of each of the pair of parallel conveyors to at least one of hoist and fold the deformable article disposed within one of the work volumes of the pair of parallel conveyors.

19. The system of claim 18, wherein the controller is further configured to simultaneously activate two or more of the arm drive motor of the separating arm closest to the outlet end of the pair of platforms and the two or more repositioning arms of each of the pair of parallel conveyors to at least one of hoist and fold the deformable article disposed within both of the work volumes of the pair of parallel conveyors.

20. A method of robotically separating a laundry article from a pile of laundry, comprising:

receiving, at a controller, a signal from at least one sensor disposed at least one of on, adjacent to, and within a plurality of sequential work volumes, the signal being indicative of at least one of a plurality of deformable laundry articles being disposed within the associated one of the plurality of sequential work volumes;

determining, based on the received signal, a location of the at least one of the plurality of deformable articles on a stationary floor of the associated one of the plurality of sequential work volumes, the plurality of sequential work volumes being constituent to a platform and the stationary floor extending between an inlet end and an outlet end of the platform, a portion of the stationary floor adjacent the inlet end being configured to receive thereon the plurality of deformable laundry articles;

instructing at least one drive of at least one of a plurality of arms disposed in series along the platform to at least one of rotate, tilt, extend, and retract a terminal gripper configured to selectively grasp at least one of the plurality of deformable laundry articles at the determined location, each one of the plurality of arms being associated with one of the plurality of sequential work volumes, a last one of the plurality of arms being configured to extend into a repositioning work volume configured to be disposed adjacent the outlet end;

instructing, by the controller, an actuator of the terminal gripper to close on the at least one of the plurality of deformable laundry articles;

instructing the at least one drive to
- raise the closed terminal gripper and the grasped at least one of the plurality of deformable laundry articles to a hoist height above the stationary floor, and
- rotate toward the outlet end into at least one of an adjacent work volume and the repositioning work volume;

instructing the actuator of the terminal gripper to open the gripper to release the at least one of the plurality of deformable laundry articles in the adjacent work volume;

receiving a signal from the at least one sensor of the plurality of sequential work volumes; and determining, based on the received signal, a state comprising at least one of one or more of the plurality of deformable laundry articles are present on the stationary floor,
- one or more of the plurality of deformable laundry articles are not present on the stationary floor, and
- one of the plurality of deformable laundry articles is disposed in a repositioning work volume adjacent the outlet end.

* * * * *